United States Patent
Kim et al.

(10) Patent No.: US 12,465,588 B2
(45) Date of Patent: Nov. 11, 2025

(54) INDOLE CARBOXAMIDE DERIVATIVE AND PHARMACEUTICAL COMPOSITION CONTAINING SAME

(71) Applicant: KUKJE PHARMA CO., LTD., Seongnam-si (KR)

(72) Inventors: Younghoon Kim, Gunpo-si (KR); Juhee Lee, Gunpo-si (KR); Changmin Park, Anyang-si (KR); Sehoan Kim, Hwaseong-si (KR); Jungmin Seo, Incheon (KR); Shinyoung Lee, Anyang-si (KR); Sooin Chae, Seoul (KR); Younggwan Kim, Ansan-si (KR)

(73) Assignee: KUKJE PHARMA CO., LTD., Seongnam-si (KR)

( * ) Notice: Subject to any disclaimer, the term of this patent is extended or adjusted under 35 U.S.C. 154(b) by 932 days.

(21) Appl. No.: 17/638,707

(22) PCT Filed: Aug. 26, 2020

(86) PCT No.: PCT/KR2020/011372
§ 371 (c)(1),
(2) Date: Feb. 25, 2022

(87) PCT Pub. No.: WO2021/040393
PCT Pub. Date: Mar. 4, 2021

(65) Prior Publication Data
US 2023/0000821 A1 Jan. 5, 2023

(30) Foreign Application Priority Data
Aug. 26, 2019 (KR) .......................... 10-2019-0104379

(51) Int. Cl.
*A61K 31/404* (2006.01)
*A61P 19/02* (2006.01)
*A61P 25/28* (2006.01)

(52) U.S. Cl.
CPC ............ *A61K 31/404* (2013.01); *A61P 19/02* (2018.01); *A61P 25/28* (2018.01)

(58) Field of Classification Search
CPC ......... A61K 31/404; A61P 25/28; A61P 19/02
See application file for complete search history.

(56) References Cited

U.S. PATENT DOCUMENTS

2013/0018073 A1* 1/2013 Masada ................ C07D 209/14
514/415

FOREIGN PATENT DOCUMENTS

| | | |
|---|---|---|
| JP | 2008-527028 A | 7/2008 |
| JP | 2009-543766 A | 12/2009 |
| JP | 2014-500321 A | 1/2014 |
| KR | 10-2007-0028553 A | 3/2007 |
| KR | 10-2013-0099004 A | 9/2013 |
| WO | 01/00657 A2 | 1/2001 |
| WO | 2008/071944 A1 | 6/2008 |
| WO | 2009/083436 A1 | 7/2009 |
| WO | 2013/038308 A1 | 3/2013 |
| WO | 2013/072825 A1 | 5/2013 |
| WO | 2014/167444 A | 10/2014 |
| WO | 2015/158204 A | 10/2015 |
| WO | WO-2015158204 A1 * | 10/2015 ................ A61P 9/00 |

OTHER PUBLICATIONS

Abhisek Banerjee, et al. "Development of 2-aryl substituted quinazolin-4(3H)-one, pyrido[4,3-d]pyrimidin-4(3H)-one and pyrido[2,3-d]pyrimidin-4(3H)-one derivatives as microsomal prostaglandin E2 synthase-1 inhibiors", Bioorganic & Medicinal Chemistry Letters, 2014, pp. 4838-4844, vol. 24.
International Search Report for PCT/KR2020/011372 dated Dec. 1, 2020 [PCT/ISA/210].
Written Opinion for PCT/KR2020/011372 dated Dec. 1, 2020 [PCT/ISA/237].

* cited by examiner

*Primary Examiner* — Adam C Milligan
*Assistant Examiner* — Ernesto Valle, Jr.
(74) *Attorney, Agent, or Firm* — Sughrue Mion, PLLC

(57) ABSTRACT

Indole carboxamide compounds of Formula (II) or pharmaceutically acceptable salt thereof have activity of inhibiting production of prostaglandin $E_2$ ($PGE_2$) through inhibition of microsomal prostaglandin $E_2$ synthase-1 (mPGES-1). The indole carboxamide compounds and salts can be effectively used in treating or preventing inflammation, arthritis, high fever, pain, cancer, stroke or brain diseases such as Alzheimer's disease. A pharmaceutical composition contains the indole carboxamide compound as an active ingredient.

(II)

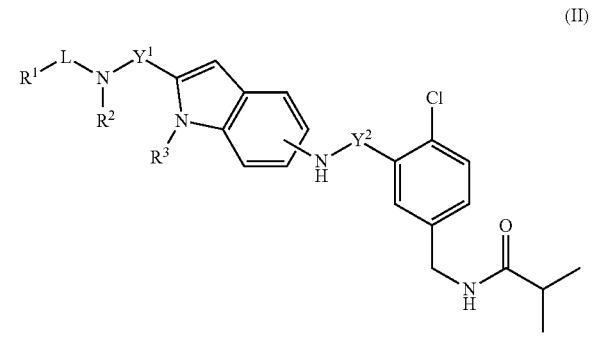

12 Claims, 3 Drawing Sheets

[Fig. 1]
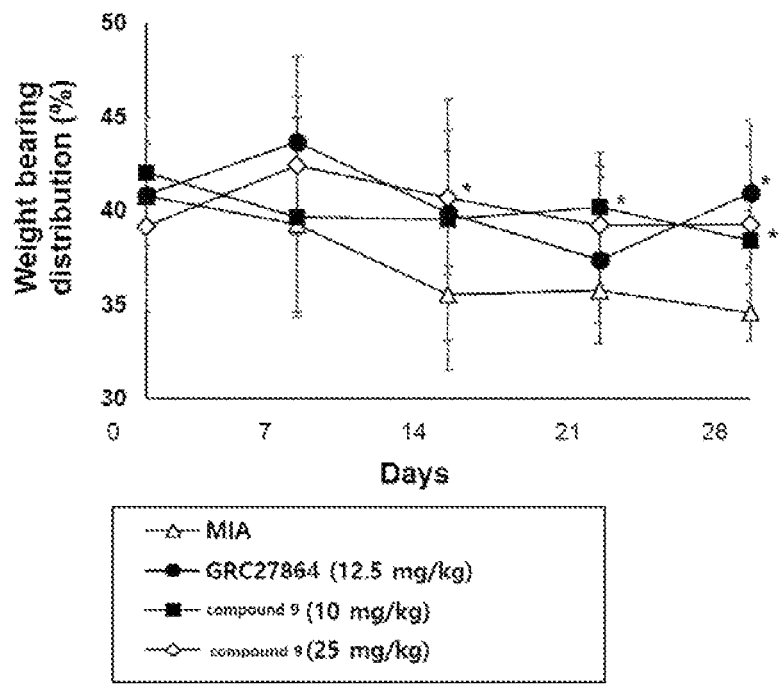
[Fig.2]
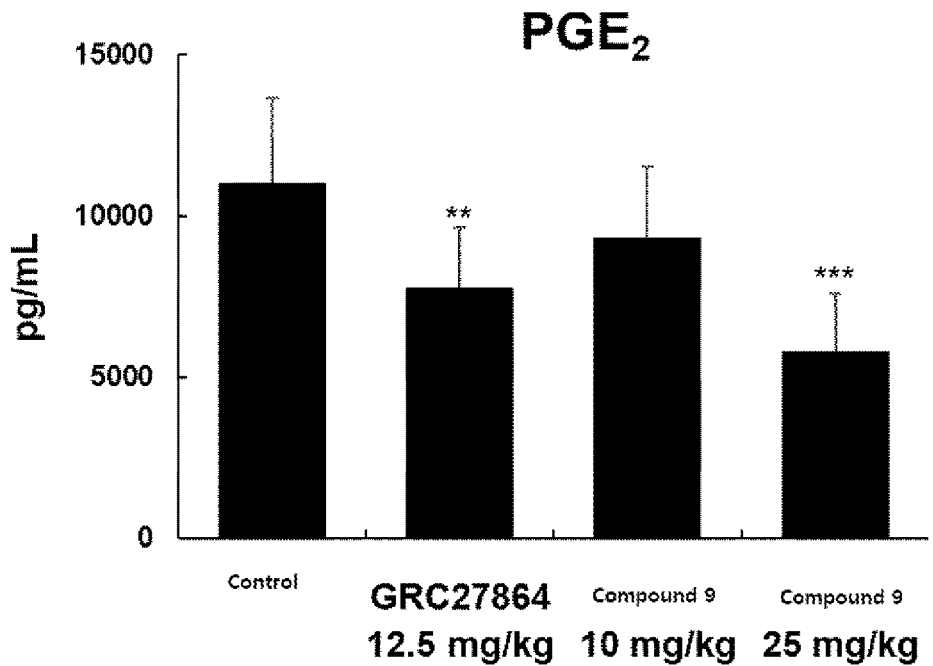

【Fig.3】
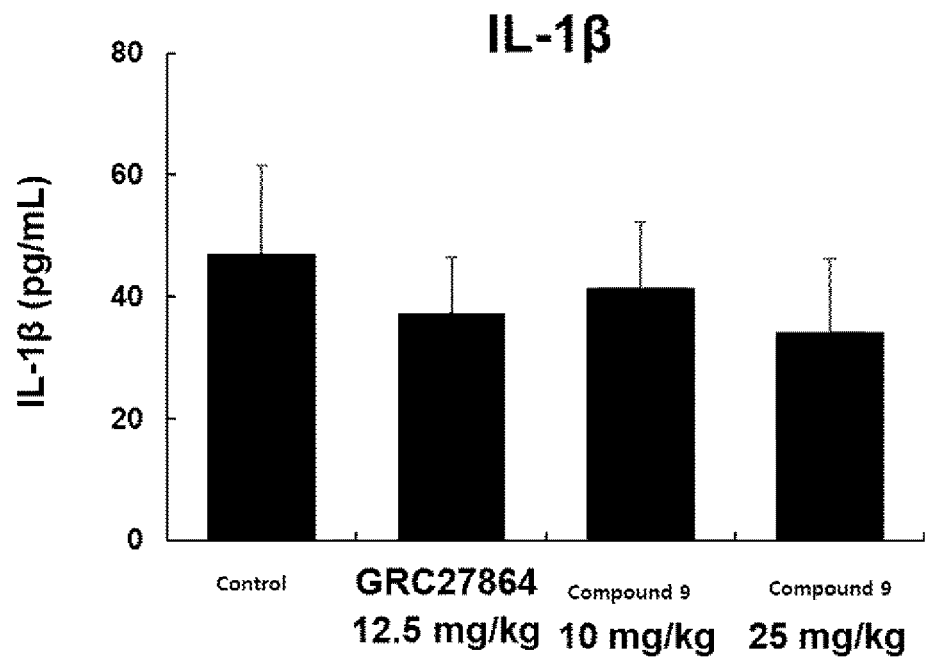
【Fig.4】
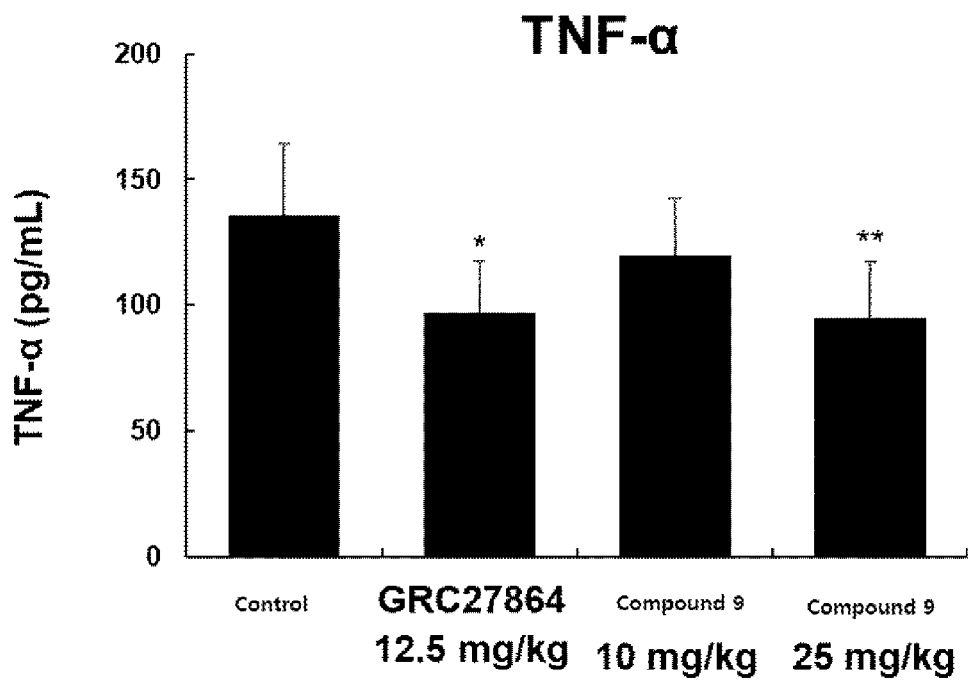

[Fig.5]
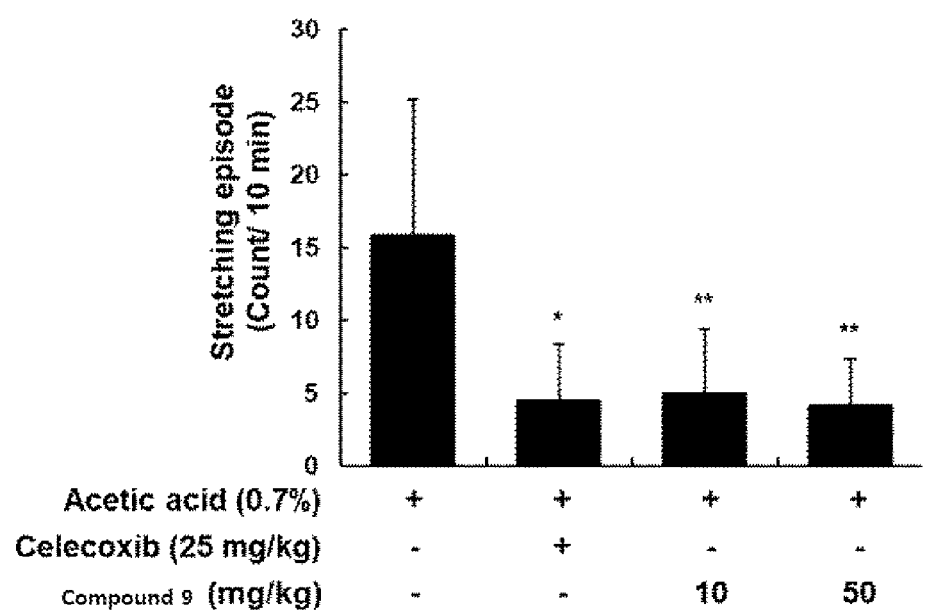

INDOLE CARBOXAMIDE DERIVATIVE AND PHARMACEUTICAL COMPOSITION CONTAINING SAME

CROSS REFERENCE TO RELATED APPLICATIONS

This application is a National Stage of International Application No. PCT/KR2020/011372 filed Aug. 26, 2020, claiming priority based on Korean Patent Application No. 10-2019-0104379 filed Aug. 26, 2019.

TECHNICAL FIELD

The present invention relates to an indole carboxamide derivative and a pharmaceutical composition comprising the same, and more specifically, it relates to an indole carboxamide derivative that blocks the production of prostaglandin $E_2$ ($PGE_2$), a factor inducing inflammation, through inhibition of microsomal prostaglandin E synthase-1 (mPGES-1), and a pharmaceutical composition comprising the same as an active ingredient.

BACKGROUND ART

Prostanoids are endocrine substances involved in various physiological processes, and one of them, prostaglandin $E_2$ ($PGE_2$), is known to be involved in inducing inflammation.

As a therapeutic agent for such inflammation, a COX-2 inhibitor that selectively inhibits only the cyclooxygenase-2 (COX-2) enzyme was developed. As a representative COX-2 inhibitor, celecoxib (Celebrex™) from Pfizer, valdecoxib (Bextra™) from G. D. Searle & Company and rofecoxib (Vioxx™) from Merck are known. They have been widely used for arthritis, severe pain, rheumatism and the like.

However, although COX-2 inhibitors reduced gastrointestinal dysfunction, the biggest side effect of nonsteroidal anti-inflammatory drugs (NSAIDs), due to cardiovascular side effects, they were withdrawn from the pharmaceutical market except for celecoxib. These cardiovascular side effects are reported to occur because the production of intermediate $PGH_2$ (prostaglandin $H_2$) is inhibited, thereby inhibiting the production of not only $PGE_2$ but also $PGI_2$ (prostacyclin) and $TXA_2$ (thromboxane).

Therefore, an inhibitor that selectively inhibits microsomal prostaglandin E synthase-1 (mPGES-1) involved in the production of $PGE_2$ by acting on the terminal stage of $PGH_2$ is recognized as a new drug candidate that uses an advantage of COX-2 inhibitors and complements the shortcomings, and studies targeting mPGES-1 are in progress.

In particular, the inhibition of mPGES-1 has been proven to be as effective as treatment using nonsteroidal anti-inflammatory drugs in pain and inflammation animal model studies, and is expected to be effective in the treatment of inflammation, arthritis, high fever, pain, cancer, stroke, and brain diseases such as Alzheimer's disease.

As inhibitors of mPGES-1, for example, pyridopyrimidine derivatives of the following formula (I) have been proposed (Bioorganic & Medicinal Chemistry Letters, 2014, 24, 4838-4844).

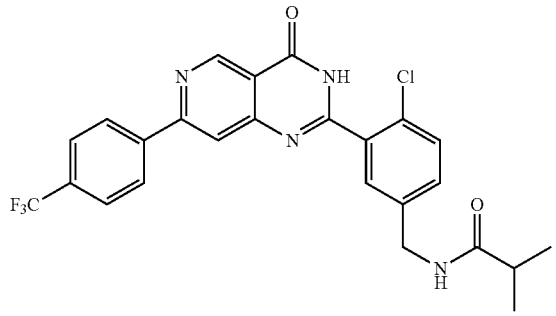

(I)

However, there is a need to develop a new mPGES-1 inhibitor that is more effective and has no side effects.

DISCLOSURE

Technical Problem

An object of the present invention is to provide an indole carboxamide derivative of the following formula (II) or a pharmaceutically acceptable salt thereof, which strongly inhibits the production of $PGE_2$.

Another object of the present invention is to provide a pharmaceutical composition for inhibiting mPGES-1 comprising an indole carboxamide derivative of the following formula (II) or a pharmaceutically acceptable salt thereof.

Technical Solution

One embodiment of the present invention relates to an indole carboxamide derivative of the following formula (II) or pharmaceutically acceptable salt thereof.

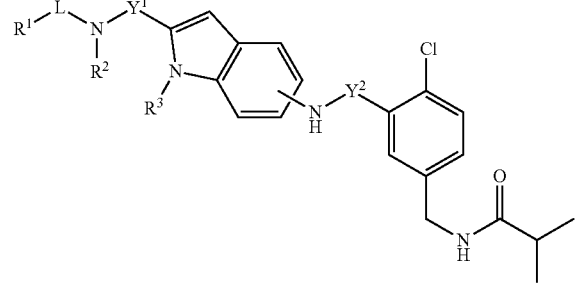

(II)

wherein,
$R^1$ is an aryl group;
L is absent or is a $C_1$-$C_6$ alkylene group;
$R^2$ is hydrogen; or
L and $R^2$ are bonded to each other to form a 4 to 7 membered heterohydrocarbon ring;
$Y^1$ and $Y^2$ are each independently C=O or $CH_2$; and
$R^3$ is hydrogen, a $C_1$-$C_6$ alkyl group, a $C_1$-$C_6$ haloalkyl group, or a $C_2$-$C_{12}$ alkoxyalkyl group.

The term "aryl group" as used herein includes an aromatic group and a heteroaromatic group, and partially reduced derivatives thereof. The aromatic group is a 5 to 15 membered simple or fused ring and the heteroaromatic group refers to an aromatic group containing at least one oxygen, sulfur, or nitrogen. Examples of representative aryl groups include phenyl, naphthyl, pyridinyl, furanyl, thiophenyl, indolyl, quinolinyl, imidazolinyl, oxazolyl, thiazolyl, and tetrahydronaphthyl, but are not limited thereto.

The term "$C_1$-$C_6$ alkylene group" as used herein refers to a straight-chain or branched divalent hydrocarbon consisting of 1 to 6 carbon atoms, and includes, for example, methylene, ethylene, propylene, butylene, etc., but is not limited thereto.

The term "4 to 7 membered heterohydrocarbon ring" as used herein refers to a functional group in which at least one of the ring carbons of the 4 to 7 membered hydrocarbon ring is substituted with oxygen, sulfur or nitrogen, and includes, for example, piperidine, morpholine, pyrimidine, oxolein, oxane, thiazolidine, and the like, but is not limited thereto.

The term "$C_1$-$C_6$ alkyl group" as used herein refers to a straight-chain or branched monovalent hydrocarbon consisting of 1 to 6 carbon atoms, and includes, for example, methyl, ethyl, n-propyl, i-propyl, n-butyl, i-butyl, t-butyl, n-pentyl, n-hexyl, and the like, but is not limited thereto.

The term "$C_1$-$C_6$ haloalkyl group" as used herein refers to a straight-chain or branched hydrocarbon having 1 to 6 carbon atoms substituted with one or more halogens selected from the group consisting of fluorine, chlorine, bromine and iodine, and includes, for example, trifluoromethyl, trichloromethyl, trifluoroethyl, and the like, but is not limited thereto.

The term "$C_2$-$C_{12}$ alkoxyalkyl group" as used herein refers to a complex group formed by substituting a $C_1$-$C_6$ alkoxy group on carbon of a $C_1$-$C_6$ alkyl group, and includes, for example, methoxymethyl, methoxyethyl, methoxypropyl, ethoxymethyl, ethoxyethyl, ethoxypropyl, propoxymethyl, propoxyethyl, propoxypropyl, and the like, but is not limited to.

One or more hydrogens of the aryl group, $C_1$-$C_6$ alkylene group, 4 to 7 membered heterohydrocarbon ring, $C_1$-$C_6$ alkyl group, $C_1$-$C_5$ haloalkyl group and $C_2$-$C_{12}$ alkoxyalkyl group may be substituted with $C_1$-$C_6$ alkyl, $C_2$-$C_6$ alkenyl, $C_2$-$C_6$ alkynyl, $C_3$-$C_{10}$ cycloalkyl, $C_3$-$C_{10}$ heterocycloalkyl, $C_3$-$C_{10}$ heterocycloalkyloxy, $C_1$-$C_6$ haloalkyl, $C_1$-$C_6$ alkoxy, $C_1$-$C_6$ thioalkoxy, aryl, acyl, hydroxy, thio, halogen, amino, alkoxycarbonyl, carboxy, carbamoyl, cyano, nitro, etc.

In one embodiment of the present invention, the indole carboxamide derivative may be an indole carboxamide derivative or a pharmaceutically acceptable salt thereof, which is a compound of the following formula (II-1).

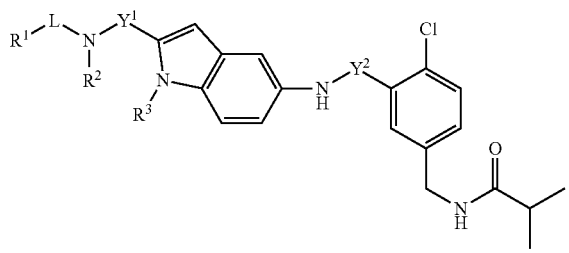

(II-1)

wherein,
$R^1$ is an aryl group;
L is absent or is a $C_1$-$C_6$ alkylene group;
$R^2$ is hydrogen; or
L and $R^2$ are bonded to each other to form a 4 to 7 membered heterohydrocarbon ring;

$Y^1$ and $Y^2$ are each independently C=O or $CH_2$; and
$R^3$ is hydrogen, a $C_1$-$C_6$ alkyl group, a $C_1$-$C_6$ haloalkyl group, or a $C_2$-$C_{12}$ alkoxyalkyl group.

In one embodiment of the present invention, the indole carboxamide derivative may be an indole carboxamide derivative or a pharmaceutically acceptable salt thereof, which is a compound of the following formula (II-2).

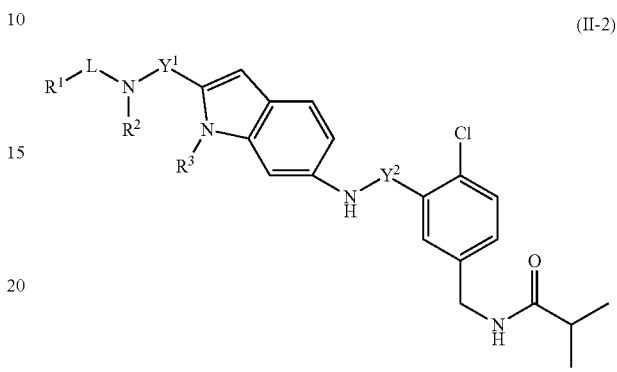

(II-2)

wherein,
$R^1$ is an aryl group;
L is absent or is a $C_1$-$C_6$ alkylene group;
$R^2$ is hydrogen; or
L and $R^2$ are bonded to each other to form a 4 to 7 membered heterohydrocarbon ring;
$Y^1$ and $Y^2$ are each independently C=O or $CH_2$; and
$R^3$ is hydrogen, a $C_1$-$C_6$ alkyl group, a $C_1$-$C_6$ haloalkyl group, or a $C_2$-$C_{12}$ alkoxyalkyl group.

In one embodiment of the present invention, the indole carboxamide derivative is a compound wherein $R^1$ is an aryl group substituted or unsubstituted with one or more substituents selected from the group consisting of halogen, $C_1$-$C_6$ alkyl group, $C_1$-$C_6$ haloalkyl group, $C_1$-$C_6$ alkoxy group, $C_1$-$C_6$ haloalkoxy group, nitro, aryl group, $C_3$-$C_{10}$ cycloalkyl group, $C_3$-$C_{10}$ heterocycloalkyl group, cyano, $C_1$-$C_6$ alkoxycarbonyl, and carboxy.

In one embodiment of the present invention, the indole carboxamide derivative is a compound wherein $R^1$ is phenyl, pyridinyl, pyrazolyl, pyrimidinyl, naphthalenyl, benzodioxolyl or tetrahydronaphthyl substituted or unsubstituted with one or more substituents selected from the group consisting of fluoro, chloro, bromo, methyl, tert-butyl, trifluoromethyl, methoxy, trifluoromethoxy, nitro, phenyl, trifluoromethylphenyl, cyclohexyl, morpholinyl, cyano, methoxycarbonyl and carboxy.

In one embodiment of the present invention, the indole carboxamide derivative is a compound wherein at least one of $Y^1$ or $Y^2$ is C=O.

In one embodiment of the present invention, the indole carboxamide derivative is a compound wherein $R^1$ is phenyl, pyridinyl, pyrazolyl, pyrimidinyl, naphthalenyl, benzodioxolyl or tetrahydronaphthyl substituted or unsubstituted with one or more substituents selected from the group consisting of fluoro, chloro, bromo, methyl, tert-butyl, trifluoromethyl, methoxy, trifluoromethoxy, nitro, phenyl, trifluoromethylphenyl, cyclohexyl, morpholinyl, cyano, methoxycarbonyl and carboxy; L is absent or is methylene or ethylene; $R^2$ is hydrogen; or L and $R^2$ are bonded to each other to form piperazine; $Y^1$ and $Y^2$ are each independently C=O or $CH_2$; and $R^3$ is hydrogen, methyl, ethyl, n-propyl, i-propyl, n-butyl, trifluoromethyl, difluoroethyl, trifluoroethyl, methoxymethyl, methoxyethyl, methoxypropyl or ethoxymethyl.

In one embodiment of the present invention, the indole carboxamide derivative is a compound wherein $R^1$ is phenyl substituted with a $C_1$-$C_6$ haloalkoxy group; L is absent; $R^2$ is hydrogen; $Y^1$ and $Y^2$ are C=O; and $R^3$ is a $C_1$-$C_6$ alkyl group.

The pharmaceutically acceptable salts of the present invention include both non-toxic inorganic salts and organic salts, and may be acid addition salts or base addition salts.

Examples of acid addition salts include hydrochloride, sulfate, nitrate, phosphate, acetate, adipate, aspartate, benzoate, benzenesulfonate, citrate, camphorate, camphorsulfonate, diphosphate, ethanesulfonate, fumarate, glutamate, malate, lactate, methanesulfonate, succinate, tartrate, picrate, tosylate, and the like. Examples of base addition salts include salts of alkali metal or alkaline earth metal such as lithium, sodium, potassium, magnesium and calcium, ammonium salts, quaternary ammonium salts such as tetramethylammonium, and amine salts such as methylamine, dimethylamine, trimethylamine, triethylamine and ethylamine, and the like.

The representative compounds according to the present invention are selected from the following group.

5-(2-chloro-5-(isobutyramidomethyl)benzamido)-N-(3-fluorophenyl)-1-methyl-1H-indole-2-carboxamide (Compound 1);

5-(2-chloro-5-(isobutyramidomethyl)benzamido)-N-(4-fluorophenyl)-1-methyl-1H-indole-2-carboxamide (Compound 2);

5-(2-chloro-5-(isobutyramidomethyl)benzamido)-N-(3-chlorophenyl)-1-methyl-1H-indole-2-carboxamide (Compound 3);

5-(2-chloro-5-(isobutyramidomethyl)benzamido)-N-(4-fluoro-3-(trifluoromethyl)phenyl)-1-methyl-1H-indole-2-carboxamide (Compound 4);

5-(2-chloro-5-(isobutyramidomethyl)benzamido)-N-(3-chloro-5-fluorophenyl)-1-methyl-1H-indole-2-carboxamide (Compound 5);

5-(2-chloro-5-(isobutyramidomethyl)benzamido)-N-(3,5-difluorophenyl)-1-methyl-1H-indole-2-carboxamide (Compound 6);

5-(2-chloro-5-(isobutyramidomethyl)benzamido)-1-methyl-N-(3-(trifluoromethyl)phenyl)-1H-indole-2-carboxamide (Compound 7);

5-(2-chloro-5-(isobutyramidomethyl)benzamido)-1-methyl-N-(4-(trifluoromethyl)phenyl)-1H-indole-2-carboxamide (Compound 8);

5-(2-chloro-5-(isobutyramidomethyl)benzamido)-1-methyl-N-(4-(trifluoromethoxy)phenyl)-1H-indole-2-carboxamide (Compound 9);

5-(2-chloro-5-(isobutyramidomethyl)benzamido)-N-(2-fluorophenyl)-1-methyl-1H-indole-2-carboxamide (Compound 10);

5-(2-chloro-5-(isobutyramidomethyl)benzamido)-N-(4-chlorophenyl)-1-methyl-1H-indole-2-carboxamide (Compound 11);

5-(2-chloro-5-(isobutyramidomethyl)benzamido)-1-methyl-N-(4'-(trifluoromethyl)-[1,1'-biphenyl]-4-yl)-1H-indole-2-carboxamide (Compound 12);

N-(4-bromophenyl)-5-(2-chloro-5-(isobutyramidomethyl)benzamido)-1-methyl-1H-indole-2-carboxamide (Compound 13);

5-(2-chloro-5-(isobutyramidomethyl)benzamido)-1-methyl-N-(o-tolyl)-1H-indole-2-carboxamide (Compound 14);

5-(2-chloro-5-(isobutyramidomethyl)benzamido)-1-methyl-N-(2-(trifluoromethoxy)phenyl)-1H-indole-2-carboxamide (Compound 15);

5-(2-chloro-5-(isobutyramidomethyl)benzamido)-1-methyl-N-(4'-(trifluoromethyl)-[1,1'-biphenyl]-3-yl)-1H-indole-2-carboxamide (Compound 16);

5-(2-chloro-5-(isobutyramidomethyl)benzamido)-N-(3-fluoro-5-(trifluoromethyl)phenyl)-1-methyl-1H-indole-2-carboxamide (Compound 17);

5-(2-chloro-5-(isobutyramidomethyl)benzamido)-1-methyl-N-(6-(trifluoromethyl)pyridin-3-yl)-1H-indole-2-carboxamide (Compound 18);

5-(2-chloro-5-(isobutyramidomethyl)benzamido)-1-methyl-N-(3-(4-(trifluoromethyl)phenyl)-1H-pyrazol-5-yl)-1H-indole-2-carboxamide (Compound 19);

5-(2-chloro-5-(isobutyramidomethyl)benzamido)-1-methyl-N-(4-methyl-3-(4-(trifluoromethyl)phenyl)-1H-pyrazol-5-yl)-1H-indole-2-carboxamide (Compound 20);

2-chloro-5-(isobutyramidomethyl)-N-(1-methyl-2-(4-(pyrimidin-2-yl)piperazine-1-carbonyl)-1H-indole-5-yl)benzamide (Compound 21);

N-(4-chloro-2-methylphenyl)-5-(2-chloro-5-(isobutyramidomethyl)benzamido)-1-methyl-1H-indole-2-carboxamide (Compound 22);

5-(2-chloro-5-(isobutyramidomethyl)benzamido)-N-(4-fluoro-2-methylphenyl)-1-methyl-1H-indole-2-carboxamide (Compound 23);

(S)—N-(1-(4-bromophenyl)ethyl)-5-(2-chloro-5-(isobutyramidomethyl)benzamido)-1-methyl-1H-indole-2-carboxamide (Compound 24);

(S)-5-(2-chloro-5-(isobutyramidomethyl)benzamido)-1-methyl-N-(1-(4-nitrophenyl)ethyl)-1H-indole-2-carboxamide (Compound 25);

5-(2-chloro-5-(isobutyramidomethyl)benzamido)-1-methyl-N-(2-methylbenzyl)-1H-indole-2-carboxamide (Compound 26);

5-(2-chloro-5-(isobutyramidomethyl)benzamido)-N-(1-(4-fluorophenyl)ethyl)-1-methyl-1H-indole-2-carboxamide (Compound 27);

(S)-5-(2-chloro-5-(isobutyramidomethyl)benzamido)-1-methyl-N-(1-phenylethyl)-1H-indole-2-carboxamide (Compound 28);

5-(2-chloro-5-(isobutyramidomethyl)benzamido)-N-(4-methoxybenzyl)-1-methyl-1H-indole-2-carboxamide (Compound 29);

N-([1,1'-biphenyl]-4-ylmethyl)-5-(2-chloro-5-(isobutyramidomethyl)benzamido)-1-methyl-1H-indole-2-carboxamide (Compound 30);

(S)-5-(2-chloro-5-(isobutyramidomethyl)benzamido)-1-methyl-N-(1-(naphthalen-2-yl)ethyl)-1H-indole-2-carboxamide (Compound 31);

5-(2-chloro-5-(isobutyramidomethyl)benzamido)-N-(4-fluorobenzyl)-1-methyl-1H-indole-2-carboxamide (Compound 32);

N-(4-(tert-butyl)benzyl)-5-(2-chloro-5-(isobutyramidomethyl)benzamido)-1-methyl-1H-indole-2-carboxamide (Compound 33);

5-(2-chloro-5-(isobutyramidomethyl)benzamido)-1-methyl-N-(4-(trifluoromethyl)benzyl)-1H-indole-2-carboxamide (Compound 34);

5-(2-chloro-5-(isobutyramidomethyl)benzamido)-1-methyl-N-(2-(trifluoromethyl)benzyl)-1H-indole-2-carboxamide (Compound 35);

5-(2-chloro-5-(isobutyramidomethyl)benzamido)-N-(3-fluorobenzyl)-1-methyl-1H-indole-2-carboxamide (Compound 36);

5-(2-chloro-5-(isobutyramidomethyl)benzamido)-N-(2-fluorobenzyl)-1-methyl-1H-indole-2-carboxamide (Compound 37);

5-(2-chloro-5-(isobutyramidomethyl)benzamido)-N-(3,4-difluorobenzyl)-1-methyl-1H-indole-2-carboxamide (Compound 38);

N-(4-chloro-3-fluorobenzyl)-5-(2-chloro-5-(isobutyramidomethyl)benzamido)-1-methyl-1H-indole-2-carboxamide (Compound 39);

(R)-5-(2-chloro-5-(isobutyramidomethyl)benzamido)-1-methyl-N-(1-phenylethyl)-1H-indole-2-carboxamide (Compound 40);

5-(2-chloro-5-(isobutyramidomethyl)benzamido)-1-methyl-N-(3-(trifluoromethyl)benzyl)-1H-indole-2-carboxamide (Compound 41);

5-(2-chloro-5-(isobutyramidomethyl)benzamido)-N-(3-fluoro-5-(trifluoromethyl)benzyl)-1-methyl-1H-indole-2-carboxamide (Compound 42);

5-(2-chloro-5-(isobutyramidomethyl)benzamido)-N-(3-chlorobenzyl)-1-methyl-1H-indole-2-carboxamide (Compound 43);

5-(2-chloro-5-(isobutyramidomethyl)benzamido)-N-(2-chlorobenzyl)-1-methyl-1H-indole-2-carboxamide (Compound 44);

5-(2-chloro-5-(isobutyramidomethyl)benzamido)-1-methyl-N-(4-nitrobenzyl)-1H-indole-2-carboxamide (Compound 45);

5-(2-chloro-5-(isobutyramidomethyl)benzamido)-N-(3-bromobenzyl)-1-methyl-1H-indole-2-carboxamide (Compound 46);

5-(2-chloro-5-(isobutyramidomethyl)benzamido)-1-methyl-N-(1-(4-(trifluoromethyl)phenyl)ethyl)-1H-indole-2-carboxamide (Compound 47);

5-(2-chloro-5-(isobutyramidomethyl)benzamido)-N-(4-bromobenzyl)-1-methyl-1H-indole-2-carboxamide (Compound 48);

5-(2-chloro-5-(isobutyramidomethyl)benzamido)-N-(4-chlorobenzyl)-1-methyl-1H-indole-2-carboxamide (Compound 49);

N-(benzo[d][1,3]dioxol-5-ylmethyl)-5-(2-chloro-5-(isobutyramidomethyl)benzamido)-1-methyl-1H-indole-2-carboxamide (Compound 50);

5-(2-chloro-5-(isobutyramidomethyl)benzamido)-N-(3,5-difluorobenzyl)-1-methyl-1H-indole-2-carboxamide (Compound 51);

5-(2-chloro-5-(isobutyramidomethyl)benzamido)-1-methyl-N-(4-(trifluoromethoxy)benzyl)-1H-indole-2-carboxamide (Compound 52);

N-(4-bromo-2-fluorobenzyl)-5-(2-chloro-5-(isobutyramidomethyl)benzamido)-1-methyl-1H-indole-2-carboxamide (Compound 53);

5-(2-chloro-5-(isobutyramidomethyl)benzamido)-N-(2,6-difluorobenzyl)-1-methyl-1H-indole-2-carboxamide (Compound 54);

5-(2-chloro-5-(isobutyramidomethyl)benzamido)-N-(2,6-dichlorobenzyl)-1-methyl-1H-indole-2-carboxamide (Compound 55);

N-(3-chloro-4-fluorobenzyl)-5-(2-chloro-5-(isobutyramidomethyl)benzamido)-1-methyl-1H-indole-2-carboxamide (Compound 56);

N-(2-chloro-3-(trifluoromethyl)benzyl)-5-(2-chloro-5-(isobutyramidomethyl)benzamido)-1-methyl-1H-indole-2-carboxamide (Compound 57);

(R)-5-(2-chloro-5-(isobutyramidomethyl)benzamido)-1-methyl-N-(1-(4-(trifluoromethyl)phenyl)ethyl)-1H-indole-2-carboxamide (Compound 58);

(R)-5-(2-chloro-5-(isobutyramidomethyl)benzamido)-1-methyl-N-(1-(4-(trifluoromethoxy)phenyl)ethyl)-1H-indole-2-carboxamide (Compound 59);

(S)-5-(2-chloro-5-(isobutyramidomethyl)benzamido)-1-methyl-N-(1-(4-(trifluoromethyl)phenyl)ethyl)-1H-indole-2-carboxamide (Compound 60);

(S)-5-(2-chloro-5-(isobutyramidomethyl)benzamido)-1-methyl-N-(1-(4-(trifluoromethoxy)phenyl)ethyl)-1H-indole-2-carboxamide (Compound 61);

N-(4-(tert-butyl)benzyl)-5-(2-chloro-5-(isobutyramidomethyl)benzamido)-1-(2,2,2-trifluoroethyl)-1H-indole-2-carboxamide (Compound 62);

5-(2-chloro-5-(isobutyramidomethyl)benzamido)-1-(2,2,2-trifluoroethyl)-N-(2-(trifluoromethyl)benzyl)-1H-indole-2-carboxamide (Compound 63);

5-(2-chloro-5-(isobutyramidomethyl)benzamido)-1-(2,2,2-trifluoroethyl)-N-(4-(trifluoromethyl)benzyl)-1H-indole-2-carboxamide (Compound 64);

(S)-5-(2-chloro-5-(isobutyramidomethyl)benzamido)-N-(1-(naphthalen-2-yl)ethyl)-1-(2,2,2-trifluoroethyl)-1H-indole-2-carboxamide (Compound 65);

(S)-5-(2-chloro-5-(isobutyramidomethyl)benzamido)-N-(1-(4-nitrophenyl)ethyl)-1-(2,2,2-trifluoroethyl)-1H-indole-2-carboxamide (Compound 66);

(S)—N-(1-(4-bromophenyl)ethyl)-5-(2-chloro-5-(isobutyramidomethyl)benzamido)-1-(2,2,2-trifluoroethyl)-1H-indole-2-carboxamide (Compound 67);

5-(2-chloro-5-(isobutyramidomethyl)benzamido)-N-(4-fluorobenzyl)-1-(2,2,2-trifluoroethyl)-1H-indole-2-carboxamide (Compound 68);

5-(2-chloro-5-(isobutyramidomethyl)benzamido)-N-(3-fluoro-5-(trifluoromethyl)benzyl)-1-(2,2,2-trifluoroethyl)-1H-indole-2-carboxamide (Compound 69);

5-(2-chloro-5-(isobutyramidomethyl)benzamido)-1-(2,2,2-trifluoroethyl)-N-(3-(trifluoromethyl)benzyl)-1H-indole-2-carboxamide (Compound 70);

N-(4-chloro-3-fluorobenzyl)-5-(2-chloro-5-(isobutyramidomethyl)benzamido)-1-(2,2,2-trifluoroethyl)-1H-indole-2-carboxamide (Compound 71);

5-(2-chloro-5-(isobutyramidomethyl)benzamido)-1-(2,2,2-trifluoroethyl)-N-(4-(trifluoromethoxy)benzyl)-1H-indole-2-carboxamide (Compound 72);

5-((2-chloro-5-(isobutyramidomethyl)benzyl)amino)-1-methyl-N-(4-(trifluoromethoxy)phenyl)-1H-indole-2-carboxamide (Compound 73);

5-(2-chloro-5-(isobutyramidomethyl)benzamido)-N-(4-(trifluoromethoxy)phenyl)-1H-indole-2-carboxamide (Compound 74);

5-(2-chloro-5-(isobutyramidomethyl)benzamido)-N-(4-(trifluoromethyl)phenyl)-1H-indole-2-carboxamide (Compound 75);

2-chloro-5-(isobutyramidomethyl)-N-(1-methyl-2-(((4-(trifluoromethoxy)phenyl)amino)methyl)-1H-indole-5-yl)benzamide (Compound 76);

5-(2-chloro-5-(isobutyramidomethyl)benzamido)-1-(methoxymethyl)-N-(4-(trifluoromethoxy)phenyl)-1H-indole-2-carboxamide (Compound 77);

5-(2-chloro-5-(isobutyramidomethyl)benzamido)-1-(methoxymethyl)-N-(4-(trifluoromethyl)phenyl)-1H-indole-2-carboxamide (Compound 78);

5-(2-chloro-5-(isobutyramidomethyl)benzamido)-N-(4-chlorophenyl)-1-(methoxymethyl)-1H-indole-2-carboxamide (Compound 79);

5-(2-chloro-5-(isobutyramidomethyl)benzamido)-1-(methoxymethyl)-N-(6-(trifluoromethyl)pyridin-3-yl)-1H-indole-2-carboxamide (Compound 80);

N-(4-chloro-2-methylphenyl)-5-(2-chloro-5-(isobutyramidomethyl)benzamido)-1-(methoxymethyl)-1H-indole-2-carboxamide (Compound 81);

5-(2-chloro-5-(isobutyramidomethyl)benzamido)-N-(4-cyclohexylphenyl)-1-(methoxymethyl)-1H-indole-2-carboxamide (Compound 82);

5-(2-chloro-5-(isobutyramidomethyl)benzamido)-N-(2,4-difluorophenyl)-1-(methoxymethyl)-1H-indole-2-carboxamide (Compound 83);

N-(4-(tert-butyl)phenyl)-5-(2-chloro-5-(isobutyramidomethyl)benzamido)-1-(methoxymethyl)-1H-indole-2-carboxamide (Compound 84);

5-(2-chloro-5-(isobutyramidomethyl)benzamido)-N-(4-fluorophenyl)-1-(methoxymethyl)-1H-indole-2-carboxamide (Compound 85);

5-(2-chloro-5-(isobutyramidomethyl)benzamido)-N-(3-chlorophenyl)-1-(methoxymethyl)-1H-indole-2-carboxamide (Compound 86);

5-(2-chloro-5-(isobutyramidomethyl)benzamido)-1-(methoxymethyl)-N-(3-(trifluoromethyl)phenyl)-1H-indole-2-carboxamide (Compound 87);

5-(2-chloro-5-(isobutyramidomethyl)benzamido)-N-(3-fluorophenyl)-1-(methoxymethyl)-1H-indole-2-carboxamide (Compound 88);

5-(2-chloro-5-(isobutyramidomethyl)benzamido)-1-(methoxymethyl)-N-(3-(trifluoromethoxy)phenyl)-1H-indole-2-carboxamide (Compound 89);

5-(2-chloro-5-(isobutyramidomethyl)benzamido)-N-(3-chloro-5-fluorophenyl)-1-(methoxymethyl)-1H-indole-2-carboxamide (Compound 90);

5-(2-chloro-5-(isobutyramidomethyl)benzamido)-1-(methoxymethyl)-N-(5,6,7,8-tetrahydronaphthalen-1-yl)-1H-indole-2-carboxamide (Compound 91);

5-(2-chloro-5-(isobutyramidomethyl)benzamido)-1-(3-methoxypropyl)-N-(4-(trifluoromethoxy)phenyl)-1H-indole-2-carboxamide (Compound 92);

N-(4-(tert-butyl)phenyl)-5-(2-chloro-5-(isobutyramidomethyl)benzamido)-1-(3-methoxypropyl)-1H-indole-2-carboxamide (Compound 93);

N-(4-chloro-2-methylphenyl)-5-(2-chloro-5-(isobutyramidomethyl)benzamido)-1-(3-methoxypropyl)-1H-indole-2-carboxamide (Compound 94);

N-(3-chloro-4-fluorophenyl)-5-(2-chloro-5-(isobutyramidomethyl)benzamido)-1-(3-methoxypropyl)-1H-indole-2-carboxamide (Compound 95);

5-(2-chloro-5-(isobutyramidomethyl)benzamido)-N-(4-chlorophenyl)-1-(3-methoxypropyl)-1H-indole-2-carboxamide (Compound 96);

5-(2-chloro-5-(isobutyramidomethyl)benzamido)-N-(4-fluoro-2-methylphenyl)-1-(3-methoxypropyl)-1H-indole-2-carboxamide (Compound 97);

5-(2-chloro-5-(isobutyramidomethyl)benzamido)-N-(3-fluoro-4-morpholinophenyl)-1-(3-methoxypropyl)-1H-indole-2-carboxamide (Compound 98);

5-(2-chloro-5-(isobutyramidomethyl)benzamido)-1-(3-methoxypropyl)-N-(3-(trifluoromethoxy)phenyl)-1H-indole-2-carboxamide (Compound 99);

5-(2-chloro-5-(isobutyramidomethyl)benzamido)-1-(3-methoxypropyl)-N-(3-(trifluoromethyl)phenyl)-1H-indole-2-carboxamide (Compound 100);

5-(2-chloro-5-(isobutyramidomethyl)benzamido)-1-(3-methoxypropyl)-N-(4-(trifluoromethyl)phenyl)-1H-indole-2-carboxamide (Compound 101);

5-(2-chloro-5-(isobutyramidomethyl)benzamido)-N-(4-fluorophenyl)-1-(3-methoxypropyl)-1H-indole-2-carboxamide (Compound 102);

5-(2-chloro-5-(isobutyramidomethyl)benzamido)-N-(3-chlorophenyl)-1-(3-methoxypropyl)-1H-indole-2-carboxamide (Compound 103);

5-(2-chloro-5-(isobutyramidomethyl)benzamido)-N-(2-chlorophenyl)-1-(3-methoxypropyl)-1H-indole-2-carboxamide (Compound 104);

5-(2-chloro-5-(isobutyramidomethyl)benzamido)-N-(4-cyclohexylphenyl)-1-(3-methoxypropyl)-1H-indole-2-carboxamide (Compound 105);

5-(2-chloro-5-(isobutyramidomethyl)benzamido)-N-(2,4-difluorophenyl)-1-(3-methoxypropyl)-1H-indole-2-carboxamide (Compound 106);

5-(2-chloro-5-(isobutyramidomethyl)benzamido)-N-(2-fluorophenyl)-1-(3-methoxypropyl)-1H-indole-2-carboxamide (Compound 107);

5-(2-chloro-5-(isobutyramidomethyl)benzamido)-N-(3-fluorophenyl)-1-(3-methoxypropyl)-1H-indole-2-carboxamide (Compound 108);

5-(2-chloro-5-(isobutyramidomethyl)benzamido)-N-(3,5-difluorophenyl)-1-(3-methoxypropyl)-1H-indole-2-carboxamide (Compound 109);

5-(2-chloro-5-(isobutyramidomethyl)benzamido)-1-(ethoxymethyl)-N-(4-fluorophenyl)-1H-indole-2-carboxamide (Compound 110)

5-(2-chloro-5-(isobutyramidomethyl)benzamido)-1-(ethoxymethyl)-N-(4-chlorophenyl)-1H-indole-2-carboxamide (Compound 111);

5-(2-chloro-5-(isobutyramidomethyl)benzamido)-N-(3-(trifluoromethoxy)phenyl)-1-(ethoxymethyl)-1H-indole-2-carboxamide (Compound 112);

5-(2-chloro-5-(isobutyramidomethyl)benzamido)-1-(ethoxymethyl)-N-(4-(trifluoromethyl)phenyl)-1H-indole-2-carboxamide (Compound 113);

N-(3-chlorophenyl)-5-(2-chloro-5-(isobutyramidomethyl)benzamido)-1-(ethoxymethyl)-1H-indole-2-carboxamide (Compound 114);

5-(2-chloro-5-(isobutyramidomethyl)benzamido)-N-(3-chloro-4-fluorophenyl)-1-(ethoxymethyl)-1H-indole-2-carboxamide (Compound 115);

5-(2-chloro-5-(isobutyramidomethyl)benzamido)-N-(4-fluorophenyl)-1-(2-methoxyethyl)-1H-indole-2-carboxamide (Compound 116);

5-(2-chloro-5-(isobutyramidomethyl)benzamido)-N-(4-chlorophenyl)-1-(2-methoxyethyl)-1H-indole-2-carboxamide (Compound 117);

5-(2-chloro-5-(isobutyramidomethyl)benzamido)-1-(2-methoxyethyl)-N-(4-(trifluoromethoxy)phenyl)-1H-indole-2-carboxamide (Compound 118);

5-(2-chloro-5-(isobutyramidomethyl)benzamido)-1-(2-methoxyethyl)-N-(3-(trifluoromethoxy)phenyl)-1H-indole-2-carboxamide (Compound 119);

N-(2-chloro-4-fluorophenyl)-5-(2-chloro-5-(isobutyramidomethyl)benzamido)-1-(2-methoxyethyl)-1H-indole-2-carboxamide (Compound 120);

N-(4-chloro-2-fluorophenyl)-5-(2-chloro-5-(isobutyramidomethyl)benzamido)-1-(2-methoxyethyl)-1H-indole-2-carboxamide (Compound 121);

N-(4-chloro-3-fluorophenyl)-5-(2-chloro-5-(isobutyramidomethyl)benzamido)-1-(2-methoxyethyl)-1H-indole-2-carboxamide (Compound 122);

N-(3-chloro-4-fluorophenyl)-5-(2-chloro-5-(isobutyramidomethyl)benzamido)-1-(2-methoxyethyl)-1H-indole-2-carboxamide (Compound 123);

5-(2-chloro-5-(isobutyramidomethyl)benzamido)-N-(3-chloro-5-fluorophenyl)-1-(2-methoxyethyl)-1H-indole-2-carboxamide (Compound 124);

5-(2-chloro-5-(isobutyramidomethyl)benzamido)-N-(3-chlorophenyl)-1-(2-methoxyethyl)-1H-indole-2-carboxamide (Compound 125);

5-(2-chloro-5-(isobutyramidomethyl)benzamido)-N-(4-trifluoromethylphenyl)-1-(2-methoxyethyl)-1H-indole-2-carboxamide (Compound 126);

5-(2-chloro-5-(isobutyramidomethyl)benzamido)-N-(3-trifluoromethylphenyl)-1-(2-methoxyethyl)-1H-indole-2-carboxamide (Compound 127);

5-(2-chloro-5-(isobutyramidomethyl)benzamido)-N-(3-fluorophenyl)-1-(2-methoxyethyl)-1H-indole-2-carboxamide (Compound 128);

5-(2-chloro-5-(isobutyramidomethyl)benzamido)-N-(3-fluoro-5-trifluoromethylphenyl)-1-(2-methoxyethyl)-1H-indole-2-carboxamide (Compound 129);

5-(2-chloro-5-(isobutyramidomethyl)benzamido)-N-(3,4-dichlorophenyl)-1-(2-methoxyethyl)-1H-indole-2-carboxamide (Compound 130);

5-(2-chloro-5-(isobutyramidomethyl)benzamido)-N-(2,4-dichlorophenyl)-1-(2-methoxyethyl)-1H-indole-2-carboxamide (Compound 131);

5-(2-chloro-5-(isobutyramidomethyl)benzamido)-N-(3,5-dichlorophenyl)-1-(2-methoxyethyl)-1H-indole-2-carboxamide (Compound 132);

5-(2-chloro-5-(isobutyramidomethyl)benzamido)-N-(3,4-difluorophenyl)-1-(2-methoxyethyl)-1H-indole-2-carboxamide (Compound 133);

5-(2-chloro-5-(isobutyramidomethyl)benzamido)-1-ethyl-N-(4-(trifluoromethoxy)phenyl)-1H-indole-2-carboxamide (Compound 134);

5-(2-chloro-5-(isobutyramidomethyl)benzamido)-1-ethyl-N-(4-(trifluoromethyl)phenyl)-1H-indole-2-carboxamide (Compound 135);

5-(2-chloro-5-(isobutyramidomethyl)benzamido)-1-ethyl-N-(3-(trifluoromethyl)phenyl)-1H-indole-2-carboxamide (Compound 136);

5-(2-chloro-5-(isobutyramidomethyl)benzamido)-1-ethyl-N-(4-fluorophenyl)-1H-indole-2-carboxamide (Compound 137);

5-(2-chloro-5-(isobutyramidomethyl)benzamido)-N-(4-chlorophenyl)-1-ethyl-1H-indole-2-carboxamide (Compound 138);

5-(2-chloro-5-(isobutyramidomethyl)benzamido)-1-ethyl-N-(3-fluorophenyl)-1H-indole-2-carboxamide (Compound 139);

5-(2-chloro-5-(isobutyramidomethyl)benzamido)-1-ethyl-N-(3-(trifluoromethoxy)phenyl)-1H-indole-2-carboxamide (Compound 140);

5-(2-chloro-5-(isobutyramidomethyl)benzamido)-N-(3-chlorophenyl)-1-ethyl-1H-indole-2-carboxamide (Compound 141);

5-(2-chloro-5-(isobutyramidomethyl)benzamido)-N-(2,4-difluorophenyl)-1-ethyl-1H-indole-2-carboxamide (Compound 142);

5-(2-chloro-5-(isobutyramidomethyl)benzamido)-1-ethyl-N-(4-fluoro-3-(trifluoromethyl)phenyl)-1H-indole-2-carboxamide (Compound 143);

5-(2-chloro-5-(isobutyramidomethyl)benzamido)-1-ethyl-N-(2-fluorophenyl)-1H-indole-2-carboxamide (Compound 144);

N-(3-chloro-4-fluorophenyl)-5-(2-chloro-5-(isobutyramidomethyl)benzamido)-1-ethyl-1H-indole-2-carboxamide (Compound 145);

5-(2-chloro-5-(isobutyramidomethyl)benzamido)-1-ethyl-N-(3-fluoro-5-(trifluoromethyl)phenyl)-1H-indole-2-carboxamide (Compound 146);

5-(2-chloro-5-(isobutyramidomethyl)benzamido)-N-(4-cyanophenyl)-1-ethyl-1H-indole-2-carboxamide (Compound 147);

N-(4-chloro-2-methylphenyl)-5-(2-chloro-5-(isobutyramidomethyl)benzamido)-1-ethyl-1H-indole-2-carboxamide (Compound 148);

N-(4-fluoro-2-methylphenyl)-5-(2-chloro-5-(isobutyramidomethyl)benzamido)-1-ethyl-1H-indole-2-carboxamide (Compound 149);

5-(2-chloro-5-(isobutyramidomethyl)benzamido)-N-(3,5-difluorophenyl)-1-ethyl-1H-indole-2-carboxamide (Compound 150);

5-(2-chloro-5-(isobutyramidomethyl)benzamido)-N-(3-chloro-5-fluorophenyl)-1-ethyl-1H-indole-2-carboxamide (Compound 151);

5-(2-chloro-5-(isobutyramidomethyl)benzamido)-1-ethyl-N-(2-fluoro-4-(trifluoromethyl)phenyl)-1H-indole-2-carboxamide (Compound 152);

N-(4-chloro-3-fluorophenyl)-5-(2-chloro-5-(isobutyramidomethyl)benzamido)-1-ethyl-1H-indole-2-carboxamide (Compound 153);

N-(4-chloro-2-fluorophenyl)-5-(2-chloro-5-(isobutyramidomethyl)benzamido)-1-ethyl-1H-indole-2-carboxamide (Compound 154);

N-(2-chloro-4-fluorophenyl)-5-(2-chloro-5-(isobutyramidomethyl)benzamido)-1-ethyl-1H-indole-2-carboxamide (Compound 155);

5-(2-chloro-5-(isobutyramidomethyl)benzamido)-N-(4-cyclohexylphenyl)-1-ethyl-1H-indole-2-carboxamide (Compound 156);

5-(2-chloro-5-(isobutyramidomethyl)benzamido)-1-propyl-N-(4-(trifluoromethoxy)phenyl)-1H-indole-2-carboxamide (Compound 157);

5-(2-chloro-5-(isobutyramidomethyl)benzamido)-1-propyl-N-(3-(trifluoromethoxy)phenyl)-1H-indole-2-carboxamide (Compound 158);

5-(2-chloro-5-(isobutyramidomethyl)benzamido)-1-propyl-N-(4-(trifluoromethyl)phenyl)-1H-indole-2-carboxamide (Compound 159);

5-(2-chloro-5-(isobutyramidomethyl)benzamido)-1-propyl-N-(3-(trifluoromethyl)phenyl)-1H-indole-2-carboxamide (Compound 160);

5-(2-chloro-5-(isobutyramidomethyl)benzamido)-N-(4-chlorophenyl)-1-propyl-1H-indole-2-carboxamide (Compound 161);

5-(2-chloro-5-(isobutyramidomethyl)benzamido)-N-(3-chlorophenyl)-1-propyl-1H-indole-2-carboxamide (Compound 162);

5-(2-chloro-5-(isobutyramidomethyl)benzamido)-N-(3-chloro-5-fluorophenyl)-1-propyl-1H-indole-2-carboxamide (Compound 163);

N-(3-chloro-4-fluorophenyl)-5-(2-chloro-5-(isobutyramidomethyl)benzamido)-1-propyl-1H-indole-2-carboxamide (Compound 164);

N-(4-chloro-3-fluorophenyl)-5-(2-chloro-5-(isobutyramidomethyl)benzamido)-1-propyl-1H-indole-2-carboxamide (Compound 165);

5-(2-chloro-5-(isobutyramidomethyl)benzamido)-N-(4-fluorophenyl)-1-propyl-1H-indole-2-carboxamide (Compound 166);

5-(2-chloro-5-(isobutyramidomethyl)benzamido)-N-(3-fluorophenyl)-1-propyl-1H-indole-2-carboxamide (Compound 167);

5-(2-chloro-5-(isobutyramidomethyl)benzamido)-N-(4-cyclohexylphenyl)-1-propyl-1H-indole-2-carboxamide (Compound 168);

5-(2-chloro-5-(isobutyramidomethyl)benzamido)-N-(3-fluoro-5-(trifluoromethyl)phenyl)-1-propyl-1H-indole-2-carboxamide (Compound 169);

1-butyl-5-(2-chloro-5-(isobutyramidomethyl)benzamido)-N-(4-fluorophenyl)-1H-indole-2-carboxamide (Compound 170);

1-butyl-5-(2-chloro-5-(isobutyramidomethyl)benzamido)-N-(4-chlorophenyl)-1H-indole-2-carboxamide (Compound 171);

1-butyl-5-(2-chloro-5-(isobutyramidomethyl)benzamido)-N-(4-(trifluoromethoxy)phenyl)-1H-indole-2-carboxamide (Compound 172);

1-butyl-5-(2-chloro-5-(isobutyramidomethyl)benzamido)-N-(3-(trifluoromethoxy)phenyl)-1H-indole-2-carboxamide (Compound 173);

1-butyl-5-(2-chloro-5-(isobutyramidomethyl)benzamido)-N-(4-(trifluoromethyl)phenyl)-1H-indole-2-carboxamide (Compound 174);

1-butyl-5-(2-chloro-5-(isobutyramidomethyl)benzamido)-N-(3-(trifluoromethyl)phenyl)-1H-indole-2-carboxamide (Compound 175);

1-butyl-N-(4-chloro-3-fluorophenyl)-5-(2-chloro-5-(isobutyramidomethyl)benzamido)-1H-indole-2-carboxamide (Compound 176);

1-butyl-N-(3-chloro-4-fluorophenyl)-5-(2-chloro-5-(isobutyramidomethyl)benzamido)-1H-indole-2-carboxamide (Compound 177);

1-butyl-5-(2-chloro-5-(isobutyramidomethyl)benzamido)-N-(3,4-dichlorophenyl)-1H-indole-2-carboxamide (Compound 178);

1-butyl-5-(2-chloro-5-(isobutyramidomethyl)benzamido)-N-(3,4-difluorophenyl)-1H-indole-2-carboxamide (Compound 179);

5-(2-chloro-5-(isobutyramidomethyl)benzamido)-1-isopropyl-N-(4-(trifluoromethoxy)phenyl)-1H-indole-2-carboxamide (Compound 180);

5-(2-chloro-5-(isobutyramidomethyl)benzamido)-1-isopropyl-N-(3-(trifluoromethoxy)phenyl)-1H-indole-2-carboxamide (Compound 181);

5-(2-chloro-5-(isobutyramidomethyl)benzamido)-N-(4-fluorophenyl)-1-isopropyl-1H-indole-2-carboxamide (Compound 182);

5-(2-chloro-5-(isobutyramidomethyl)benzamido)-N-(4-chlorophenyl)-1-isopropyl-1H-indole-2-carboxamide (Compound 183);

5-(2-chloro-5-(isobutyramidomethyl)benzamido)-N-(3-chlorophenyl)-1-isopropyl-1H-indole-2-carboxamide (Compound 184);

5-(2-chloro-5-(isobutyramidomethyl)benzamido)-1-isopropyl-N-(4-(trifluoromethyl)phenyl)-1H-indole-2-carboxamide (Compound 185);

N-(3-chloro-4-fluorophenyl)-5-(2-chloro-5-(isobutyramidomethyl)benzamido)-1-isopropyl-1H-indole-2-carboxamide (Compound 186);

N-(4-chloro-3-fluorophenyl)-5-(2-chloro-5-(isobutyramidomethyl)benzamido)-1-isopropyl-1H-indole-2-carboxamide (Compound 187);

5-(2-chloro-5-(isobutyramidomethyl)benzamido)-1-isopropyl-N-(3-(trifluoromethyl)phenyl)-1H-indole-2-carboxamide (Compound 188);

5-(2-chloro-5-(isobutyramidomethyl)benzamido)-N-(2-chlorophenyl)-1-isopropyl-1H-indole-2-carboxamide (Compound 189);

5-(2-chloro-5-(isobutyramidomethyl)benzamido)-N-(3,4-dichlorophenyl)-1-isopropyl-1H-indole-2-carboxamide (Compound 190);

5-(2-chloro-5-(isobutyramidomethyl)benzamido)-N-(3,5-dichlorophenyl)-1-isopropyl-1H-indole-2-carboxamide (Compound 191);

N-(4-bromophenyl)-5-(2-chloro-5-(isobutyramidomethyl)benzamido)-1-isopropyl-1H-indole-2-carboxamide (Compound 192);

5-(2-chloro-5-(isobutyramidomethyl)benzamido)-N-(4-cyclohexylphenyl)-1-isopropyl-1H-indole-2-carboxamide (Compound 193);

N-(4-(tert-butyl)phenyl)-5-(2-chloro-5-(isobutyramidomethyl)benzamido)-1-isopropyl-1H-indole-2-carboxamide (Compound 194);

5-(2-chloro-5-(isobutyramidomethyl)benzamido)-N-(3-chloro-5-fluorophenyl)-1-isopropyl-1H-indole-2-carboxamide (Compound 195);

5-(2-chloro-5-(isobutyramidomethyl)benzamido)-N-(3,5-difluorophenyl)-1-isopropyl-1H-indole-2-carboxamide (Compound 196);

5-(2-chloro-5-(isobutyramidomethyl)benzamido)-1-isopropyl-N-(4-methoxyphenyl)-1H-indole-2-carboxamide (Compound 197);

5-(2-chloro-5-(isobutyramidomethyl)benzamido)-1-isopropyl-N-(6-(trifluoromethyl)pyridin-3-yl)-1H-indole-2-carboxamide (Compound 198);

5-(2-chloro-5-(isobutyramidomethyl)benzamido)-N-(4-cyanophenyl)-1-isopropyl-1H-indole-2-carboxamide (Compound 199);

N-(4-chloro-2-methylphenyl)-5-(2-chloro-5-(isobutyramidomethyl)benzamido)-1-isopropyl-1H-indole-2-carboxamide (Compound 200);

5-(2-chloro-5-(isobutyramidomethyl)benzamido)-1-isopropyl-N-(5,6,7,8-tetrahydronaphthalen-1-yl)-1H-indole-2-carboxamide (Compound 201);

5-(2-chloro-5-(isobutyramidomethyl)benzamido)-N-(2,4-difluorophenyl)-1-isopropyl-1H-indole-2-carboxamide (Compound 202);

Methyl 4-(5-(2-chloro-5-(isobutyramidomethyl)benzamido)-1-isopropyl-1H-indole-2-carboxamido)benzoate (Compound 203);

4-(5-(2-chloro-5-(isobutyramidomethyl)benzamido)-1-isopropyl-1H-indole-2-carboxamido)benzoic acid (Compound 204);

5-(2-chloro-5-(isobutyramidomethyl)benzamido)-N-(4-fluorophenyl)-1-(2,2,2-trifluoroethyl)-1H-indole-2-carboxamide (Compound 205);

5-(2-chloro-5-(isobutyramidomethyl)benzamido)-N-(4-chlorophenyl)-1-(2,2,2-trifluoroethyl)-1H-indole-2-carboxamide (Compound 206);

5-(2-chloro-5-(isobutyramidomethyl)benzamido)-1-(2,2,2-trifluoroethyl)-N-(4-(trifluoromethyl)phenyl)-1H-indole-2-carboxamide (Compound 207);

5-(2-chloro-5-(isobutyramidomethyl)benzamido)-1-(2,2,2-trifluoroethyl)-N-(3-(trifluoromethyl)phenyl)-1H-indole-2-carboxamide (Compound 208);

5-(2-chloro-5-(isobutyramidomethyl)benzamido)-1-(2,2,2-trifluoroethyl)-N-(4-(trifluoromethoxy)phenyl)-1H-indole-2-carboxamide (Compound 209);

5-(2-chloro-5-(isobutyramidomethyl)benzamido)-1-(2,2,2-trifluoroethyl)-N-(3-(trifluoromethoxy)phenyl)-1H-indole-2-carboxamide (Compound 210);

5-(2-chloro-5-(isobutyramidomethyl)benzamido)-N-(3-chlorophenyl)-1-(2,2,2-trifluoroethyl)-1H-indole-2-carboxamide (Compound 211);

N-(3-chloro-4-fluorophenyl)-5-(2-chloro-5-(isobutyramidomethyl)benzamido)-1-(2,2,2-trifluoroethyl)-1H-indole-2-carboxamide (Compound 212);

N-(4-chloro-3-fluorophenyl)-5-(2-chloro-5-(isobutyramidomethyl)benzamido)-1-(2,2,2-trifluoroethyl)-1H-indole-2-carboxamide (Compound 213);

N-(4-chloro-2-fluorophenyl)-5-(2-chloro-5-(isobutyramidomethyl)benzamido)-1-(2,2,2-trifluoroethyl)-1H-indole-2-carboxamide (Compound 214);

N-(3-chloro-5-fluorophenyl)-5-(2-chloro-5-(isobutyramidomethyl)benzamido)-1-(2,2,2-trifluoroethyl)-1H-indole-2-carboxamide (Compound 215);

N-(3-fluoro-5-trifluoromethylphenyl)-5-(2-chloro-5-(isobutyramidomethyl)benzamido)-1-(2,2,2-trifluoroethyl)-1H-indole-2-carboxamide (Compound 216);

5-(2-chloro-5-(isobutyramidomethyl)benzamido)-N-(4-fluorophenyl)-1-(2,2-difluoroethyl)-1H-indole-2-carboxamide (Compound 217);

5-(2-chloro-5-(isobutyramidomethyl)benzamido)-N-(4-chlorophenyl)-1-(2,2-difluoroethyl)-1H-indole-2-carboxamide (Compound 218);

5-(2-chloro-5-(isobutyramidomethyl)benzamido)-1-(2,2-difluoroethyl)-N-(4-(trifluoromethoxy)phenyl)-1H-indole-2-carboxamide (Compound 219);

5-(2-chloro-5-(isobutyramidomethyl)benzamido)-1-(2,2-difluoroethyl)-N-(4-(trifluoromethyl)phenyl)-1H-indole-2-carboxamide (Compound 220);

N-(2-chloro-4-fluorophenyl)-5-(2-chloro-5-(isobutyramidomethyl)benzamido)-1-(2,2-difluoroethyl)-1H-indole-2-carboxamide (Compound 221);

N-(4-chloro-2-fluorophenyl)-5-(2-chloro-5-(isobutyramidomethyl)benzamido)-1-(2,2-difluoroethyl)-1H-indole-2-carboxamide (Compound 222);

N-(4-chloro-3-fluorophenyl)-5-(2-chloro-5-(isobutyramidomethyl)benzamido)-1-(2,2-difluoroethyl)-1H-indole-2-carboxamide (Compound 223);

N-(3-chloro-4-fluorophenyl)-5-(2-chloro-5-(isobutyramidomethyl)benzamido)-1-(2,2-difluoroethyl)-1H-indole-2-carboxamide (Compound 224);

5-(2-chloro-5-(isobutyramidomethyl)benzamido)-N-(3,4-dichlorophenyl)-1-(2,2-difluoroethyl)-1H-indole-2-carboxamide (Compound 225);

5-(2-chloro-5-(isobutyramidomethyl)benzamido)-1-(2,2-difluoroethyl)-N-(2-fluoro-4-(trifluoromethyl)phenyl)-1H-indole-2-carboxamide (Compound 226);

Methyl 4-(5-(2-chloro-5-(isobutyramidomethyl)benzamido)-1-methyl-1H-indole-2-carboxamido)benzoate (Compound 227);

4-(5-(2-chloro-5-(isobutyramidomethyl)benzamido)-1-methyl-1H-indole-2-carboxamido)benzoic acid (Compound 228);

Sodium 4-(5-(2-chloro-5-(isobutyramidomethyl)benzamido)-1-methyl-1H-indole-2-carboxamido)benzoate (Compound 229);

Methyl 5-(5-(2-chloro-5-(isobutyramidomethyl)benzamido)-1-methyl-1H-indole-2-carboxamido)-2-fluorobenzoate (Compound 230);

5-(5-(2-chloro-5-(isobutyramidomethyl)benzamido)-1-methyl-1H-indole-2-carboxamido)-2-fluorobenzoic acid (Compound 231);

6-(2-chloro-5-(isobutyramidomethyl)benzamido)-N-(4-(trifluoromethoxy)phenyl)-1H-indole-2-carboxamide (Compound 232);

6-(2-chloro-5-(isobutyramidomethyl)benzamido)-N-(4-(trifluoromethyl)phenyl)-1H-indole-2-carboxamide (Compound 233);

6-(2-chloro-5-(isobutyramidomethyl)benzamido)-N-(4-fluorophenyl)-1H-indole-2-carboxamide (Compound 234);

6-(2-chloro-5-(isobutyramidomethyl)benzamido)-N-(3-(trifluoromethoxy)phenyl)-1H-indole-2-carboxamide (Compound 235);

6-(2-chloro-5-(isobutyramidomethyl)benzamido)-N-(3-(trifluoromethyl)phenyl)-1H-indole-2-carboxamide (Compound 236);

6-(2-chloro-5-(isobutyramidomethyl)benzamido)-N-(4-chlorophenyl)-1H-indole-2-carboxamide (Compound 237);

6-(2-chloro-5-(isobutyramidomethyl)benzamido)-N-(3-chlorophenyl)-1H-indole-2-carboxamide (Compound 238);

6-(2-chloro-5-(isobutyramidomethyl)benzamido)-1-methyl-N-(4-(trifluoromethoxy)phenyl)-1H-indole-2-carboxamide (Compound 239);

6-(2-chloro-5-(isobutyramidomethyl)benzamido)-1-methyl-N-(4-(trifluoromethyl)phenyl)-1H-indole-2-carboxamide (Compound 240);

5-(2-chloro-5-(isobutyramidomethyl)benzamido)-1-(3-methoxypropyl)-N-(4-(trifluoromethoxy)benzyl)-1H-indole-2-carboxamide (Compound 241);

5-(2-chloro-5-(isobutyramidomethyl)benzamido)-N-(4-fluoro-3-(trifluoromethyl)benzyl)-1-(3-methoxypropyl)-1H-indole-2-carboxamide (Compound 243); and 5-(2-chloro-5-(isobutyramidomethyl)benzamido)-N-(2-fluoro-4-(trifluoromethyl)benzyl)-1-(3-methoxypropyl)-1H-indole-2-carboxamide (Compound 244).

The processes for preparing the indole carboxamide derivatives of formula (II) according to the present invention are depicted in the following Reaction Schemes 1 to 4.

However, those illustrated in the following Reaction Schemes represent examples of representative processes used in the present invention. The reaction reagents, reaction conditions, etc. may be changed without limit.

[Reaction Scheme 1]

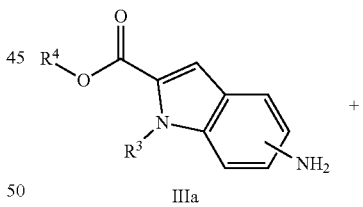

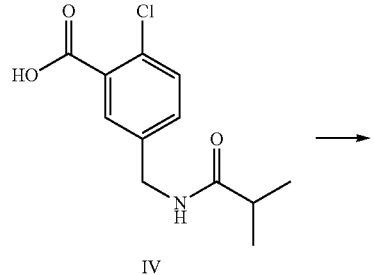

IV

17

-continued

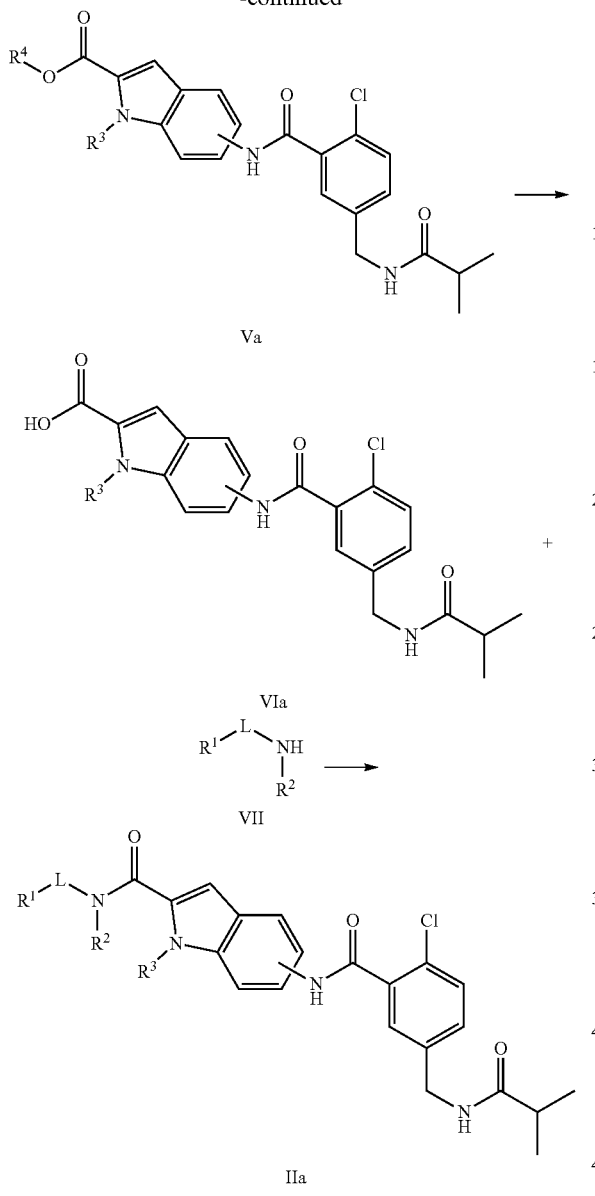

In Reaction Scheme 1, $R^1$, L, $R^2$, and $R^3$ are as defined in formula II, and $R^4$ is a $C_1$-$C_6$ alkyl group.

As shown in Reaction Scheme 1, the indole carboxamide derivative of formula (IIa) in which $Y^1$ and $Y^2$ are C=O can be prepared by amide coupling reaction of a compound of formula (IIIa) with a compound of formula (IV) to obtain a compound of formula (Va), and a hydrolysis of the ester group of the compound of formula (Va) to obtain a compound of formula (VIa) having a carboxylic acid group, and then amide coupling reaction of the compound of formula (VIa) with a compound of formula (VII).

At this time, the amide coupling reaction may be carried out using a conventional amide coupling agent. For example, it can be carried out by adding and reacting hydroxybenzotriazole (HOBT) and 4-dimethylaminopyridine (DMAP), and then adding 1-ethyl-3-(3-dimethylaminopropyl)carbodiimide (EDC) and optionally triethylamine (TEA) to react, or it can be carried out by adding and

18 reacting hexafluorophosphate azabenzotriazole tetramethyluronium (HATU) and N,N-diisopropylethylamine (DIPEA).

In addition, the hydrolysis reaction of the carboxylate group may be carried out under a base catalyst. For example, LiOH, NaOH, KOH, and the like may be used as the base.

[Reaction Scheme 2]

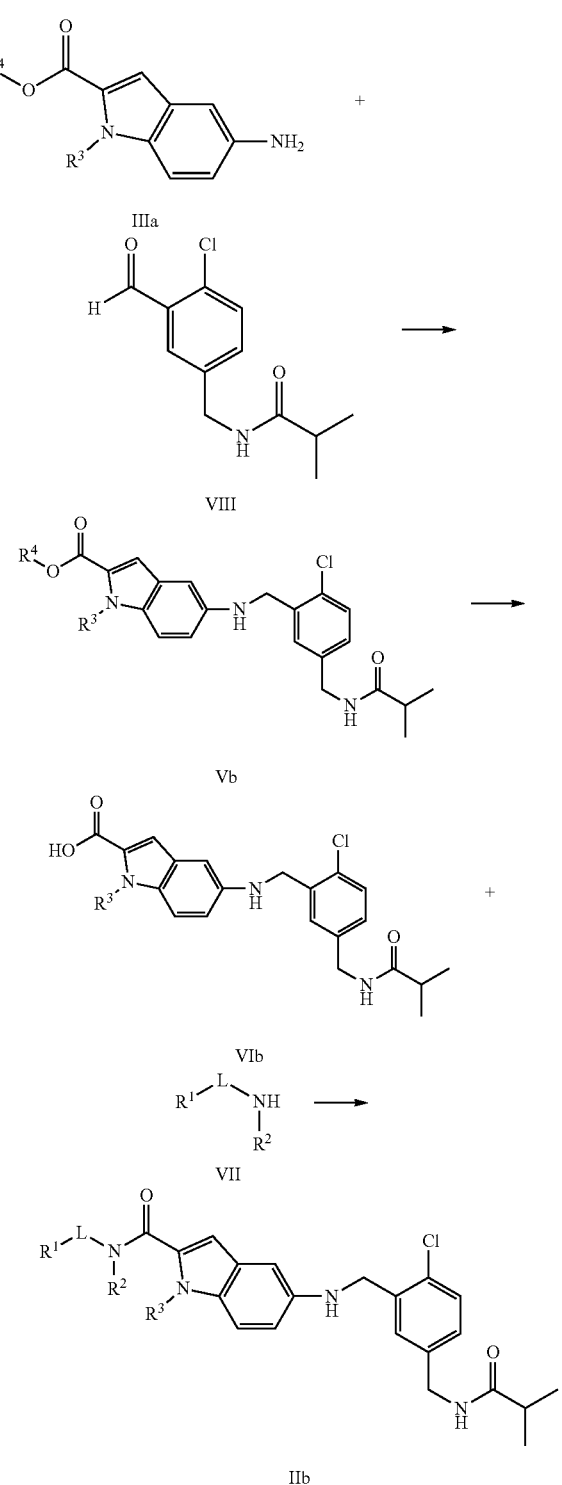

In Reaction Scheme 2, $R^1$, L, $R^2$, and $R^3$ are as defined in formula (II), and $R^4$ is a $C_1$-$C_6$ alkyl group.

As shown in Reaction Scheme 2, the indole carboxamide derivative of formula (IIb) in which $Y^1$ is C=O and $Y^2$ is $CH_2$ can be prepared by reduction amination reaction of a compound of formula (IIa) with a compound of formula (VIII) to obtain a compound of formula (Vb), and a hydrolysis of the ester group of the compound of formula (Vb) to obtain a compound of formula (VIb) having a carboxylic acid group, and then amide coupling reaction of the compound of formula (VIb) with a compound of formula (VII).

At this time, the reduction amination reaction may be carried out in the presence of sodium triacetoxyborohydride (NaBH(OAc)$_3$) and acetic acid.

The amide coupling reaction may be carried out using a conventional amide coupling agent. For example, it may be carried out using the amide coupling agent used in Reaction Scheme 1 above.

In addition, the hydrolysis reaction of the carboxylate group may be carried out under a base catalyst. For example, LiOH, NaOH, KOH, and the like may be used as the base.

[Reaction Scheme 3]

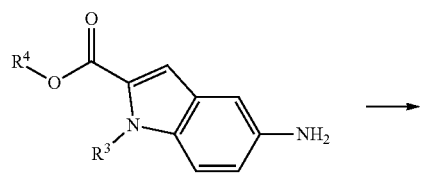

IIIa

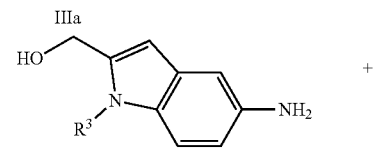

IIIb

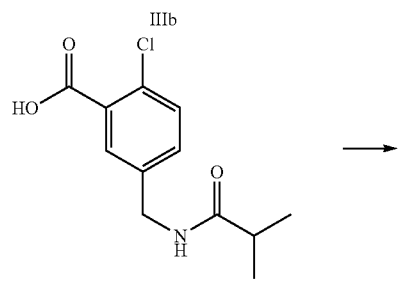

IV

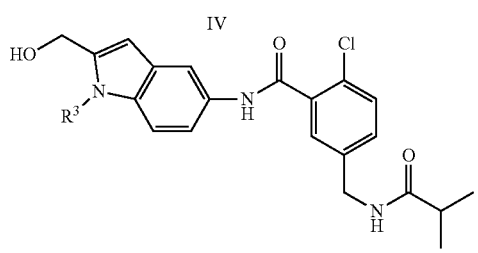

VIc

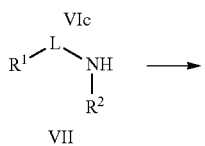

VII

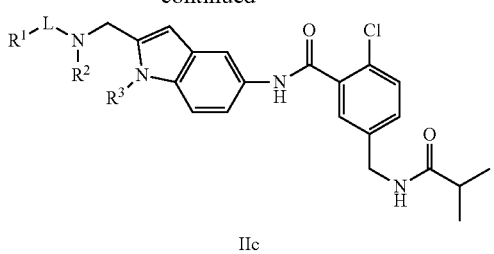

IIc

In Reaction Scheme 3, $R^1$, L, $R^2$, and $R^3$ are as defined in formula (II), and $R^4$ is a $C_1$-$C_6$ alkyl group.

As shown in Reaction Scheme 3, the indole carboxamide derivative of formula (IIc) in which $Y^1$ is $CH_2$ and $Y^2$ is C=O can be prepared by reduction of the ester group of the compound of formula (IIIa) to obtain a compound of formula (IIIb) having a hydroxy group, and amide coupling reaction of the compound of formula (IIIb) with the compound of formula (IV) to obtain a compound of formula (VIc), and then Mitsunobu coupling reaction of the compound of formula (VIc) with the compound of formula (VII).

At this time, the reduction reaction may be carried out using a reducing agent such as lithium aluminum hydride (LAH).

The amide coupling reaction may be carried out using a conventional amide coupling agent. For example, it may be carried out using the amide coupling agent used in Reaction Scheme 1 above.

In addition, the Mitsunobu coupling reaction may be carried out using an azodicarboxylate such as diisopropyl azodicarboxylate (DIAD) or diethyl azodicarboxylate (DEAD) and triphenylphosphine (PPh$_3$).

[Reaction Scheme 4]

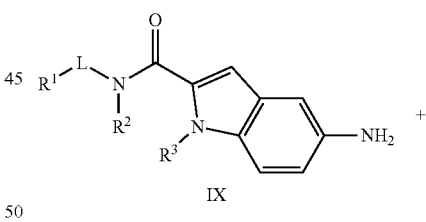

IX

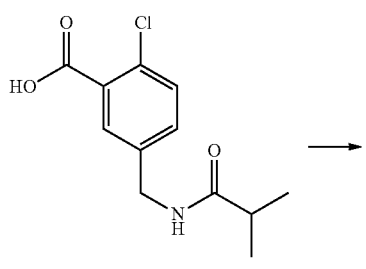

IV

-continued

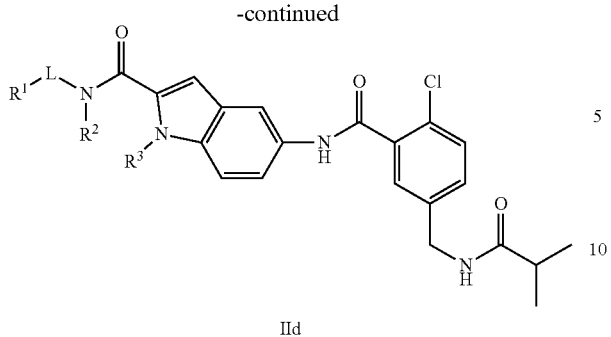

IId

In Reaction Scheme 4, $R^1$, L, $R^2$, and $R^3$ are as defined in formula (II).

As shown in Reaction Scheme 4, the indole carboxamide derivative of formula (IId) in which $Y^1$ and $Y^2$ are C═O can be prepared by amide coupling reaction of a compound of formula (IX) with a compound of formula (IV).

The amide coupling reaction may be carried out using a conventional amide coupling agent. For example, it may be carried out using the amide coupling agent used in Reaction Scheme 1 above.

The compound of formula (II) or pharmaceutically acceptable salt thereof according to the present invention exhibits an excellent inhibitory activity on $PGE_2$ production through inhibition of microsomal prostaglandin $E_2$ synthase-1 (mPGES-1) (see Experimental Example 1).

Accordingly, the present invention relates to a pharmaceutical composition for inhibiting microsomal prostaglandin $E_2$ synthase-1 (mPGES-1) comprising the compound of formula (II) or pharmaceutically acceptable salt thereof along with a pharmaceutically acceptable carrier, and in particular, relates to a pharmaceutical composition for the treatment or prevention of inflammation, arthritis, high fever, pain, cancer, stroke or brain diseases such as Alzheimer's disease.

The pharmaceutical composition according to the present invention can be administered orally, e.g., ingestion or inhalation; or parenterally, e.g., injection, deposition, implantation or suppositories. The injection can be, for example, intravenous, subcutaneous, intramuscular or intraperitoneal injection. Depending on the route of administration, the pharmaceutical composition of the present invention may be formulated as tablets, capsules, granules, fine subtilae, powders, sublingual tablets, suppositories, ointments, injection solutions, emulsions, suspensions, syrups, aerosols, etc. The above various forms of the pharmaceutical composition of the present invention can be prepared in a manner well known in the art using a pharmaceutically acceptable carrier(s) which are usually used for each form. Examples of the pharmaceutically acceptable carriers include excipient, binder, disintegrating agent, lubricant, preservative, antioxidant, isotonic agent, buffer, coating agent, sweetening agent, dissolvent, base, dispersing agent, wetting agent, suspending agent, stabilizer, colorant, etc.

The pharmaceutical composition according to the present invention contains about 0.01 to 95 wt % of the compound of the present invention or pharmaceutically acceptable salt thereof depending on the form thereof.

The specific dosage of the present pharmaceutical composition can be varied with species of mammals including a human-being, body weight, gender, severity of disease, judgment of doctor, etc. It is preferable that 0.01 to 50 mg of the active ingredient is administered per kg of body weight a day for oral use, while 0.01 to 10 mg of the active ingredient is administered per kg of body weight a day for parenteral use. The total daily dosage can be administered once or over several times depending on the severity of disease, judgment of doctor, etc.

One embodiment of the present invention relates to a method for inhibiting microsomal prostaglandin $E_2$ synthase-1 (mPGES-1), comprising administering a composition comprising an effective amount of the indole carboxamide derivative or pharmaceutically acceptable salt thereof to a subject in need thereof.

One embodiment of the present invention relates to a method for treating or preventing inflammation, arthritis, high fever, pain, cancer, stroke or Alzheimer's disease, comprising administering a composition comprising an effective amount of the indole carboxamide derivative or pharmaceutically acceptable salt thereof to a subject in need thereof.

One embodiment of the present invention relates to a use of the indole carboxamide derivative or pharmaceutically acceptable salt thereof for inhibition of microsomal prostaglandin $E_2$ synthase-1 (mPGES-1).

One embodiment of the present invention relates to a use of the indole carboxamide derivative or pharmaceutically acceptable salt thereof for preventing or treating inflammation, arthritis, high fever, pain, cancer, stroke or Alzheimer's disease.

Advantageous Effects

The compound of the present invention exhibits an excellent inhibitory activity on $PGE_2$ production through inhibition of microsomal prostaglandin $E_2$ synthase-1 (mPGES-1). Therefore, the compound of the present invention can be effectively used in a pharmaceutical composition for the treatment or prevention of inflammation, arthritis, high fever, pain, cancer, stroke or brain diseases such as Alzheimer's disease.

BRIEF DESCRIPTION OF FIGURES

FIG. 1 is a graph showing the results of a hind limb incapacitance test performed in an osteoarthritis animal model for Compound 9 of the present invention.

FIG. 2 is a graph showing the evaluation results of the inflammatory factor $PGE_2$ in blood performed in an osteoarthritis animal model for Compound 9 of the present invention.

FIG. 3 is a graph showing the evaluation results of the inflammatory factor IL-1β in blood performed in an osteoarthritis animal model for Compound 9 of the present invention.

FIG. 4 is a graph showing the evaluation results of the inflammatory factor TNF-α in blood performed in an osteoarthritis animal model for Compound 9 of the present invention.

FIG. 5 is a graph showing the evaluation results of anti-pain effect performed in a pain animal model for Compound 9 of the present invention.

BEST MODE

The present invention is further illustrated by the following examples, which are not to be construed to limit the scope of the invention.

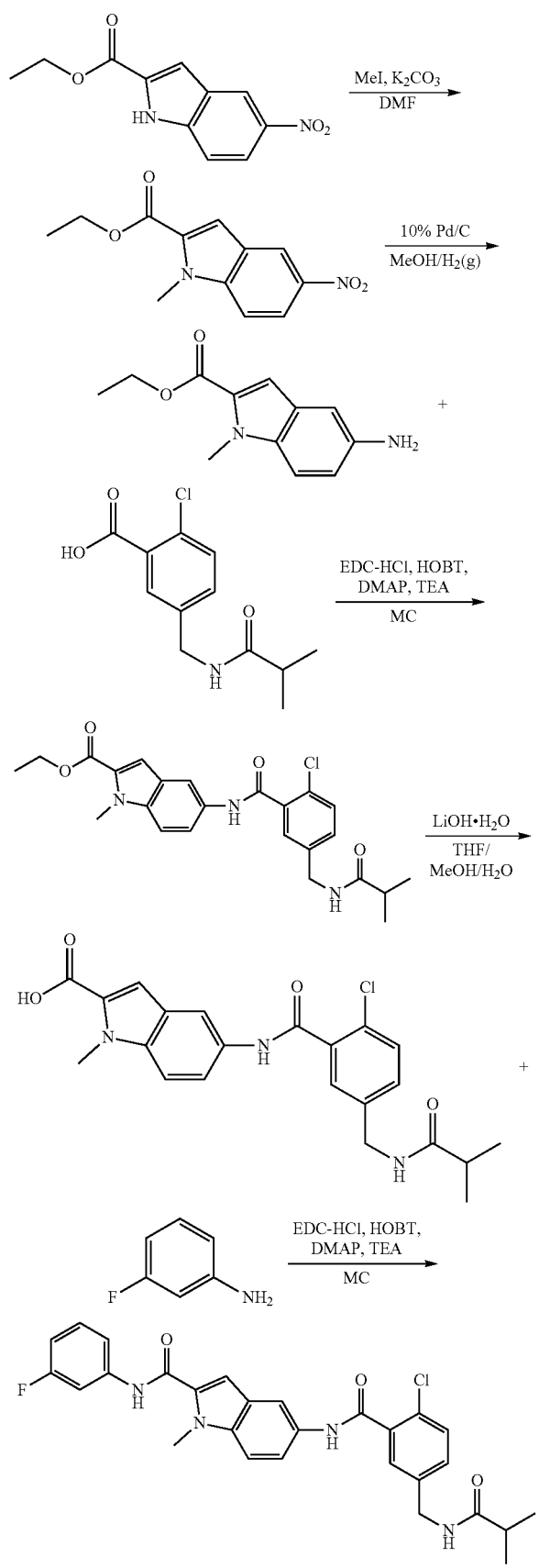

Example 1: Synthesis of 5-(2-chloro-5-(isobutyramidomethyl)benzamido)-N-(3-fluorophenyl)-1-methyl-1H-indole-2-carboxamide (Compound 1)

Example 1-1: Synthesis of ethyl 1-methyl-5-nitro-1H-indole-2-carboxylate

Ethyl 5-nitro-1H-indole-2-carboxylate (2.5 g, 10.67 mmol) and MeI (2.27 g, 16.01 mmol) were added to a 100 mL flask and dissolved in DMF (25 ml). $K_2CO_3$ (2.95 g, 21.34 mmol) was added thereto and stirred at room temperature for 12 hours. After the reaction was completed, the organic material was extracted with ethyl acetate/$H_2O$. The organic layer was dried over $MgSO_4$ and distilled under reduced pressure to remove the solvent. The residue was subjected to column chromatography (ethyl acetate:n-hexane=1:3) to obtain ethyl 1-methyl-5-nitro-1H-indole-2-carboxylate (2.38 g, 9.58 mmol, 90%, white solid).

1H NMR (300 MHz, $CDCl_3$) 8.66-8.65 (m, 1H), 8.25-8.22 (m, 1H), 7.46-7.43 (m, 2H), 4.45-4.42 (m, 2H), 4.14 (s, 3H), 1.45-1.41 (m, 3H).

Example 1-2: Synthesis of ethyl 5-amino-1-methyl-1H-indole-2-carboxylate

Ethyl 1-methyl-5-nitro-1H-indole-2-carboxylate (2.38 g, 9.58 mmol) was added to a 100 mL flask and dissolved in MeOH (50 ml). 10% Pd/C (2.3 g) was added and stirred for 12 hours at room temperature under $H_2$ (g). After Celite filtration upon completion of the reaction, the solvent was removed by distillation under reduced pressure. The residue was subjected to column chromatography (ethyl acetate:n-hexane=1:3) to obtain ethyl 5-amino-1-methyl-1H-indole-2-carboxylate (1.66 g, 7.60 mmol, 77%).

1H NMR (300 MHz, $CDCl_3$) 7.52 (s, 1H), 7.21-7.18 (m, 1H), 7.09 (s, 1H), 6.92-6.91 (m, 1H), 6.85-6.82 (m, 1H), 4.38-4.31 (m, 2H), 4.01 (s, 3H), 3.55 (br, NH, 2H), 1.42-1.37 (m, 3H).

Example 1-3: Synthesis of ethyl 5-(2-chloro-5-(isobutyramidomethyl)benzamido)-1-methyl-1H-indole-2-carboxylate Ethyl 5-amino-1-methyl-1H-indole-2-carboxylate (660 mg, 3.02 mmol) and 2-chloro-5-(isobutyramidomethyl)benzoic acid (927 mg, 3.624 mmol) were added to a 100 mL flask and dissolved in $CH_2Cl_2$ (20 ml). HOBT (612 mg, 4.53 mmol) and DMAP (369 mg, 3.02 mmol) were added thereto and reacted for 10 minutes. Then, EDC (1.74 g, 9.06 mmol) and TEA (917 mg, 9.06 mmol) were added and stirred under reflux for 12 hours. After completion of the reaction, the organic material was extracted with $CH_2Cl_2/H_2O$. The organic layer was dried over $MgSO_4$ and distilled under reduced pressure to remove the solvent. The residue was subjected to column chromatography (ethyl acetate:n-hexane=3:1) to obtain ethyl 5-(2-chloro-5-(isobutyramidomethyl)benzamido)-1-methyl-1H-indole-2-carboxylate (900 mg, 1.97 mmol, 66%, white solid).

1H NMR (300 MHz, DMSO-$d_6$) 10.46 (br, NH, 1H), 8.39-8.35 (m, NH, 1H), 8.18 (m, 1H), 7.59-7.49 (m, 3H), 7.43 (m, 1H), 7.35-7.33 (m, 1H), 7.25 (m, 1H), 4.36-4.28 (m, 4H), 4.01 (s, 3H), 2.50-2.38 (m, 1H), 1.36-1.31 (m, 3H), 1.04-1.02 (m, 6H).

Example 1-4: Synthesis of 5-(2-chloro-5-(isobutyramidomethyl)benzamido)-1-methyl-1H-indole-2-carboxylic acid Ethyl 5-(2-chloro-5-(isobutyramidomethyl)benzamido)-1-methyl-1H-indole-2-carboxylate (900 mg, 1.97 mmol)

was added to a 500 mL flask and dissolved in THF (100 ml) and MeOH (100 ml). LiOH (413 mg, 9.85 mmol) dissolved in $H_2O$ (70 ml) was added thereto and stirred for 12 hours. After concentration upon completion of the reaction, the pH was adjusted to 2 with 2N—HCl, and the resulting solid was filtered to obtain 5-(2-chloro-5-(isobutyramidomethyl)benzamido)-1-methyl-1H-indole-2-carboxylic acid (812 mg, 1.89 mmol, 96%, white solid).

1H NMR (300 MHz, DMSO-$d_6$) 10.45 (br, NH, 1H), 8.39-8.35 (m, NH, 1H), 8.18 (m, 1H), 7.57-7.49 (m, 3H), 7.43 (m, 1H), 7.35-7.33 (m, 1H), 7.21 (m, 1H), 4.30-4.28 (m, 2H), 4.01 (s, 3H), 2.50-2.38 (m, 1H), 1.04-1.02 (m, 6H).

Example 1-5: Synthesis of 5-(2-chloro-5-(isobutyramidomethyl)benzamido)-N-(3-fluorophenyl)-1-methyl-1H-indole-2-carboxamide (Compound 1)

5-(2-chloro-5-(isobutyramidomethyl)benzamido)-1-methyl-1H-indole-2-carboxylic acid (100 mg, 0.23 mmol) and 3-fluoroaniline (38 mg, 0.345 mmol) were added to a 25 mL flask and dissolved in $CH_2Cl_2$ (5 ml). HOBT (46 mg, 0.345 mmol) and DMAP (28 mg, 0.23 mmol) were added thereto and reacted for 10 minutes. Then, EDC (132 mg, 0.69 mmol) and TEA (96 µl, 0.69 mmol) were added and stirred under reflux for 12 hours. After completion of the reaction, the organic material was extracted with $CH_2Cl_2$/$H_2O$. The organic layer was dried over $MgSO_4$ and distilled under reduced pressure to remove the solvent. The residue was subjected to column chromatography (ethyl acetate:n-hexane=3:1) to obtain 5-(2-chloro-5-(isobutyramidomethyl)benzamido)-N-(3-fluorophenyl)-1-methyl-1H-indole-2-carboxamide (50 mg, 0.095 mmol, 41%, white solid).

1H NMR (300 MHz, DMSO-$d_6$) 10.50 (br, NH, 1H), 10.47 (br, NH, 1H), 8.37 (m, NH, 1H), 8.19 (m, 1H), 7.78-7.74 (m, 1H), 7.59-7.50 (m, 4H), 7.44-7.31 (m, 4H), 6.97-6.91 (m, 1H), 4.31-4.29 (m, 2H), 4.00 (s, 3H), 2.50-2.39 (m, 1H), 1.04-1.02 (m, 6H).

Example 2: Synthesis of 5-(2-chloro-5-(isobutyramidomethyl)benzamido)-N-(4-fluorophenyl)-1-methyl-1H-indole-2-carboxamide (Compound 2)

The title compound was obtained according to the same procedure as Example 1, except for using 4-fluoroaniline instead of 3-fluoroaniline.

1H NMR (300 MHz, DMSO-$d_6$) 10.46 (br, NH, 1H), 10.38 (br, NH, 1H), 8.39-8.36 (m, NH, 1H), 8.18 (m, 1H), 7.82-7.77 (m, 2H), 7.58-7.50 (m, 3H), 7.44 (m, 1H), 7.36-7.33 (m, 1H), 7.28-7.18 (m, 3H), 4.31-4.29 (m, 2H), 4.00 (s, 3H), 2.50-2.39 (m, 1H), 1.04-1.02 (m, 6H).

Example 3: Synthesis of 5-(2-chloro-5-(isobutyramidomethyl)benzamido)-N-(3-chlorophenyl)-1-methyl-1H-indole-2-carboxamide (Compound 3)

The title compound was obtained according to the same procedure as Example 1, except for using 3-chloroaniline instead of 3-fluoroaniline.

1H NMR (300 MHz, DMSO-$d_6$) 10.47 (br, NH, 2H), 8.39-8.36 (m, NH, 1H), 8.19 (m, 1H), 7.99 (m, 1H), 7.72-7.70 (m, 1H), 7.59-7.50 (m, 3H), 7.44-7.32 (m, 4H), 7.18-7.15 (m, 1H), 4.31-4.29 (m, 2H), 4.00 (s, 3H), 2.50-2.39 (m, 1H), 1.04-1.02 (m, 6H).

Example 4: Synthesis of 5-(2-chloro-5-(isobutyramidomethyl)benzamido)-N-(4-fluoro-3-(trifluoromethyl)phenyl)-1-methyl-1H-indole-2-carboxamide (Compound 4)

The title compound was obtained according to the same procedure as Example 1, except for using 4-fluoro-3-(trifluoromethyl)aniline instead of 3-fluoroaniline.

1H NMR (300 MHz, DMSO-$d_6$) 10.62 (br, NH, 1H), 10.45 (br, NH, 1H), 8.35 (m, NH, 1H), 8.29-8.27 (m, 1H), 8.20 (m, 1H), 8.07 (m, 1H), 7.59-7.52 (m, 4H), 7.44 (m, 1H), 7.36-7.34 (m, 2H), 4.31-4.29 (m, 2H), 4.01 (s, 3H), 2.50-2.39 (m, 1H), 1.04-1.02 (m, 6H).

Example 5: Synthesis of 5-(2-chloro-5-(isobutyramidomethyl)benzamido)-N-(3-chloro-5-fluorophenyl)-1-methyl-1H-indole-2-carboxamide (Compound 5)

The title compound was obtained according to the same procedure as Example 1, except for using 3-chloro-5-fluoroaniline instead of 3-fluoroaniline.

1H NMR (300 MHz, DMSO-$d_6$) 10.61 (br, NH, 1H), 10.46 (br, NH, 1H), 8.38 (m, NH, 1H), 8.20 (m, 1H), 7.77 (m, 1H), 7.71-7.67 (m, 1H), 7.59-7.50 (m, 3H), 7.44 (m, 1H), 7.36-7.33 (m, 2H), 7.18-7.15 (m, 1H), 4.31-4.29 (m, 2H), 4.00 (s, 3H), 2.50-2.39 (m, 1H), 1.04-1.02 (m, 6H).

Example 6: Synthesis of 5-(2-chloro-5-(isobutyramidomethyl)benzamido)-N-(3,5-difluorophenyl)-1-methyl-1H-indole-2-carboxamid (Compound 6)

The title compound was obtained according to the same procedure as Example 1, except for using 3,5-difluoroaniline instead of 3-fluoroaniline.

1H NMR (300 MHz, DMSO-$d_6$) 10.62 (br, NH, 1H), 10.45 (br, NH, 1H), 8.35 (m, NH, 1H), 8.19 (m, 1H), 7.59-7.50 (m, 5H), 7.44 (m, 1H), 7.35-7.32 (m, 2H), 6.99-6.93 (m, 1H), 4.31-4.29 (m, 2H), 4.00 (s, 3H), 2.50-2.39 (m, 1H), 1.04-1.02 (m, 6H).

Example 7: Synthesis of 5-(2-chloro-5-(isobutyramidomethyl)benzamido)-1-methyl-N-(3-(trifluoromethyl)phenyl)-1H-indole-2-carboxamide (Compound 7)

The title compound was obtained according to the same procedure as Example 1, except for using 3-(trifluoromethyl)aniline instead of 3-fluoroaniline.

1H NMR (300 MHz, DMSO-$d_6$) 10.60 (br, NH, 1H), 10.45 (br, NH, 1H), 8.38-8.34 (m, NH, 1H), 8.27 (m, 1H), 8.20 (m, 1H), 8.06-8.03 (m, 1H), 7.64-7.44 (m, 6H), 7.35-7.33 (m, 2H), 4.31-4.29 (m, 2H), 4.02 (s, 3H), 2.50-2.39 (m, 1H), 1.04-1.02 (m, 6H).

Example 8: Synthesis of 5-(2-chloro-5-(isobutyramidomethyl)benzamido)-1-methyl-N-(4-(trifluoromethyl)phenyl)-1H-indole-2-carboxamide (Compound 8)

The title compound was obtained according to the same procedure as Example 1, except for using 4-(trifluoromethyl)aniline instead of 3-fluoroaniline.

1H NMR (300 MHz, DMSO-$d_6$) 10.63 (br, NH, 1H), 10.46 (br, NH, 1H), 8.38-8.34 (m, NH, 1H), 8.20 (m, 1H), 8.02-8.01 (m, 2H), 7.75-7.72 (m, 2H), 7.59-7.50 (m, 3H), 7.44 (m, 1H), 7.36-7.33 (m, 2H), 4.31-4.29 (m, 2H), 4.01 (s, 3H), 2.50-2.39 (m, 1H), 1.04-1.02 (m, 6H).

Example 9: Synthesis of 5-(2-chloro-5-(isobutyramidomethyl)benzamido)-1-methyl-N-(4-(trifluoromethoxy)phenyl)-1H-indole-2-carboxamide (Compound 9)

The title compound was obtained according to the same procedure as Example 1, except for using 4-(trifluoromethoxy)aniline instead of 3-fluoroaniline.

1H NMR (300 MHz, DMSO-d$_6$) 10.50 (br, NH, 1H), 10.46 (br, NH, 1H), 8.37 (m, NH, 1H), 8.19 (m, 1H), 7.91-7.88 (m, 2H), 7.58-7.50 (m, 3H), 7.45-7.31 (m, 5H), 4.31-4.29 (m, 2H), 4.00 (s, 3H), 2.50-2.39 (m, 1H), 1.04-1.02 (m, 6H).

Example 10: Synthesis of 5-(2-chloro-5-(isobutyramidomethyl)benzamido)-N-(2-fluorophenyl)-1-methyl-1H-indole-2-carboxamide (Compound 10)

The title compound was obtained according to the same procedure as Example 1, except for using 2-fluoroaniline instead of 3-fluoroaniline.

1H NMR (300 MHz, DMSO-d$_6$) 10.45 (br, NH, 1H), 10.13 (br, NH, 1H), 8.36 (m, NH, 1H), 8.19 (m, 1H), 7.64-7.50 (m, 4H), 7.44 (m, 1H), 7.35-7.23 (m, 5H), 4.31-4.29 (m, 2H), 4.00 (s, 3H), 2.50-2.39 (m, 1H), 1.04-1.02 (m, 6H).

Example 11: Synthesis of 5-(2-chloro-5-(isobutyramidomethyl)benzamido)-N-(4-chlorophenyl)-1-methyl-1H-indole-2-carboxamide (Compound 11)

The title compound was obtained according to the same procedure as Example 1, except for using 4-chloroaniline instead of 3-fluoroaniline.

1H NMR (300 MHz, DMSO-d$_6$) 10.45 (br, NH, 1H), 10.43 (br, NH, 1H), 8.36 (m, NH, 1H), 8.18 (m, 1H), 7.83-7.81 (m, 2H), 7.58-7.50 (m, 3H), 7.44-7.40 (m, 3H), 7.36-7.30 (m, 2H), 4.31-4.29 (m, 2H), 4.00 (s, 3H), 2.50-2.39 (m, 1H), 1.04-1.02 (m, 6H).

Example 12: Synthesis of 5-(2-chloro-5-(isobutyramidomethyl)benzamido)-1-methyl-N-(4'-(trifluoromethyl)-[1,1'-biphenyl]-4-yl)-1H-indole-2-carboxamide (Compound 12)

The title compound was obtained according to the same procedure as Example 1, except for using 4'-(trifluoromethyl)-[1,1'-biphenyl]-4-amine instead of 3-fluoroaniline.

1H NMR (300 MHz, DMSO-d$_6$) 10.49 (br, NH, 1H), 10.47 (br, NH, 1H), 8.41-8.37 (m, NH, 1H), 8.20 (m, 1H), 7.96-7.91 (m, 4H), 7.82-7.77 (m, 4H), 7.59-7.50 (m, 4H), 7.45 (m, 1H), 7.36-7.34 (m, 2H), 4.31-4.29 (m, 2H), 4.03 (s, 3H), 2.50-2.39 (m, 1H), 1.04-1.02 (m, 6H).

Example 13: Synthesis of N-(4-bromophenyl)-5-(2-chloro-5-(isobutyramidomethyl)benzamido)-1-methyl-1H-indole-2-carboxamide (Compound 13)

The title compound was obtained according to the same procedure as Example 1, except for using 4-bromoaniline instead of 3-fluoroaniline.

1H NMR (300 MHz, DMSO-d$_6$) 10.45-10.43 (br, NH, 2H), 8.39-8.35 (m, NH, 1H), 8.18 (m, 1H), 7.78-7.76 (m, 2H), 7.56-7.50 (m, 5H), 7.44 (m, 1H), 7.36-7.30 (m, 2H), 4.31-4.29 (m, 2H), 4.00 (s, 3H), 2.50-2.39 (m, 1H), 1.04-1.02 (m, 6H).

Example 14: Synthesis of 5-(2-chloro-5-(isobutyramidomethyl)benzamido)-1-methyl-N-(o-tolyl)-1H-indole-2-carboxamide (Compound 14)

The title compound was obtained according to the same procedure as Example 1, except for using o-toluidine instead of 3-fluoroaniline.

1H NMR (300 MHz, DMSO-d$_6$) 10.45 (br, NH, 1H), 9.90 (br, NH, 1H), 8.39-8.35 (m, NH, 1H), 8.17 (m, 1H), 7.57-7.50 (m, 3H), 7.44 (m, 1H), 7.39-7.36 (m, 2H), 7.33-7.28 (m, 2H), 7.23-7.18 (m, 2H), 4.31-4.29 (m, 2H), 4.00 (s, 3H), 2.50-2.39 (m, 1H), 1.04-1.02 (m, 6H).

Example 15: Synthesis of 5-(2-chloro-5-(isobutyramidomethyl)benzamido)-1-methyl-N-(2-(trifluoromethoxy)phenyl)-1H-indole-2-carboxamide (Compound 15)

The title compound was obtained according to the same procedure as Example 1, except for using 2-(trifluoromethoxy)aniline instead of 3-fluoroaniline.

1H NMR (300 MHz, DMSO-d$_6$) 10.47 (br, NH, 1H), 10.22 (br, NH, 1H), 8.38 (m, NH, 1H), 8.19 (m, 1H), 7.70-7.68 (m, 1H), 7.55-7.29 (m, 9H), 4.31-4.29 (m, 2H), 3.99 (s, 3H), 2.50-2.39 (m, 1H), 1.04-1.02 (m, 6H).

Example 16: Synthesis of 5-(2-chloro-5-(isobutyramidomethyl)benzamido)-1-methyl-N-(4'-(trifluoromethyl)-[1,1'-biphenyl]-3-yl)-1H-indole-2-carboxamide (Compound 16)

The title compound was obtained according to the same procedure as Example 1, except for using 4'-(trifluoromethyl)-[1,1'-biphenyl]-3-amine instead of 3-fluoroaniline.

1H NMR (300 MHz, DMSO-d$_6$) 10.47 (br, NH, 2H), 8.38 (m, NH, 1H), 8.20 (m, 2H), 7.88-7.85 (m, 5H), 7.59-7.45 (m, 6H), 7.35-7.33 (m, 2H), 4.31-4.29 (m, 2H), 4.03 (s, 3H), 2.50-2.39 (m, 1H), 1.04-1.02 (m, 6H).

Example 17: Synthesis of 5-(2-chloro-5-(isobutyramidomethyl)benzamido)-N-(3-fluoro-5-(trifluoromethyl)phenyl)-1-methyl-1H-indole-2-carboxamide (Compound 17)

The title compound was obtained according to the same procedure as Example 1, except for using 3-fluoro-5-(trifluoromethyl)aniline instead of 3-fluoroaniline.

1H NMR (300 MHz, DMSO-d$_6$) 10.77 (br, NH, 1H), 10.48 (br, NH, 1H), 8.37 (m, NH, 1H), 8.21 (m, 1H), 8.07 (m, 1H), 8.03-7.99 (m, 1H), 7.60-7.50 (m, 3H), 7.44-7.33 (m, 4H), 4.31-4.29 (m, 2H), 4.02 (s, 3H), 2.50-2.39 (m, 1H), 1.04-1.02 (m, 6H).

Example 18: Synthesis of 5-(2-chloro-5-(isobutyramidomethyl)benzamido)-1-methyl-N-(6-(trifluoromethyl)pyridin-3-yl)-1H-indole-2-carboxamide (Compound 18)

The title compound was obtained according to the same procedure as Example 1, except for using 6-(trifluoromethyl)pyridin-3-amine instead of 3-fluoroaniline.

1H NMR (300 MHz, DMSO-d$_6$) 10.86 (br, NH, 1H), 10.49 (br, NH, 1H), 9.12 (m, 1H), 8.51-8.48 (m, 1H), 8.40-8.36 (m, NH, 1H), 8.23 (m, 1H), 7.95-7.92 (m, 1H), 7.61-7.50 (m, 3H), 7.45-7.42 (m, 2H), 7.36-7.33 (m, 1H), 4.31-4.29 (m, 2H), 4.03 (s, 3H), 2.50-2.39 (m, 1H), 1.04-1.02 (m, 6H).

Example 19: Synthesis of 5-(2-chloro-5-(isobutyramidomethyl)benzamido)-1-methyl-N-(3-(4-(trifluoromethyl)phenyl)-1H-pyrazole-5-yl)-1H-indole-2-carboxamide (Compound 19)

The title compound was obtained according to the same procedure as Example 1, except for using 3-(4-(trifluoromethyl)phenyl)-1H-pyrazol-5-amine instead of 3-fluoroaniline.

1H NMR (300 MHz, DMSO-d$_6$) 10.49 (br, NH, 1H), 8.35-8.32 (m, 2H), 8.07 (m, 2H), 7.83-7.81 (m, 3H), 7.66-7.61 (m, 1H), 7.56-7.48 (m, 2H), 7.44 (m, 1H), 7.36-7.34 (m, 1H), 6.92 (m, 2H), 6.01-5.99 (m, 1H), 4.29 (m, 2H), 4.03 (m, 3H), 2.49-2.41 (m, 1H), 1.04-1.02 (m, 6H).

Example 20: Synthesis of 5-(2-chloro-5-(isobutyramidomethyl)benzamido)-1-methyl-N-(4-methyl-3-(4-(trifluoromethyl)phenyl)-1H-pyrazol-5-yl)-1H-indole-2-carboxamide (Compound 20)

The title compound was obtained according to the same procedure as Example 1, except for using 4-methyl-3-(4-(trifluoromethyl)phenyl)-1H-pyrazol-5-amine instead of 3-fluoroaniline.

1H NMR (300 MHz, DMSO-d$_6$) 10.49 (br, NH, 1H), 8.36 (br, NH, 1H), 8.27 (m, 1H), 7.98-7.96 (m, 2H), 7.86-7.83 (m, 2H), 7.76 (m, 1H), 7.63-7.60 (m, 1H), 7.55-7.50 (m, 2H), 7.44 (m, 1H), 7.35-7.32 (m, 1H), 4.30-4.28 (m, 2H), 4.01 (s, 3H), 2.50-2.41 (m, 1H), 2.08 (s, 3H), 1.04-1.02 (m, 6H).

Example 21: Synthesis of 2-chloro-5-(isobutyramidomethyl)-N-(1-methyl-2-(4-(pyrimidin-2-yl)piperazin-1-carbonyl)-1H-indole-5-yl)benzamide (Compound 21)

The title compound was obtained according to the same procedure as Example 1, except for using 2-(piperazin-1-yl)pyrimidine instead of 3-fluoroaniline.

1H NMR (300 MHz, DMSO-d$_6$) 10.40 (br, NH, 1H), 8.40-8.39 (m, 3H), 8.11 (m, 1H), 7.52-7.43 (m, 4H), 7.35-7.33 (m, 1H), 6.72-6.66 (m, 2H), 4.28 (m, 2H), 3.83 (m, 4H), 3.77-3.73 (m, 7H), 2.49-2.39 (m, 1H), 1.04-1.02 (m, 6H).

Example 22: Synthesis of N-(4-chloro-2-methylphenyl)-5-(2-chloro-5-(isobutyramidomethyl)benzamido)-1-methyl-1H-indole-2-carboxamide (Compound 22)

The title compound was obtained according to the same procedure as Example 1, except for using 4-chloro-2-methylaniline instead of 3-fluoroaniline.

1H NMR (300 MHz, DMSO-d$_6$) 10.46 (br, NH, 1H), 9.94 (br, NH, 1H), 8.37 (m, NH, 1H), 8.18 (m, 1H), 7.57-7.50 (m, 3H), 7.44-7.36 (m, 4H), 7.33-7.28 (m, 2H), 4.31-4.29 (m, 2H), 4.00 (s, 3H), 2.50-2.41 (m, 1H), 2.28 (s, 3H), 1.05-1.02 (m, 6H).

Example 23: Synthesis of 5-(2-chloro-5-(isobutyramidomethyl)benzamido)-N-(4-fluoro-2-methylphenyl)-1-methyl-1H-indole-2-carboxamid (Compound 23)

The title compound was obtained according to the same procedure as Example 1, except for using 4-fluoro-2-methylaniline instead of 3-fluoroaniline.

1H NMR (300 MHz, DMSO-d$_6$) 10.45 (br, NH, 1H), 9.92 (br, NH, 1H), 8.37 (m, NH, 1H), 8.18 (m, 1H), 7.57-7.50 (m, 3H), 7.45 (m, 1H), 7.40-7.30 (m, 3H), 7.18-7.15 (m, 1H), 7.10-7.04 (m, 1H), 4.31-4.29 (m, 2H), 4.00 (s, 3H), 2.50-2.41 (m, 1H), 2.28 (s, 3H), 1.05-1.02 (m, 6H).

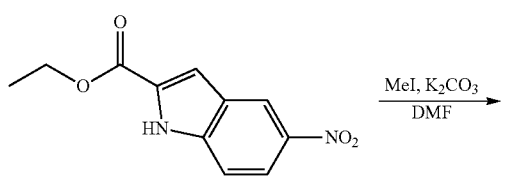

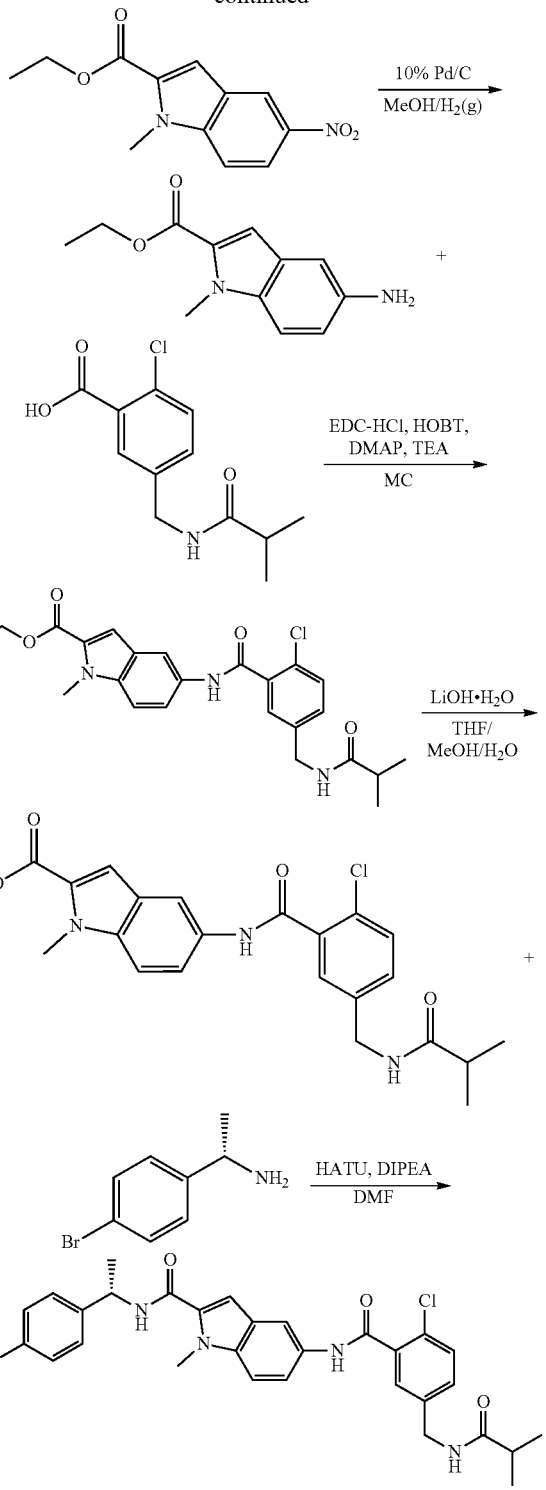

Example 24: Synthesis of (S)—N-(1-(4-bromophenyl)ethyl)-5-(2-chloro-5-(isobutyramidomethyl)benzamido)-1-methyl-1H-indole-2-carboxamide (Compound 24)

Example 24-1: Synthesis of ethyl 1-methyl-5-nitro-1H-indole-2-carboxylate

Ethyl 5-nitro-1H-indole-2-carboxylate (2.5 g, 10.67 mmol) and MeI (2.27 g, 16.01 mmol) were added to a 100 mL flask and dissolved in DMF (25 ml). $K_2CO_3$ (2.95 g, 21.34 mmol) was added and stirred at room temperature for 12 hours. After the reaction was completed, the organic material was extracted with ethyl acetate/$H_2O$. The organic layer was dried over $MgSO_4$ and distilled under reduced pressure to remove the solvent. The residue was subjected to column chromatography (ethyl acetate:n-hexane=1:3) to obtain ethyl 1-methyl-5-nitro-1H-indole-2-carboxylate (2.38 g, 9.58 mmol, 90%, white solid).

1H NMR (300 MHz, $CDCl_3$) 8.66-8.65 (m, 1H), 8.25-8.22 (m, 1H), 7.46-7.43 (m, 2H), 4.45-4.42 (m, 2H), 4.14 (s, 3H), 1.45-1.41 (m, 3H).

Example 24-2: Synthesis of ethyl 5-amino-1-methyl-1H-indole-2-carboxylate

Ethyl 1-methyl-5-nitro-1H-indole-2-carboxylate (2.38 g, 9.58 mmol) was added to a 100 mL flask and dissolved in MeOH (50 ml). 10% Pd/C (2.3 g) was added thereto and stirred for 12 hours at room temperature under $H_2$ (g). After Celite filtration upon completion of the reaction, the solvent was removed by distillation under reduced pressure. The residue was subjected to column chromatography (ethyl acetate:n-hexane=1:3) to obtain ethyl 5-amino-1-methyl-1H-indole-2-carboxylate (1.66 g, 7.60 mmol, 77%).

1H NMR (300 MHz, $CDCl_3$) 7.52 (s, 1H), 7.21-7.18 (m, 1H), 7.09 (s, 1H), 6.92-6.91 (m, 1H), 6.85-6.82 (m, 1H), 4.38-4.31 (m, 2H), 4.01 (s, 3H), 3.55 (br, NH, 2H), 1.42-1.37 (m, 3H).

Example 24-3: Synthesis of ethyl 5-(2-chloro-5-(isobutyramidomethyl)benzamido)-1-methyl-1H-indole-2-carboxylate Ethyl 5-amino-1-methyl-1H-indole-2-carboxylate (660 mg, 3.02 mmol) and 2-chloro-5-(isobutyramidomethyl)benzoic acid (927 mg, 3.624 mmol) were added to a 100 mL flask and dissolved in $CH_2Cl_2$ (20 ml). HOBT (612 mg, 4.53 mmol) and DMAP (369 mg, 3.02 mmol) were added thereto and reacted for 10 minutes. Then, EDC (1.74 g, 9.06 mmol) and TEA (917 mg, 9.06 mmol) were added and stirred under reflux for 12 hours. After completion of the reaction, the organic material was extracted with $CH_2Cl_2/H_2O$. The organic layer was dried over $MgSO_4$ and distilled under reduced pressure to remove the solvent. The residue was subjected to column chromatography (ethyl acetate:n-hexane=3:1) to obtain ethyl 5-(2-chloro-5-(isobutyramidomethyl)benzamido)-1-methyl-1H-indole-2-carboxylate (900 mg, 1.97 mmol, 66%, white solid).

1H NMR (300 MHz, DMSO-$d_6$) 10.46 (br, NH, 1H), 8.39-8.35 (m, NH, 1H), 8.18 (m, 1H), 7.59-7.49 (m, 3H), 7.43 (m, 1H), 7.35-7.33 (m, 1H), 7.25 (m, 1H), 4.36-4.28 (m, 4H), 4.01 (s, 3H), 2.50-2.38 (m, 1H), 1.36-1.31 (m, 3H), 1.04-1.02 (m, 6H).

Example 24-4: Synthesis of 5-(2-chloro-5-(isobutyramidomethyl)benzamido)-1-methyl-1H-indole-2-carboxylic acid Ethyl 5-(2-chloro-5-(isobutyramidomethyl)benzamido)-1-methyl-1H-indole-2-carboxylate (900 mg, 1.97 mmol) was added to a 500 mL flask and dissolved in THF (100 ml) and MeOH (100 ml). LiOH (413 mg, 9.85 mmol) dissolved in $H_2O$ (70 ml) was added and stirred for 12 hours. After concentration upon completion of the reaction, the pH was adjusted to 2 with 2N—HCl. The resulting solid was filtered to obtain 5-(2-chloro-5-(isobutyramidomethyl)benzamido)-1-methyl-1H-indole-2-carboxylic acid (812 mg, 1.89 mmol, 96%, white solid).

1H NMR (300 MHz, DMSO-$d_6$) 10.45 (br, NH, 1H), 8.39-8.35 (m, NH, 1H), 8.18 (m, 1H), 7.57-7.49 (m, 3H), 7.43 (m, 1H), 7.35-7.33 (m, 1H), 7.21 (m, 1H), 4.30-4.28 (m, 2H), 4.01 (s, 3H), 2.50-2.38 (m, 1H), 1.04-1.02 (m, 6H).

Example 24-5: Synthesis of (S)—N-(1-(4-bromophenyl)ethyl)-5-(2-chloro-5-(isobutyramidomethyl)benzamido)-1-methyl-1H-indole-2-carboxamide (Compound 24)

5-(2-chloro-5-(isobutyramidomethyl)benzamido)-1-methyl-1H-indole-2-carboxylic acid (100 mg, 0.23 mmol) and (S)-1-(4-bromophenyl)ethanamine (69 mg, 0.345 mmol) were added to a 25 mL flask and dissolved in DMF (2 ml). HATU (131 mg, 0.345 mmol) and DIPEA (60 mg, 0.46 mmol) were added thereto and stirred at room temperature for 12 hours. After the reaction was completed, the organic material was extracted with ethyl acetate/$H_2O$. The organic layer was dried over $MgSO_4$ and distilled under reduced pressure to remove the solvent. The residue was subjected to column chromatography (ethyl acetate:n-hexane=3:1) to obtain (S)—N-(1-(4-bromophenyl)ethyl)-5-(2-chloro-5-(isobutyramidomethyl)benzamido)-1-methyl-1H-indole-2-carboxamide (87 mg, 0.142 mmol, 62%, white solid).

1H NMR (300 MHz, DMSO-$d_6$) 10.41 (br, NH, 1H), 8.88-8.85 (m, NH, 1H), 8.35 (m, NH, 1H), 8.11 (m, 1H), 7.54-7.49 (m, 5H), 7.43 (m, 1H), 7.39-7.32 (m, 3H), 7.19 (m, 1H), 5.15-5.10 (m, 1H), 4.30-4.28 (m, 2H), 3.92 (s, 3H), 2.50-2.39 (m, 1H), 1.49-1.46 (m, 3H), 1.04-1.02 (m, 6H).

Example 25: Synthesis of (S)-5-(2-chloro-5-(isobutyramidomethyl)benzamido)-1-methyl-N-(1-(4-nitrophenyl)ethyl)-1H-indole-2-carboxamide (Compound 25)

The title compound was obtained according to the same procedure as Example 24, except for using (S)-1-(4-nitrophenyl)ethanamine instead of (S)-1-(4-bromophenyl)ethanamine.

1H NMR (300 MHz, DMSO-$d_6$) 10.42 (br, NH, 1H), 9.02-8.99 (m, NH, 1H), 8.38-8.34 (m, NH, 1H), 8.24-8.21 (m, 2H), 8.13 (m, 1H), 7.70-7.67 (m, 2H), 7.52-7.50 (m, 3H), 7.44 (m, 1H), 7.35-7.33 (m, 1H), 7.24 (m, 1H), 5.27-5.23 (m, 1H), 4.30-4.28 (m, 2H), 3.92 (s, 3H), 2.50-2.39 (m, 1H), 1.53-1.51 (m, 3H), 1.04-1.02 (m, 6H).

Example 26: Synthesis of 5-(2-chloro-5-(isobutyramidomethyl)benzamido)-1-methyl-N-(2-methylbenzyl)-1H-indole-2-carboxamide (Compound 26)

The title compound was obtained according to the same procedure as Example 24, except for using o-tolylmethanamine instead of (S)-1-(4-bromophenyl)ethanamine.

1H NMR (300 MHz, DMSO-$d_6$) 10.41 (br, NH, 1H), 8.94 (m, NH, 1H), 8.35 (m, NH, 1H), 8.12 (m, 1H), 7.52-7.43 (m, 4H), 7.35-7.16 (m, 6H), 4.47-4.45 (m, 2H), 4.30-4.28 (m, 2H), 3.98 (s, 3H), 2.50-2.39 (m, 1H), 2.34 (s, 3H), 1.04-1.02 (m, 6H).

Example 27: Synthesis of 5-(2-chloro-5-(isobutyramidomethyl)benzamido)-N-(1-(4-fluorophenyl)ethyl)-1-methyl-1H-indole-2-carboxamide (Compound 27)

The title compound was obtained according to the same procedure as Example 24, except for using 1-(4-fluorophenyl)ethanamine instead of (S)-1-(4-bromophenyl)ethanamine.

1H NMR (300 MHz, DMSO-$d_6$) 10.40 (br, NH, 1H), 8.85-8.82 (m, NH, 1H), 8.37-8.33 (m, NH, 1H), 8.11 (m, 1H), 7.52-7.43 (m, 6H), 7.35-7.32 (m, 1H), 7.19-7.13 (m, 3H), 5.19-5.14 (m, 1H), 4.30-4.28 (m, 2H), 3.93 (s, 3H), 2.50-2.38 (m, 1H), 1.49-1.47 (m, 3H), 1.04-1.02 (m, 6H).

Example 28: Synthesis of (S)-5-(2-chloro-5-(isobutyramidomethyl)benzamido)-1-methyl-N-(1-phenylethyl)-1H-indole-2-carboxamide (Compound 28)

The title compound was obtained according to the same procedure as Example 24, except for using (S)-1-phenylethanamine instead of (S)-1-(4-bromophenyl)ethanamine.

1H NMR (300 MHz, DMSO-$d_6$) 10.40 (br, NH, 1H), 8.85-8.83 (m, NH, 1H), 8.37-8.33 (m, NH, 1H), 8.11 (m, 1H), 7.52-7.49 (m, 3H), 7.43-7.41 (m, 3H), 7.36-7.31 (m, 3H), 7.25-7.20 (m, 2H), 5.19-5.14 (m, 1H), 4.30-4.28 (m, 2H), 3.93 (s, 3H), 2.50-2.39 (m, 1H), 1.50-1.48 (m, 3H), 1.04-1.02 (m, 6H).

Example 29: Synthesis of 5-(2-chloro-5-(isobutyramidomethyl)benzamido)-N-(4-methoxybenzyl)-1-methyl-1H-indole-2-carboxamide (Compound 29)

The title compound was obtained according to the same procedure as Example 24, except for using (4-methoxyphenyl)methanamine instead of (S)-1-(4-bromophenyl)ethanamine.

1H NMR (300 MHz, DMSO-$d_6$) 10.40 (br, NH, 1H), 9.00-8.96 (m, NH, 1H), 8.37-8.33 (m, NH, 1H), 8.11 (m, 1H), 7.51-7.43 (m, 4H), 7.35-7.26 (m, 3H), 7.10 (m, 1H), 6.91-6.88 (m, 2H), 4.41-4.39 (m, 2H), 4.30-4.28 (m, 2H), 3.98 (s, 3H), 3.73 (s, 3H), 2.50-2.38 (m, 1H), 1.49-1.47 (m, 3H), 1.04-1.02 (m, 6H).

Example 30: Synthesis of N-([1,1'-biphenyl]-4-ylmethyl)-5-(2-chloro-5-(isobutyramidomethyl)benzamido)-1-methyl-1H-indole-2-carboxamide (Compound 30)

The title compound was obtained according to the same procedure as Example 24, except for using [1,1'-biphenyl]-4-ylmethanamine instead of (S)-1-(4-bromophenyl)ethanamine.

1H NMR (300 MHz, DMSO-$d_6$) 10.41 (br, NH, 1H), 9.12-9.07 (m, NH, 1H), 8.37-8.33 (m, NH, 1H), 7.94 (m, 1H), 7.66-7.63 (m, 4H), 7.51-7.43 (m, 8H), 7.37-7.32 (m, 2H), 7.16 (m, 1H), 4.53-4.51 (m, 2H), 4.30-4.28 (m, 2H), 4.00 (s, 3H), 3.73 (s, 3H), 2.50-2.38 (m, 1H), 1.49-1.47 (m, 3H), 1.04-1.02 (m, 6H).

Example 31: Synthesis of (S)-5-(2-chloro-5-(isobutyramidomethyl)benzamido)-1-methyl-N-(1-(naphthalen-2-yl)ethyl)-1H-indole-2-carboxamide (Compound 31)

The title compound was obtained according to the same procedure as Example 24, except for using (S)-1-(naphthalen-2-yl)ethanamine instead of (S)-1-(4-bromophenyl)ethanamine.

1H NMR (300 MHz, DMSO-$d_6$) 10.42 (br, NH, 1H), 8.98-8.95 (m, NH, 1H), 8.38-8.34 (m, NH, 1H), 8.13 (m, 1H), 7.92-7.89 (m, 4H), 7.63-7.60 (m, 1H), 7.52-7.44 (m, 6H), 7.35-7.32 (m, 1H), 7.24 (m, 1H), 5.36-5.31 (m, 1H), 4.30-4.28 (m, 2H), 3.93 (s, 3H), 2.50-2.38 (m, 1H), 1.60-1.58 (m, 3H), 1.04-1.02 (m, 6H).

Example 32: Synthesis of 5-(2-chloro-5-(isobutyramidomethyl)benzamido)-N-(4-fluorobenzyl)-1-methyl-1H-indole-2-carboxamide (Compound 32)

The title compound was obtained according to the same procedure as Example 24, except for using (4-fluorophenyl)methanamine instead of (S)-1-(4-bromophenyl)ethanamine.

1H NMR (300 MHz, DMSO-$d_6$) 10.41 (br, NH, 1H), 9.08-9.04 (m, NH, 1H), 8.35 (m, NH, 1H), 8.12 (m, 1H), 7.52-7.32 (m, 7H), 7.19-7.13 (m, 3H), 4.45-4.44 (m, 2H), 4.30-4.28 (m, 2H), 3.98 (s, 3H), 2.50-2.38 (m, 1H), 1.04-1.02 (m, 6H).

Example 33: Synthesis of N-(4-(tert-butyl)benzyl)-5-(2-chloro-5-(isobutyramidomethyl)benzamido)-1-methyl-1H-indole-2-carboxamide (Compound 33)

The title compound was obtained according to the same procedure as Example 24, except for using (4-(tert-butyl)phenyl)methanamine instead of (S)-1-(4-bromophenyl)ethanamine.

1H NMR (300 MHz, DMSO-$d_6$) 10.41 (br, NH, 1H), 9.03-8.99 (m, NH, 1H), 8.38-8.34 (m, NH, 1H), 8.12 (m, 1H), 7.52-7.43 (m, 4H), 7.37-7.32 (m, 3H), 7.28-7.25 (m, 2H), 7.12 (m, 1H), 4.44-4.42 (m, 2H), 4.30-4.28 (m, 2H), 3.98 (s, 3H), 2.50-2.38 (m, 1H), 1.26 (s, 9H), 1.04-1.02 (m, 6H).

Example 34: Synthesis of 5-(2-chloro-5-(isobutyramidomethyl)benzamido)-1-methyl-N-(4-(trifluoromethyl)benzyl)-1H-indole-2-carboxamide (Compound 34)

The title compound was obtained according to the same procedure as Example 24, except for using (4-(trifluoromethyl)phenyl)methanamine instead of (S)-1-(4-bromophenyl)ethanamine.

1H NMR (300 MHz, DMSO-$d_6$) 10.42 (br, NH, 1H), 9.16 (m, NH, 1H), 8.36 (m, NH, 1H), 8.14 (m, 1H), 7.73-7.70 (m, 2H), 7.58-7.43 (m, 6H), 7.35-7.32 (m, 1H), 7.16 (m, 1H), 4.57-4.55 (m, 2H), 4.30-4.28 (m, 2H), 3.98 (s, 3H), 2.50-2.38 (m, 1H), 1.04-1.02 (m, 6H).

Example 35: Synthesis of 5-(2-chloro-5-(isobutyramidomethyl)benzamido)-1-methyl-N-(2-(trifluoromethyl)benzyl)-1H-indole-2-carboxamide (Compound 35)

The title compound was obtained according to the same procedure as Example 24, except for using (2-(trifluoromethyl)phenyl)methanamine instead of (S)-1-(4-bromophenyl)ethanamine.

1H NMR (300 MHz, DMSO-$d_6$) 10.43 (br, NH, 1H), 9.17-9.13 (m, NH, 1H), 8.37 (m, NH, 1H), 8.16 (m, 1H), 7.76-7.66 (m, 2H), 7.60-7.43 (m, 6H), 7.35-7.33 (m, 2H), 7.23 (m, 1H), 4.68-4.66 (m, 2H), 4.30-4.28 (m, 2H), 3.98 (s, 3H), 2.50-2.38 (m, 1H), 1.04-1.02 (m, 6H).

Example 36: Synthesis of 5-(2-chloro-5-(isobutyramidomethyl)benzamido)-N-(3-fluorobenzyl)-1-methyl-1H-indole-2-carboxamide (Compound 36)

The title compound was obtained according to the same procedure as Example 24, except for using (3-fluorophenyl)methanamine instead of (S)-1-(4-bromophenyl)ethanamine.

1H NMR (300 MHz, DMSO-$d_6$) 10.41 (br, NH, 1H), 9.09 (m, NH, 1H), 8.35 (m, NH, 1H), 8.13 (m, 1H), 7.50-7.32 (m, 6H), 7.21-7.08 (m, 4H), 4.50-4.48 (m, 2H), 4.30-4.28 (m, 2H), 3.98 (s, 3H), 2.50-2.38 (m, 1H), 1.04-1.02 (m, 6H).

Example 37: Synthesis of 5-(2-chloro-5-(isobutyramidomethyl)benzamido)-N-(2-fluorobenzyl)-1-methyl-1H-indole-2-carboxamide (Compound 37)

The title compound was obtained according to the same procedure as Example 24, except for using (2-fluorophenyl)methanamine instead of (S)-1-(4-bromophenyl)ethanamine.

1H NMR (300 MHz, DMSO-$d_6$) 10.42 (br, NH, 1H), 9.05 (m, NH, 1H), 8.36 (m, NH, 1H), 8.13 (m, 1H), 7.52-7.43 (m, 5H), 7.35-7.32 (m, 2H), 7.23-7.16 (m, 3H), 4.53-4.51 (m, 2H), 4.30-4.28 (m, 2H), 3.98 (s, 3H), 2.50-2.38 (m, 1H), 1.04-1.02 (m, 6H).

Example 38: Synthesis of 5-(2-chloro-5-(isobutyramidomethyl)benzamido)-N-(3,4-difluorobenzyl)-1-methyl-1H-indole-2-carboxamide (Compound 38)

The title compound was obtained according to the same procedure as Example 24, except for using (3,4-difluorophenyl)methanamine instead of (S)-1-(4-bromophenyl)ethanamine.

1H NMR (300 MHz, DMSO-$d_6$) 10.42 (br, NH, 1H), 9.09 (m, NH, 1H), 8.36 (m, NH, 1H), 8.13 (m, 1H), 7.53-7.32 (m, 7H), 7.21-7.14 (m, 2H), 4.46-4.44 (m, 2H), 4.30-4.28 (m, 2H), 3.98 (s, 3H), 2.50-2.38 (m, 1H), 1.04-1.02 (m, 6H).

Example 39: Synthesis of N-(4-chloro-3-fluorobenzyl)-5-(2-chloro-5-(isobutyramidomethyl)benzamido)-1-methyl-1H-indole-2-carboxamide (Compound 39)

The title compound was obtained according to the same procedure as Example 24, except for using (4-chloro-3-fluorophenyl)methanamine instead of (S)-1-(4-bromophenyl)ethanamine.

1H NMR (300 MHz, DMSO-$d_6$) 10.42 (br, NH, 1H), 9.13-9.09 (m, NH, 1H), 8.36 (m, NH, 1H), 8.14 (m, 1H), 7.58-7.33 (m, 7H), 7.24-7.21 (m, 1H), 7.17-7.15 (m, 1H), 4.48-4.47 (m, 2H), 4.30-4.28 (m, 2H), 3.98 (s, 3H), 2.50-2.38 (m, 1H), 1.04-1.02 (m, 6H).

Example 40: Synthesis of (R)-5-(2-chloro-5-(isobutyramidomethyl)benzamido)-1-methyl-N-(1-phenylethyl)-1H-indole-2-carboxamide (Compound 40)

The title compound was obtained according to the same procedure as Example 24, except for using (R)-1-phenylethanamine instead of (S)-1-(4-bromophenyl)ethanamine.

1H NMR (300 MHz, DMSO-$d_6$) 10.40 (br, NH, 1H), 8.85-8.83 (m, NH, 1H), 8.37-8.33 (m, NH, 1H), 8.11 (m, 1H), 7.52-7.49 (m, 3H), 7.43-7.40 (m, 3H), 7.36-7.31 (m, 3H), 7.25-7.20 (m, 1H), 5.19-5.14 (m, 1H), 4.30-4.28 (m, 2H), 3.93 (s, 3H), 2.50-2.38 (m, 1H), 1.50-1.48 (m, 3H), 1.04-1.02 (m, 6H).

Example 41: Synthesis of 5-(2-chloro-5-(isobutyramidomethyl)benzamido)-1-methyl-N-(3-(trifluoromethyl)benzyl)-1H-indole-2-carboxamide (Compound 41)

The title compound was obtained according to the same procedure as Example 24, except for using (3-(trifluoromethyl)phenyl)methanamine instead of (S)-1-(4-bromophenyl)ethanamine.

1H NMR (300 MHz, DMSO-$d_6$) 10.42 (br, NH, 1H), 9.16 (m, NH, 1H), 8.36 (m, NH, 1H), 8.14 (m, 1H), 7.69-7.59 (m, 4H), 7.51-7.43 (m, 4H), 7.35-7.32 (m, 1H), 7.15 (m, 1H), 4.57-4.55 (m, 2H), 4.30-4.28 (m, 2H), 3.98 (s, 3H), 2.50-2.38 (m, 1H), 1.04-1.02 (m, 6H).

Example 42: Synthesis of 5-(2-chloro-5-(isobutyramidomethyl)benzamido)-N-(3-fluoro-5-(trifluoromethyl)benzyl)-1-methyl-1H-indole-2-carboxamide (Compound 42)

The title compound was obtained according to the same procedure as Example 24, except for using (3-fluoro-5-(trifluoromethyl)phenyl)methanamine instead of (S)-1-(4-bromophenyl)ethanamine.

1H NMR (300 MHz, DMSO-$d_6$) 10.42 (br, NH, 1H), 9.17 (m, NH, 1H), 8.36 (m, NH, 1H), 8.14 (m, 1H), 7.58-7.43 (m, 7H), 7.35-7.32 (m, 1H), 7.16 (m, 1H), 4.58-4.56 (m, 2H), 4.30-4.28 (m, 2H), 3.97 (s, 3H), 2.50-2.38 (m, 1H), 1.04-1.02 (m, 6H).

Example 43: Synthesis of 5-(2-chloro-5-(isobutyramidomethyl)benzamido)-N-(3-chlorobenzyl)-1-methyl-1H-indole-2-carboxamide (Compound 43)

The title compound was obtained according to the same procedure as Example 24, except for using (3-chlorophenyl)methanamine instead of (S)-1-(4-bromophenyl)ethanamine.

1H NMR (300 MHz, DMSO-$d_6$) 10.43 (br, NH, 1H), 9.11 (m, NH, 1H), 8.37 (m, NH, 1H), 8.14 (m, 1H), 7.52-7.49 (m, 3H), 7.44-7.33 (m, 6H), 7.15 (m, 1H), 4.49-4.47 (m, 2H), 4.30-4.29 (m, 2H), 3.98 (s, 3H), 2.50-2.38 (m, 1H), 1.04-1.02 (m, 6H).

Example 44: Synthesis of 5-(2-chloro-5-(isobutyramidomethyl)benzamido)-N-(2-chlorobenzyl)-1-methyl-1H-indole-2-carboxamide (Compound 44)

The title compound was obtained according to the same procedure as Example 24, except for using (2-chlorophenyl)methanamine instead of (S)-1-(4-bromophenyl)ethanamine.

1H NMR (300 MHz, DMSO-$d_6$) 10.43 (br, NH, 1H), 9.10-9.06 (m, NH, 1H), 8.39-8.35 (m, NH, 1H), 8.15 (m, 1H), 7.54-7.41 (m, 6H), 7.37-7.28 (m, 3H), 7.20 (m, 1H), 4.56-4.54 (m, 2H), 4.31-4.29 (m, 2H), 3.98 (s, 3H), 2.50-2.38 (m, 1H), 1.04-1.02 (m, 6H).

Example 45: Synthesis of 5-(2-chloro-5-(isobutyramidomethyl)benzamido)-1-methyl-N-(4-nitrobenzyl)-1H-indole-2-carboxamide (Compound 45)

The title compound was obtained according to the same procedure as Example 24, except for using (4-nitrophenyl)methanamine instead of (S)-1-(4-bromophenyl)ethanamine.

1H NMR (300 MHz, DMSO-$d_6$) 10.43 (br, NH, 1H), 9.23-9.20 (m, NH, 1H), 8.36 (m, NH, 1H), 8.24-8.21 (m, 2H), 8.15 (m, 1H), 7.63-7.60 (m, 2H), 7.54-7.43 (m, 4H), 7.35-7.32 (m, 1H), 7.18 (m, 1H), 4.61-4.59 (m, 2H), 4.30-4.28 (m, 2H), 3.98 (s, 3H), 2.50-2.38 (m, 1H), 1.04-1.02 (m, 6H).

Example 46: Synthesis of 5-(2-chloro-5-(isobutyramidomethyl)benzamido)-N-(3-bromobenzyl)-1-methyl-1H-indole-2-carboxamide (Compound 46)

The title compound was obtained according to the same procedure as Example 24, except for using (3-bromophenyl)methanamine instead of (S)-1-(4-bromophenyl)ethanamine.
1H NMR (300 MHz, DMSO-$d_6$) 10.43 (br, NH, 1H), 9.13-9.09 (m, NH, 1H), 8.37 (m, NH, 1H), 8.14 (m, 1H), 7.54-7.44 (m, 6H), 7.38-7.31 (m, 3H), 7.15 (m, 1H), 4.48-4.46 (m, 2H), 4.30-4.28 (m, 2H), 3.98 (s, 3H), 2.50-2.38 (m, 1H), 1.04-1.02 (m, 6H).

Example 47: Synthesis of 5-(2-chloro-5-(isobutyramidomethyl)benzamido)-1-methyl-N-(1-(4-(trifluoromethyl)phenyl)ethyl)-1H-indole-2-carboxamide (Compound 47)

The title compound was obtained according to the same procedure as Example 24, except for using 1-(4-(trifluoromethyl)phenyl)ethanamine instead of (S)-1-(4-bromophenyl)ethanamine.
1H NMR (300 MHz, DMSO-$d_6$) 10.42 (br, NH, 1H), 8.98-8.95 (m, NH, 1H), 8.37 (m, NH, 1H), 8.12 (m, 1H), 7.73-7.70 (m, 2H), 7.65-7.62 (m, 2H), 7.52-7.49 (m, 3H), 7.43 (m, 1H), 7.35-7.32 (m, 1H), 7.23 (m, 1H), 5.24-5.19 (m, 1H), 4.30-4.28 (m, 2H), 3.92 (s, 3H), 2.50-2.38 (m, 1H), 1.52-1.50 (m, 3H), 1.04-1.02 (m, 6H).

Example 48: Synthesis of 5-(2-chloro-5-(isobutyramidomethyl)benzamido)-N-(4-bromobenzyl)-1-methyl-1H-indole-2-carboxamide (Compound 48)

The title compound was obtained according to the same procedure as Example 24, except for using (4-bromophenyl)methanamine instead of (S)-1-(4-bromophenyl)ethanamine.
1H NMR (300 MHz, DMSO-$d_6$) 10.42 (br, NH, 1H), 9.09 (m, NH, 1H), 8.38-8.34 (m, NH, 1H), 8.13 (m, 1H), 7.55-7.43 (m, 6H), 7.35-7.30 (m, 3H), 7.13 (m, 1H), 4.45-4.43 (m, 2H), 4.30-4.28 (m, 2H), 3.98 (s, 3H), 2.50-2.38 (m, 1H), 1.04-1.02 (m, 6H).

Example 49: Synthesis of 5-(2-chloro-5-(isobutyramidomethyl)benzamido)-N-(4-chlorobenzyl)-1-methyl-1H-indole-2-carboxamide (Compound 49)

The title compound was obtained according to the same procedure as Example 24, except for using (4-chlorophenyl)methanamine instead of (S)-1-(4-bromophenyl)ethanamine.
1H NMR (300 MHz, DMSO-$d_6$) 10.42 (br, NH, 1H), 9.11-9.07 (m, NH, 1H), 8.38-8.34 (m, NH, 1H), 8.13 (m, 1H), 7.52-7.32 (m, 9H), 7.13 (m, 1H), 4.47-4.45 (m, 2H), 4.30-4.28 (m, 2H), 3.98 (s, 3H), 2.50-2.38 (m, 1H), 1.04-1.02 (m, 6H).

Example 50: Synthesis of N-(benzo[d][1,3]dioxol-5-ylmethyl)-5-(2-chloro-5-(isobutyramidomethyl)benzamido)-1-methyl-1H-indole-2-carboxamide (Compound 50)

The title compound was obtained according to the same procedure as Example 24, except for using benzo[d][1,3]dioxol-5-ylmethanamine instead of (S)-1-(4-bromophenyl)ethanamine.
1H NMR (300 MHz, DMSO-$d_6$) 10.41 (br, NH, 1H), 8.99 (m, NH, 1H), 8.36 (m, NH, 1H), 8.11 (m, 1H), 7.52-7.43 (m, 4H), 7.35-7.32 (m, 1H), 7.11 (m, 1H), 6.91-6.80 (m, 3H), 4.38-4.36 (m, 2H), 4.30-4.28 (m, 2H), 3.98 (s, 3H), 2.50-2.38 (m, 1H), 1.04-1.02 (m, 6H).

Example 51: Synthesis of 5-(2-chloro-5-(isobutyramidomethyl)benzamido)-N-(3,5-difluorobenzyl)-1-methyl-1H-indole-2-carboxamide (Compound 51)

The title compound was obtained according to the same procedure as Example 24, except for using (3,5-difluorophenyl)methanamine instead of (S)-1-(4-bromophenyl)ethanamine.
1H NMR (300 MHz, DMSO-$d_6$) 10.43 (br, NH, 1H), 9.14-9.10 (m, NH, 1H), 8.39-8.35 (m, NH, 1H), 8.15 (m, 1H), 7.54-7.44 (m, 4H), 7.35-7.33 (m, 1H), 7.17-7.05 (m, 4H), 4.50-4.48 (m, 2H), 4.30-4.28 (m, 2H), 3.98 (s, 3H), 2.50-2.38 (m, 1H), 1.04-1.02 (m, 6H).

Example 52: Synthesis of 5-(2-chloro-5-(isobutyramidomethyl)benzamido)-1-methyl-N-(4-(trifluoromethoxy)benzyl)-1H-indole-2-carboxamide (Compound 52)

The title compound was obtained according to the same procedure as Example 24, except for using (4-(trifluoromethoxy)phenyl)methanamine instead of (S)-1-(4-bromophenyl)ethanamine.
1H NMR (300 MHz, DMSO-$d_6$) 10.41 (br, NH, 1H), 9.12-9.08 (m, NH, 1H), 8.36 (m, NH, 1H), 8.13 (m, 1H), 7.52-7.43 (m, 6H), 7.35-7.33 (m, 3H), 7.14 (m, 1H), 4.51-4.49 (m, 2H), 4.30-4.28 (m, 2H), 3.98 (s, 3H), 2.50-2.38 (m, 1H), 1.04-1.02 (m, 6H).

Example 53: Synthesis of N-(4-bromo-2-fluorobenzyl)-5-(2-chloro-5-(isobutyramidomethyl)benzamido)-1-methyl-1H-indole-2-carboxamide (Compound 53)

The title compound was obtained according to the same procedure as Example 24, except for using (4-bromo-2-fluorophenyl)methanamine instead of (S)-1-(4-bromophenyl)ethanamine.
1H NMR (300 MHz, DMSO-$d_6$) 10.43 (br, NH, 1H), 9.06 (m, NH, 1H), 8.37 (m, NH, 1H), 8.13 (m, 1H), 7.56-7.32 (m, 8H), 7.15 (m, 1H), 4.47-4.45 (m, 2H), 4.30-4.28 (m, 2H), 3.97 (s, 3H), 2.50-2.40 (m, 1H), 1.04-1.02 (m, 6H).

Example 54: Synthesis of 5-(2-chloro-5-(isobutyramidomethyl)benzamido)-N-(2,6-difluorobenzyl)-1-methyl-1H-indole-2-carboxamide (Compound 54)

The title compound was obtained according to the same procedure as Example 24, except for using (2,6-difluorophenyl)methanamine instead of (S)-1-(4-bromophenyl)ethanamine.
1H NMR (300 MHz, DMSO-$d_6$) 10.41 (br, NH, 1H), 8.91 (m, NH, 1H), 8.36 (m, NH, 1H), 8.08 (m, 1H), 7.51-7.32 (m, 6H), 7.13-7.07 (m, 3H), 4.52-4.51 (m, 2H), 4.29-4.27 (m, 2H), 3.96 (s, 3H), 2.50-2.38 (m, 1H), 1.03-1.01 (m, 6H).

Example 55: Synthesis of 5-(2-chloro-5-(isobutyramidomethyl)benzamido)-N-(2,6-dichlorobenzyl)-1-methyl-1H-indole-2-carboxamide (Compound 55)

The title compound was obtained according to the same procedure as Example 24, except for using (2,6-dichlorophenyl)methanamine instead of (S)-1-(4-bromophenyl)ethanamine.

1H NMR (300 MHz, DMSO-d$_6$) 10.40 (br, NH, 1H), 8.72 (m, NH, 1H), 8.36 (m, NH, 1H), 8.06 (m, 1H), 7.52-7.49 (m, 5H), 7.42-7.31 (m, 3H), 7.07 (m, 1H), 4.71-4.69 (m, 2H), 4.29-4.27 (m, 2H), 3.97 (s, 3H), 2.50-2.38 (m, 1H), 1.03-1.01 (m, 6H).

Example 56: Synthesis of N-(3-chloro-4-fluorobenzyl)-5-(2-chloro-5-(isobutyramidomethyl)benzamido)-1-methyl-1H-indole-2-carboxamide (Compound 56)

The title compound was obtained according to the same procedure as Example 24, except for using (3-chloro-4-fluorophenyl)methanamine instead of (S)-1-(4-bromophenyl)ethanamine.

1H NMR (300 MHz, DMSO-d$_6$) 10.43 (br, NH, 1H), 9.10 (m, NH, 1H), 8.38 (m, NH, 1H), 8.14 (m, 1H), 7.56-7.32 (m, 8H), 7.14 (m, 1H), 4.46-4.44 (m, 2H), 4.30-4.28 (m, 2H), 3.98 (s, 3H), 2.50-2.40 (m, 1H), 1.04-1.02 (m, 6H).

Example 57: Synthesis of N-(2-chloro-3-(trifluoromethyl)benzyl)-5-(2-chloro-5-(isobutyramidomethyl)benzamido)-1-methyl-1H-indole-2-carboxamide (Compound 57)

The title compound was obtained according to the same procedure as Example 24, except for using (2-chloro-3-(trifluoromethyl)phenyl)methanamine instead of (S)-1-(4-bromophenyl)ethanamine.

1H NMR (300 MHz, DMSO-d$_6$) 10.44 (br, NH, 1H), 9.18 (m, NH, 1H), 8.38 (m, NH, 1H), 8.15 (m, 1H), 7.81-7.79 (m, 1H), 7.74-7.72 (m, 1H), 7.60-7.436 (m, 5H), 7.35-7.32 (m, 1H), 7.22 (m, 1H), 4.62-4.61 (m, 2H), 4.30-4.28 (m, 2H), 3.98 (s, 3H), 2.50-2.38 (m, 1H), 1.04-1.02 (m, 6H).

Example 58: Synthesis of (R)-5-(2-chloro-5-(isobutyramidomethyl)benzamido)-1-methyl-N-(1-(4-(trifluoromethyl)phenyl)ethyl)-1H-indole-2-carboxamide (Compound 58)

The title compound was obtained according to the same procedure as Example 24, except for using (R)-1-(4-(trifluoromethyl)phenyl)ethanamine hydrochloride instead of (S)-1-(4-bromophenyl)ethanamine.

1H NMR (300 MHz, DMSO-d$_6$) 10.43 (br, NH, 1H), 8.91-8.96 (m, NH, 1H), 8.39-8.36 (m, NH, 1H), 8.13 (m, 1H), 7.73-7.70 (m, 2H), 7.65-7.62 (m, 2H), 7.52-7.49 (m, 3H), 7.44 (m, 1H), 7.35-7.33 (m, 1H), 7.23 (m, 1H), 5.24-5.19 (m, 1H), 4.30-4.28 (m, 2H), 3.92 (s, 3H), 2.50-2.39 (m, 1H), 1.52-1.50 (m, 3H), 1.04-1.02 (m, 6H).

Example 59: Synthesis of (R)-5-(2-chloro-5-(isobutyramidomethyl)benzamido)-1-methyl-N-(1-(4-(trifluoromethoxy)phenyl)ethyl)-1H-indole-2-carboxamide (Compound 59)

The title compound was obtained according to the same procedure as Example 24, except for using (R)-1-(4-(trifluoromethoxy)phenyl)ethanamine hydrochloride instead of (S)-1-(4-bromophenyl)ethanamine.

1H NMR (300 MHz, DMSO-d$_6$) 10.42 (br, NH, 1H), 8.92-8.89 (m, NH, 1H), 8.38-8.34 (m, NH, 1H), 8.11 (m, 1H), 7.55-7.49 (m, 5H), 7.43 (m, 1H), 7.35-7.32 (m, 3H), 7.21 (m, 1H), 5.21-5.16 (m, 1H), 4.30-4.28 (m, 2H), 3.93 (s, 3H), 2.50-2.38 (m, 1H), 1.51-1.48 (m, 3H), 1.04-1.02 (m, 6H).

Example 60: Synthesis of (S)-5-(2-chloro-5-(isobutyramidomethyl)benzamido)-1-methyl-N-(1-(4-(trifluoromethyl)phenyl)ethyl)-1H-indole-2-carboxamide (Compound 60)

The title compound was obtained according to the same procedure as Example 24, except for using (S)-1-(4-(trifluoromethyl)phenyl)ethanamine hydrochloride instead of (S)-1-(4-bromophenyl)ethanamine.

1H NMR (300 MHz, DMSO-d$_6$) 10.41 (br, NH, 1H), 8.96-8.94 (m, NH, 1H), 8.35 (m, NH, 1H), 8.12 (m, 1H), 7.72-7.70 (m, 2H), 7.64-7.62 (m, 2H), 7.51-7.49 (m, 3H), 7.43 (m, 1H), 7.35-7.32 (m, 1H), 7.23 (m, 1H), 5.24-5.19 (m, 1H), 4.30-4.28 (m, 2H), 3.92 (s, 3H), 2.50-2.38 (m, 1H), 1.52-1.50 (m, 3H), 1.04-1.02 (m, 6H).

Example 61: Synthesis of (S)-5-(2-chloro-5-(isobutyramidomethyl)benzamido)-1-methyl-N-(1-(4-(trifluoromethoxy)phenyl)ethyl)-1H-indole-2-carboxamide (Compound 61)

The title compound was obtained according to the same procedure as Example 24, except for using (S)-1-(4-(trifluoromethoxy)phenyl)ethanamine hydrochloride instead of (S)-1-(4-bromophenyl)ethanamine.

1H NMR (300 MHz, DMSO-d$_6$) 10.40 (br, NH, 1H), 8.90-8.88 (m, NH, 1H), 8.35 (m, NH, 1H), 8.11 (m, 1H), 7.55-7.49 (m, 5H), 7.43 (m, 1H), 7.35-7.32 (m, 3H), 7.20 (m, 1H), 5.21-5.16 (m, 1H), 4.30-4.28 (m, 2H), 3.93 (s, 3H), 2.49-2.39 (m, 1H), 1.51-1.48 (m, 3H), 1.04-1.02 (m, 6H).

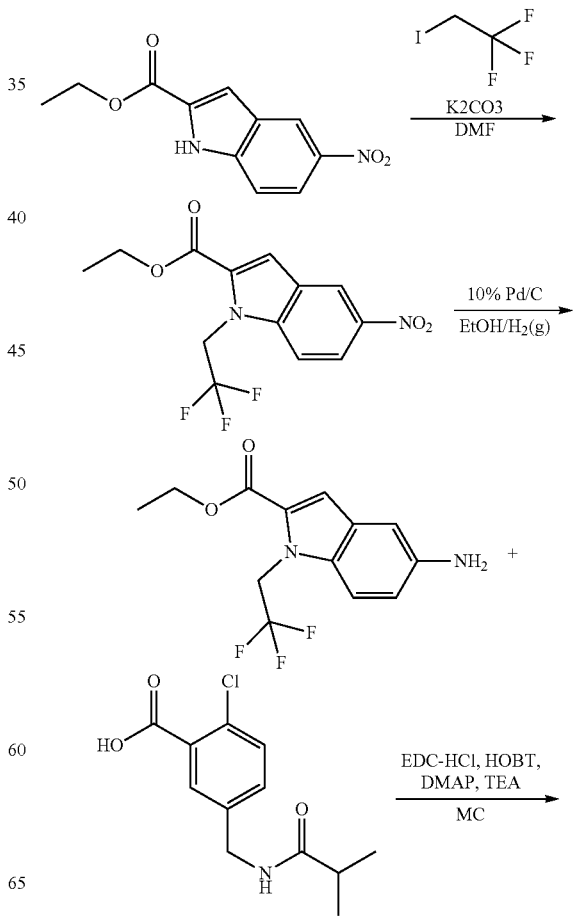

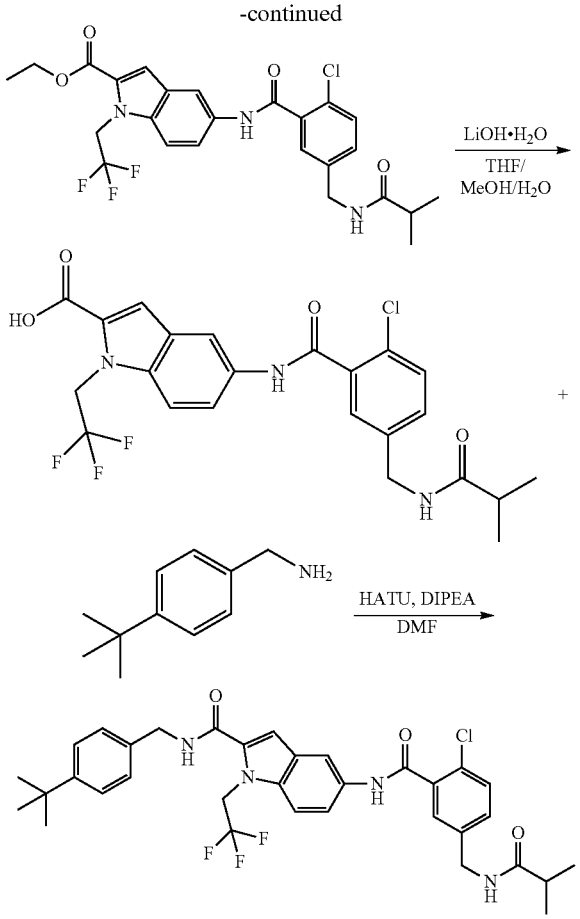

Example 62: Synthesis of N-(4-(tert-butyl)benzyl)-5-(2-chloro-5-(isobutyramidomethyl)benzamido)-1-(2,2,2-trifluoroethyl)-1H-indole-2-carboxamide (Compound 62)

Example 62-1: Synthesis of ethyl 5-nitro-1-(2,2,2-trifluoroethyl)-1H-indole-2-carboxylate Ethyl 5-nitro-1H-indole-2-carboxylate (3 g, 12.81 mmol) and 1,1,1-trifluoro-2-iodoethane (4.03 g, 19.21 mmol) were added to a 100 mL flask and dissolved in DMF (50 ml). $K_2CO_3$ (3.54 g, 25.62 mmol) was added thereto and stirred under reflux for 12 hours. After the reaction was completed, the organic material was extracted with ethyl acetate/$H_2O$. The organic layer was dried over $MgSO_4$ and distilled under reduced pressure to remove the solvent.

The residue was subjected to column chromatography (ethyl acetate:n-hexane=1:3) to obtain ethyl 5-nitro-1-(2,2,2-trifluoroethyl)-1H-indole-2-carboxylate (3.4 g, 10.75 mmol, 84%, white solid).

1H NMR (300 MHz, DMSO-$d_6$) 8.79 (m, 1H), 8.29-8.26 (m, 1H), 8.03-8.00 (m, 1H), 7.71 (m, 1H), 5.75-5.66 (m, 2H), 4.41-4.34 (m, 2H), 1.37-1.32 (m, 3H).

Example 62-2: Synthesis of ethyl 5-amino-1-(2,2,2-trifluoroethyl)-1H-indole-2-carboxylate Ethyl 5-nitro-1-(2,2,2-trifluoroethyl)-1H-indole-2-carboxylate (3.4 g, 10.75 mmol) was added to a 100 mL flask and dissolved in EtOH (60 ml). 10% Pd/C (1.7 g) was added thereto and stirred for 12 hours at room temperature under $H_2$ (g). After Celite filtration upon completion of the reaction, the solvent was removed by distillation under reduced pressure. The residue was subjected to column chromatography (ethyl acetate:n-hexane=1:3) to obtain ethyl 5-amino-1-(2,2,2-trifluoroethyl)-1H-indole-2-carboxylate (2.8 g, 9.78 mmol, 90%).

1H NMR (300 MHz, DMSO-$d_6$) 7.42-7.39 (m, 1H), 7.12 (m, 1H), 6.81-6.78 (m, 1H), 6.74 (m, 1H), 5.49-5.40 (m, 2H), 4.84 (br, NH, 2H), 4.33-4.26 (m, 2H), 1.33-1.28 (m, 3H).

Example 62-3: Synthesis of ethyl 5-(2-chloro-5-(isobutyramidomethyl)benzamido)-1-(2,2,2-trifluoroethyl)-1H-indole-2-carboxylate Ethyl 5-amino-1-(2,2,2-trifluoroethyl)-1H-indole-2-carboxylate (2.8 g, 9.78 mmol) and 2-chloro-5-(isobutyramidomethyl)benzoic acid (3.0 g, 11.736 mmol) were added to a 100 mL flask and dissolved in $CH_2Cl_2$ (60 ml). HOBT (1.98 g, 14.67 mmol) and DMAP (1.194 g, 9.78 mmol) were added thereto and reacted for 10 minutes. Then, EDC (5.624 g, 29.34 mmol) and TEA (4.09 ml, 29.34 mmol) were added and stirred under reflux for 12 hours. After completion of the reaction, the organic material was extracted with $CH_2Cl_2$/$H_2O$. The organic layer was dried over $MgSO_4$ and distilled under reduced pressure to remove the solvent. The residue was subjected to column chromatography (ethyl acetate:n-hexane=3:1) to obtain ethyl 5-(2-chloro-5-(isobutyramidomethyl)benzamido)-1-(2,2,2-trifluoroethyl)-1H-indole-2-carboxylate (3.54 g, 6.75 mmol, 69%, white solid).

1H NMR (300 MHz, DMSO-$d_6$) 10.53 (br, NH, 1H), 8.39-8.35 (m, NH, 1H), 8.23 (m, 1H), 7.75-7.72 (m, 1H), 7.59-7.56 (m, 1H), 7.52-7.50 (m, 1H), 7.43 (m, 2H), 7.36-7.33 (m, 1H), 5.62-5.53 (m, 2H), 4.38-4.28 (m, 4H), 2.50-2.38 (m, 1H), 1.36-1.31 (m, 3H), 1.04-1.02 (m, 6H).

Example 62-4: Synthesis of 5-(2-chloro-5-(isobutyramidomethyl)benzamido)-1-(2,2,2-trifluoroethyl)-1H-indole-2-carboxylic acid Ethyl 5-(2-chloro-5-(isobutyramidomethyl)benzamido)-1-(2,2,2-trifluoroethyl)-1H-indole-2-carboxylate (3.54 g, 6.75 mmol) was added to a 500 mL flask and dissolved in THF (40 ml) and MeOH (40 ml). LiOH (1.416 g, 33.75 mmol) dissolved in $H_2O$ (40 ml) was added and stirred for 12 hours. After concentration upon completion of the reaction, the pH was adjusted to 2 with 2N—HCl. The resulting solid was filtered to obtain 5-(2-chloro-5-(isobutyramidomethyl)benzamido)-1-(2,2,2-trifluoroethyl)-1H-indole-2-carboxylic acid (2.94 g, 5.92 mmol, 88%, white solid).

1H NMR (300 MHz, DMSO-$d_6$) 10.51 (br, NH, 1H), 8.37 (m, NH, 1H), 8.22 (m, 1H), 7.72-7.69 (m, 1H), 7.56-7.50 (m, H), 7.43 (m, 1H), 7.37-7.33 (m, 2H), 5.61-5.59 (m, 2H), 4.30-4.29 (m, 2H), 2.50-2.38 (m, 1H), 1.04-1.02 (m, 6H).

Example 62-5: Synthesis of N-(4-(tert-butyl)benzyl)-5-(2-chloro-5-(isobutyramidomethyl)benzamido)-1-(2,2,2-trifluoroethyl)-1H-indole-2-carboxamide (Compound 62)

5-(2-chloro-5-(isobutyramidomethyl)benzamido)-1-(2,2,2-trifluoroethyl)-1H-indole-2-carboxylic acid (100 mg, 0.2 mmol) and (4-(tert-butyl)phenyl)methanamine (49 mg, 0.3 mmol) were added to a 25 mL flask and dissolved in DMF (2 ml). HATU (114 mg, 0.3 mmol) and DIPEA (52 mg, 0.4 mmol) were added thereto and stirred at room temperature for 12 hours. After the reaction was completed, the organic material was extracted with ethyl acetate/H$_2$O. The organic layer was dried over MgSO$_4$ and distilled under reduced pressure to remove the solvent. The residue was subjected to column chromatography (ethyl acetate:n-hexane=3:1) to obtain N-(4-(tert-butyl)benzyl)-5-(2-chloro-5-(isobutyramidomethyl)benzamido)-1-(2,2,2-trifluoroethyl)-1H-indole-2-carboxamide (94 mg, 0.146 mmol, 73%, white solid).

1H NMR (300 MHz, DMSO-d$_6$) 10.47 (br, NH, 1H), 9.17 (m, NH, 1H), 8.35 (m, NH, 1H), 8.15 (m, 1H), 7.69-7.66 (m, 1H), 7.53-7.50 (m, 2H), 7.43 (m, 1H), 7.37-7.34 (m, 3H), 7.28-7.24 (m, 3H), 5.69-5.66 (m, 2H), 4.46-4.45 (m, 2H), 4.30-4.29 (m, 2H), 2.50-2.39 (m, 1H), 1.27 (s, 9H), 1.04-1.02 (m, 6H).

Example 63: Synthesis of 5-(2-chloro-5-(isobutyramidomethyl)benzamido)-1-(2,2,2-trifluoroethyl)-N-(2-(trifluoromethyl)benzyl)-1H-indole-2-carboxamide (Compound 63)

The title compound was obtained according to the same procedure as Example 62, except for using (2-(trifluoromethyl)phenyl)methanamine instead of (4-(tert-butyl)phenyl)methanamine.

1H NMR (300 MHz, DMSO-d$_6$) 10.51 (br, NH, 1H), 9.33 (m, NH, 1H), 8.37 (m, NH, 1H), 8.19 (m, 1H), 7.77-7.65 (m, 3H), 7.56-7.44 (m, 5H), 7.37-7.33 (m, 2H), 5.67-5.64 (m, 2H), 4.68 (m, 2H), 4.31-4.29 (m, 2H), 2.50-2.39 (m, 1H), 1.04-1.02 (m, 6H).

Example 64: Synthesis of 5-(2-chloro-5-(isobutyramidomethyl)benzamido)-1-(2,2,2-trifluoroethyl)-N-(4-(trifluoromethyl)benzyl)-1H-indole-2-carboxamide (Compound 64)

The title compound was obtained according to the same procedure as Example 62, except for using (4-(trifluoromethyl)phenyl)methanamine instead of (4-(tert-butyl)phenyl)methanamine.

1H NMR (300 MHz, DMSO-d$_6$) 10.48 (br, NH, 1H), 9.32 (m, NH, 1H), 8.35 (m, NH, 1H), 8.17 (m, 1H), 7.73-7.67 (m, 3H), 7.56-7.50 (m, 4H), 7.43 (m, 1H), 7.36-7.31 (m, 2H), 5.66-5.64 (m, 2H), 4.58-4.57 (m, 2H), 4.30-4.29 (m, 2H), 2.50-2.39 (m, 1H), 1.04-1.02 (m, 6H).

Example 65: Synthesis of (S)-5-(2-chloro-5-(isobutyramidomethyl)benzamido)-N-(1-(naphthalen-2-yl)ethyl)-1-(2,2,2-trifluoroethyl)-1H-indole-2-carboxamide (Compound 65)

The title compound was obtained according to the same procedure as Example 62, except for using (S)-1-(naphthalen-2-yl)ethanamine instead of (4-(tert-butyl)phenyl)methanamine.

1H NMR (300 MHz, DMSO-d$_6$) 10.49 (br, NH, 1H), 9.17-9.14 (m, NH, 1H), 8.37 (m, NH, 1H), 8.16 (m, 1H), 7.91-7.86 (m, 4H), 7.68-7.65 (m, 1H), 7.60-7.44 (m, 6H), 7.37-7.33 (m, 2H), 5.60-5.58 (m, 2H), 5.35-5.30 (m, 1H), 4.30-4.29 (m, 2H), 2.50-2.39 (m, 1H), 1.60-1.57 (m, 3H), 1.04-1.02 (m, 6H).

Example 66: Synthesis of (S)-5-(2-chloro-5-(isobutyramidomethyl)benzamido)-N-(1-(4-nitrophenyl)ethyl)-1-(2,2,2-trifluoroethyl)-1H-indole-2-carboxamide (Compound 66)

The title compound was obtained according to the same procedure as Example 62, except for using (S)-1-(4-nitrophenyl)ethanamine instead of (4-(tert-butyl)phenyl)methanamine.

1H NMR (300 MHz, DMSO-d$_6$) 10.50 (br, NH, 1H), 9.21-9.19 (m, NH, 1H), 8.37 (m, NH, 1H), 8.23-8.17 (m, 3H), 7.69-7.66 (m, 3H), 7.55-7.50 (m, 2H), 7.44 (m, 1H), 7.38-7.33 (m, 2H), 5.60-5.64 (m, 2H), 5.27-5.23 (m, 1H), 4.31-4.29 (m, 2H), 2.50-2.39 (m, 1H), 1.53-1.51 (m, 3H), 1.04-1.02 (m, 6H).

Example 67: Synthesis of (S)—N-(1-(4-bromophenyl)ethyl)-5-(2-chloro-5-(isobutyramidomethyl)benzamido)-1-(2,2,2-trifluoroethyl)-1H-indole-2-carboxamide (Compound 67)

The title compound was obtained according to the same procedure as Example 62, except for using (S)-1-(4-bromophenyl)ethanamine instead of (4-(tert-butyl)phenyl)methanamine.

1H NMR (300 MHz, DMSO-d$_6$) 10.48 (br, NH, 1H), 9.06-9.04 (m, NH, 1H), 8.36 (m, NH, 1H), 8.14 (m, 1H), 7.68-7.65 (m, 1H), 7.54-7.50 (m, 4H), 7.43 (m, 1H), 7.37-7.33 (m, 4H), 5.61-5.56 (m, 2H), 5.15-5.10 (m, 1H), 4.30-4.28 (m, 2H), 2.50-2.39 (m, 1H), 1.48-1.46 (m, 3H), 1.04-1.02 (m, 6H).

Example 68: Synthesis of 5-(2-chloro-5-(isobutyramidomethyl)benzamido)-N-(4-fluorobenzyl)-1-(2,2,2-trifluoroethyl)-1H-indole-2-carboxamide (Compound 68)

The title compound was obtained according to the same procedure as Example 62, except for using (4-fluorophenyl)methanamine instead of (4-(tert-butyl)phenyl)methanamine.

1H NMR (300 MHz, DMSO-d$_6$) 10.49 (br, NH, 1H), 9.26-9.22 (m, NH, 1H), 8.37 (m, NH, 1H), 8.16 (m, 1H), 7.69-7.66 (m, 1H), 7.52-7.50 (m, 2H), 7.43-7.34 (m, 4H), 7.28 (m, 1H), 7.20-7.14 (m, 2H), 5.67-5.64 (m, 2H), 4.48-4.46 (m, 2H), 4.30-4.28 (m, 2H), 2.50-2.39 (m, 1H), 1.04-1.02 (m, 6H).

Example 69: Synthesis of 5-(2-chloro-5-(isobutyramidomethyl)benzamido)-N-(3-fluoro-5-(trifluoromethyl)benzyl)-1-(2,2,2-trifluoroethyl)-1H-indole-2-carboxamide (Compound 69)

The title compound was obtained according to the same procedure as Example 62, except for using (3-fluoro-5-(trifluoromethyl)phenyl)methanamine instead of (4-(tert-butyl)phenyl)methanamine.

1H NMR (300 MHz, DMSO-d$_6$) 10.51 (br, NH, 1H), 9.38 (m, NH, 1H), 8.38 (m, NH, 1H), 8.19 (m, 1H), 7.71-7.68 (m, 1H), 7.60-7.44 (m, 6H), 7.36-7.30 (m, 2H), 5.66-5.63 (m, 2H), 4.59-4.58 (m, 2H), 4.31-4.29 (m, 2H), 2.50-2.39 (m, 1H), 1.04-1.02 (m, 6H).

Example 70: Synthesis of 5-(2-chloro-5-(isobutyramidomethyl)benzamido)-1-(2,2,2-trifluoroethyl)-N-(3-(trifluoromethyl)benzyl)-1H-indole-2-carboxamide (Compound 70)

The title compound was obtained according to the same procedure as Example 62, except for using (3-(trifluoromethyl)phenyl)methanamine instead of (4-(tert-butyl)phenyl)methanamine.

1H NMR (300 MHz, DMSO-d$_6$) 10.50 (br, NH, 1H), 9.35 (m, NH, 1H), 8.37 (m, NH, 1H), 8.18 (m, 1H), 7.71-7.58 (m, 5H), 7.53-7.50 (m, 2H), 7.43 (m, 1H), 7.36-7.33 (m, 1H), 7.29 (m, 1H), 5.67-5.61 (m, 2H), 4.59-4.57 (m, 2H), 4.31-4.29 (m, 2H), 2.50-2.41 (m, 1H), 1.04-1.02 (m, 6H).

Example 71: Synthesis of N-(4-chloro-3-fluorobenzyl)-5-(2-chloro-5-(isobutyramidomethyl)benzamido)-1-(2,2,2-trifluoroethyl)-1H-indole-2-carboxamide (Compound 71)

The title compound was obtained according to the same procedure as Example 62, except for using (4-chloro-3-fluorophenyl)methanamine instead of (4-(tert-butyl)phenyl)methanamine.

1H NMR (300 MHz, DMSO-$d_6$) 10.50 (br, NH, 1H), 9.30 (m, NH, 1H), 8.37 (m, NH, 1H), 8.18 (m, 1H), 7.70-7.67 (m, 1H), 7.59-7.50 (m, 3H), 7.43 (m, 1H), 7.36-7.30 (m, 3H), 7.21-7.19 (m, 1H), 5.66-5.63 (m, 2H), 4.50-4.48 (m, 2H), 4.30-4.28 (m, 2H), 2.50-2.41 (m, 1H), 1.04-1.02 (m, 6H).

Example 72: Synthesis of 5-(2-chloro-5-(isobutyramidomethyl)benzamido)-1-(2,2,2-trifluoroethyl)-N-(4-(trifluoromethoxy)Benzyl)-1H-indole-2-carboxamide (Compound 72)

The title compound was obtained according to the same procedure as Example 62, except for using (4-(trifluoromethoxy)phenyl)methanamine instead of (4-(tert-butyl)phenyl)methanamine.

1H NMR (300 MHz, DMSO-$d_6$) 10.50 (br, NH, 1H), 9.29 (m, NH, 1H), 8.37 (m, NH, 1H), 8.17 (m, 1H), 7.70-7.67 (m, 1H), 7.53-7.44 (m, 5H), 7.36-7.30 (m, 4H), 5.67-5.64 (m, 2H), 4.52-4.50 (m, 2H), 4.30-4.28 (m, 2H), 2.50-2.38 (m, 1H), 1.04-1.02 (m, 6H).

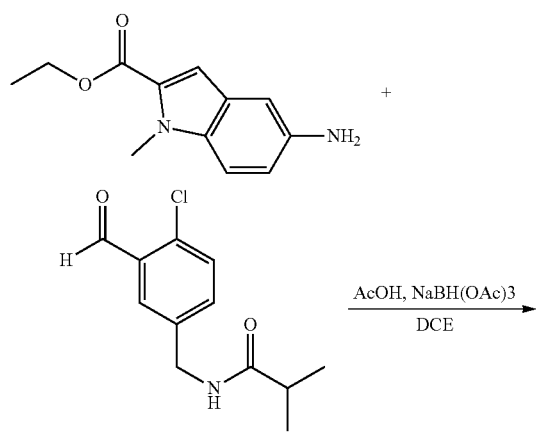

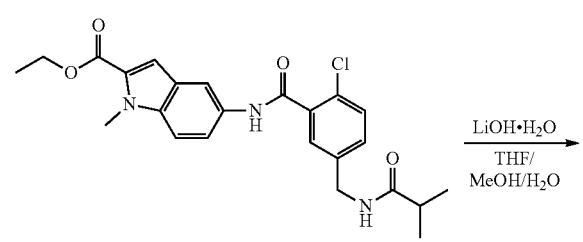

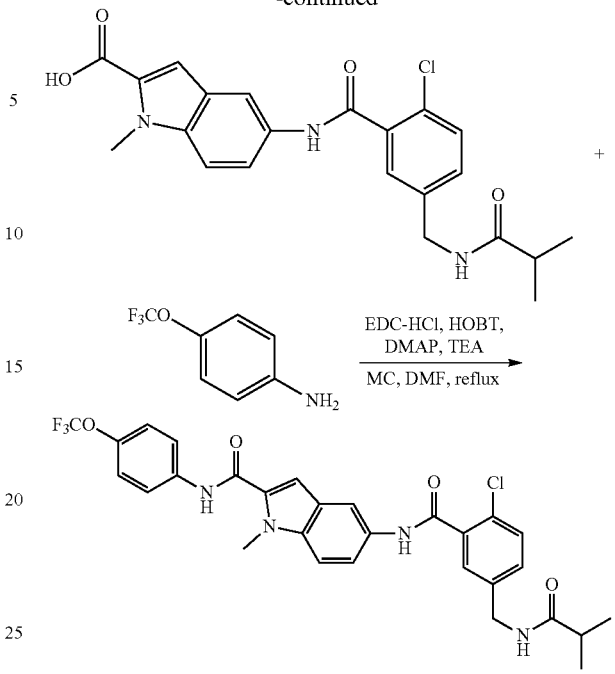

Example 73: Synthesis of 5-((2-chloro-5-(isobutyramidomethyl)benzyl)amino)-1-methyl-N-(4-(trifluoromethoxy)phenyl)-1H-indole-2-carboxamide (Compound 73)

Example 73-1: Synthesis of ethyl 5-((2-chloro-5-(isobutyramidomethyl)benzyl)amino)-1-methyl-1H-indole-2-carboxylate Ethyl 5-amino-1-methyl-1H-indole-2-carboxylate (300 mg, 1.37 mmol) and N-(4-chloro-3-formylbenzyl) isobutyramide (328 mg, 1.37 mmol) were added to a 25 mL flask and dissolved in DCE (10 ml). AcOH (2 drop) and NaBH(OAc)$_3$ (580 mg, 2.74 mmol) were added thereto under 0° C., and stirred at room temperature for 12 hours. After completion of the reaction, the organic material was extracted with CH$_2$Cl$_2$/NaHCO$_3$ (aq). The organic layer was dried over MgSO$_4$ and distilled under reduced pressure to remove the solvent. The residue was subjected to column chromatography (ethyl acetate:n-hexane=1:1) to obtain ethyl 5-((2-chloro-5-(isobutyramidomethyl)benzyl)amino)-1-methyl-1H-indole-2-carboxylate (420 mg, 0.95 mmol, 69%, solid).

1H NMR (300 MHz, DMSO-$d_6$) 8.19 (br, NH, 1H), 7.41-7.38 (m, 1H), 7.35-7.32 (m, 2H), 7.12-7.10 (m, 1H), 6.95 (m, 1H), 6.89-6.86 (m, 1H), 6.50 (m, 1H), 5.98 (m, NH, 1H), 4.31-4.23 (m, 4H), 4.15-4.14 (m, 2H), 3.92 (s, 3H), 2.34-2.25 (m, 1H), 1.32-1.27 (m, 3H), 0.92-0.90 (m, 6H).

Example 73-2: Synthesis of 5-((2-chloro-5-(isobutyramidomethyl)benzyl)amino)-1-methyl-1H-indole-2-carboxylic acid Ethyl 5-((2-chloro-5-(isobutyramidomethyl)benzyl)amino)-1-methyl-1H-indole-2-carboxylate (420 mg, 0.95 mmol) was added to 500 mL flask and dissolved in THF (5 ml) and MeOH (5 ml). LiOH (199 mg, 4.75 mmol) dissolved in H$_2$O (5 ml) was added and stirred for 12 hours. After concentration upon completion of the reaction, the pH was adjusted to 2 with 2N—HCl. The resulting solid was filtered to obtain 5-((2-chloro-5-(isobutyramidomethyl)benzyl)amino)-1-methyl-1H-indole-2-carboxylic acid (260 mg, 0.628 mmol, 66%, solid).

1H NMR (300 MHz, Cd₃Od) 7.67-7.64 (m, 2H), 7.50-7.47 (m, 1H), 7.42 (m, 1H), 7.37-7.30 (m, 3H), 4.72 (m, 1H), 4.32-4.31 (m, 2H), 4.10 (s, 3H), 2.47-2.38 (m, 1H), 1.10-1.07 (m, 6H).

Example 73-3: Synthesis of 5-((2-chloro-5-(isobutyramidomethyl)benzyl)amino)-1-methyl-N-(4-(trifluoromethoxy)phenyl)-1H-indole-2-carboxamide (Compound 73)

5-((2-chloro-5-(isobutyramidomethyl)benzyl)amino)-1-methyl-1H-indole-2-carboxylic acid (150 mg, 0.362 mmol) and 4-(trifluoromethoxy)aniline (117 mg, 0.724 mmol) were added to a 25 mL flask and dissolved in CH₂Cl₂ (5 ml) and DMF (1 ml). HOBT (98 mg, 0.724 mmol) and DMAP (85 mg, 0.724 mmol) were added thereto and reacted for 10 minutes. EDC (139 mg, 0.724 mmol) and TEA (100 µl, 0.724 mmol) were added and heated at reflux temperature for 12 hours. After completion of the reaction, the organic material was extracted with CH₂Cl₂/H₂O. The organic layer was dried over MgSO₄ and distilled under reduced pressure to remove the solvent. The residue was subjected to column chromatography (ethyl acetate:n-hexane=3:1) to obtain 5-((2-chloro-5-(isobutyramidomethyl)benzyl)amino)-1-methyl-N-(4)-(trifluoromethoxy)phenyl)-1H-indole-2-carboxamide (65 mg, 0.116 mmol, 32%, white solid).

1H NMR (300 MHz, DMSO-d₆) 10.27 (br, NH, 1H), 8.21 (br, NH, 1H), 7.88-7.85 (m, 2H), 7.42-7.31 (m, 5H), 7.12-7.09 (m, 1H), 7.04 (m, 1H), 6.85-6.82 (m, 1H), 6.51 (m, 1H), 6.00 (m, NH, 1H), 4.33-4.32 (m, 2H), 4.16-4.14 (m, 2H), 3.92 (s, 3H), 2.34-2.29 (m, 1H), 0.95-0.92 (m, 6H).

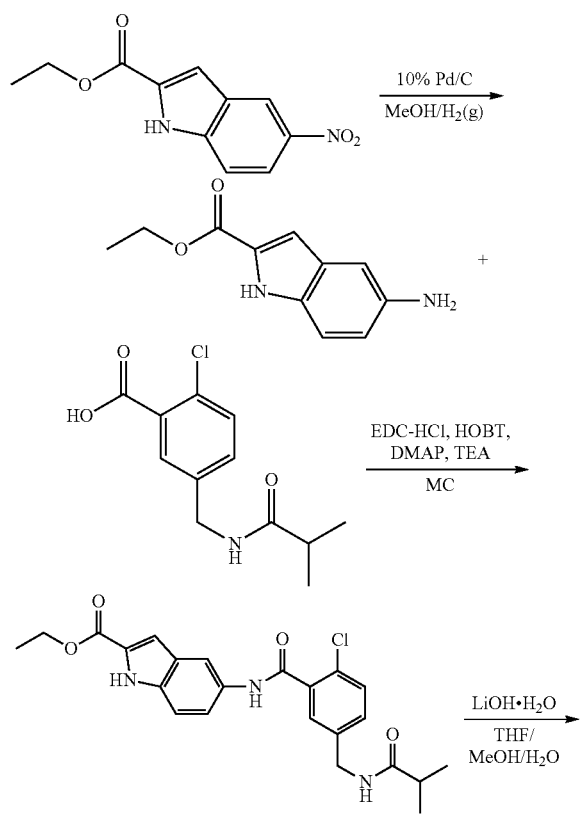

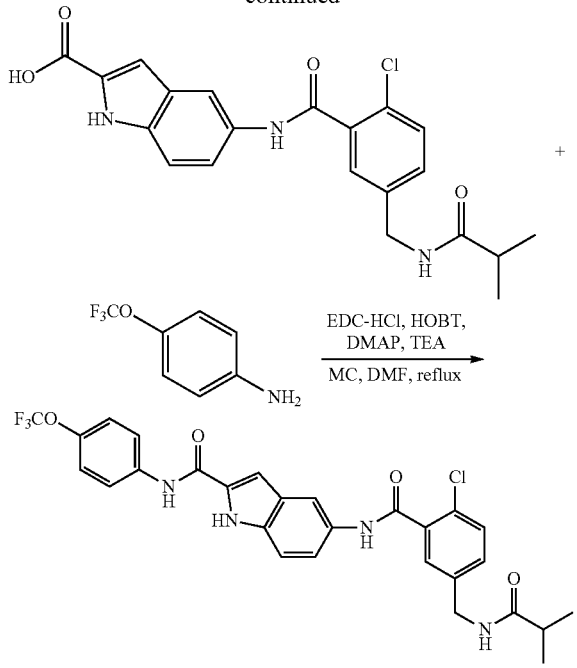

Example 74: Synthesis of 5-(2-chloro-5-(isobutyramidomethyl)benzamido)-N-(4-(trifluoromethoxy)phenyl)-1H-indole-2-carboxamide (Compound 74)

Example 74-1: Synthesis of ethyl 5-amino-1H-indole-2-carboxylate

Ethyl 5-nitro-1H-indole-2-carboxylate (3.0 g, 12.81 mmol) was added to a 100 mL flask and dissolved in MeOH (60 ml). 10% Pd/C (3.0 g) was added thereto and stirred for 6 hours at room temperature under H₂ (g). After Celite filtration upon completion of the reaction, the solvent was removed by distillation under reduced pressure. The residue was subjected to column chromatography (ethyl acetate:n-hexane=1:3) to obtain ethyl 5-amino-1H-indole-2-carboxylate (2.46 g, 12.04 mmol, 94%).

1H NMR (300 MHz DMSO-d₆) 11.37 (br, NH, 1H), 7.13 (m, 1H), 6.82-6.80 (m, 1H), 6.68-6.67 (m, 1H), 4.63 (br, NH, 2H), 4.32-4.25 (m, 2H), 1.33-1.26 (m, 3H).

Example 74-2: Synthesis of ethyl 5-(2-chloro-5-(isobutyramidomethyl)benzamido)-1H-indole-2-carboxylate Ethyl 5-amino-1H-indole-2-carboxylate (1.0 g, 4.89 mmol) and 2-chloro-5-(isobutyramidomethyl)benzoic acid (1.37 g, 5.379 mmol) were added to a 100 mL flask and dissolved in CH₂Cl₂ (20 ml). HOBT (1.32 g, 9.78 mmol) and DMAP (1.2 g, 9.78 mmol) were added thereto and reacted for 10 minutes. Then, EDC (1.87 g, 9.78 mmol) and TEA (989 mg, 9.78 mmol) were added and stirred at room temperature for 12 hours. After completion of the reaction, the organic material was extracted with CH₂Cl₂/H₂O. The organic layer was dried over MgSO₄ and distilled under reduced pressure to remove the solvent. The residue was subjected to column chromatography (ethyl acetate:n-hexane=3:1) to obtain ethyl 5-(2-chloro-5-(isobutyramidomethyl)benzamido)-1H-indole-2-carboxylate (1.6 g, 3.62 mmol, 74%, white solid).

1H NMR (300 MHz, DMSO-$d_6$) 11.85 (br, NH, 1H), 10.41 (br, NH, 1H), 8.37-8.34 (m, NH, 1H), 8.15 (m, 1H), 7.51-7.32 (m, 5H), 7.14 (m, 1H), 4.37-4.28 (m, 4H), 2.50-2.38 (m, 1H), 1.36-1.32 (m, 3H), 1.04-1.02 (m, 6H).

Example 74-3: Synthesis of 5-(2-chloro-5-(isobutyramidomethyl)benzamido)-1H-indole-2-carboxylic acid Ethyl 5-(2-chloro-5-(isobutyramidomethyl)benzamido)-1H-indole-2-carboxylate (1.6 g, 3.62 mmol) was added to a 250 mL flask and dissolved in THF (20 ml) and MeOH (20 ml). LiOH (760 mg, 18.1 mmol) dissolved in $H_2O$ (20 ml) was added and stirred at room temperature for 12 hours. After concentration upon completion of the reaction, the pH was adjusted to 2 with 2N—HCl. The resulting solid was filtered to obtain 5-(2-chloro-5-(isobutyramidomethyl)benzamido)-1H-indole-2-carboxylic acid (1.3 g, 3.14 mmol, 86%, white solid).

1H NMR (300 MHz, DMSO-$d_6$) 12.91 (br, OH, 1H), 11.70 (br, NH, 1H), 10.38 (br, NH, 1H), 8.37-8.33 (m, NH, 1H), 8.12 (m, 1H), 7.51-7.48 (m, 1H), 7.44-7.32 (m, 4H), 7.06 (m, 1H), 4.30-4.28 (m, 2H), 2.50-2.38 (m, 1H), 1.04-1.02 (m, 6H).

Example 74-4: Synthesis of 5-(2-chloro-5-(isobutyramidomethyl)benzamido)-N-(4-(trifluoromethoxy)phenyl)-1H-indole-2-carboxamide (Compound 74)

5-(2-chloro-5-(isobutyramidomethyl)benzamido)-1H-indole-2-carboxylic acid (150 mg, 0.362 mmol) and 4-(trifluoromethoxy)aniline (117 mg, 0.724 mmol) were added to a 25 mL flask and dissolved in $CH_2Cl_2$ (5 ml) and DMF (1 ml). HOBT (98 mg, 0.724 mmol) and DMAP (85 mg, 0.724 mmol) were added thereto and reacted for 10 minutes. Then, EDC (139 mg, 0.724 mmol) and TEA (100 µl, 0.724 mmol) were added and heated at reflux temperature for 12 hours. After completion of the reaction, the organic material was extracted with $CH_2Cl_2/H_2O$. The organic layer was dried over $MgSO_4$ and distilled under reduced pressure to remove the solvent. The residue was subjected to column chromatography (ethyl acetate:n-hexane=3:1) to obtain 5-(2-chloro-5-(isobutyramidomethyl)benzamido)-N-(4-(trifluoromethoxy)phenyl)-1H-indole-2-carboxamide (65 mg, 0.116 mmol, 32%, white solid).

1H NMR (300 MHz, DMSO-$d_6$) 11.82 (br, NH, 1H), 10.53 (br, NH, 1H), 10.41 (br, NH, 1H), 8.36 (m, NH, 1H), 8.17 (m, 1H), 8.06-8.03 (m, 2H), 7.76-7.74 (m, 2H), 7.52-7.50 (m, 1H), 7.44 (m, 4H), 7.36-7.33 (m, 1H), 4.31-4.29 (m, 2H), 2.50-2.39 (m, 1H), 1.05-1.02 (m, 6H).

Example 75: Synthesis of 5-(2-chloro-5-(isobutyramidomethyl)benzamido)-N-(4-(trifluoromethyl)phenyl)-1H-indole-2-carboxamide (Compound 75)

The title compound was obtained according to the same procedure as Example 74, except for using 4-(trifluoromethyl)aniline instead of 4-(trifluoromethoxy)aniline.

1H NMR (300 MHz, DMSO-$d_6$) 11.80 (br, NH, 1H), 10.42-10.40 (br, NH, 2H), 8.39-8.36 (m, NH, 1H), 8.17 (m, 1H), 7.94-7.91 (m, 2H), 7.53-7.50 (m, 1H), 7.43-7.33 (m, 7H), 4.31-4.29 (m, 2H), 2.50-2.41 (m, 1H), 1.05-1.02 (m, 6H).

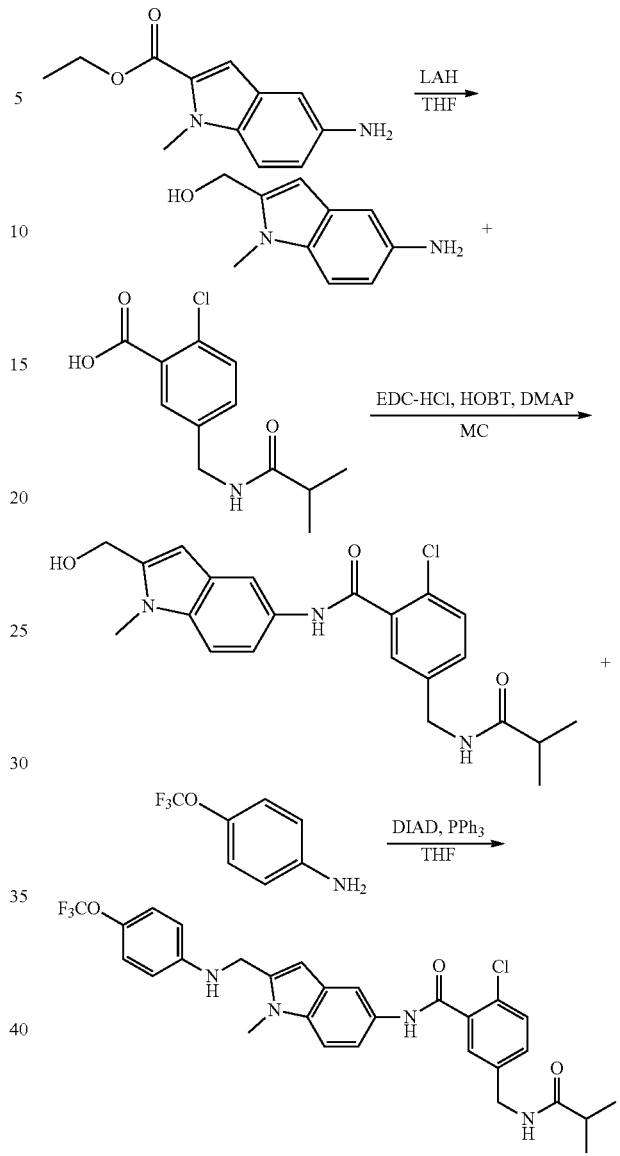

Example 76: Synthesis of 2-chloro-5-(isobutyramidomethyl)-N-(1-methyl-2-(((4-(trifluoromethoxy)phenyl)amino)methyl)-1H-indole-5-yl)benzamide (Compound 76)

Example 76-1: Synthesis of (5-amino-1-methyl-1H-indol-2-yl)methanol

LAH (1.13 g, 29.783 mmol) was added to a 250 mL flask and dissolved in THF (60 ml). Ethyl 5-amino-1-methyl-1H-indole-2-carboxylate (5 g, 22.91 mmol) was added thereto and stirred at room temperature for 3 hours. After completion of the reaction, sodium sulfate (20 g)/$H_2O$ (10 ml) was added and stirred for 30 minutes. After Celite filtration, solvent was removed by distillation under reduced pressure. The residue was subjected to column chromatography (ethyl acetate:n-hexane=1:1) to obtain (5-amino-1-methyl-1H-indole-2-yl)methanol (3.3 g, 18.72 mmol, 81%, white solid).

1H NMR (300 MHz, DMSO-d$_6$) 7.09-7.06 (m, 1H), 6.63 (m, 1H), 6.52-6.49 (m, 1H), 6.05 (m, 1H), 5.09 (br, OH, 1H), 4.55-4.53 (m, 2H), 4.44 (m, 2H), 3.62 (s, 3H).

Example 76-2: Synthesis of 2-chloro-N-(2-(hydroxymethyl)-1-methyl-1H-indole-5-yl)-5-(isobutyramidomethyl)benzamide Ethyl (5-amino-1-methyl-1H-indole-2-yl)methanol (2 g, 11.35 mmol) and 2-chloro-5-(isobutyramidomethyl)benzoic acid (3.2 g, 12.485 mmol) were added to a 100 mL flask and dissolved in CH$_2$Cl$_2$ (50 ml). HOBT (3.07 g, 22.7 mmol) and DMAP (2.78 g, 22.7 mmol) were added thereto and reacted for 10 minutes. Then, EDC (4.35 g, 22.7 mmol) was added and stirred at room temperature for 12 hours. After completion of the reaction, the organic material was extracted with CH$_2$Cl$_2$/H$_2$O. The organic layer was dried over MgSO$_4$ and distilled under reduced pressure to remove the solvent. The residue was subjected to column chromatography (ethyl acetate:n-hexane=5:1) to obtain 2-chloro-N-(2-(hydroxymethyl)-1-methyl-1H-indole-5-yl)-5-(isobutyramidomethyl) benzamide (900 mg, 2.17 mmol, 19%, white solid).

1H NMR (300 MHz, DMSO-d$_6$) 10.28 (br, NH, 1H), 8.35 (br, NH, 1H), 7.95 (m, 1H), 7.50-7.48 (m, H), 7.41 (m, 1H), 7.34-7.31 (m, 3H), 6.34 (m, 1H), 5.23 (br, OH, 1H), 4.62-4.61 (m, 2H), 4.29-4.27 (m, 2H), 3.72 (s, 3H), 2.49-2.40 (m, 1H), 1.04-1.02 (m, 6H).

Example 76-3: Synthesis of 2-chloro-5-(isobutyramidomethyl)-N-(1-methyl-2-(((4-(trifluoromethoxy)phenyl)amino)methyl)-1H-indole-5-yl)benzamide (Compound 76)

Triphenylphosphine (253 mg, 0.966 mmol), diisopropyl azodicarboxylate (195 mg, 0.966 mmol), and THF (5 ml) were added to a 25 mL flask and stirred at 0° C. for 10 minutes. And then, 2-chloro-N-(2-(hydroxymethyl)-1-methyl-1H-indole-5-yl)-5-(isobutyramidomethyl)benzamide (200 mg, 0.483 mmol) dissolved in THF (5 ml) and 4-(trifluoromethoxy)aniline (94 mg, 0.531 mmol) were added and stirred at room temperature for 12 hours. After completion of the reaction, the organic material was extracted with EA/H$_2$O. The organic layer was dried over MgSO$_4$ and distilled under reduced pressure to remove the solvent. The residue was subjected to column chromatography (ethyl acetate:n-hexane=3:1) to obtain 2-chloro-5-(isobutyramidomethyl)-N-(1-methyl-2-(((4-(trifluoromethoxy)phenyl)amino)methyl)-1H-indole-5-yl)benzamide (28 mg, 0.048 mmol, 10%, solid).

1H NMR (300 MHz, DMSO-d$_6$) 10.29 (br, NH, 1H), 8.35 (m, 2H), 7.92 (m, 1H), 7.50-7.47 (m, 1H), 7.41-7.31 (m, 4H), 7.08-7.05 (m, 2H), 6.75-6.72 (m, 2H), 6.42-6.40 (m, 2H), 4.43-4.42 (m, 2H), 4.29-4.28 (m, 2H), 3.75 (s, 3H), 2.49-2.38 (m, 1H), 1.04-1.01 (m, 6H).

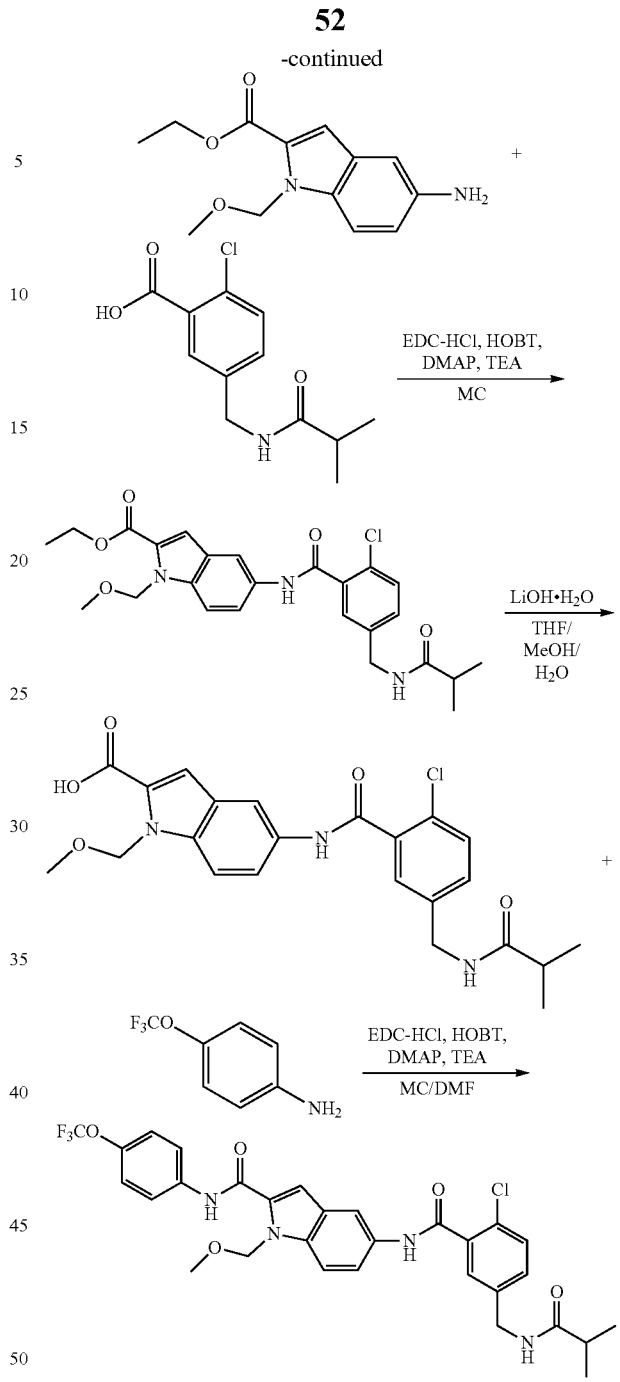

Example 77: Synthesis of 5-(2-chloro-5-(isobutyramidomethyl)benzamido)-1-(methoxymethyl)-N-(4-(trifluoromethoxy)phenyl)-1H-indole-2-carboxamide (Compound 77)

Example 77-1: Synthesis of ethyl 1-(methoxymethyl)-5-nitro-1H-indole-2-carboxylate Ethyl 5-nitro-1H-indole-2-carboxylate (5 g, 21.35 mmol) and chloro(methoxy)methane (3.4 g, 42.7 mmol) were added to a 100 mL flask and dissolved in DMF (50 ml). Cs$_2$CO$_3$ (13.9 g, 42.7 mmol) was added thereto and stirred at room temperature for 6 hours. After the reaction was completed, the organic material was extracted with ethyl acetate/H₂O. The organic layer was dried over MgSO₄ and distilled under reduced pressure to remove the solvent. The residue was subjected to column chromatography (ethyl acetate:n-hexane=1:3) to obtain ethyl 1-(methoxymethyl)-5-nitro-1H-indole-2-carboxylate (3.0 g, 10.78 mmol, 50%, a white solid).

1H NMR (300 MHz, DMSO-d₆) 8.77 (m, 1H), 8.23-8.20 (m, 1H), 7.95-7.92 (m, 1H), 7.63 (m, 1H), 5.99 (s, 2H), 4.40-4.33 (m, 2H), 3.18 (s, 3H), 1.38-1.33 (m, 3H).

Example 77-2: Synthesis of ethyl 5-amino-1-(methoxymethyl)-1H-indole-2-carboxylate Ethyl 1-(methoxymethyl)-5-nitro-1H-indole-2-carboxylate (3.0 g, 10.78 mmol) was added to a 100 mL flask and dissolved in MeOH (60 ml). 10% Pd/C (1.0 g) was added thereto and stirred for 12 hours at room temperature under H₂ (g). After Celite filtration upon completion of the reaction, the solvent was removed by distillation under reduced pressure. The residue was subjected to column chromatography (ethyl acetate:n-hexane=1:3) to obtain ethyl 5-amino-1-(methoxymethyl)-1H-indole-2-carboxylate (2.4 g, 9.67 mmol, 89%).

1H NMR (300 MHz, DMSO-d₆) 7.38-7.35 (m, 1H), 7.06 (m, 1H), 6.79-6.76 (m, 1H), 6.74 (m, 1H), 5.80 (s, 2H), 4.80 (br, NH, 2H), 4.32-4.25 (m, 2H), 3.12 (s, 3H), 1.33-1.29 (m, 3H).

Example 77-3: Synthesis of ethyl 5-(2-chloro-5-(isobutyramidomethyl)benzamido)-1-(methoxymethyl)-1H-indole-2-carboxylate Ethyl 5-amino-1-(methoxymethyl)-1H-indole-2-carboxylate (2.4 g, 9.67 mmol) and 2-chloro-5-(isobutyramidomethyl)benzoic acid (2.97 g, 11.604 mmol) were added to a 100 mL flask and dissolved in CH₂Cl₂ (50 ml). HOBT (3.92 g, 29.01 mmol) and DMAP (3.54 g, 29.01 mmol) were added thereto and reacted for 10 minutes. Then, EDC (5.56 g, 29.01 mmol) and TEA (4.0 ml, 29.01 mmol) were added and stirred under reflux for 12 hours. After completion of the reaction, the organic material was extracted with CH₂Cl₂/H₂O. The organic layer was dried over MgSO₄ and distilled under reduced pressure to remove the solvent. The residue was subjected to column chromatography (ethyl acetate:n-hexane=2:1) to obtain ethyl 5-(2-chloro-5-(isobutyramidomethyl)benzamido)-1-(methoxymethyl)-1H-indole-2-carboxylate (4.1 g, 8.43 mmol, 89%, white solid).

1H NMR (300 MHz, DMSO-d₆) 10.50 (br, NH, 1H), 8.36 (m, NH, 1H), 8.20 (m, 1H), 7.70-7.67 (m, 1H), 7.57-7.49 (m, 2H), 7.43 (m, 1H), 7.36-7.33 (m, 2H), 4.37-4.28 (m, 4H), 3.14 (s. 3H), 2.50-2.38 (m, 1H), 1.36-1.31 (m, 3H), 1.04-1.02 (m, 6H).

Example 77-4: Synthesis of 5-(2-chloro-5-(isobutyramidomethyl)benzamido)-1-(methoxymethyl)-1H-indole-2-carboxylic acid Ethyl 5-(2-chloro-5-(isobutyramidomethyl)benzamido)-1-(methoxymethyl)-1H-indole-2-carboxylate (4.1 g, 8.43 mmol) was added to a 500 mL flask and dissolved in THF (50 ml) and MeOH (50 ml). LiOH (1.77 g, 42.15 mmol) dissolved in H₂O (50 ml) was added and stirred for 12 hours. After concentration upon completion of the reaction, the pH was adjusted to 2 with 2N—HCl. The resulting solid was filtered to obtain 5-(2-chloro-5-(isobutyramidomethyl)benzamido)-1-(methoxymethyl)-1H-indole-2-carboxylic acid (3.4 g, 7.42 mmol, 88%, white solid).

1H NMR (300 MHz, DMSO-d₆) 10.47 (br, NH, 1H), 8.36 (m, NH, 1H), 8.18 (m, 1H), 7.65-7.63 (m, 1H), 7.53-7.49 (m, 2H), 7.43 (m, 1H), 7.35-7.33 (m, 1H), 7.28 (m, 1H), 5.94 (s, 2H), 4.30-4.28 (m, 2H), 3.14 (s. 3H), 2.50-2.38 (m, 1H), 1.04-1.02 (m, 6H).

Example 77-5: Synthesis of 5-(2-chloro-5-(isobutyramidomethyl)benzamido)-1-(methoxymethyl)-N-(4-(trifluoromethoxy)phenyl)-1H-indole-2-carboxamide (Compound 77)

5-(2-chloro-5-(isobutyramidomethyl)benzamido)-1-(methoxymethyl)-1H-indole-2-carboxylic acid (300 mg, 0.65 mmol) and 4-(trifluoromethoxy)aniline (232 mg, 1.31 mmol) were added to a 25 mL flask and dissolved in CH₂Cl₂ (10 ml) and DMF (1 ml). HOBT (265 mg, 1.965 mmol) and DMAP (240 mg, 1.965 mmol) were added thereto and reacted for 10 minutes. EDC (377 mg, 1.965 mmol) and TEA (273 µl, 1.965 mmol) were added and stirred under reflux for 12 hours. After the reaction was completed, the organic material was extracted with ethyl acetate/H₂O. The organic layer was dried over MgSO₄ and is tilled under reduced pressure to remove the solvent. The residue was subjected to column chromatography (ethyl acetate:n-hexane=3:1) to obtain 5-(2-chloro-5-(isobutyramidomethyl)benzamido)-1-(methoxymethyl)-N-(4-(trifluoromethoxy)phenyl)-1H-indole-2-carboxamide (230 mg, 0.37 mmol, 57%, white solid).

1H NMR (300 MHz, DMSO-d₆) 10.60 (br, NH, 1H), 10.49 (br, NH, 1H), 8.38-8.34 (m, NH, 1H), 8.21 (m, 1H), 7.91-7.88 (m, 2H), 7.69-7.66 (m, 1H), 7.56-7.50 (m, 2H), 7.44-7.33 (m, 5H), 5.92 (s, 2H), 4.31-4.29 (m, 2H), 3.18 (s, 3H), 2.50-2.39 (m, 1H), 1.04-1.02 (m, 6H).

Example 78: Synthesis of 5-(2-chloro-5-(isobutyramidomethyl)benzamido)-1-(methoxymethyl)-N-(4-(trifluoromethyl)phenyl)-1H-indole-2-carboxamide (Compound 78)

The title compound was obtained according to the same procedure as Example 77, except for using 4-(trifluoromethyl)aniline instead of 4-(trifluoromethoxy)aniline.

1H NMR (300 MHz, DMSO-d₆) 10.74 (br, NH, 1H), 10.50 (br, NH, 1H), 8.38-8.34 (m, NH, 1H), 8.20 (m, 1H), 8.03-8.00 (m, 2H), 7.75-7.68 (m, 3H), 7.58-7.50 (m, 3H), 7.44-7.43 (m, 2H), 7.37-7.34 (m, 1H), 5.93 (s, 2H), 4.31-4.29 (m, 2H), 3.15 (s, 3H), 2.50-2.39 (m, 1H), 1.05-1.02 (m, 6H).

Example 79: Synthesis of 5-(2-chloro-5-(isobutyramidomethyl)benzamido)-N-(4-chlorophenyl)-1-(methoxymethyl)-1H-indole-2-carboxamide (Compound 79)

The title compound was obtained according to the same procedure as Example 77, except for using 4-chloroaniline instead of 4-(trifluoromethoxy)aniline.

1H NMR (300 MHz, DMSO-d₆) 10.54 (br, NH, 1H), 10.49 (br, NH, 1H), 8.38-8.34 (m, NH, 1H), 8.20 (m, 1H), 7.83-7.80 (m, 2H), 7.69-7.66 (m, 1H), 7.55-7.50 (m, 2H), 7.44-7.41 (m, 3H), 7.37-7.33 (m, 2H), 5.92 (s, 2H), 4.31-4.29 (m, 2H), 3.14 (s, 3H), 2.50-2.36 (m, 1H), 1.04-1.02 (m, 6H).

Example 80: Synthesis of 5-(2-chloro-5-(isobutyramidomethyl)benzamido)-1-(methoxymethyl)-N-(6-(trifluoromethyl)pyridin-3-yl)-1H-indole-2-carboxamide (Compound 80)

The title compound was obtained according to the same procedure as Example 77, except for using 6-(trifluoromethyl)pyridin-3-amine instead of 4-(trifluoromethoxy)aniline.

1H NMR (300 MHz, DMSO-$d_6$) 10.96 (br, NH, 1H), 10.52 (br, NH, 1H), 9.03 (m, NH, 1H), 8.51-8.48 (m, 1H), 8.37 (m, 1H), 8.24 (m, 1H), 7.94-7.92 (m, 1H), 7.72-7.69 (m, 1H), 7.59-7.45 (m, 4H), 7.37-7.34 (m, 1H), 5.95 (s, 2H), 4.31-4.29 (m, 2H), 3.16 (s, 3H), 2.50-2.36 (m, 1H), 1.05-1.02 (m, 6H).

Example 81: Synthesis of N-(4-chloro-2-methylphenyl)-5-(2-chloro-5-(isobutyramidomethyl)benzamido)-1-(methoxymethyl)-1H-indole-2-carboxamide (Compound 81)

The title compound was obtained according to the same procedure as Example 77, except for using 4-chloro-2-methylaniline instead of 4-(trifluoromethoxy)aniline.

1H NMR (300 MHz, DMSO-$d_6$) 10.50 (br, NH, 1H), 10.06 (br, NH, 1H), 8.36 (m, NH, 1H), 8.21 (s, 1H), 7.70-7.64 (m, 1H), 7.55-7.51 (m, 2H), 7.45-7.38 (m, 5H), 7.37-7.28 (m, 1H), 5.94 (m, 2H), 4.32-4.29 (m, 2H), 3.20-3.16 (m, 3H), 2.50-2.29 (m, 1H), 2.29 (m, 3H), 1.06-1.02 (m, 6H).

Example 82: Synthesis of 5-(2-chloro-5-(isobutyramidomethyl)benzamido)-N-(4-cyclohexylphenyl)-1-(methoxymethyl)-1H-indole-2-carboxamide (Compound 82)

The title compound was obtained according to the same procedure as Example 77, except for using 4-cyclohexylaniline instead of 4-(trifluoromethoxy)aniline.

1H NMR (300 MHz, DMSO-$d_6$) 10.54 (br, NH, 1H), 10.49 (br, NH, 1H), 8.38-8.34 (m, NH, 1H), 8.20 (m, 1H), 7.83-7.80 (m, 2H), 7.69-7.66 (m, 1H), 7.55-7.50 (m, 2H), 7.44-7.41 (m, 3H), 7.37-7.33 (m, 2H), 5.92 (s, 2H), 4.31-4.29 (m, 2H), 3.15-3.14 (m, 3H), 2.50-2.36 (m, 1H), 1.04-1.02 (m, 6H).

Example 83: Synthesis of 5-(2-chloro-5-(isobutyramidomethyl)benzamido)-N-(2,4-difluorophenyl)-1-(methoxymethyl)-1H-indole-2-carboxamide (Compound 83)

The title compound was obtained according to the same procedure as Example 77, except for using 2,4-difluoroaniline instead of 4-(trifluoromethoxy)aniline.

1H NMR (300 MHz, DMSO-$d_6$) 10.54 (br, NH, 1H), 10.49 (br, NH, 1H), 8.38-8.34 (m, NH, 1H), 8.20 (m, 1H), 7.83-7.80 (m, 2H), 7.69-7.66 (m, 1H), 7.55-7.50 (m, 2H), 7.44-7.41 (m, 3H), 7.37-7.33 (m, 2H), 5.92 (s, 2H), 4.31-4.29 (m, 2H), 3.15-3.14 (m, 3H), 2.50-2.36 (m, 1H), 1.04-1.02 (m, 6H).

Example 84: Synthesis of N-(4-(tert-butyl)phenyl)-5-(2-chloro-5-(isobutyramidomethyl)benzamido)-1-(methoxymethyl)-1H-indole-2-carboxamide (Compound 84)

The title compound was obtained according to the same procedure as Example 77, except for using 4-(tert-butyl)aniline instead of 4-(trifluoromethoxy)aniline.

1H NMR (300 MHz, DMSO-$d_6$) 10.48 (br, NH, 1H), 10.35 (br, NH, 1H), 8.36 (m, NH, 1H), 8.20 (m, 1H), 7.70-7.58 (m, 3H), 7.58-7.48 (m, 2H), 7.45 (m, 1H), 7.40-7.33 (m, 4H), 5.93 (s, 2H), 4.31-4.29 (m, 2H), 3.15-3.14 (m, 3H), 2.50-2.36 (m, 1H), 1.05-1.03 (m, 6H).

Example 85: Synthesis of 5-(2-chloro-5-(isobutyramidomethyl)benzamido)-N-(4-fluorophenyl)-1-(methoxymethyl)-1H-indole-2-carboxamide (Compound 85)

The title compound was obtained according to the same procedure as Example 77, except for using 4-fluoroaniline instead of 4-(trifluoromethoxy)aniline.

1H NMR (300 MHz, DMSO-$d_6$) 10.50 (br, NH, 1H), 8.39 (br, NH, 1H), 8.20 (m, NH, 1H), 7.79-7.77 (m, 2H), 7.70-7.66 (m, 1H), 7.55-7.50 (m, 2H), 7.44 (m, 1H), 7.37-7.33 (m, 2H), 7.22-7.19 (m, 2H), 5.92 (s, 2H), 4.31-4.29 (m, 2H), 3.15-3.14 (m, 3H), 2.50-2.36 (m, 1H), 1.05-1.02 (m, 6H).

Example 86: Synthesis of 5-(2-chloro-5-(isobutyramidomethyl)benzamido)-N-(3-chlorophenyl)-1-(methoxymethyl)-1H-indole-2-carboxamide (Compound 86)

The title compound was obtained according to the same procedure as Example 77, except for using 3-chloroaniline instead of 4-(trifluoromethoxy)aniline.

1H NMR (300 MHz, DMSO-$d_6$) 10.60 (br, NH, 1H), 10.52 (br, NH, 1H), 8.40-8.38 (m, NH, 1H), 8.22 (m, 1H), 7.97 (m, 1H), 7.59-7.48 (m, 2H), 7.45-7.30 (m, 4H), 7.20-7.15 (m, 1H), 5.92 (s, 2H), 4.31-4.29 (m, 2H), 3.15-3.14 (m, 3H), 2.50-2.36 (m, 1H), 1.04-1.02 (m, 6H).

Example 87: Synthesis of 5-(2-chloro-5-(isobutyramidomethyl)benzamido)-1-(methoxymethyl)-N-(3-(trifluoromethyl)phenyl)-1H-indole-2-carboxamide (Compound 87)

The title compound was obtained according to the same procedure as Example 77, except for using 3-(trifluoromethyl)aniline instead of 4-(trifluoromethoxy)aniline.

1H NMR (300 MHz, DMSO-$d_6$) 10.73 (br, NH, 1H), 10.52 (br, NH, 1H), 8.38 (m, NH, 1H), 8.26-8.22 (m, 2H), 8.05-8.02 (m, 1H), 7.75-7.68 (m, 1H), 7.65-7.45 (m, 4H), 7.45-7.42 (m, 2H), 7.36-7.34 (m, 1H), 5.94 (s, 2H), 4.31-4.29 (m, 2H), 3.15-3.14 (m, 3H), 2.50-2.41 (m, 1H), 1.05-1.02 (m, 6H).

Example 88: Synthesis of 5-(2-chloro-5-(isobutyramidomethyl)benzamido)-N-(3-fluorophenyl)-1-(methoxymethyl)-1H-indole-2-carboxamide (Compound 88)

The title compound was obtained according to the same procedure as Example 77, except for using 3-fluoroaniline instead of 4-(trifluoromethoxy)aniline.

1H NMR (300 MHz, DMSO-$d_6$) 10.63 (br, NH, 1H), 10.52 (br, NH, 1H), 8.41-8.38 (m, NH, 1H), 8.20 (m, 1H), 7.77-7.66 (m, 2H), 7.60-7.51 (m, 3H), 7.45-7.34 (m, 4H), 6.99-6.32 (m, 1H), 5.92 (s, 2H), 4.31-4.29 (m, 2H), 3.15-3.14 (m, 3H), 2.50-2.36 (m, 1H), 1.05-1.02 (m, 6H).

Example 89: Synthesis of 5-(2-chloro-5-(isobutyramidomethyl)benzamido)-1-(methoxymethyl)-N-(3-(trifluoromethoxy)phenyl)-1H-indole-2-carboxamide (Compound 89)

The title compound was obtained according to the same procedure as Example 77, except for using 3-(trifluoromethoxy)aniline instead of 4-(trifluoromethoxy)aniline.

1H NMR (300 MHz, DMSO-d$_6$) 10.70 (br, NH, 1H), 10.53 (br, NH, 1H), 8.41-8.38 (m, NH, 1H), 8.22 (m, 1H), 7.93 (s, 1H), 7.79-7.76 (m, 1H), 7.71-7.68 (m, 1H), 7.56-7.48 (m, 3H), 7.48-7.34 (m, 3H), 7.13-7.10 (m, 1H), 5.92 (s, 2H), 4.31-4.29 (m, 2H), 3.15-3.14 (m, 3H), 2.50-2.36 (m, 1H), 1.05-1.02 (m, 6H).

Example 90: Synthesis of 5-(2-chloro-5-(isobutyramidomethyl)benzamido)-N-(3-chloro-5-fluorophenyl)-1-(methoxymethyl)-1H-indole-2-carboxamide (Compound 90)

The title compound was obtained according to the same procedure as Example 77, except for using 3-chloro-5-fluoroaniline instead of 4-(trifluoromethoxy)aniline.

1H NMR (300 MHz, DMSO-d$_6$) 10.78 (br, NH, 1H), 10.53 (br, NH, 1H), 8.40-8.38 (m, NH, 1H), 8.23 (s, 1H), 7.77 (s, 1H), 7.71-7.67 (m, 2H), 7.58-7.51 (m, 2H), 7.45-7.34 (m, 3H), 7.20-7.18 (m, 1H), 5.92 (s, 2H), 4.31-4.29 (m, 2H), 3.15-3.14 (m, 3H), 2.50-2.36 (m, 1H), 1.05-1.03 (m, 6H).

Example 91: Synthesis of 5-(2-chloro-5-(isobutyramidomethyl)benzamido)-1-(methoxymethyl)-N-(5,6,7,8-tetrahydronaphthalene-1-yl)-1H-indole-2-carboxamide (Compound 91)

The title compound was obtained according to the same procedure as Example 77, except for using 5,6,7,8-tetrahydronaphthalen-1-amine instead of 4-(trifluoromethoxy)aniline.

1H NMR (300 MHz, DMSO-d$_6$) 10.51 (br, NH, 1H), 9.87 (br, NH, 1H), 8.39 (m, NH, 1H), 8.20 (m, 1H), 7.67-7.63 (m, 1H), 7.54-7.51 (m, 2H), 7.45 (m, 1H), 7.35-7.33 (m, 2H), 7.20-7.10 (m, 2H), 7.03-7.00 (m, 1H), 5.93 (s, 2H), 4.31-4.29 (m, 2H), 3.14 (s, 3H), 2.78-2.69 (m, 4H), 2.50-2.36 (m, 1H), 1.73 (s, 4H), 1.05-1.02 (m, 6H).

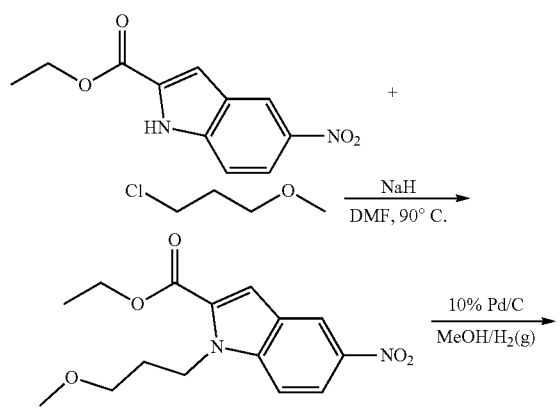

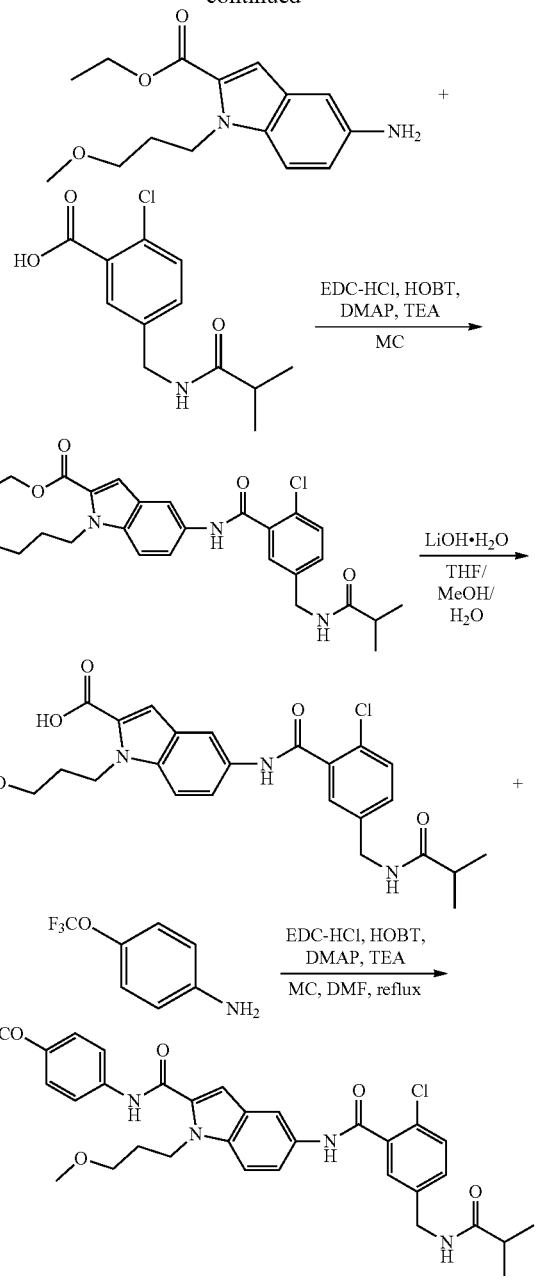

Example 92: Synthesis of 5-(2-chloro-5-(isobutyramidomethyl)benzamido)-1-(3-methoxypropyl)-N-(4-(trifluoromethoxy)phenyl)-1H-indole-2-carboxamide (Compound 92)

Example 92-1: Synthesis of ethyl 1-(3-methoxypropyl)-5-nitro-1H-indole-2-carboxylate Ethyl 5-nitro-1H-indole-2-carboxylate (3 g, 12.8 mmol) and 1-chloro-3-methoxypropane (2.78 g, 25.6 mmol) were added to a 100 mL flask and dissolved in DMF (30 ml). NaH (768 mg, 19.2 mmol) was added thereto and stirred at 90° C. for 12 hours. After the reaction was completed, the organic material was extracted with ethyl acetate/H$_2$O. The organic layer was dried over MgSO$_4$ and distilled under reduced pressure to remove the solvent. The residue was subjected to column chromatography (ethyl acetate:n-hexane=1:3) to obtain ethyl 1-(3-methoxypropyl)-5-nitro-1H-indole-2-carboxylate (1.8 g, 5.88 mmol, 46%, oil).

1H NMR (300 MHz, DMSO-$d_6$) 8.74 (m, 1H), 8.20-8.17 (m, 1H), 7.80-7.77 (m, 1H), 7.56 (m, 1H), 4.68-4.64 (m, 2H), 4.39-4.32 (m, 2H), 3.23-3.21 (m, 2H), 3.14 (s, 3H), 1.97-1.93 (m, 2H), 1.37-1.33 (m, 3H).

Example 92-2: Synthesis of ethyl 5-amino-1-(3-methoxypropyl)-1H-indole-2-carboxylate Ethyl 1-(3-methoxypropyl)-5-nitro-1H-indole-2-carboxylate (1.8 g, 5.88 mmol) was added to a 100 mL flask and dissolved in EtOH (40 ml). 10% Pd/C (360 mg) was added and stirred for 12 hours at room temperature under $H_2$ (g). After Celite filtration upon completion of the reaction, the solvent was removed by distillation under reduced pressure. The residue was subjected to column chromatography (ethyl acetate:n-hexane=1:1) to obtain ethyl 5-amino-1-(3-methoxypropyl)-1H-indole-2-carboxylate (1.42 g, 5.14 mmol, 87%).

1H NMR (300 MHz, DMSO-$d_6$) 7.27-7.24 (m, 1H), 6.96 (m, 1H), 6.78-6.72 (m, 2H), 4.73 (br, NH, 2H), 4.50-4.45 (m, 2H), 4.31-4.24 (m, 2H), 3.23-3.19 (m, 5H), 1.89-1.85 (m, 2H), 1.33-1.29 (m, 3H).

Example 92-3: Synthesis of ethyl 5-(2-chloro-5-(isobutyramidomethyl)benzamido)-1-(3-methoxypropyl)-1H-indole-2-carboxylate Ethyl 5-amino-1-(3-methoxypropyl)-1H-indole-2-carboxylate (1.42 g, 5.14 mmol) and 2-chloro-5-(isobutyramidomethyl)benzoic acid (1.58 g, 6.168 mmol) were added to a 100 mL flask and dissolved in $CH_2Cl_2$ (30 ml). HOBT (2.08 g, 15.42 mmol) and DMAP (1.88 g, 15.42 mmol) were added thereto and reacted for 10 minutes. Then, EDC (2.96 g, 15.42 mmol) and TEA (2.15 ml, 15.42 mmol) were added and stirred under reflux for 12 hours. After completion of the reaction, the organic material was extracted with $CH_2Cl_2/H_2O$. The organic layer was dried over $MgSO_4$ and distilled under reduced pressure to remove the solvent. The residue was subjected to column chromatography (ethyl acetate:n-hexane=2:1) to obtain ethyl 5-(2-chloro-5-(isobutyramidomethyl)benzamido)-1-(3-methoxypropyl)-1H-indole-2-carboxylate (2.1 g, 4.09 mmol, 79%, white solid).

1H NMR (300 MHz, DMSO-$d_6$) 10.48 (br, NH, 1H), 8.38 (m, NH, 1H), 8.18 (m, 1H), 7.54-7.50 (m, 3H), 7.43 (m, 1H), 7.36-7.33 (m, 1H), 7.28 (m, 1H), 4.59 (m, 2H), 4.36-4.29 (m, 4H), 3.23-3.19 (m. 5H), 2.50-2.38 (m, 1H), 1.95-1.91 (m, 2H), 1.36-1.32 (m, 3H), 1.04-1.02 (m, 6H).

Example 92-4: Synthesis of 5-(2-chloro-5-(isobutyramidomethyl)benzamido)-1-(3-methoxypropyl)-1H-indole-2-carboxylic acid Ethyl 5-(2-chloro-5-(isobutyramidomethyl)benzamido)-1-(3-methoxypropyl)-1H-indole-2-carboxylate (2.1 g, 4.09 mmol) was added to a 500 mL flask and dissolved in THF (30 ml) and MeOH (30 ml). LiOH (858 mg, 20.45 mmol) dissolved in $H_2O$ (30 ml) was added and stirred for 12 hours. After concentration upon completion of the reaction, the pH was adjusted to 2 with 2N—HCl. The resulting solid was filtered to obtain 5-(2-chloro-5-(isobutyramidomethyl)benzamido)-1-(3-methoxypropyl)-1H-indole-2-carboxylic acid (1.79 g, 3.68 mmol, 89%, white solid).

1H NMR (300 MHz, DMSO-$d_6$) 12.90 (br, OH, 1H), 10.45 (br, NH, 1H), 8.37 (m, NH, 1H), 8.16 (m, 1H), 7.51-7.49 (m, 3H), 7.42 (m, 1H), 7.35-7.32 (m, 1H), 7.22 (m, 1H), 4.59-4.57 (m, 2H), 4.30-4.28 (m, 2H), 3.24-3.19 (m, 5H), 2.50-2.38 (m, 1H), 1.94-1.90 (m, 2H), 1.04-1.02 (m, 6H).

Example 92-5: Synthesis of 5-(2-chloro-5-(isobutyramidomethyl)benzamido)-1-(3-methoxypropyl)-N-(4-(trifluoromethoxy)phenyl)-1H-indole-2-carboxamide (Compound 92)

5-(2-chloro-5-(isobutyramidomethyl)benzamido)-1-(3-methoxypropyl)-1H-indole-2-carboxylic acid (200 mg, 0.411 mmol) and 4-(trifluoromethoxy)aniline (146 mg, 0.822 mmol) were added to a 10 mL flask and dissolved in $CH_2Cl_2$ (5 ml) and DMF (1 ml). HOBT (167 mg, 1.233 mmol) and DMAP (151 mg, 1.233 mmol) were added thereto and reacted for 10 minutes. Then, EDC (236 mg, 1.233 mmol) and TEA (172 µl, 1.233 mmol) were added and stirred under reflux for 12 hours. After the reaction was completed, the organic material was extracted with ethyl acetate/$H_2O$. The organic layer was dried over $MgSO_4$ and distilled under reduced pressure to remove the solvent. The residue was subjected to column chromatography (ethyl acetate:n-hexane=3:1) to obtain 5-(2-chloro-5-(isobutyramidomethyl)benzamido)-1-(3-methoxypropyl)-N-(4-(trifluoromethoxy)phenyl)-1H-indole-2-carboxamide (212 mg, 0.32 mmol, 80%, white solid).

1H NMR (300 MHz, DMSO-$d_6$) 10.52 (br, NH, 1H), 10.46 (br, NH, 1H), 8.37 (m, NH, 1H), 8.18 (m, 1H), 7.91-7.88 (m, 2H), 7.53-7.50 (m, 3H), 7.44-7.39 (m, 2H), 7.36-7.31 (m, 3H), 4.59 (m, 2H), 4.31-4.29 (m, 2H), 3.24-3.17 (m, 5H), 2.50-2.39 (m, 1H), 1.99-1.93 (m, 2H), 1.04-1.02 (m, 6H).

Example 93: Synthesis of N-(4-(tert-butyl)phenyl)-5-(2-chloro-5-(isobutyramidomethyl)benzamido)-1-(3-methoxypropyl)-1H-indole-2-carboxamide (Compound 93)

The title compound was obtained according to the same procedure as Example 92, except for using 4-(tert-butyl)aniline instead of 4-(trifluoromethoxy)aniline.

1H NMR (300 MHz, DMSO-$d_6$) 10.45 (br, NH, 1H), 10.26 (br, NH, 1H), 8.37 (m, NH, 1H), 8.16 (s, 1H), 7.70-7.67 (m, 2H), 7.53-7.50 (m, 3H), 7.44 (m, 1H), 7.39-7.33 (m, 3H), 7.27 (m, 1H), 4.59 (m, 2H), 4.31-4.29 (m, 2H), 3.25-3.21 (m, 2H), 3.18 (s, 3H), 2.50-2.41 (m, 1H), 1.97-1.95 (m, 2H), 1.05-1.03 (m, 6H).

Example 94: Synthesis of N-(4-chloro-2-methylphenyl)-5-(2-chloro-5-(isobutyramidomethyl)benzamido)-1-(3-methoxypropyl)-1H-indole-2-carboxamide (Compound 94)

The title compound was obtained according to the same procedure as Example 92, except for using 4-chloro-2-methylaniline instead of 4-(trifluoromethoxy)aniline.

1H NMR (300 MHz, DMSO-$d_6$) 10.46 (br, NH, 1H), 9.96 (br, NH, 1H), 8.37-8.35 (m, NH, 1H), 8.17 (s, 1H), 7.60-7.50 (m, 3H), 7.44 (m, 1H), 7.41-7.39 (m, 1H), 7.36 (m, 1H), 7.31-7.28 (m, 3H), 4.58 (m, 2H), 4.32-4.29 (m, 2H), 3.25-3.21 (m, 2H), 3.19 (s, 3H), 2.50-2.34 (m, 1H), 2.28 (s, 3H), 1.96-1.92 (m, 2H), 1.04-1.02 (m, 6H).

Example 95: Synthesis of N-(3-chloro-4-fluorophenyl)-5-(2-chloro-5-(isobutyramidomethyl)benzamido)-1-(3-methoxypropyl)-1H-indole-2-carboxamide (Compound 95)

The title compound was obtained according to the same procedure as Example 92, except for using 3-chloro-4-fluoroaniline instead of 4-(trifluoromethoxy)aniline.

1H NMR (300 MHz, DMSO-$d_6$) 10.51 (br, NH, 1H), 10.46 (br, NH, 1H), 8.37 (m, NH, 1H), 8.19 (s, 1H), 8.12-8.08 (m, 1H), 7.74-7.71 (m, 2H), 7.53-7.50 (m, 3H), 7.46-7.40 (m, 2H), 7.36-7.31 (m, 2H), 4.59 (m, 2H), 4.31-4.29 (m, 2H), 3.25-3.20 (m, 2H), 3.18 (s, 3H), 2.50-2.39 (m, 1H), 1.97-1.95 (m, 2H), 1.05-1.03 (m, 6H).

Example 96: Synthesis of 5-(2-chloro-5-(isobutyramidomethyl)benzamido)-N-(4-chlorophenyl)-1-(3-methoxypropyl)-1H-indole-2-carboxamide (Compound 96)

The title compound was obtained according to the same procedure as Example 92, except for using 4-chloroaniline instead of 4-(trifluoromethoxy)aniline.

1H NMR (300 MHz, DMSO-$d_6$) 10.46 (br, NH, 2H), 8.38-8.34 (m, NH, 1H), 8.18 (m, 1H), 7.83-7.81 (m, 2H), 7.53-7.50 (m, 3H), 7.43-7.41 (m, 3H), 7.37-7.33 (m, 2H), 4.59 (m, 2H), 4.31-4.29 (m, 2H), 3.25-3.20 (m, 2H), 3.17 (s, 3H), 2.50-2.39 (m, 1H), 1.97-1.95 (m, 2H), 1.04-1.02 (m, 6H).

Example 97: Synthesis of 5-(2-chloro-5-(isobutyramidomethyl)benzamido)-N-(4-fluoro-2-methylphenyl)-1-(3-methoxypropyl)-1H-indole-2-carboxamide (Compound 97)

The title compound was obtained according to the same procedure as Example 92, except for using 4-fluoro-2-methylaniline instead of 4-(trifluoromethoxy)aniline.

1H NMR (300 MHz, DMSO-$d_6$) 10.45 (br, NH, 1H), 9.93 (br, NH, 1H), 8.37 (m, NH, 1H), 8.17 (s, 1H), 7.52-7.50 (m, 3H), 7.44 (m, 1H), 7.39-7.33 (m, 2H), 7.30 (m, 1H), 7.18-7.14 (m, 1H), 7.10-7.04 (m, 1H), 4.58 (m, 2H), 4.32-4.29 (m, 2H), 3.26-3.22 (m, 2H), 3.19 (s, 3H), 2.50-2.39 (m, 1H), 2.27 (s, 3H), 1.96-1.92 (m, 2H), 1.05-1.02 (m, 6H).

Example 98: Synthesis of 5-(2-chloro-5-(isobutyramidomethyl)benzamido)-N-(3-fluoro-4-morpholinophenyl)-1-(3-methoxypropyl)-1H-indole-2-carboxamide (Compound 98)

The title compound was obtained according to the same procedure as Example 92, except for using 3-fluoro-4-morpholinoaniline instead of 4-(trifluoromethoxy)aniline.

1H NMR (300 MHz, DMSO-$d_6$) 10.45 (br, NH, 1H), 10.36 (br, NH, 1H), 8.37 (m, NH, 1H), 8.17 (m, 1H), 7.73-7.67 (m, 1H), 7.53-7.44 (m, 5H), 7.36-7.33 (m, 1H), 7.26 (s, 1H), 7.08-7.01 (m, 1H), 4.58 (m, 2H), 4.32-4.29 (m, 2H), 3.75 (s, 4H), 3.24-3.20 (m, 2H), 3.17 (s, 3H), 2.98 (s, 4H), 2.50-2.41 (m, 1H), 1.96-1.92 (m, 2H), 1.05-1.02 (m, 6H).

Example 99: Synthesis of 5-(2-chloro-5-(isobutyramidomethyl)benzamido)-1-(3-methoxypropyl)-N-(3-(trifluoromethoxy)phenyl)-1H-indole-2-carboxamide (Compound 99)

The title compound was obtained according to the same procedure as Example 92, except for using 3-(trifluoromethoxy)aniline instead of 4-(trifluoromethoxy)aniline.

1H NMR (300 MHz, DMSO-$d_6$) 10.58 (br, NH, 1H), 10.47 (br, NH, 1H), 8.39-8.35 (m, NH, 1H), 8.19 (m, 1H), 7.93 (m, 1H), 7.80-7.77 (m, 1H), 7.54-7.49 (m, 4H), 7.47-7.44 (m, 1H), 7.36-7.33 (m, 2H), 7.11-7.08 (m, 1H), 4.60 (m, 2H), 4.31-4.29 (m, 2H), 3.24-3.20 (m, 3H), 3.17 (s, 3H) 2.50-2.41 (m, 1H), 1.98-1.93 (m, 2H), 1.05-1.02 (m, 6H).

Example 100: Synthesis of 5-(2-chloro-5-(isobutyramidomethyl)benzamido)-1-(3-methoxypropyl)-N-(3-(trifluoromethyl)phenyl)-1H-indole-2-carboxamide (Compound 100)

The title compound was obtained according to the same procedure as Example 92, except for using 3-(trifluoromethyl)aniline instead of 4-(trifluoromethoxy)aniline.

1H NMR (300 MHz, DMSO-$d_6$) 10.62 (br, NH, 1H), 10.47 (br, NH, 1H), 8.39-8.35 (m, NH, 1H), 8.26-8.19 (m, 2H), 8.07-8.04 (m, 1H), 7.64-7.58 (m, 1H), 7.54-7.45 (m, 5H), 7.36 (m, 2H), 4.61 (m, 2H), 4.31-4.29 (m, 2H), 3.24-3.21 (m, 3H), 3.17 (s, 3H), 2.50-2.42 (m, 1H), 1.98-1.96 (m, 2H), 1.05-1.02 (m, 6H).

Example 101: Synthesis of 5-(2-chloro-5-(isobutyramidomethyl)benzamido)-1-(3-methoxypropyl)-N-(4-(trifluoromethyl)phenyl)-1H-indole-2-carboxamide (Compound 101)

The title compound was obtained according to the same procedure as Example 92, except for using 4-(trifluoromethyl)aniline instead of 4-(trifluoromethoxy)aniline.

1H NMR (300 MHz, DMSO-$d_6$) 10.65 (br, NH, 1H), 10.47 (br, NH, 1H), 8.39-8.35 (m, NH, 1H), 8.19 (m, 1H), 8.03-8.01 (m, 2H), 7.75-7.72 (m, 2H), 7.55-7.53 (m, 3H), 7.44 (m, 1H), 7.36-7.33 (m, 2H), 4.62 (m, 2H), 4.31-4.29 (m, 2H), 3.33-3.21 (m, 2H), 3.17 (s, 3H), 2.50-2.41 (m, 1H), 1.98-1.94 (m, 2H), 1.05-1.02 (m, 6H).

Example 102: Synthesis of 5-(2-chloro-5-(isobutyramidomethyl)benzamido)-N-(4-fluorophenyl)-1-(3-methoxypropyl)-1H-indole-2-carboxamide (Compound 102)

The title compound was obtained according to the same procedure as Example 92, except for using 4-fluoroaniline instead of 4-(trifluoromethoxy)aniline.

1H NMR (300 MHz, DMSO-$d_6$) 10.45 (br, NH, 1H), 10.39 (br, NH, 1H), 8.39-8.35 (m, NH, 1H), 8.17 (m, 1H), 7.82-7.77 (m, 2H), 7.55-7.50 (m, 3H), 7.44 (m, 1H), 7.36-7.33 (m, 2H), 7.28 (m, 1H), 7.23-7.18 (m, 2H), 4.59 (m, 2H), 4.31-4.29 (m, 2H), 3.24-3.21 (m, 2H), 3.17 (s, 3H), 2.50-2.41 (m, 1H), 1.98-1.93 (m, 2H), 1.05-1.02 (m, 6H).

Example 103: Synthesis of 5-(2-chloro-5-(isobutyramidomethyl)benzamido)-N-(3-chlorophenyl)-1-(3-methoxypropyl)-1H-indole-2-carboxamide (Compound 103)

The title compound was obtained according to the same procedure as Example 92, except for using 3-chloroaniline instead of 4-(trifluoromethoxy)aniline.

1H NMR (300 MHz, DMSO-$d_6$) 10.48 (br, NH, 1H), 10.46 (br, NH, 1H), 8.39-8.35 (m, NH, 1H), 8.18 (m, 1H), 7.98 (m, 1H), 7.72-7.69 (m, 1H), 7.54-7.50 (m, 3H), 7.44-7.32 (m, 4H), 7.18-7.15 (m, 1H), 4.59 (m, 2H), 4.31-4.29 (m, 2H), 3.24-3.21 (m, 2H), 3.17 (s, 3H), 2.50-2.41 (m, 1H), 1.98-1.93 (m, 2H), 1.05-1.02 (m, 6H).

Example 104: Synthesis of 5-(2-chloro-5-(isobutyramidomethyl)benzamido)-N-(2-chlorophenyl)-1-(3-methoxypropyl)-1H-indole-2-carboxamide (Compound 104)

The title compound was obtained according to the same procedure as Example 92, except for using 2-chloroaniline instead of 4-(trifluoromethoxy)aniline.

1H NMR (300 MHz, DMSO-$d_6$) 10.46 (br, NH, 1H), 10.06 (br, NH, 1H), 8.39-8.35 (m, NH, 1H), 8.18 (m, 1H), 7.66-7.59 (m, 2H), 7.57-7.50 (m, 3H), 7.44-7.38 (m, 2H), 7.36-7.31 (m, 3H), 4.59 (m, 2H), 4.31-4.29 (m, 2H), 3.26-3.19 (m, 2H), 3.13 (s, 3H), 2.50-2.41 (m, 1H), 1.97-1.93 (m, 2H), 1.05-1.02 (m, 6H).

Example 105: Synthesis of 5-(2-chloro-5-(isobutyramidomethyl)benzamido)-N-(4-cyclohexylphenyl)-1-(3-methoxypropyl)-1H-indole-2-carboxamide (Compound 105)

The title compound was obtained according to the same procedure as Example 92, except for using 4-cyclohexylaniline instead of 4-(trifluoromethoxy)aniline.

1H NMR (300 MHz, DMSO-$d_6$) 10.46 (br, NH, 1H), 10.27 (br, NH, 1H), 8.41 (m, NH, 1H), 8.17 (s, 1H), 7.69-7.65 (m, 2H), 7.52-7.50 (m, 3H), 7.44 (s, 1H), 7.36-7.33 (m, 1H), 7.26 (s, 1H), 7.21-7.18 (m, 2H), 4.59-4.59 (m, 2H), 4.32-4.29 (m, 2H), 3.24-3.20 (m, 2H), 3.17 (s, 3H), 2.50-2.39 (m, 1H), 1.99-1.92 (m, 2H), 1.80-1.69 (m, 5H), 1.39-1.20 (m, 6H), 1.05-1.02 (m, 6H).

Example 106: Synthesis of 5-(2-chloro-5-(isobutyramidomethyl)benzamido)-N-(2,4-difluorophenyl)-1-(3-methoxypropyl)-1H-indole-2-carboxamide (Compound 106)

The title compound was obtained according to the same procedure as Example 92, except for using 2,4-difluoroaniline instead of 4-(trifluoromethoxy)aniline.

1H NMR (300 MHz, DMSO-$d_6$) 10.47 (br, NH, 1H), 10.18 (br, NH, 1H), 8.38-8.34 (m, NH, 1H), 8.19 (s, 1H), 7.64-7.55 (m, 1H), 7.55-7.51 (m, 3H), 7.44 (m, 1H), 7.36-7.34 (m, 3H), 7.17-7.10 (m, 1H), 4.58 (s, 2H), 4.31-4.29 (m, 2H), 3.25-3.19 (m, 2H), 3.18 (s, 3H), 2.50-2.38 (m, 1H), 1.96-1.93 (m, 2H), 1.04-1.02 (m, 6H).

Example 107: Synthesis of 5-(2-chloro-5-(isobutyramidomethyl)benzamido)-N-(2-fluorophenyl)-1-(3-methoxypropyl)-1H-indole-2-carboxamide (Compound 107)

The title compound was obtained according to the same procedure as Example 92, except for using 2-fluoroaniline instead of 4-(trifluoromethoxy)aniline.

1H NMR (300 MHz, DMSO-$d_6$) 10.48 (br, NH, 1H), 10.16 (br, NH, 1H), 8.39 (m, NH, 1H), 8.18 (s, 1H), 7.62-7.56 (m, 1H), 7.54-7.50 (m, 2H), 7.44 (m, 1H), 7.36-7.32 (m, 2H), 7.30-7.24 (m, 3H), 4.58 (s, 2H), 4.31-4.29 (m, 2H), 3.24-3.19 (m, 2H), 3.18 (s, 3H), 2.50-2.38 (m, 1H), 2.00-1.93 (m, 3H), 1.96-1.93 (m, 2H), 1.05-1.02 (m, 6H).

Example 108: Synthesis of 5-(2-chloro-5-(isobutyramidomethyl)benzamido)-N-(3-fluorophenyl)-1-(3-methoxypropyl)-1H-indole-2-carboxamide (Compound 108)

The title compound was obtained according to the same procedure as Example 92, except for using 3-fluoroaniline instead of 4-(trifluoromethoxy)aniline.

1H NMR (300 MHz, DMSO-$d_6$) 10.53 (br, NH, 1H), 10.48 (br, NH, 1H), 8.38-8.34 (m, NH, 1H), 8.19 (s, 1H), 7.77-7.73 (m, 1H), 7.60-7.51 (m, 4H), 7.44-7.31 (m, 4H), 6.97-6.91 (m, 1H), 4.59 (s, 2H), 4.31-4.29 (m, 2H), 3.25-3.20 (m, 2H), 3.17 (s, 3H), 2.50-2.37 (m, 1H), 2.00-1.95 (m, 2H), 1.05-1.02 (m, 6H).

Example 109: Synthesis of 5-(2-chloro-5-(isobutyramidomethyl)benzamido)-N-(3,5-difluorophenyl)-1-(3-methoxypropyl)-1H-indole-2-carboxamide (Compound 109)

The title compound was obtained according to the same procedure as Example 92, except for using 3,5-difluoroaniline instead of 4-(trifluoromethoxy)aniline.

1H NMR (300 MHz, DMSO-$d_6$) 10.67 (br, NH, 1H), 10.49 (br, NH, 1H), 8.40-8.38 (m, NH, 1H), 8.20 (s, 1H), 7.58-7.51 (m, 5H), 7.44 (m, 1H), 7.36-7.32 (m, 2H), 7.00-6.90 (m, 1H), 4.59 (s, 2H), 4.31-4.29 (m, 2H), 3.22-3.18 (m, 2H), 3.17 (s, 3H), 2.50-2.38 (m, 1H), 1.96-1.93 (m, 2H), 1.04-1.02 (m, 6H).

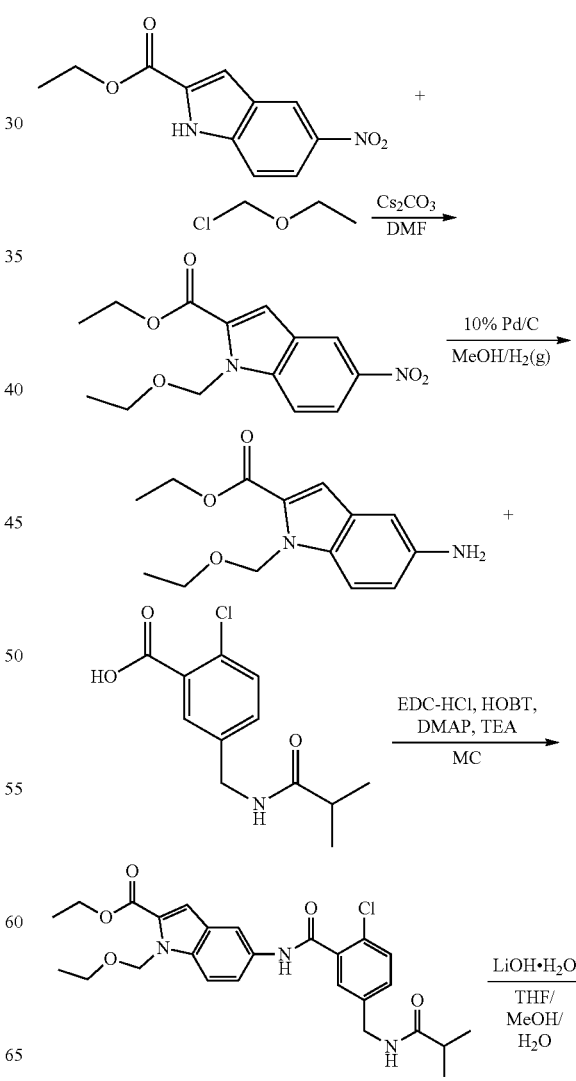

-continued

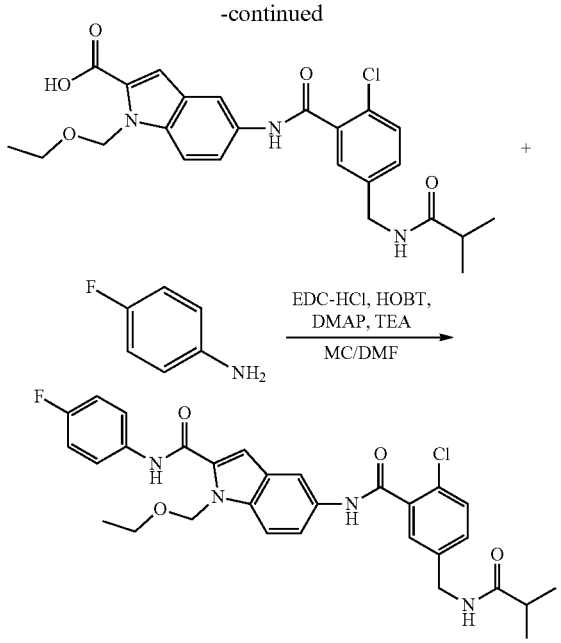

Example 110: Synthesis of 5-(2-chloro-5-(isobutyramidomethyl)benzamido)-1-(ethoxymethyl)-N-(4-fluorophenyl)-1H-indole-2-carboxamide (Compound 110)

Example 110-1: Synthesis of ethyl 1-(ethoxymethyl)-5-nitro-1H-indole-2-carboxylate Ethyl 5-nitro-1H-indole-2-carboxylate (5 g, 21.35 mmol) and chloromethoxyethane (7.91 mL, 85.4 mmol) were added to a 100 mL flask and dissolved in DMF (50 ml). $Cs_2CO_3$ (20.9 g, 64.0 mmol) was added thereto and stirred at room temperature for 38 hours. After the reaction was completed, the organic material was extracted with ethyl acetate/$H_2O$. The organic layer was dried over $MgSO_4$ and distilled under reduced pressure to remove the solvent. The concentrated solution was treated with ethyl acetate and ethyl ether to collect solid, and then filtered to obtain ethyl 1-(ethoxymethyl)-5-nitro-1H-indole-2-carboxylate (4.5 g, 15.4 mmol, 72%, white solid).

1H NMR (300 MHz, DMSO-$d_6$) 8.77 (d, 1H), 8.25-8.21 (d, 1H), 7.95-7.92 (d, 1H), 7.63 (br, 1H), 5.99 (s, 2H), 4.40-4.33 (q, 2H), 3.39 (q, 2H), 1.38-1.33 (t, 3H), 1.05-1.0 (t, 3H).

Example 110-2: Synthesis of ethyl 5-amino-1-(ethoxymethyl)-1H-indole-2-carboxylate Ethyl 1-(ethoxymethyl)-5-nitro-1H-indole-2-carboxylate (4.5 g, 17.16 mmol) was added to a 250 mL flask and dissolved in MeOH (90 ml). 10% Pd/C (450 mg) was added thereto and stirred for 12 hours at room temperature under $H_2$ (g). After Celite filtration upon completion of the reaction, the solvent was removed by distillation under reduced pressure. The resulting solid ethyl 5-amino-1-(ethoxymethyl)-1H-indole-2-carboxylate (4.15 g, 15.8 mmol, 92%) was obtained.

1H NMR (300 MHz, DMSO-$d_6$) 7.38-7.35 (d, 1H), 7.06 (s, 1H), 6.79-6.76 (m, 1H), 6.74 (m, 1H), 5.80 (s, 2H), 4.80 (br, NH, 2H), 4.32-4.25 (q, 2H), 3.39-3.32 (m, 2H), 1.33-1.29 (t, 3H), 1.08-0.98 (t, 3H).

Example 110-3: Synthesis of ethyl 5-(2-chloro-5-(isobutyramidomethyl)benzamido)-1-(ethoxymethyl)-1H-indole-2-carboxylate Ethyl 5-amino-1-(ethoxymethyl)-1H-indole-2-carboxylate (1.0 g, 3.81 mmol) and 2-chloro-5-(isobutyramidomethyl)benzoic acid (1.17 g, 4.575 mmol) were added to a 100 mL flask and dissolved in $CH_2Cl_2$ (25 ml). HOBT (77.3 mg, 5.72 mmol) and DMAP (0.14 g, 1.14 mmol) were added thereto and reacted for 10 minutes. Then, EDC (1.10 g, 5.72 mmol) and TEA (1.33 ml, 9.53 mmol) were added and stirred under reflux for 12 hours. After completion of the reaction, the organic material was extracted with $CH_2Cl_2$/$H_2O$. The organic layer was dried over $MgSO_4$ and distilled under reduced pressure to remove the solvent. The residue was subjected to column chromatography (ethyl acetate:n-hexane=2:1) to obtain ethyl 5-(2-chloro-5-(isobutyramidomethyl)benzamido)-1-(ethoxymethyl)-1H-indole-2-carboxylate (1.52 g, 3.04 mmol, 80%, white solid).

1H NMR (300 MHz, DMSO-$d_6$) 10.52 (br, NH, 1H), 8.36 (m, NH, 1H), 8.20 (m, 1H), 7.70-7.67 (m, 1H), 7.57-7.49 (m, 2H), 7.43 (m, 1H), 7.36-7.33 (m, 2H), 5.96 (s, 2H), 4.37-4.29 (m, 4H), 3.39-3.32 (m, 2H), 2.50-2.38 (m, 1H), 1.36-1.32 (t, 3H), 1.05-0.99 (m, 9H).

Example 110-4: Synthesis of 5-(2-chloro-5-(isobutyramidomethyl)benzamido)-1-(ethoxymethyl)-1H-indole-2-carboxylic acid Ethyl 5-(2-chloro-5-(isobutyramidomethyl)benzamido)-1-(ethoxymethyl)-1H-indole-2-carboxylate (1.5 g, 3.00 mmol) was added to a 250 mL flask and dissolved in THF (15 ml) and MeOH (15 ml). LiOH (0.63 g, 15.00 mmol) dissolved in $H_2O$ (12 ml) was added and stirred for 12 hours. After concentration upon completion of the reaction, the pH was adjusted to 2 with 2N—HCl. The resulting solid was filtered to obtain 5-(2-chloro-5-(isobutyramidomethyl)benzamido)-1-(ethoxymethyl)-1H-indole-2-carboxylic acid (1.10 g, 2.33 mmol, 77.6%, white solid).

1H NMR (300 MHz, DMSO-$d_6$) 13.07 (br, OH, 1H), 10.51 (br, NH, 1H), 8.41-8.36 (m, NH, 1H), 8.20 (br, 1H), 7.67-7.64 (d, 1H), 7.53-7.50 (d, 2H), 7.43 (m, 1H), 7.36-7.30 (m, 2H), 5.98 (s, 2H), 4.31-4.29 (d, 2H), 3.41-3.35 (m. 2H), 2.50-2.38 (m, 1H), 1.04-1.02 (m, 9H).

Example 110-5: Synthesis of 5-(2-chloro-5-(isobutyramidomethyl)benzamido)-1-(ethoxymethyl)-N-(4-fluorophenyl)-1H-indole-2-carboxamide (Compound 110)

5-(2-chloro-5-(isobutyramidomethyl)benzamido)-1-(ethoxymethyl)-1H-indole-2-carboxylic acid (150 mg, 0.32 mmol) and 4-fluoroaniline (36 μl, 0.38 mmol) were added to a 10 mL flask and dissolved in $CH_2Cl_2$ (2.1 ml) and DMF (0.5 ml). HOBT (64.4 mg, 0.477 mmol) and DMAP (11.6 mg, 0.095 mmol) were added thereto and reacted for 10 minutes. Then, EDC (91.4 mg, 0.477 mmol) and TEA (130 μl, 0.953 mmol) were added and stirred under reflux for 12 hours. After the reaction was completed, the organic material was extracted with ethyl acetate/$H_2O$. The organic layer was dried over $MgSO_4$ and distilled under reduced pressure to remove the solvent. The residue was subjected to column chromatography (ethyl acetate:n-hexane=3:1) to obtain 5-(2-chloro-5-(isobutyramidomethyl)benzamido)-1-

(ethoxymethyl)-N-(4-fluorophenyl)-1H-indole-2-carboxamide (79.6 mg, 0.141 mmol, 44.3%, white solid).

1H NMR (300 MHz, DMSO-$d_6$) 10.48 (br, NH, 2H), 8.37-8.35 (m, NH, 1H), 8.19 (br, 1H), 7.81-7.77 (m, 2H), 7.68-7.65 (m, 1H), 7.54-7.51 (m, 2H), 7.44 (m, 1H), 7.36-7.33 (m, 2H), 7.24-7.19 (m, 2H), 5.97 (s, 2H), 4.31-4.29 (d, 2H), 3.42-3.30 (m. 2H), 2.50-2.41 (m, 1H), 1.05-0.98 (m, 9H).

Example 111: Synthesis of 5-(2-chloro-5-(isobutyramidomethyl)benzamido)-1-(ethoxymethyl)-N-(4-chlorophenyl)-1H-indole-2-carboxamide (Compound 111)

The title compound was obtained according to the same procedure as Example 110, except for using 4-chloroaniline instead of 4-fluoroaniline.

1H NMR (300 MHz, DMSO-$d_6$) 10.54 (br, NH, 1H), 10.49 (br, NH, 1H), 8.37-8.34 (m, NH, 1H), 8.19 (br, 1H), 7.83-7.80 (m, 2H), 7.68-7.65 (m, 1H), 7.56-7.48 (m, 2H), 7.45-7.41 (m, 3H), 7.34 (m, 2H), 5.96 (s, 2H), 4.31-4.29 (d, 2H), 3.41-3.30 (m, 2H), 2.50-2.39 (m, 1H), 1.05-0.96 (m, 9H).

Example 112: Synthesis of 5-(2-chloro-5-(isobutyramidomethyl)benzamido)-N-(3-(trifluoromethoxy)phenyl)-1-(ethoxymethyl)-1H-indole-2-carboxamide (Compound 112)

The title compound was obtained according to the same procedure as Example 110, except for using 3-(trifluoromethoxy)aniline instead of 4-fluoroaniline.

1H NMR (300 MHz, DMSO-$d_6$) 10.67 (br, NH, 1H), 10.50 (br, NH, 1H), 8.38 (m, NH, 1H), 8.20 (br, 1H), 7.92 (br, 1H), 7.79-7.76 (d, 1H), 7.70-7.67 (d, 1H), 7.56-7.44 (m, 4H), 7.38-7.34 (m, 2H), 7.12-7.09 (d, 1H), 5.96 (s, 2H), 4.31-4.29 (d, 2H), 3.14-3.32 (m, 2H), 2.50-2.39 (m, 1H), 1.05-0.98 (m, 9H).

Example 113: Synthesis of 5-(2-chloro-5-(isobutyramidomethyl)benzamido)-1-(ethoxymethyl)-N-(4-(trifluoromethyl)phenyl)-1H-indole-2-carboxamide (Compound 113)

The title compound was obtained according to the same procedure as Example 110, except for using 4-(trifluoromethyl)aniline instead of 4-fluoroaniline.

1H NMR (300 MHz, DMSO-$d_6$) 10.75 (br, NH, 1H), 10.50 (br, NH, 1H), 8.37 (m, NH, 1H), 8.21 (m, 1H), 8.02-8.00 (d, 2H), 7.75-7.67 (m, 3H), 7.57-7.51 (t, 2H), 7.44-7.41 (d, 2H), 7.36-7.34 (m, 1H), 5.97 (s, 2H), 4.31-4.29 (d, 2H), 3.41-3.32 (m, 2H), 2.50-2.41 (m, 1H), 1.05-0.98 (m, 9H).

Example 114: Synthesis of N-(3-chlorophenyl)-5-(2-chloro-5-(isobutyramidomethyl)benzamido)-1-(ethoxymethyl)-1H-indole-2-carboxamide (Compound 114)

The title compound was obtained according to the same procedure as Example 110, except for using 3-chloroaniline instead of 4-fluoroaniline.

1H NMR (300 MHz, DMSO-$d_6$) 10.58 (br, NH, 1H), 10.50 (br, NH, 1H), 8.39-8.35 (m, NH, 1H), 8.20 (s, 1H), 7.97 (s, 2H), 7.71-7.66 (m, 2H), 7.56-7.50 (m, 2H), 7.44-7.34 (m, 4H), 7.19-7.16 (d, 1H), 5.96 (s, 2H), 4.31-4.29 (m, 2H), 3.41-3.32 (m, 2H), 2.50-2.41 (m, 1H), 1.05-0.98 (m, 9H).

Example 115: Synthesis of 5-(2-chloro-5-(isobutyramidomethyl)benzamido)-N-(3-chloro-4-fluorophenyl)-1-(ethoxymethyl)-1H-indole-2-carboxamide (Compound 115)

The title compound was obtained according to the same procedure as Example 110, except for using 3-chloro-4-fluoroaniline instead of 4-fluoroaniline.

1H NMR (300 MHz, DMSO-$d_6$) 10.61 (br, NH, 1H), 10.49 (br, NH, 1H), 8.38-8.35 (m, NH, 1H), 8.20 (s, 1H), 8.09-8.06 (dd, 1H), 7.73-7.66 (m, 2H), 7.55-7.50 (m, 2H), 7.47-7.41 (m, 2H), 7.35 (m, 2H), 5.96 (s, 2H), 4.31-4.29 (m, 2H), 3.41-3.32 (m, 2H), 2.50-2.39 (m, 1H), 1.05-0.98 (m, 9H).

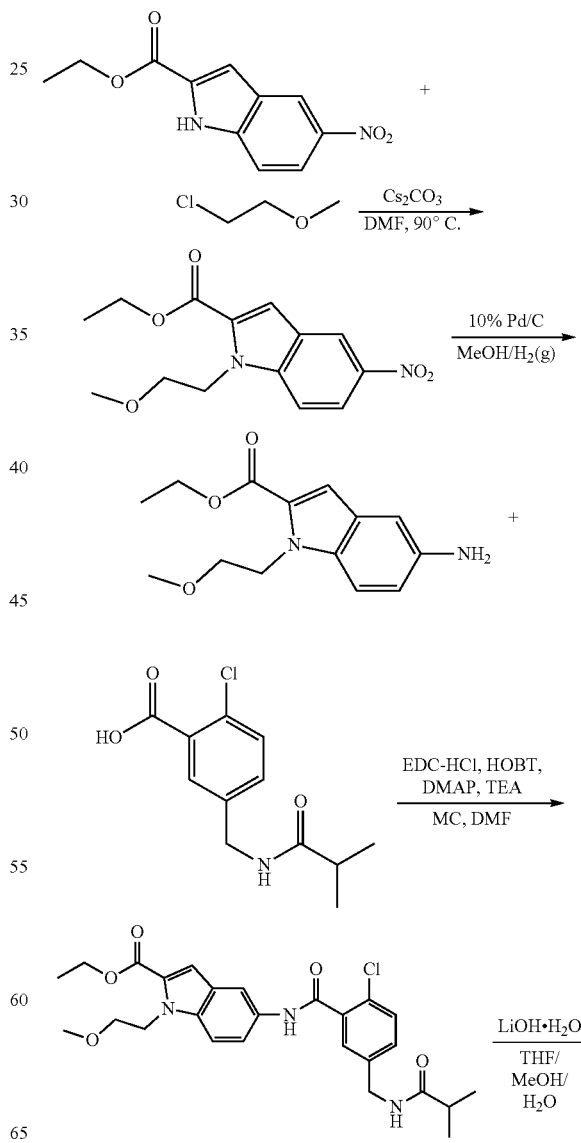

-continued

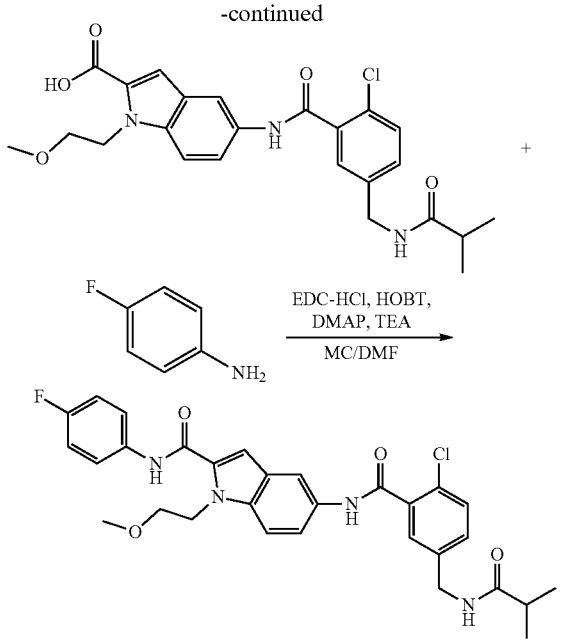

Example 116: Synthesis of 5-(2-chloro-5-(isobutyramidomethyl)benzamido)-N-(4-fluorophenyl)-1-(2-methoxyethyl)-1H-indole-2-carboxamide (Compound 116)

Example 116-1: Synthesis of ethyl 1-(2-methoxyethyl)-5-nitro-1H-indole-2-carboxylate Ethyl 5-nitro-1H-indole-2-carboxylate (5 g, 21.35 mmol) and 1-chloro-2-methoxyethane (4.04 g, 42.7 mmol) were added to a 100 mL flask and dissolved in DMF (50 ml). $Cs_2CO_3$ (13.9 g, 42.7 mmol) was added thereto and stirred at 90° C. for 12 hours. After the reaction was completed, the organic material was extracted with ethyl acetate/$H_2O$. The organic layer was dried over $MgSO_4$ and distilled under reduced pressure to remove the solvent. The residue was subjected to column chromatography (ethyl acetate:n-hexane=1:3) to obtain ethyl 1-(2-methoxyethyl)-5-nitro-1H-indole-2-carboxylate (4 g, 13.68 mmol, 64%, white solid).

1H NMR (300 MHz, DMSO-$d_6$) 8.73-8.72 (m, 1H), 8.18-8.14 (m, 1H), 7.84-7.81 (m, 1H), 7.55 (m, 1H), 4.81-4.78 (m, 2H), 4.39-4.32 (m, 2H), 3.66-3.63 (m, 2H), 3.15 (s, 3H), 1.37-1.32 (m, 6H).

Example 116-2: Synthesis of ethyl 5-amino-1-(2-methoxyethyl)-1H-indole-2-carboxylate Ethyl 1-(2-methoxyethyl)-5-nitro-1H-indole-2-carboxylate (4 g, 13.68 mmol) was added to a 100 mL flask and dissolved in MeOH (100 ml). 10% Pd/C (After 2.0 g) was added and stirred for 12 hours at room temperature under $H_2$ (g). After Celite filtration upon completion of the reaction, the solvent was removed by distillation under reduced pressure. The residue was subjected to column chromatography (ethyl acetate:n-hexane=1:1) to obtain ethyl 5-amino-1-(2-methoxyethyl)-1H-indole-2-carboxylate (3.38 g, 12.88 mmol, 94%).

1H NMR (300 MHz, DMSO-$d_6$) 7.30-7.27 (m, 1H), 6.96 (m, 1H), 6.76-6.70 (m, 2H), 4.72 (br, NH, 2H), 4.61-4.58 (m, 2H), 4.30-4.23 (m, 2H), 3.58-3.54 (m, 2H), 3.16 (s, 3H), 1.33-1.29 (m, 3H).

Example 116-3: Synthesis of ethyl 5-(2-chloro-5-(isobutyramidomethyl)benzamido)-1-(2-methoxyethyl)-1H-indole-2-carboxylate Ethyl 5-amino-1-(2-methoxyethyl)-1H-indole-2-carboxylate (1.5 g, 5.72 mmol) and 2-chloro-5-(isobutyramidomethyl)benzoic acid (1.755 g, 6.864 mmol) were added to a 100 mL flask and dissolved in $CH_2Cl_2$ (30 ml) and DMF (5 ml). HOBT (1.545 g, 11.44 mmol) and DMAP (1.4 g, 11.44 mmol) were added thereto and reacted for 10 minutes. Then, EDC (2.2 g, 11.44 mmol) and TEA (1.6 ml, 11.44 mmol) were added and stirred under reflux for 12 hours. After the reaction was completed, the organic material was extracted with ethyl acetate/$H_2O$. The organic layer was dried over $MgSO_4$ and distilled under reduced pressure to remove the solvent. The residue was subjected to column chromatography (ethyl acetate:n-hexane=3:1) to obtain ethyl 5-(2-chloro-5-(isobutyramidomethyl)benzamido)-1-(2-methoxyethyl)-1H-indole-2-carboxylate (2.4 g, 4.8 mmol, 84%, white solid).

1H NMR (300 MHz, DMSO-$d_6$) 10.45 (br, NH, 1H), 8.37 (m, NH, 1H), 8.16 (m, 1H), 7.60-7.57 (m, 1H), 7.52-7.49 (m, 2H), 7.42 (m, 1H), 7.36-7.33 (m, 1H), 7.27 (m, 1H), 4.71-4.69 (m, 2H), 4.36-4.28 (m, 4H), 3.63-3.59 (m, 2H), 3.16 (s, 3H), 2.50-2.38 (m, 1H), 1.36-1.31 (m, 3H), 1.04-1.02 (m, 6H).

Example 116-4: Synthesis of 5-(2-chloro-5-(isobutyramidomethyl)benzamido)-1-(2-methoxyethyl)-1H-indole-2-carboxylic acid Ethyl 5-(2-chloro-5-(isobutyramidomethyl)benzamido)-1-(2-methoxyethyl)-1H-indole-2-carboxylate (2.4 g, 4.8 mmol) was added to a 500 mL flask and dissolved in THF (50 ml) and MeOH (50 ml). LiOH (1.0 g, 24.0 mmol) dissolved in $H_2O$ (40 ml) was added and stirred for 12 hours. After concentration upon completion of the reaction, the pH was adjusted to 2 with 2N—HCl. The resulting solid was filtered to obtain 5-(2-chloro-5-(isobutyramidomethyl)benzamido)-1-(2-methoxyethyl)-1H-indole-2-carboxylic acid (2.1 g, 4.45 mmol, 93%, white solid).

1H NMR (300 MHz, DMSO-$d_6$) 12.92 (br, OH, 1H), 10.43 (br, NH, 1H), 8.36 (m, NH, 1H), 8.14 (m, 1H), 7.658-7.45 (m, 3H), 7.42 (m, 1H), 7.36-7.33 (m, 1H), 7.21 (m, 1H), 4.73-4.70 (m, 2H), 4.30-4.28 (m, 2H), 3.63-3.60 (m, 2H), 3.16 (s, 3H), 2.50-2.38 (m, 1H), 1.04-1.02 (m, 6H).

Example 116-5: Synthesis of 5-(2-chloro-5-(isobutyramidomethyl)benzamido)-N-(4-fluorophenyl)-1-(2-methoxyethyl)-1H-indole-2-carboxamide (Compound 116)

5-(2-chloro-5-(isobutyramidomethyl)benzamido)-1-(2-methoxyethyl)-1H-indole-2-carboxylic acid (150 mg, 0.33 mmol) and 4-fluoroaniline (87 mg, 0.495 mmol) were added to a 10 mL flask and dissolved in $CH_2Cl_2$ (5 ml) and DMF (1 ml). HOBT (89 mg, 0.66 mmol) and DMAP (80 mg, 0.66 mmol) were added thereto and reacted for 10 minutes. EDC (126 mg, 0.66 mmol) and TEA (91 µl, 0.66 mmol) were added and stirred under reflux for 12 hours. After the reaction was completed, the organic material was extracted with ethyl acetate/$H_2O$. The organic layer was dried over $MgSO_4$ and distilled under reduced pressure to remove the solvent. The residue was subjected to column chromatography (ethyl acetate:n-hexane=3:1) to obtain 5-(2-chloro-5-

(isobutyramidomethyl)benzamido)-N-(4-fluorophenyl)-1-(2-methoxyethyl)-1H-indole-2-carboxamide (140 mg, 0.227 mmol, 69%, white solid).

1H NMR (300 MHz, DMSO-$d_6$) 10.43-10.40 (m, NH, 2H), 8.39-8.34 (m, NH, 1H), 8.15 (s, 1H), 7.82-7.77 (m, 2H), 7.60-7.56 (m, 1H), 7.53-7.48 (m, 2H), 7.44 (s, 1H), 7.37-7.33 (m, 1H), 7.26 (s, 1H), 7.24-7.17 (m, 2H), 4.72 (m, 2H), 4.32-4.29 (m, 2H), 3.65-3.61 (m, 2H), 3.16 (s, 3H), 2.51-2.35 (m, 1H), 1.05-1.02 (m, 6H).

Example 117: Synthesis of 5-(2-chloro-5-(isobutyramidomethyl)benzamido)-N-(4-chlorophenyl)-1-(2-methoxyethyl)-1H-indole-2-carboxamide (Compound 117)

The title compound was obtained according to the same procedure as Example 116, except for using 4-chloroaniline instead of 4-fluoroaniline.

1H NMR (300 MHz, DMSO-$d_6$) 10.47-10.44 (m, NH, 2H), 8.39-8.34 (m, NH, 1H), 8.15 (s, 1H), 7.84-7.80 (m, 2H), 7.60-7.56 (m, 1H), 7.53-7.48 (m, 2H), 7.44-7.40 (m, 3H), 7.37-7.33 (m, 1H), 7.28 (s, 1H), 4.72 (m, 2H), 4.32-4.29 (m, 2H), 3.65-3.60 (m, 2H), 3.16 (s, 3H), 2.51-2.35 (m, 1H), 1.05-1.02 (m, 6H).

Example 118: Synthesis of 5-(2-chloro-5-(isobutyramidomethyl)benzamido)-1-(2-methoxyethyl)-N-(4-(trifluoromethoxy)phenyl)-1H-indole-2-carboxamide (Compound 118)

The title compound was obtained according to the same procedure as Example 116, except for using 4-(trifluoromethoxy)aniline instead of 4-fluoroaniline.

1H NMR (300 MHz, DMSO-$d_6$) 10.60-10.44 (m, NH, 2H), 8.39-8.34 (m, NH, 1H), 8.15 (s, 1H), 7.91-7.88 (m, 2H), 7.61-7.57 (m, 1H), 7.53-7.50 (m, 2H), 7.44 (s, 1H), 7.40-7.33 (m, 3H), 7.29 (s, 1H), 4.72 (m, 2H), 4.32-4.29 (m, 2H), 3.65-3.60 (m, 2H), 3.16 (s, 3H), 2.51-2.35 (m, 1H), 1.05-1.02 (m, 6H).

Example 119: Synthesis of 5-(2-chloro-5-(isobutyramidomethyl)benzamido)-1-(2-methoxyethyl)-N-(3-(trifluoromethoxy)phenyl)-1H-indole-2-carboxamide (Compound 119)

The title compound was obtained according to the same procedure as Example 116, except for using 3-(trifluoromethoxy)aniline instead of 4-fluoroaniline.

1H NMR (300 MHz, DMSO-$d_6$) 10.60-10.44 (m, NH, 2H), 8.39-8.34 (m, NH, 1H), 8.17 (s, 1H), 7.93 (m, 1H), 7.80-7.77 (m, 1H), 7.61-7.58 (m, 1H), 7.52-7.50 (m, 3H), 7.47-7.44 (m, 1H), 7.37-7.31 (m, 2H), 7.12-7.08 (m, 1H), 4.72 (m, 2H), 4.32-4.29 (m, 2H), 3.65-3.60 (m, 2H), 3.16 (s, 3H), 2.51-2.35 (m, 1H), 1.05-1.02 (m, 6H).

Example 120: Synthesis of N-(2-chloro-4-fluorophenyl)-5-(2-chloro-5-(isobutyramidomethyl)benzamido)-1-(2-methoxyethyl)-1H-indole-2-carboxamide (Compound 120)

The title compound was obtained according to the same procedure as Example 116, except for using 2-chloro-4-fluoroaniline instead of 4-fluoroaniline.

1H NMR (300 MHz, DMSO-$d_6$) 10.44 (m, NH, 1H), 10.11 (s, NH, 1H), 8.39-8.34 (m, NH, 1H), 8.16 (s, 1H), 7.65-7.57 (m, 3H), 7.53-7.50 (m, 2H), 7.47-7.44 (m, 1H), 7.37-7.27 (m, 3H), 4.71 (m, 2H), 4.32-4.29 (m, 2H), 3.64-3.60 (m, 2H), 3.17 (s, 3H), 2.51-2.35 (m, 1H), 1.05-1.02 (m, 6H).

Example 121: Synthesis of N-(4-chloro-2-fluorophenyl)-5-(2-chloro-5-(isobutyramidomethyl)benzamido)-1-(2-methoxyethyl)-1H-indole-2-carboxamide (Compound 121)

The title compound was obtained according to the same procedure as Example 116, except for using 4-chloro-2-fluoroaniline instead of 4-fluoroaniline.

1H NMR (300 MHz, DMSO-$d_6$) 10.44 (m, NH, 1H), 10.23 (s, NH, 1H), 8.39-8.34 (m, NH, 1H), 8.16 (s, 1H), 7.69-7.63 (m, 1H), 7.60-7.57 (m, 2H), 7.54-7.50 (m, 2H), 7.47-7.43 (m, 1H), 7.36-7.33 (m, 3H), 4.71 (m, 2H), 4.32-4.29 (m, 2H), 3.64-3.60 (m, 2H), 3.17 (s, 3H), 2.51-2.35 (m, 1H), 1.05-1.02 (m, 6H).

Example 122: Synthesis of N-(4-chloro-3-fluorophenyl)-5-(2-chloro-5-(isobutyramidomethyl)benzamido)-1-(2-methoxyethyl)-1H-indole-2-carboxamide (Compound 122)

The title compound was obtained according to the same procedure as Example 116, except for using 4-chloro-3-fluoroaniline instead of 4-fluoroaniline.

1H NMR (300 MHz, DMSO-$d_6$) 10.64 (m, NH, 1H), 10.44 (s, NH, 1H), 8.39-8.34 (m, NH, 1H), 8.17 (s, 1H), 7.97-7.92 (m, 1H), 7.64-7.58 (m, 3H), 7.53-7.50 (m, 2H), 7.44 (s, 1H), 7.37-7.33 (m, 1H), 7.30 (s, 1H), 4.71 (m, 2H), 4.32-4.29 (m, 2H), 3.64-3.60 (m, 2H), 3.17 (s, 3H), 2.51-2.35 (m, 1H), 1.05-1.02 (m, 6H).

Example 123: Synthesis of N-(3-chloro-4-fluorophenyl)-5-(2-chloro-5-(isobutyramidomethyl)benzamido)-1-(2-methoxyethyl)-1H-indole-2-carboxamide (Compound 123)

The title compound was obtained according to the same procedure as Example 116, except for using 3-chloro-4-fluoroaniline instead of 4-fluoroaniline.

1H NMR (300 MHz, DMSO-$d_6$) 10.53 (m, NH, 1H), 10.44 (s, NH, 1H), 8.38-8.34 (m, NH, 1H), 8.16 (s, 1H), 8.11-8.08 (m, 1H), 7.75-7.71 (m, 1H), 7.61-7.57 (m, 1H), 7.53-7.48 (m, 2H), 7.47-7.43 (m, 2H), 7.40-7.33 (m, 1H), 7.28 (s, 1H), 4.71 (m, 2H), 4.32-4.29 (m, 2H), 3.64-3.60 (m, 2H), 3.16 (s, 3H), 2.51-2.35 (m, 1H), 1.05-1.02 (m, 6H).

Example 124: Synthesis of 5-(2-chloro-5-(isobutyramidomethyl)benzamido)-N-(3-chloro-5-fluorophenyl)-1-(2-methoxyethyl)-1H-indole-2-carboxamide (Compound 124)

The title compound was obtained according to the same procedure as Example 116, except for using 3-chloro-5-fluoroaniline instead of 4-fluoroaniline.

1H NMR (300 MHz, DMSO-$d_6$) 10.65 (m, NH, 1H), 10.45 (s, NH, 1H), 8.39-8.34 (m, NH, 1H), 8.17 (s, 1H), 7.78 (s, 1H), 7.71-7.67 (m, 1H), 7.62-7.58 (m, 1H), 7.53-7.50 (m, 2H), 7.44 (s, 1H), 7.36-7.30 (m, 2H), 7.18-7.15 (m, 1H), 4.72 (m, 2H), 4.32-4.29 (m, 2H), 3.64-3.60 (m, 2H), 3.15 (s, 3H), 2.51-2.35 (m, 1H), 1.05-1.02 (m, 6H).

Example 125: Synthesis of 5-(2-chloro-5-(isobutyramidomethyl)benzamido)-N-(3-chlorophenyl)-1-(2-methoxyethyl)-1H-indole-2-carboxamide (Compound 125)

The title compound was obtained according to the same procedure as Example 116, except for using 3-chloroaniline instead of 4-fluoroaniline.

1H NMR (300 MHz, DMSO-$d_6$) 10.50-10.45 (m, NH, 2H), 8.39-8.34 (m, NH, 1H), 8.16 (s, 1H), 7.98 (s, 1H), 7.73-7.69 (m, 1H), 7.61-7.58 (m, 1H), 7.53-7.50 (m, 2H), 7.44 (s, 1H), 7.42-7.33 (m, 2H), 7.29 (s, 1H), 7.18-7.15 (m, 1H), 4.71 (m, 2H), 4.32-4.29 (m, 2H), 3.64-3.60 (m, 2H), 3.17 (s, 3H), 2.51-2.35 (m, 1H), 1.05-1.02 (m, 6H).

Example 126: Synthesis of 5-(2-chloro-5-(isobutyramidomethyl)benzamido)-N-(4-trifluoromethylphenyl)-1-(2-methoxyethyl)-1H-indole-2-carboxamide (Compound 126)

The title compound was obtained according to the same procedure as Example 116, except for using 4-trifluoromethylaniline instead of 4-fluoroaniline.

1H NMR (300 MHz, DMSO-$d_6$) 10.69-10.46 (m, NH, 2H), 8.39-8.34 (m, NH, 1H), 8.18 (s, 1H), 8.04-8.01 (m, 2H), 7.76-7.72 (m, 2H), 7.63-7.59 (m, 1H), 7.53-7.50 (m, 2H), 7.44 (s, 1H), 7.37-7.33 (m, 2H), 4.73 (m, 2H), 4.32-4.29 (m, 2H), 3.63 (m, 2H), 3.15 (s, 3H), 2.51-2.35 (m, 1H), 1.05-1.02 (m, 6H).

Example 127: Synthesis of 5-(2-chloro-5-(isobutyramidomethyl)benzamido)-N-(3-trifluoromethylphenyl)-1-(2-methoxyethyl)-1H-indole-2-carboxamide (Compound 127)

The title compound was obtained according to the same procedure as Example 116, except for using 3-trifluoromethylaniline instead of 4-fluoroaniline.

1H NMR (300 MHz, DMSO-$d_6$) 10.66 (br, NH, 1H), 10.46 (br, NH, 1H), 8.40-8.35 (m, NH, 1H), 8.27 (s, 1H), 8.17 (s, 1H), 8.06-8.03 (m, 1H), 7.64-7.58 (m, 2H), 7.53-7.47 (m, 2H), 7.44 (s, 2H), 7.37-7.33 (m, 2H), 4.73 (m, 2H), 4.32-4.29 (m, 2H), 3.66-3.62 (m, 2H), 3.15 (s, 3H), 2.51-2.35 (m, 1H), 1.05-1.02 (m, 6H).

Example 128: Synthesis of 5-(2-chloro-5-(isobutyramidomethyl)benzamido)-N-(3-fluorophenyl)-1-(2-methoxyethyl)-1H-indole-2-carboxamide (Compound 128)

The title compound was obtained according to the same procedure as Example 116, except for using 3-fluoroaniline instead of 4-fluoroaniline.

1H NMR (300 MHz, DMSO-$d_6$) 10.54 (br, NH, 1H), 10.46 (br, NH, 1H), 8.40-8.35 (m, NH, 1H), 8.17 (s, 1H), 7.78-7.73 (m, 1H), 7.61-7.56 (m, 2H), 7.53-7.50 (m, 2H), 7.43-7.41 (m, 2H), 7.39-7.33 (m, 1H), 7.28 (s, 1H), 6.97-6.94 (m, 1H), 4.72 (m, 2H), 4.32-4.29 (m, 2H), 3.66-3.62 (m, 2H), 3.15 (s, 3H), 2.51-2.35 (m, 1H), 1.05-1.02 (m, 6H).

Example 129: Synthesis of 5-(2-chloro-5-(isobutyramidomethyl)benzamido)-N-(3-fluoro-5-trifluoromethylphenyl)-1-(2-methoxyethyl)-1H-indole-2-carboxamide (Compound 129)

The title compound was obtained according to the same procedure as Example 116, except for using 3-fluoro-5-trifluoromethylaniline instead of 4-fluoroaniline.

1H NMR (300 MHz, DMSO-$d_6$) 10.81 (br, NH, 1H), 10.47 (br, NH, 1H), 8.40-8.35 (m, NH, 1H), 8.19 (s, 1H), 8.07 (s, 1H), 8.07-7.99 (m, 1H), 7.63-7.60 (m, 1H), 7.54-7.50 (m, 2H), 7.45-7.40 (m, 2H), 7.35 (m, 21H), 4.72 (m, 2H), 4.32-4.29 (m, 2H), 3.66-3.62 (m, 2H), 3.15 (s, 3H), 2.51-2.35 (m, 1H), 1.05-1.02 (m, 6H).

Example 130: Synthesis of 5-(2-chloro-5-(isobutyramidomethyl)benzamido)-N-(3,4-dichlorophenyl)-1-(2-methoxyethyl)-1H-indole-2-carboxamide (Compound 130)

The title compound was obtained according to the same procedure as Example 116, except for using 3,4-dichloroaniline instead of 4-fluoroaniline.

1H NMR (300 MHz, DMSO-$d_6$) 10.61 (br, NH, 1H), 10.46 (br, NH, 1H), 8.40-8.35 (m, NH, 1H), 8.18-8.16 (s, 2H), 7.78-7.74 (m, 1H), 7.65-7.58 (m, 2H), 7.53-7.48 (m, 2H), 7.44 (m, 1H), 7.36-7.30 (m, 21H), 4.72 (m, 2H), 4.32-4.29 (m, 2H), 3.65-3.60 (m, 2H), 3.15 (s, 3H), 2.51-2.35 (m, 1H), 1.05-1.02 (m, 6H).

Example 131: Synthesis of 5-(2-chloro-5-(isobutyramidomethyl)benzamido)-N-(2,4-dichlorophenyl)-1-(2-methoxyethyl)-1H-indole-2-carboxamide (Compound 131)

The title compound was obtained according to the same procedure as Example 116, except for using 2,4-dichloroaniline instead of 4-fluoroaniline.

1H NMR (300 MHz, DMSO-$d_6$) 10.46 (br, NH, 1H), 10.14 (br, NH, 1H), 8.40-8.35 (m, NH, 1H), 8.16 (s, 1H), 7.76 (m, 1H), 7.67-7.64 (m, 1H), 7.61-7.57 (m, 1H), 7.54-7.48 (m, 3H), 7.44 (s, 1H), 7.35 (m, 2H), 4.71 (m, 2H), 4.32-4.29 (m, 2H), 3.65-3.60 (m, 2H), 3.17 (s, 3H), 2.51-2.35 (m, 1H), 1.05-1.02 (m, 6H).

Example 132: Synthesis of 5-(2-chloro-5-(isobutyramidomethyl)benzamido)-N-(3,5-dichlorophenyl)-1-(2-methoxyethyl)-1H-indole-2-carboxamide (Compound 132)

The title compound was obtained according to the same procedure as Example 116, except for using 3,5-dichloroaniline instead of 4-fluoroaniline.

1H NMR (300 MHz, DMSO-$d_6$) 10.61 (br, NH, 1H), 10.46 (br, NH, 1H), 8.40-8.35 (m, NH, 1H), 8.17 (s, 2H), 7.78-7.74 (m, 1H), 7.65-7.58 (m, 2H), 7.53-7.48 (m, 2H), 7.44 (m, 1H), 7.37-7.30 (m, 2H), 4.72 (m, 2H), 4.32-4.29 (m, 2H), 3.65-3.60 (m, 2H), 3.15 (s, 3H), 2.51-2.35 (m, 1H), 1.05-1.02 (m, 6H).

Example 133: Synthesis of 5-(2-chloro-5-(isobutyramidomethyl)benzamido)-N-(3,4-difluorophenyl)-1-(2-methoxyethyl)-1H-indole-2-carboxamide (Compound 133)

The title compound was obtained according to the same procedure as Example 116, except for using 3,4-difluoroaniline instead of 4-fluoroaniline.

1H NMR (300 MHz, DMSO-$d_6$) 10.56 (br, NH, 1H), 10.46 (br, NH, 1H), 8.40-8.35 (m, NH, 1H), 8.18-8.16 (s, 2H), 7.98-7.90 (m, 1H), 7.61-7.39 (m, 6H), 7.37-7.33 (m, 1H), 7.27 (s, 1H), 4.72 (m, 2H), 4.32-4.29 (m, 2H), 3.65-3.60 (m, 2H), 3.15 (s, 3H), 2.51-2.35 (m, 1H), 1.05-1.02 (m, 6H).

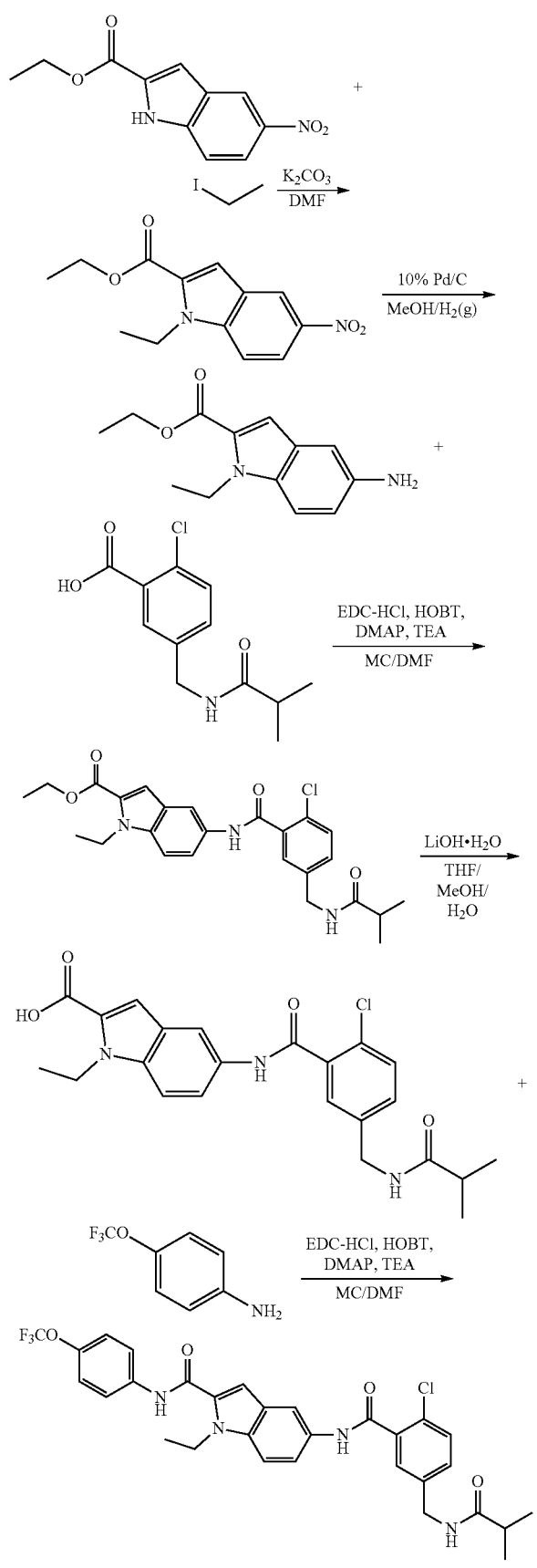

Example 134: Synthesis of 5-(2-chloro-5-(isobutyramidomethyl)benzamido)-1-ethyl-N-(4-(trifluoromethoxy)phenyl)-1H-indole-2-carboxamide (Compound 134)

Example 134-1: Synthesis of ethyl 1-ethyl-5-nitro-1H-indole-2-carboxylate

Ethyl 5-nitro-1H-indole-2-carboxylate (3 g, 12.8 mmol) and iodoethane (4 g, 25.6 mmol) were added to a 100 mL flask and dissolved in DMF (40 ml). K$_2$CO$_3$ (5.3 g, 38.4 mmol) was added thereto and stirred at room temperature for 12 hours. After the reaction was completed, the organic material was extracted with ethyl acetate/H$_2$O. The organic layer was dried over MgSO$_4$ and distilled under reduced pressure to remove the solvent. The residue was subjected to column chromatography (ethyl acetate:n-hexane=1:3) to obtain ethyl 1-ethyl-5-nitro-1H-indole-2-carboxylate (3.1 g, 11.82 mmol, 92%, white solid).

1H NMR (300 MHz, DMSO-d$_6$) 8.73 (m, 1H), 8.17-8.15 (m, 1H), 7.86-7.84 (m, 1H), 7.55-7.54 (m, 1H), 4.65-4.64 (m, 2H), 4.38-4.34 (m, 2H), 1.35-1.30 (m, 6H).

Example 134-2: Synthesis of ethyl 5-amino-1-ethyl-1H-indole-2-carboxylate

Ethyl 1-ethyl-5-nitro-1H-indole-2-carboxylate (3.1 g, 11.82 mmol) was added to a 100 mL flask and dissolved in MeOH (50 ml). 10% Pd/C (1.5 g) was added thereto and stirred for 12 hours at room temperature under H$_2$ (g). After Celite filtration upon completion of the reaction, the solvent was removed by distillation under reduced pressure. The residue was subjected to column chromatography (ethyl acetate:n-hexane=1:3) to obtain ethyl 5-amino-1-ethyl-1H-indole-2-carboxylate (2.5 g, 10.76 mmol, 91%).

1H NMR (300 MHz, DMSO-d$_6$) 7.29-7.27 (m, 1H), 6.95-6.93 (m, 1H), 6.77-6.70 (m, 2H), 4.71 (Br, NH, 2H), 4.47-4.46 (m, 2H), 4.29-4.25 (m, 2H), 1.33-1.29 (m, 3H), 1.23 (m, 3H).

Example 134-3: Synthesis of ethyl 5-(2-chloro-5-(isobutyramidomethyl)benzamido)-1-ethyl-1H-indole-2-carboxylate Ethyl 5-amino-1-ethyl-1H-indole-2-carboxylate (1 g, 4.3 mmol) and 2-chloro-5-(isobutyramidomethyl)benzoic acid (1.32 g, 5.16 mmol) were added to a 100 mL flask and dissolved in CH$_2$Cl$_2$ (20 ml) and DMF (4 ml). HOBT (1.16 g, 8.6 mmol) and DMAP (1.05 g, 8.6 mmol) were added thereto and reacted for 10 minutes. Then, EDC (1.64 g, 8.6 mmol) and TEA (1.2 ml, 8.6 mmol) were added and stirred under reflux for 12 hours. After completion of the reaction, the organic material was extracted with CH$_2$Cl$_2$/H$_2$O. The organic layer was dried over MgSO$_4$ and distilled under reduced pressure to remove the solvent. The residue was subjected to column chromatography (ethyl acetate:n-hexane=3:1) to obtain ethyl 5-(2-chloro-5-(isobutyramidomethyl)benzamido)-1-ethyl-1H-indole-2-carboxylate (1.68 g, 3.57 mmol, 83%, white solid).

1H NMR (300 MHz, DMSO-d$_6$) 10.46 (br, NH, 1H), 8.37 (m, NH, 1H), 8.17 (m, 1H), 7.61-7.50 (m, 3H), 7.43 (m, 1H), 7.35-7.33 (m, 1H), 7.26 (m, 1H), 4.59-4.57 (m, 2H), 4.36-4.29 (m, 4H), 2.50-2.38 (m, 1H), 1.36-1.26 (m, 6H), 1.04-1.02 (m, 6H).

Example 134-4: Synthesis of 5-(2-chloro-5-(isobutyramidomethyl)benzamido)-1-ethyl-1H-indole-2-carboxylic acid Ethyl 5-(2-chloro-5-(isobutyramidomethyl)benzamido)-1-ethyl-1H-indole-2-carboxylate (1.68 g, 3.57 mmol) was added to a 500 mL flask and dissolved in THF (30 ml) and MeOH (30 ml). LiOH (749 mg, 17.85 mmol) dissolved in H$_2$O (30 ml) was added and stirred for 12 hours. After concentration upon completion of the reaction, the pH was adjusted to 2 with 2N—HCl. The resulting solid was filtered to obtain 5-(2-chloro-5-(isobutyramidomethyl)benzamido)-1-ethyl-1H-indole-2-carboxylic acid (1.48 g, 3.35 mmol, 94%, white solid).

1H NMR (300 MHz, DMSO-d$_6$) 12.90 (br, OH, 1H), 10.44 (br, NH, 1H), 8.38-8.34 (m, NH, 1H), 8.16 (m, 1H), 7.59-7.49 (m, 3H), 7.43 (m, 1H), 7.36-7.33 (m, 1H), 7.21 (m, 1H), 4.60-4.57 (m, 2H), 4.30-4.29 (m, 2H), 2.50-2.38 (m, 1H), 1.29-1.25 (m, 3H), 1.04-1.02 (m, 6H).

Example 134-5: Synthesis of 5-(2-chloro-5-(isobutyramidomethyl)benzamido)-1-ethyl-N-(4-(trifluoromethoxy)phenyl)-1H-indole-2-carboxamide (Compound 134)

5-(2-chloro-5-(isobutyramidomethyl)benzamido)-1-ethyl-1H-indole-2-carboxylic acid (150 mg, 0.34 mmol) and 4-(trifluoromethoxy)aniline (90 mg, 0.51 mmol) were added to a 10 mL flask and dissolved in CH$_2$Cl$_2$ (5 ml) and DMF (1 ml). HOBT (91 mg, 0.68 mmol) and DMAP (83 mg, 0.68 mmol) were added thereto and reacted for 10 minutes. EDC (130 mg, 0.68 mmol) and TEA (95 μl, 0.68 mmol) were added and stirred under reflux for 12 hours. After the reaction was completed, the organic material was extracted with ethyl acetate/H$_2$O. The organic layer was dried over MgSO$_4$ and distilled under reduced pressure to remove the solvent. The residue was subjected to column chromatography (ethyl acetate:n-hexane=3:1) to obtain 5-(2-chloro-5-(isobutyramidomethyl)benzamido)-1-ethyl-N-(4-(trifluoromethoxy)phenyl)-1H-indole-2-carboxamide (100 mg, 0.166 mmol, 49%, white solid).

1H NMR (300 MHz, DMSO-d$_6$) 10.49 (br, NH, 1H), 10.44 (br, NH, 1H), 8.36 (m, NH, 1H), 8.18 (m, 1H), 7.92-7.89 (m, 2H), 7.60-7.57 (m, 1H), 7.53-7.50 (m, 2H), 7.44 (m, 1H), 7.39-7.32 (m, 4H), 4.58-4.56 (m, 2H), 4.31-4.29 (m, 2H), 2.50-2.39 (m, 1H), 1.33-1.29 (m, 3H), 1.05-1.02 (m, 6H).

Example 135: Synthesis of 5-(2-chloro-5-(isobutyramidomethyl)benzamido)-1-ethyl-N-(4-(trifluoromethyl)phenyl)-1H-indole-2-carboxamide (Compound 135)

The title compound was obtained according to the same procedure as Example 134, except for using 4-(trifluoromethyl)aniline instead of 4-(trifluoromethoxy)aniline.

1H NMR (300 MHz, DMSO-d$_6$) 10.63 (br, NH, 1H), 10.46 (br, NH, 1H), 8.36 (m, NH, 1H), 8.19 (m, 1H), 8.04-8.01 (m, 2H), 7.74-7.72 (m, 2H), 7.61-7.58 (m, 1H), 7.54-7.50 (m, 2H), 7.44 (m, 1H), 7.37-7.32 (m, 2H), 4.59-4.57 (m, 2H), 4.31-4.29 (m, 2H), 2.50-2.39 (m, 1H), 1.34-1.29 (m, 3H), 1.05-1.02 (m, 6H).

Example 136: Synthesis of 5-(2-chloro-5-(isobutyramidomethyl)benzamido)-1-ethyl-N-(3-(trifluoromethyl)phenyl)-1H-indole-2-carboxamide (Compound 136)

The title compound was obtained according to the same procedure as Example 134, except for using 3-(trifluoromethyl)aniline instead of 4-(trifluoromethoxy)aniline.

1H NMR (300 MHz, DMSO-d$_6$) 10.62 (br, NH, 1H), 10.47 (br, NH, 1H), 8.38 (m, NH, 1H), 8.28 (m, 1H), 8.20 (m, 1H), 8.06-8.04 (m, 1H), 7.64-7.59 (m, 2H), 7.53-7.51 (m, 2H), 7.48-7.45 (m, 2H), 7.36-7.34 (m, 2H), 4.59-4.57 (m, 2H), 4.31-4.29 (m, 2H), 2.50-2.39 (m, 1H), 1.34-1.30 (m, 3H), 1.05-1.02 (m, 6H).

Example 137: Synthesis of 5-(2-chloro-5-(isobutyramidomethyl)benzamido)-1-ethyl-N-(4-fluorophenyl)-1H-indole-2-carboxamide (Compound 137)

The title compound was obtained according to the same procedure as Example 134, except for using 4-fluoroaniline instead of 4-(trifluoromethoxy)aniline.

1H NMR (300 MHz, DMSO-d$_6$) 10.44 (br, NH, 1H), 10.37 (br, NH, 1H), 8.36 (m, NH, 1H), 8.17 (m, 1H), 7.82-7.78 (m, 2H), 7.60-7.57 (m, 1H), 7.53-7.50 (m, 2H), 7.44 (m, 1H), 7.36-7.33 (m, 1H), 7.28 (m, 1H), 7.23-7.17 (m, 2H), 4.58-4.56 (m, 2H), 4.31-4.29 (m, 2H), 2.50-2.39 (m, 1H), 1.33-1.28 (m, 3H), 1.05-1.02 (m, 6H).

Example 138: Synthesis of 5-(2-chloro-5-(isobutyramidomethyl)benzamido)-N-(4-chlorophenyl)-1-ethyl-1H-indole-2-carboxamide (Compound 138)

The title compound was obtained according to the same procedure as Example 134, except for using 4-chloroaniline instead of 4-(trifluoromethoxy)aniline.

1H NMR (300 MHz, DMSO-d$_6$) 10.46 (br, NH, 1H), 10.45 (br, NH, 1H), 8.38 (m, NH, 1H), 8.18 (m, 1H), 7.84-7.81 (m, 2H), 7.60-7.57 (m, 1H), 7.53-7.50 (m, 2H), 7.44-7.41 (m, 3H), 7.36-7.30 (m, 2H), 4.58-4.56 (m, 2H), 4.31-4.29 (m, 2H), 2.50-2.39 (m, 1H), 1.33-1.28 (m, 3H), 1.04-1.02 (m, 6H).

Example 139: Synthesis of 5-(2-chloro-5-(isobutyramidomethyl)benzamido)-1-ethyl-N-(3-fluorophenyl)-1H-indole-2-carboxamide (Compound 139)

The title compound was obtained according to the same procedure as Example 134, except for using 3-fluoroaniline instead of 4-(trifluoromethoxy)aniline.

1H NMR (300 MHz, DMSO-d$_6$) 10.50 (br, NH, 1H), 10.47 (br, NH, 1H), 8.38 (m, NH, 1H), 8.18 (m, 1H), 7.78-7.74 (m, 2H), 7.61-7.50 (m, 4H), 7.44-7.32 (m, 4H), 6.96-6.91 (m, 1H), 4.58-4.56 (m, 2H), 4.31-4.29 (m, 2H), 2.50-2.39 (m, 1H), 1.33-1.29 (m, 3H), 1.05-1.02 (m, 6H).

Example 140: Synthesis of 5-(2-chloro-5-(isobutyramidomethyl)benzamido)-1-ethyl-N-(3-(trifluoromethoxy)phenyl)-1H-indole-2-carboxamide (Compound 140)

The title compound was obtained according to the same procedure as Example 134, except for using 3-(trifluoromethoxy)aniline instead of 4-(trifluoromethoxy)aniline.

1H NMR (300 MHz, DMSO-d$_6$) 10.57 (br, NH, 1H), 10.47 (br, NH, 1H), 8.38 (m, NH, 1H), 8.19 (m, 1H), 7.94 (m, 1H), 7.80-7.77 (m, 1H), 7.62-7.59 (m, 1H), 7.53-7.47 (m, 3H), 7.44 (m, 1H), 7.36-7.34 (m, H), 7.11-7.09 (m, 1H), 4.58-4.56 (m, 2H), 4.31-4.29 (m, 2H), 2.50-2.39 (m, 1H), 1.34-1.29 (m, 3H), 1.05-1.02 (m, 6H).

Example 141: Synthesis of 5-(2-chloro-5-(isobutyramidomethyl)benzamido)-N-(3-chlorophenyl)-1-ethyl-1H-indole-2-carboxamide (Compound 141)

The title compound was obtained according to the same procedure as Example 134, except for using 3-chloroaniline instead of 4-(trifluoromethoxy)aniline.

1H NMR (300 MHz, DMSO-d₆) 10.47 (br, NH, 2H), 8.38 (m, NH, 1H), 8.18 (m, 1H), 7.99 (m, 1H), 7.72-7.70 (m, 1H), 7.61-7.58 (m, 1H), 7.53-7.50 (m, 2H), 7.44 (m, 1H), 7.42-7.32 (m, 3H), 7.18-7.15 (m, 1H), 4.58-4.56 (m, 2H), 4.31-4.29 (m, 2H), 2.50-2.39 (m, 1H), 1.33-1.29 (m, 3H), 1.04-1.02 (m, 6H).

Example 142: Synthesis of 5-(2-chloro-5-(isobu-tyramidomethyl)benzamido)-N-(2,4-difluorophe-nyl)-1-ethyl-1H-indole-2-carboxamide (Compound 142)

The title compound was obtained according to the same procedure as Example 134, except for using 2,4-difluoroaniline instead of 4-(trifluoromethoxy)aniline.

1H NMR (300 MHz, DMSO-d₆) 10.47 (br, NH, 1H), 10.16 (br, NH, 1H), 8.39 (m, NH, 1H), 8.19 (m, 1H), 7.65-7.57 (m, 2H), 7.53-7.48 (m, 2H), 7.44 (m, 1H), 7.39-7.33 (m, 3H), 7.17-7.11 (m, 1H), 4.58-4.56 (m, 2H), 4.31-4.29 (m, 2H), 2.50-2.39 (m, 1H), 1.30-1.26 (m, 3H), 1.05-1.02 (m, 6H).

Example 143: Synthesis of 5-(2-chloro-5-(isobu-tyramidomethyl)benzamido)-1-ethyl-N-(4-fluoro-3-(trifluoromethyl)phenyl)-1H-indole-2-carboxamide (Compound 143)

The title compound was obtained according to the same procedure as Example 134, except for using 4-fluoro-3-(trifluoromethyl)aniline instead of 4-(trifluoromethoxy)aniline.

1H NMR (300 MHz, DMSO-d₆) 10.64 (br, NH, 1H), 10.47 (br, NH, 1H), 8.38 (m, NH, 1H), 8.29-8.27 (m, 1H), 8.20 (m, 1H), 8.11-7.08 (m, 1H), 7.63-7.59 (m, 1H), 7.53-7.50 (m, 3H), 7.44 (m, 1H), 7.34 (m, 2H), 4.59-4.57 (m, 2H), 4.31-4.29 (m, 2H), 2.50-2.39 (m, 1H), 1.34-1.29 (m, 3H), 1.05-1.02 (m, 6H).

Example 144: Synthesis of 5-(2-chloro-5-(isobu-tyramidomethyl)benzamido)-1-ethyl-N-(2-fluoro-phenyl)-1H-indole-2-carboxamide (Compound 144)

The title compound was obtained according to the same procedure as Example 134, except for using 2-fluoroaniline instead of 4-(trifluoromethoxy)aniline.

1H NMR (300 MHz, DMSO-d₆) 10.46 (br, NH, 1H), 10.14 (br, NH, 1H), 8.38 (m, NH, 1H), 8.18 (m, 1H), 7.64-7.57 (m, 2H), 7.53-7.49 (m, 2H), 7.44 (m, 1H), 7.35-7.24 (m, 5H), 4.58-4.56 (m, 2H), 4.31-4.29 (m, 2H), 2.50-2.39 (m, 1H), 1.31-1.26 (m, 3H), 1.05-1.02 (m, 6H).

Example 145: Synthesis of N-(3-chloro-4-fluoro-phenyl)-5-(2-chloro-5-(isobutyramidomethyl)ben-zamido)-1-ethyl-1H-indole-2-carboxamide (Compound 145)

The title compound was obtained according to the same procedure as Example 134, except for using 3-chloro-4-fluoroaniline instead of 4-(trifluoromethoxy)aniline.

1H NMR (300 MHz, DMSO-d₆) 10.451 (br, NH, 1H), 10.47 (br, NH, 1H), 8.38 (m, NH, 1H), 8.19 (m, 1H), 8.12-8.09 (m, 1H), 7.75-7.71 (m, 1H), 7.61-7.58 (m, 1H), 7.53-7.50 (m, 2H), 7.46-7.40 (m, 2H), 7.36-7.31 (m, 2H), 4.58-4.56 (m, 2H), 4.31-4.29 (m, 2H), 2.50-2.39 (m, 1H), 1.33-1.29 (m, 3H), 1.04-1.02 (m, 6H).

Example 146: Synthesis of 5-(2-chloro-5-(isobu-tyramidomethyl)benzamido)-1-ethyl-N-(3-fluoro-5-(trifluoromethyl)phenyl)-1H-indole-2-carboxamide (Compound 146)

The title compound was obtained according to the same procedure as Example 134, except for using 3-fluoro-5-(trifluoromethyl)aniline instead of 4-(trifluoromethoxy)aniline.

1H NMR (300 MHz, DMSO-d₆) 10.77 (br, NH, 1H), 10.48 (br, NH, 1H), 8.38 (m, NH, 1H), 8.21 (m, 1H), 8.07 (m, 1H), 8.03-8.00 (m, 1H), 7.63-7.60 (m, 1H), 7.55-7.50 (m, 2H), 7.44 (m, 1H), 7.44-7.34 (m, 3H), 4.59-4.57 (m, 2H), 4.31-4.29 (m, 2H), 2.50-2.39 (m, 1H), 1.34-1.30 (m, 3H), 1.05-1.02 (m, 6H).

Example 147: Synthesis of 5-(2-chloro-5-(isobu-tyramidomethyl)benzamido)-N-(4-cyanophenyl)-1-ethyl-1H-indole-2-carboxamide (Compound 147)

The title compound was obtained according to the same procedure as Example 134, except for using 4-aminobenzo-nitrile instead of 4-(trifluoromethoxy)aniline.

1H NMR (300 MHz, DMSO-d₆) 10.71 (br, NH, 1H), 10.48 (br, NH, 1H), 8.38 (m, NH, 1H), 8.20 (m, 1H), 8.02-7.99 (m, 2H), 7.85-7.82 (m, 2H), 7.62-7.59 (m, 1H), 7.54-7.50 (m, 2H), 7.44 (m, 1H), 7.37-7.33 (m, 2H), 4.58-4.56 (m, 2H), 4.31-4.29 (m, 2H), 2.50-2.39 (m, 1H), 1.34-1.29 (m, 3H), 1.05-1.02 (m, 6H).

Example 148: Synthesis of N-(4-chloro-2-meth-ylphenyl)-5-(2-chloro-5-(isobutyramidomethyl)ben-zamido)-1-ethyl-1H-indole-2-carboxamide (Compound 148)

The title compound was obtained according to the same procedure as Example 134, except for using 4-chloro-2-methylaniline instead of 4-(trifluoromethoxy)aniline.

1H NMR (300 MHz, DMSO-d₆) 10.46 (br, NH, 1H), 9.95 (br, NH, 1H), 8.38 (m, NH, 1H), 8.17 (m, 1H), 7.60-7.57 (m, 1H), 7.53-7.50 (m, 2H), 7.44-7.39 (m, 3H), 7.36-7.29 (m, 3H), 4.58-4.56 (m, 2H), 4.31-4.29 (m, 2H), 2.50-2.39 (m, 1H), 2.28 (s, 3H), 1.31-1.27 (m, 3H), 1.05-1.02 (m, 6H).

Example 149: Synthesis of N-(4-fluoro-2-meth-ylphenyl)-5-(2-chloro-5-(isobutyramidomethyl)ben-zamido)-1-ethyl-1H-indole-2-carboxamide (Compound 149)

The title compound was obtained according to the same procedure as Example 134, except for using 4-fluoro-2-methylaniline instead of 4-(trifluoromethoxy)aniline.

1H NMR (300 MHz, DMSO-d₆) 10.46 (br, NH, 1H), 9.93 (br, NH, 1H), 8.38 (m, NH, 1H), 8.17 (m, 1H), 7.659-7.49 (m, 3H), 7.44 (m, 1H), 7.40-7.29 (m, 3H), 7.18-7.15 (m, 1H), 7.10-7.05 (m, 1H), 4.58-4.56 (m, 2H), 4.31-4.29 (m, 2H), 2.50-2.39 (m, 1H), 2.27 (s, 3H), 1.31-1.27 (m, 3H), 1.05-1.02 (m, 6H).

Example 150: Synthesis of 5-(2-chloro-5-(isobu-tyramidomethyl)benzamido)-N-(3,5-difluorophe-nyl)-1-ethyl-1H-indole-2-carboxamide (Compound 150)

The title compound was obtained according to the same procedure as Example 134, except for using 3,5-difluoroaniline instead of 4-(trifluoromethoxy)aniline.

1H NMR (300 MHz, DMSO-d$_6$) 10.64 (br, NH, 1H), 10.47 (br, NH, 1H), 8.38 (m, NH, 1H), 8.19 (m, 1H), 7.62-7.50 (m, 5H), 7.44 (m, 1H), 7.36-7.33 (m, 2H), 7.00-6.94 (m, 1H), 4.57-4.55 (m, 2H), 4.31-4.29 (m, 2H), 2.50-2.39 (m, 1H), 1.33-1.29 (m, 3H), 1.05-1.02 (m, 6H).

Example 151: Synthesis of 5-(2-chloro-5-(isobutyramidomethyl)benzamido)-N-(3-chloro-5-fluorophenyl)-1-ethyl-1H-indole-2-carboxamide (Compound 151)

The title compound was obtained according to the same procedure as Example 134, except for using 3-chloro-5-fluoroaniline instead of 4-(trifluoromethoxy)aniline.

1H NMR (300 MHz, DMSO-d$_6$) 10.62 (br, NH, 1H), 10.48 (br, NH, 1H), 8.38 (m, NH, 1H), 8.20 (m, 1H), 7.78 (m, 1H), 7.71-7.67 (m, 1H), 7.62-7.59 (m, 1H), 7.54-7.50 (m, 2H), 7.44 (m, 1H), 7.36-7.34 (m, 2H), 7.18-7.15 (m, 1H), 4.58-4.56 (m, 2H), 4.31-4.29 (m, 2H), 2.50-2.39 (m, 1H), 1.33-1.29 (m, 3H), 1.04-1.02 (m, 6H).

Example 152: Synthesis of 5-(2-chloro-5-(isobutyramidomethyl)benzamido)-1-ethyl-N-(2-fluoro-4-(trifluoromethyl)phenyl)-1H-indole-2-carboxamide (Compound 152)

The title compound was obtained according to the same procedure as Example 134, except for using 2-fluoro-4-(trifluoromethyl)aniline instead of 4-(trifluoromethoxy)aniline.

1H NMR (300 MHz, DMSO-d$_6$) 10.48 (br, NH, 1H), 10.41 (br, NH, 1H), 8.38 (m, NH, 1H), 8.20 (m, 1H), 7.99-7.94 (m, 1H), 7.83-7.79 (m, 1H), 7.65-7.59 (m, 2H), 7.53-7.50 (m, 2H), 7.44 (m, 1H), 7.40-7.34 (m, 2H), 4.59-4.57 (m, 2H), 4.31-4.29 (m, 2H), 2.50-2.39 (m, 1H), 1.32-1.28 (m, 3H), 1.05-1.02 (m, 6H).

Example 153: Synthesis of N-(4-chloro-3-fluorophenyl)-5-(2-chloro-5-(isobutyramidomethyl)benzamido)-1-ethyl-1H-indole-2-carboxamide (Compound 153)

The title compound was obtained according to the same procedure as Example 134, except for using 4-chloro-3-fluoroaniline instead of 4-(trifluoromethoxy)aniline.

1H NMR (300 MHz, DMSO-d$_6$) 10.60 (br, NH, 1H), 10.46 (br, NH, 1H), 8.37 (m, NH, 1H), 8.19 (m, 1H), 7.97-7.93 (m, 1H), 7.64-7.57 (m, 3H), 7.54-7.50 (m, 2H), 7.44 (m, 1H), 7.36-7.33 (m, 2H), 4.58-4.56 (m, 2H), 4.31-4.29 (m, 2H), 2.50-2.39 (m, 1H), 1.33-1.29 (m, 3H), 1.05-1.02 (m, 6H).

Example 154: Synthesis of N-(4-chloro-2-fluorophenyl)-5-(2-chloro-5-(isobutyramidomethyl)benzamido)-1-ethyl-1H-indole-2-carboxamide (Compound 154)

The title compound was obtained according to the same procedure as Example 134, except for using 4-chloro-2-fluoroaniline instead of 4-(trifluoromethoxy)aniline.

1H NMR (300 MHz, DMSO-d$_6$) 10.45 (br, NH, 1H), 10.21 (br, NH, 1H), 8.37 (m, NH, 1H), 8.18 (m, 1H), 7.69-7.64 (m, 1H), 7.60-7.50 (m, 4H), 7.44 (m, 1H), 7.34 (m, 3H), 4.58-4.55 (m, 2H), 4.31-4.29 (m, 2H), 2.50-2.39 (m, 1H), 1.31-1.26 (m, 3H), 1.05-1.02 (m, 6H).

Example 155: Synthesis of N-(2-chloro-4-fluorophenyl)-5-(2-chloro-5-(isobutyramidomethyl)benzamido)-1-ethyl-1H-indole-2-carboxamide (Compound 155)

The title compound was obtained according to the same procedure as Example 134, except for using 2-chloro-4-fluoroaniline instead of 4-(trifluoromethoxy)aniline.

1H NMR (300 MHz, DMSO-d$_6$) 10.45 (br, NH, 1H), 10.10 (br, NH, 1H), 8.36 (m, NH, 1H), 8.18 (m, 1H), 7.65-7.57 (m, 3H), 7.53-7.50 (m, 2H), 7.44 (m, 1H), 7.36-7.27 (m, 3H), 4.58-4.56 (m, 2H), 4.31-4.29 (m, 2H), 2.50-2.39 (m, 1H), 1.31-1.26 (m, 3H), 1.05-1.02 (m, 6H).

Example 156: Synthesis of 5-(2-chloro-5-(isobutyramidomethyl)benzamido)-N-(4-cyclohexylphenyl)-1-ethyl-1H-indole-2-carboxamide (Compound 156)

The title compound was obtained according to the same procedure as Example 134, except for using 4-cyclohexylaniline instead of 4-(trifluoromethoxy)aniline.

1H NMR (300 MHz, DMSO-d$_6$) 10.45 (br, NH, 1H), 10.24 (br, NH, 1H), 8.38 (m, NH, 1H), 8.16 (m, 1H), 7.69-7.66 (m, 2H), 7.59-7.50 (m, 3H), 7.44 (m, 1H), 7.36-7.33 (m, 1H), 7.26 (m, 1H), 7.21-7.19 (m, 2H), 4.58-4.55 (m, 2H), 4.31-4.29 (m, 2H), 2.50-2.39 (m, 1H), 1.80-1.69 (m, 5H), 1.42-1.15 (m, 9H), 1.05-1.02 (m, 6H).

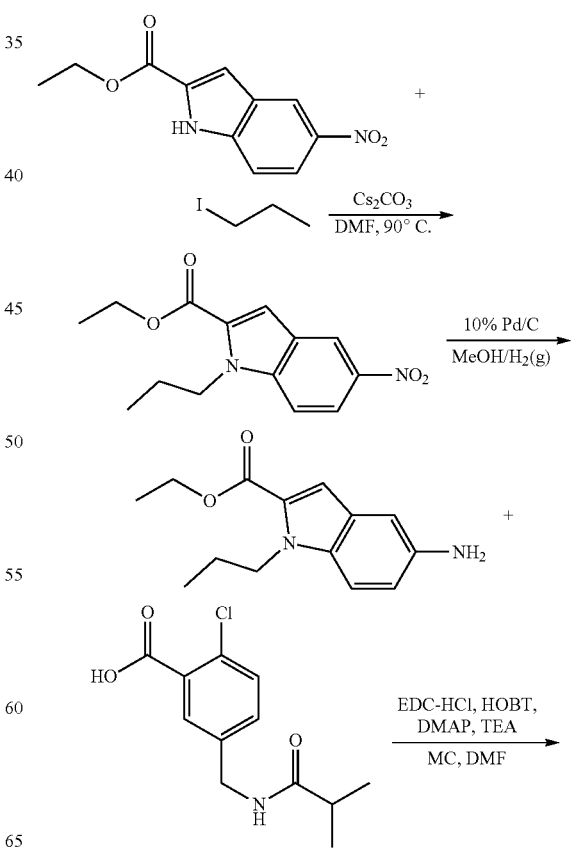

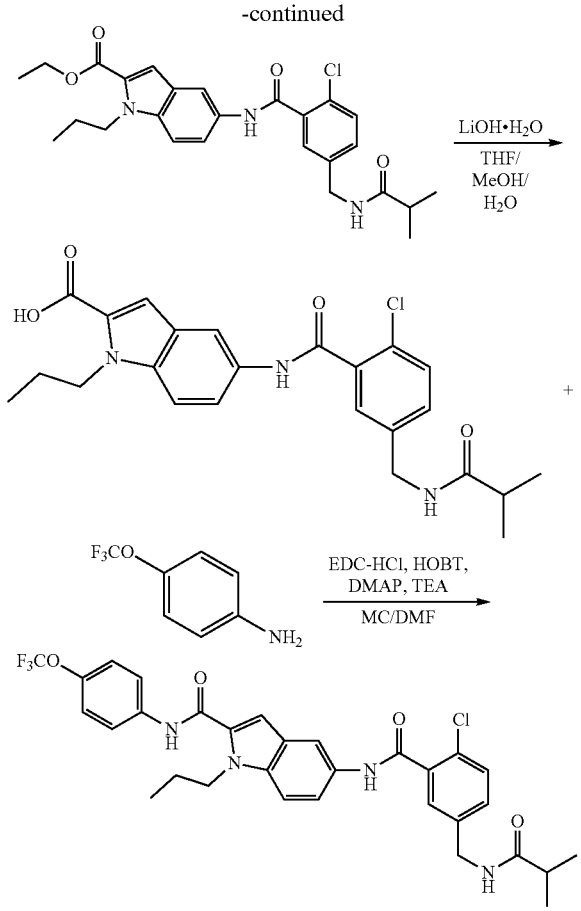

Example 157: Synthesis of 5-(2-chloro-5-(isobutyramidomethyl)benzamido)-1-propyl-N-(4-(trifluoromethoxy)phenyl)-1H-indole-2-carboxamide (Compound 157)

Example 157-1: Synthesis of ethyl 5-nitro-1-propyl-1H-indole-2-carboxylate

Ethyl 5-nitro-1H-indole-2-carboxylate (5 g, 21.34 mmol) and 1-iodopropane (6.24 ml, 64.02 mmol) were added to a 100 mL flask and dissolved in DMF (50 ml). Cs$_2$CO$_3$ (20.86 g, 64.02 mmol) was added thereto and stirred at 90° C. for 12 hours. After the reaction was completed, the organic material was extracted with ethyl acetate/H$_2$O. The organic layer was dried over MgSO$_4$ and distilled under reduced pressure to remove the solvent. The residue was subjected to column chromatography (ethyl acetate:n-hexane=1:3) to obtain ethyl 5-nitro-1-propyl-1H-indole-2-carboxylate (5.2 g, 18.82 mmol, 88%, solid).

1H NMR (300 MHz, DMSO-d$_6$) 8.75-8.74 (m, 1H), 8.18-8.14 (m, 1H), 7.89-7.86 (m, 1H), 7.57 (m, 1H), 4.61-4.56 (m, 2H), 4.39-4.32 (m, 2H), 1.77-1.70 (m, 2H), 1.37-1.33 (m, 3H), 0.90-0.81 (m, 3H).

Example 157-2: Synthesis of ethyl 5-amino-1-propyl-1H-indole-2-carboxylate

Ethyl 5-nitro-1-propyl-1H-indole-2-carboxylate (5.2 g, 18.82 mmol) was added to a 100 mL flask and dissolved in MeOH (150 ml). 10% Pd/C (2.5 g) was added and the mixture was stirred for 12 hours at room temperature under H$_2$ (g). After Celite filtration upon completion of the reaction, the solvent was removed by distillation under reduced pressure. The residue was subjected to column chromatography (ethyl acetate:n-hexane=1:3) to obtain ethyl 5-amino-1-propyl-1H-indole-2-carboxylate (4.3 g, 17.45 mmol, 92.8%).

1H NMR (300 MHz, DMSO-d$_6$) 7.31-7.28 (m, 1H), 6.95 (m, 1H), 6.77-6.73 (m, 1H), 6.71-6.70 (m, 1H), 4.72 (br, NH, 2H), 4.42-4.38 (m, 2H), 4.31-4.23 (m, 2H), 1.69-1.61 (m, 2H), 1.33-1.28 (m, 3H), 0.83-0.78 (m, 3H).

Example 157-3: Synthesis of ethyl 5-(2-chloro-5-(isobutyramidomethyl)benzamido)-1-propyl-1H-indole-2-carboxylate Ethyl 5-amino-1-propyl-1H-indole-2-carboxylate (1.5 g, 6.09 mmol) and 2-chloro-5-(isobutyramidomethyl)benzoic acid (1.87 g, 7.308 mmol) were added to a 100 mL flask and dissolved in CH$_2$Cl$_2$ (30 ml) and DMF (3 ml). HOBT (1.65 g, 12.18 mmol) and DMAP (1.49 g, 12.18 mmol) were added thereto and reacted for 10 minutes. EDC (2.33 g, 12.18 mmol) and TEA (1.7 ml, 12.18 mmol) were added and stirred under reflux for 12 hours. After the reaction was completed, the organic material was extracted with ethyl acetate/H$_2$O. The organic layer was dried over MgSO$_4$ and distilled under reduced pressure to remove the solvent. The residue was subjected to column chromatography (ethyl acetate:n-hexane=3:1) to obtain ethyl 5-(2-chloro-5-(isobutyramidomethyl)benzamido)-1-propyl-1H-indole-2-carboxylate (2.34 g, 4.83 mmol, 79%, white solid).

1H NMR (300 MHz, DMSO-d$_6$) 10.46 (br, NH, 1H), 8.38 (m, NH, 1H), 8.17 (m, 1H), 7.63-7.60 (m, 1H), 7.52-7.49 (m, 2H), 7.43 (m, 1H), 7.36-7.33 (m, 1H), 7.27 (m, 1H), 4.53-4.49 (m, 2H), 4.36-4.29 (m, 4H), 2.50-2.39 (m, 1H), 1.75-1.68 (m, 2H), 1.36-1.31 (m, 3H), 1.04-1.02 (m, 6H), 0.85-0.82 (m, 3H).

Example 157-4: Synthesis of 5-(2-chloro-5-(isobutyramidomethyl)benzamido)-1-propyl-1H-indole-2-carboxylic acid Ethyl 5-(2-chloro-5-(isobutyramidomethyl)benzamido)-1-propyl-1H-indole-2-carboxylate (2.34 g, 4.83 mmol) was added to a 500 mL flask and dissolved in THF (30 ml) and MeOH (30 ml). LiOH (1.01 g, 24.15 mmol) dissolved in H$_2$O (30 ml) was added and stirred for 12 hours. After concentration upon completion of the reaction, the pH was adjusted to 2 with 2N—HCl. The resulting solid was filtered to obtain 5-(2-chloro-5-(isobutyramidomethyl)benzamido)-1-propyl-1H-indole-2-carboxylic acid (1.98 g, 4.34 mmol, 90%, white solid).

1H NMR (300 MHz, DMSO-d$_6$) 12.88 (br, OH, 1H), 10.43 (br, NH, 1H), 8.36 (m, NH, 1H), 8.15 (m, 1H), 7.59-7.56 (m, 1H), 7.52-7.47 (m, 2H), 7.42 (m, 1H), 7.35-7.33 (m, 1H), 7.20 (m, 1H), 4.55-4.50 (m, 2H), 4.30-4.28 (m, 2H), 2.50-2.38 (m, 1H), 1.74-1.67 (m, 2H), 1.04-1.02 (m, 6H), 0.86-0.78 (m, 3H).

Example 157-5: Synthesis of 5-(2-chloro-5-(isobutyramidomethyl)benzamido)-1-propyl-N-(4-(trifluoromethoxy)phenyl)-1H-indole-2-carboxamide (Compound 157)

5-(2-chloro-5-(isobutyramidomethyl)benzamido)-1-propyl-1H-indole-2-carboxylic acid (150 mg, 0.33 mmol) and 4-(trifluoromethoxy)aniline (87 mg, 0.495 mmol) were added to a 10 mL flask and dissolved in CH$_2$Cl$_2$ (5 ml) and DMF (1 ml). HOBT (89 mg, 0.66 mmol) and DMAP (80 mg, 0.66 mmol) were added thereto and reacted for 10 minutes. EDC (126 mg, 0.66 mmol) and TEA (91 μl, 0.66 mmol) were added and stirred under reflux for 12 hours. After the reaction was completed, the organic material was extracted with ethyl acetate/H$_2$O. The organic layer was dried over MgSO$_4$ and distilled under reduced pressure to remove the solvent. The residue was subjected to column chromatography (ethyl acetate:n-hexane=3:1) to obtain 5-(2-chloro-5-(isobutyramidomethyl)benzamido)-1-propyl-N-(4-(trifluoromethoxy)phenyl)-1H-indole-2-carboxamide (140 mg, 0.227 mmol, 69%, white solid).

1H NMR (300 MHz, DMSO-d$_6$) 10.52 (br, NH, 1H), 10.45 (br, NH, 1H), 8.38 (m, NH, 1H), 8.17 (m, 1H), 7.91-7.88 (m, 2H), 7.62-7.59 (m, 1H), 7.53-7.40 (m, 2H), 7.44 (m, 1H), 7.39-7.31 (m, 4H), 4.54-4.50 (m, 2H), 4.31-4.29 (m, 2H), 2.50-2.39 (m, 1H), 1.76-1.69 (m, 2H), 1.05-1.02 (m, 6H), 0.84-0.79 (m, 3H).

Example 158: Synthesis of 5-(2-chloro-5-(isobutyramidomethyl)benzamido)-1-propyl-N-(3-(trifluoromethoxy)phenyl)-1H-indole-2-carboxamide (Compound 158)

The title compound was obtained according to the same procedure as Example 157, except for using 3-(trifluoromethoxy)aniline instead of 4-(trifluoromethoxy)aniline.

1H NMR (300 MHz, DMSO-d$_6$) 10.58 (br, NH, 1H), 10.46 (br, NH, 1H), 8.37 (m, NH, 1H), 8.18 (m, 1H), 7.92 (m, 1H), 7.80-7.78 (m, 1H), 7.62-7.59 (m, 1H), 7.53-7.44 (m, 4H), 7.36-7.33 (m, 2H), 7.11-7.08 (m, 1H), 4.54-4.50 (m, 2H), 4.31-4.29 (m, 2H), 2.50-2.39 (m, 1H), 1.77-1.70 (m, 2H), 1.05-1.02 (m, 6H), 0.84-0.79 (m, 3H).

Example 159: Synthesis of 5-(2-chloro-5-(isobutyramidomethyl)benzamido)-1-propyl-N-(4-(trifluoromethyl)phenyl)-1H-indole-2-carboxamide (Compound 159)

The title compound was obtained according to the same procedure as Example 157, except for using 4-(trifluoromethyl)aniline instead of 4-(trifluoromethoxy)aniline.

1H NMR (300 MHz, DMSO-d$_6$) 10.66 (br, NH, 1H), 10.46 (br, NH, 1H), 8.37 (m, NH, 1H), 8.19 (m, 1H), 8.03-8.01 (m, 2H), 7.75-7.72 (m, 1H), 7.63-7.60 (m, 1H), 7.53-7.50 (m, 2H), 7.44 (m, 1H), 7.36-7.34 (m, 2H), 4.55-4.50 (m, 2H), 4.31-4.29 (m, 2H), 2.50-2.39 (m, 1H), 1.77-1.70 (m, 2H), 1.05-1.02 (m, 6H), 0.85-0.80 (m, 3H).

Example 160: Synthesis of 5-(2-chloro-5-(isobutyramidomethyl)benzamido)-1-propyl-N-(3-(trifluoromethyl)phenyl)-1H-indole-2-carboxamide (Compound 160)

The title compound was obtained according to the same procedure as Example 157, except for using 3-(trifluoromethyl)aniline instead of 4-(trifluoromethoxy)aniline.

1H NMR (300 MHz, DMSO-d$_6$) 10.63 (br, NH, 1H), 10.46 (br, NH, 1H), 8.37 (m, NH, 1H), 8.25 (m, 1H), 8.19 (m, 1H), 8.07-8.04 (m, 2H), 7.63-7.60 (m, 2H), 7.53-7.44 (m, 4H), 7.35-7.34 (m, 2H), 4.55-4.51 (m, 2H), 4.31-4.29 (m, 2H), 2.50-2.41 (m, 1H), 1.78-1.70 (m, 2H), 1.05-1.02 (m, 6H), 0.85-0.80 (m, 3H).

Example 161: Synthesis of 5-(2-chloro-5-(isobutyramidomethyl)benzamido)-N-(4-chlorophenyl)-1-propyl-1H-indole-2-carboxamide (Compound 161)

The title compound was obtained according to the same procedure as Example 157, except for using 4-chloroaniline instead of 4-(trifluoromethoxy)aniline.

1H NMR (300 MHz, DMSO-d$_6$) 10.45 (br, NH, 2H), 8.37 (m, NH, 1H), 8.17 (m, 1H), 7.84-7.81 (m, 2H), 7.61-7.58 (m, 1H), 7.53-7.50 (m, 2H), 7.43-7.40 (m, 3H), 7.36-7.30 (m, 2H), 4.54-4.49 (m, 2H), 4.31-4.29 (m, 2H), 2.50-2.39 (m, 1H), 1.76-1.69 (m, 2H), 1.05-1.02 (m, 6H), 0.84-0.79 (m, 3H).

Example 162: Synthesis of 5-(2-chloro-5-(isobutyramidomethyl)benzamido)-N-(3-chlorophenyl)-1-propyl-1H-indole-2-carboxamide (Compound 162)

The title compound was obtained according to the same procedure as Example 157, except for using 3-chloroaniline instead of 4-(trifluoromethoxy)aniline.

1H NMR (300 MHz, DMSO-d$_6$) 10.48 (br, NH, 1H), 10.45 (br, NH, 1H), 8.36 (m, NH, 1H), 8.18 (m, 1H), 7.98 (m, 1H), 7.72-7.69 (m, 1H), 7.62-7.59 (m, 1H), 7.53-7.50 (m, 2H), 7.44-7.42 (m, 1H), 7.39-7.31 (m, 3H), 7.18-7.16 (m, 1H), 4.54-4.50 (m, 2H), 4.31-4.29 (m, 2H), 2.50-2.39 (m, 1H), 1.77-1.70 (m, 2H), 1.05-1.02 (m, 6H), 0.85-0.80 (m, 3H).

Example 163: Synthesis of 5-(2-chloro-5-(isobutyramidomethyl)benzamido)-N-(3-chloro-5-fluorophenyl)-1-propyl-1H-indole-2-carboxamide (Compound 163)

The title compound was obtained according to the same procedure as Example 157, except for using 3-chloro-5-fluoroaniline instead of 4-(trifluoromethoxy)aniline.

1H NMR (300 MHz, DMSO-d$_6$) 10.63 (br, NH, 1H), 10.46 (br, NH, 1H), 8.37 (m, NH, 1H), 8.19 (m, 1H), 7.77 (m, 1H), 7.70-7.66 (m, 1H), 7.63-7.60 (m, 1H), 7.53-7.50 (m, 2H), 7.44 (m, 1H), 7.36-7.33 (m, 2H), 7.18-7.15 (m, 1H), 4.53-4.49 (m, 2H), 4.31-4.29 (m, 2H), 2.50-2.39 (m, 1H), 1.76-1.69 (m, 2H), 1.05-1.02 (m, 6H), 0.84-0.80 (m, 3H).

Example 164: Synthesis of N-(3-chloro-4-fluorophenyl)-5-(2-chloro-5-(isobutyramidomethyl)benzamido)-1-propyl-1H-indole-2-carboxamide (Compound 164)

The title compound was obtained according to the same procedure as Example 157, except for using 3-chloro-4-fluoroaniline instead of 4-(trifluoromethoxy)aniline.

1H NMR (300 MHz, DMSO-d$_6$) 10.51 (br, NH, 1H), 10.44 (br, NH, 1H), 8.36 (m, NH, 1H), 8.18 (m, 1H), 8.10-8.08 (m, 1H), 7.74-7.71 (m, 1H), 7.62-7.59 (m, 2H), 7.53-7.50 (m, 2H), 7.46-7.40 (m, 2H), 7.36-7.30 (m, 2H), 4.54-4.49 (m, 2H), 4.31-4.29 (m, 2H), 2.50-2.39 (m, 1H), 1.76-1.69 (m, 2H), 1.05-1.02 (m, 6H), 0.84-0.79 (m, 3H).

Example 165: Synthesis of N-(4-chloro-3-fluorophenyl)-5-(2-chloro-5-(isobutyramidomethyl)benzamido)-1-propyl-1H-indole-2-carboxamide (Compound 165)

The title compound was obtained according to the same procedure as Example 157, except for using 4-chloro-3-fluoroaniline instead of 4-(trifluoromethoxy)aniline.

1H NMR (300 MHz, DMSO-$d_6$) 10.61 (br, NH, 1H), 10.45 (br, NH, 1H), 8.36 (m, NH, 1H), 8.18 (m, 1H), 7.96-7.92 (m, 1H), 7.60-7.57 (m, 3H), 7.53-7.50 (m, 2H), 7.44 (m, 1H), 7.36-7.32 (m, 2H), 4.54-4.49 (m, 2H), 4.31-4.29 (m, 2H), 2.50-2.39 (m, 1H), 1.76-1.69 (m, 2H), 1.05-1.02 (m, 6H), 0.84-0.79 (m, 3H).

Example 166: Synthesis of 5-(2-chloro-5-(isobutyramidomethyl)benzamido)-N-(4-fluorophenyl)-1-propyl-1H-indole-2-carboxamide (Compound 166)

The title compound was obtained according to the same procedure as Example 157, except for using 4-fluoroaniline instead of 4-(trifluoromethoxy)aniline.

1H NMR (300 MHz, DMSO-$d_6$) 10.43 (br, NH, 1H), 10.38 (br, NH, 1H), 8.36 (m, NH, 1H), 8.16 (m, 1H), 7.81-7.77 (m, 2H), 7.60-7.57 (m, 1H), 7.52-7.50 (m, 2H), 7.43 (m, 1H), 7.36-7.33 (m, 1H), 7.27 (m, 1H), 7.23-7.17 (m, 2H), 4.54-4.49 (m, 2H), 4.31-4.29 (m, 2H), 2.50-2.39 (m, 1H), 1.76-1.69 (m, 2H), 1.05-1.02 (m, 6H), 0.85-0.79 (m, 3H).

Example 167: Synthesis of 5-(2-chloro-5-(isobutyramidomethyl)benzamido)-N-(3-fluorophenyl)-1-propyl-1H-indole-2-carboxamide (Compound 167)

The title compound was obtained according to the same procedure as Example 157, except for using 3-fluoroaniline instead of 4-(trifluoromethoxy)aniline.

1H NMR (300 MHz, DMSO-$d_6$) 10.50 (br, NH, 1H), 10.44 (br, NH, 1H), 8.36 (m, NH, 1H), 8.17 (m, 1H), 7.76-7.72 (m, 1H), 7.61-7.50 (m, 4H), 7.43-7.30 (m, 4H), 6.96-6.91 (m, 1H), 4.54-4.49 (m, 2H), 4.31-4.29 (m, 2H), 2.50-2.39 (m, 1H), 1.76-1.69 (m, 2H), 1.05-1.02 (m, 6H), 0.84-0.79 (m, 3H).

Example 168: Synthesis of 5-(2-chloro-5-(isobutyramidomethyl)benzamido)-N-(4-cyclohexylphenyl)-1-propyl-1H-indole-2-carboxamide (Compound 168)

The title compound was obtained according to the same procedure as Example 157, except for using 4-cyclohexylaniline instead of 4-(trifluoromethoxy)aniline.

1H NMR (300 MHz, DMSO-$d_6$) 10.42 (br, NH, 1H), 10.24 (br, NH, 1H), 8.36 (m, NH, 1H), 8.15 (m, 1H), 7.68-7.65 (m, 2H), 7.60-7.56 (m, 1H), 7.52-7.48 (m, 2H), 7.43 (m, 1H), 7.36-7.33 (m, 1H), 7.25-7.18 (m, 3H), 4.54-4.49 (m, 2H), 4.31-4.29 (m, 2H), 2.50-2.39 (m, 1H), 1.80-1.68 (m, 7H), 1.38-1.17 (m, 6H), 1.05-1.02 (m, 6H), 0.84-0.79 (m, 3H).

Example 169: Synthesis of 5-(2-chloro-5-(isobutyramidomethyl)benzamido)-N-(3-fluoro-5-(trifluoromethyl)phenyl)-1-propyl-1H-indole-2-carboxamide (Compound 169)

The title compound was obtained according to the same procedure as Example 157, except for using 3-fluoro-5-(trifluoromethyl)aniline instead of 4-(trifluoromethoxy)aniline.

1H NMR (300 MHz, DMSO-$d_6$) 10.77 (br, NH, 1H), 10.45 (br, NH, 1H), 8.36 (m, NH, 1H), 8.19 (m, 1H), 8.05-7.99 (m, 2H), 7.63-7.60 (m, 1H), 7.54-7.50 (m, 2H), 7.44-7.33 (m, 4H), 4.55-4.51 (m, 2H), 4.31-4.29 (m, 2H), 2.50-2.39 (m, 1H), 1.77-1.70 (m, 2H), 1.05-1.02 (m, 6H), 0.85-0.80 (m, 3H).

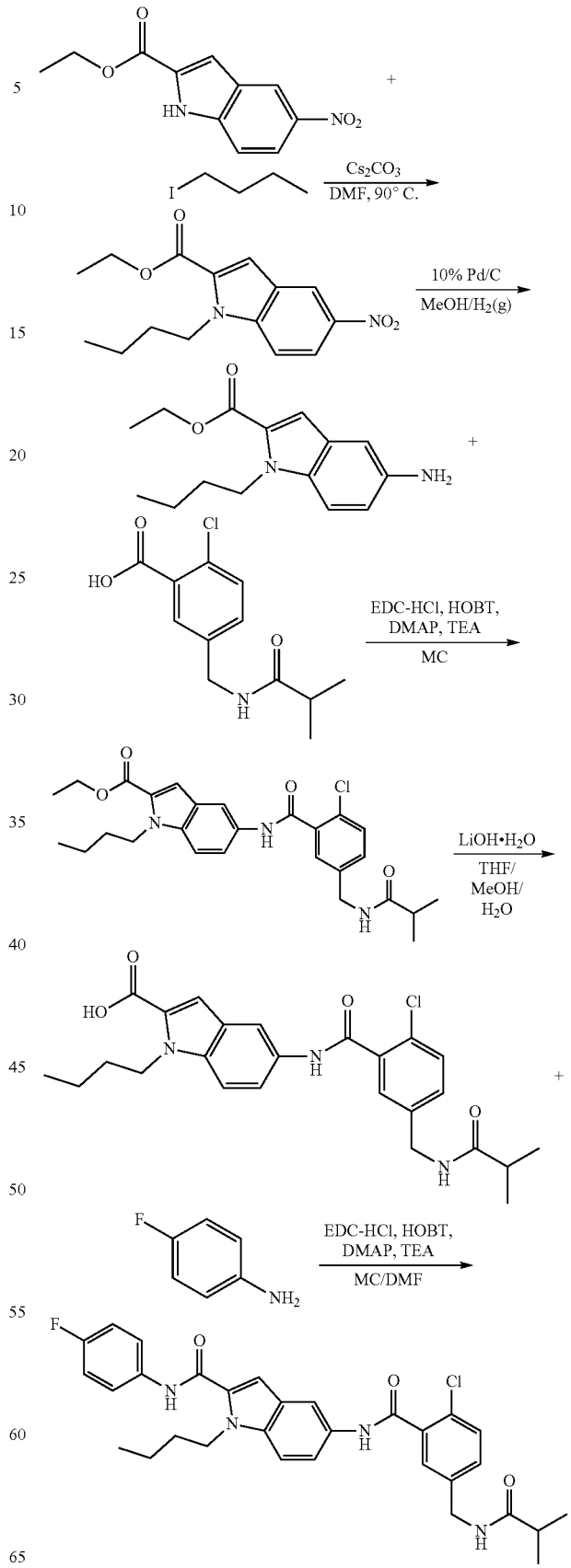

Example 170: Synthesis of 1-butyl-5-(2-chloro-5-(isobutyramidomethyl)benzamido)-N-(4-fluorophenyl)-1H-indole-2-carboxamide (Compound 170)

Example 170-1: Synthesis of ethyl 1-butyl-5-nitro-1H-indole-2-carboxylate

Ethyl 5-nitro-1H-indole-2-carboxylate (5 g, 21.35 mmol) and iodobutane (4.86 mL, 42.70 mmol) were added to a 100 mL flask and dissolved in DMF (50 ml). $Cs_2CO_3$ (20.89 g, 64.04 mmol) was added thereto and stirred at room temperature for 22 hours. After completion of the reaction, the organic material was extracted with ethyl acetate/$H_2O$. The organic layer was dried over $MgSO_4$ and distilled under reduced pressure to obtain ethyl 1-butyl-5-nitro-1H-indole-2-carboxylate (6.19 g, 21.35 mmol, quant, white solid).

1H NMR (300 MHz, DMSO-$d_6$) 8.75 (s, 1H), 8.19-8.15 (d, 1H), 7.88-7.84 (d, 1H), 7.57 (s, 1H), 4.65-4.60 (t, 2H), 4.40-4.33 (dd, 2H), 1.72-1.67 (m, 2H), 1.37-1.33 (t, 3H), 1.30-1.24 (m, 2H), 0.91-0.85 (t, 3H).

Example 170-2: Synthesis of ethyl 5-amino-1-butyl-1H-indole-2-carboxylate

Ethyl 1-butyl-5-nitro-1H-indole-2-carboxylate (6.19 g, 21.35 mmol) was added to a 250 mL flask and dissolved in MeOH (124 ml). 10% Pd/C (619 mg) was added and stirred for 12 hours at room temperature under $H_2$ (g). After Celite filtration upon completion of the reaction, the solvent was removed by distillation under reduced pressure to obtain the resulting solid ethyl 5-amino-1-butyl-1H-indole-2-carboxylate (5.34 g, 20.52 mmol, 96%).

1H NMR (300 MHz, DMSO-$d_6$) 7.30-7.26 (d, 1H), 6.95 (s, 1H), 6.77-6.73 (d, 1H), 6.70 (s, 1H), 4.72 (br, NH, 2H), 4.46-4.41 (t, 2H), 4.31-4.23 (dd, 2H), 1.64-1.59 (m, 2H), 1.33-1.28 (t, 3H), 1.25-1.20 (m, 2H), 0.89-0.84 (t, 3H).

Example 170-3: Synthesis of ethyl 1-butyl-5-(2-chloro-5-(isobutyramidomethyl)benzamido)-1H-indole-2-carboxylate Ethyl 5-amino-1-butyl-1H-indole-2-carboxylate (1.5 g, 5.76 mmol) and 2-chloro-5-(isobutyramidomethyl)benzoic acid (1.77 g, 6.91 mmol) were added to a 100 mL flask and dissolved in $CH_2Cl_2$ (38 ml). HOBT (1.17 g, 8.64 mmol) and DMAP (0.21 g, 1.73 mmol) were added thereto and reacted for 10 minutes. EDC (1.65 g, 8.64 mmol) and TEA (2.01 ml, 14.40 mmol) were added and stirred under reflux for 12 hours. After completion of the reaction, the organic material was extracted with $CH_2Cl_2/H_2O$. The organic layer was dried over $MgSO_4$ and distilled under reduced pressure to remove the solvent. The residue was subjected to column chromatography (ethyl acetate:n-hexane=2:1) to obtain ethyl 1-butyl-5-(2-chloro-5-(isobutyramidomethyl)benzamido)-1H-indole-2-carboxylate (2.09 g, 4.20 mmol, 73%, white solid).

1H NMR (300 MHz, DMSO-$d_6$) 10.47 (br, NH, 1H), 8.40-8.36 (m, NH, 1H), 8.18 (s, 1H), 7.62-7.59 (m, 1H), 7.53-7.50 (m, 2H), 7.43 (s, 1H), 7.36-7.33 (m, 1H), 7.27 (s, 1H), 4.57-4.52 (m, 2H), 4.37-4.29 (m, 4H), 2.50-2.38 (m, 1H), 1.70-1.61 (m, 2H), 1.36-1.31 (m, 3H), 1.30-1.19 (m, 2H), 1.04-1.02 (m, 6H), 0.90-0.85 (m, 3H).

Example 170-4: Synthesis of 1-butyl-5-(2-chloro-5-(isobutyramidomethyl)benzamido)-1H-indole-2-carboxylic acid Ethyl 1-butyl-5-(2-chloro-5-(isobutyramidomethyl)benzamido)-1H-indole-2-carboxylate (1.5 g, 3.00 mmol) was added to a 250 mL flask and dissolved in THF (15 ml) and MeOH (15 ml). LiOH (0.63 g, 15.00 mmol) dissolved in $H_2O$ (12 ml) was added and stirred for 12 hours. After concentration upon completion of the reaction, the pH was adjusted to 2 with 2N—HCl. The resulting solid was filtered to obtain 1-butyl-5-(2-chloro-5-(isobutyramidomethyl)benzamido)-1H-indole-2-carboxylic acid (1.94 g, 4.13 mmol, 98.3%, white solid).

1H NMR (300 MHz, DMSO-$d_6$) 12.88 (br, OH, 1H), 10.45 (br, NH, 1H), 8.40-8.35 (m, NH, 1H), 8.16 (s, 1H), 7.59-7.56 (m, 1H), 7.53-7.47 (m, 2H), 7.43 (s, 1H), 7.36-7.33 (m, 1H), 7.22 (s, 1H), 4.59-4.54 (s, 2H), 4.30-4.28 (m, 2H), 2.50-2.38 (m, 1H), 1.69-1.63 (m, 2H), 1.30-1.16 (m, 2H), 1.04-1.02 (m, 6H), 0.90-0.84 (m, 3H).

Example 170-5: Synthesis of 1-butyl-5-(2-chloro-5-(isobutyramidomethyl)benzamido)-N-(4-fluorophenyl)-1H-indole-2-carboxamide (Compound 170)

1-butyl-5-(2-chloro-5-(isobutyramidomethyl)benzamido)-1H-indole-2-carboxylic acid (150 mg, 0.32 mmol) and 4-fluoroaniline (36 μl, 0.38 mmol) were added to a 10 mL flask and dissolved in $CH_2Cl_2$ (2.1 ml) and DMF (0.5 ml). HOBT (64.4 mg, 0.477 mmol) and DMAP (11.6 mg, 0.095 mmol) were added thereto and reacted for 10 minutes. EDC (91.4 mg, 0.477 mmol) and TEA (130 μl, 0.953 mmol) were added and stirred under reflux for 12 hours. After the reaction was completed, the organic material was extracted with ethyl acetate/$H_2O$. The organic layer was dried over $MgSO_4$ and distilled under reduced pressure to remove the solvent. The residue was subjected to column chromatography (ethyl acetate:n-hexane=3:1) to obtain 1-butyl-5-(2-chloro-5-(isobutyramidomethyl)benzamido)-N-(4-fluorophenyl)-1H-indole-2-carboxamide (55.6 mg, 0.099 mmol, 46.4%, white solid).

1H NMR (300 MHz, DMSO-$d_6$) 10.45 (br, NH, 1H), 10.40 (br, NH, 1H), 8.38-8.34 (m, NH, 1H), 8.17 (s, 1H), 7.82-7.77 (m, 2H), 7.60-7.56 (m, 1H), 7.54-7.48 (m, 2H), 7.44 (s, 1H), 7.37-7.33 (m, 1H), 7.27 (s, 1H), 7.24-7.18 (m, 2H), 4.59-4.54 (m, 2H), 4.32-4.29 (m, 2H), 2.50-2.38 (m, 1H), 1.69-1.63 (m, 2H), 1.30-1.17 (m, 2H), 1.05-1.02 (m, 6H), 0.90-0.83 (m, 3H).

Example 171: Synthesis of 1-butyl-5-(2-chloro-5-(isobutyramidomethyl)benzamido)-N-(4-chlorophenyl)-1H-indole-2-carboxamide (Compound 171)

The title compound was obtained according to the same procedure as Example 170, except for using 4-chloroaniline instead of 4-fluoroaniline.

1H NMR (300 MHz, DMSO-$d_6$) 10.45 (br, NH, 2H), 8.38-8.34 (m, NH, 1H), 8.17 (s, 1H), 7.84-7.80 (m, 2H), 7.60-7.57 (m, 1H), 7.52-7.50 (m, 2H), 7.44-7.41 (m, 3H), 7.37-7.33 (m, 1H), 7.29 (s, 1H), 4.59-4.54 (m, 2H), 4.32-4.29 (m, 2H), 2.50-2.38 (m, 1H), 1.69-1.63 (m, 2H), 1.30-1.17 (m, 2H), 1.05-1.02 (m, 6H), 0.90-0.83 (m, 3H).

Example 172: Synthesis of 1-butyl-5-(2-chloro-5-(isobutyramidomethyl)benzamido)-N-(4-(trifluoromethoxy)phenyl)-1H-indole-2-carboxamide (Compound 172)

The title compound was obtained according to the same procedure as Example 170, except for using 4-(trifluoromethoxy)aniline instead of 4-fluoroaniline.

1H NMR (300 MHz, DMSO-$d_6$) 10.52 (br, NH, 1H), 10.46 (br, NH, 1H), 8.40-8.35 (m, NH, 1H), 8.17 (s, 1H), 7.92-7.88 (m, 2H), 7.61-7.57 (m, 1H), 7.53-7.50 (m, 2H), 7.44 (s, 1H), 7.40-7.30 (m, 4H), 4.59-4.53 (m, 2H), 4.32-4.29 (m, 2H), 2.50-2.38 (m, 1H), 1.71-1.63 (m, 2H), 1.30-1.20 (m, 2H), 1.05-1.02 (m, 6H), 0.90-0.83 (m, 3H).

Example 173: Synthesis of 1-butyl-5-(2-chloro-5-(isobutyramidomethyl)benzamido)-N-(3-(trifluoromethoxy)phenyl)-1H-indole-2-carboxamide (Compound 173)

The title compound was obtained according to the same procedure as Example 170, except for using 3-(trifluoromethoxy)aniline instead of 4-fluoroaniline.

1H NMR (300 MHz, DMSO-$d_6$) 10.59 (br, NH, 1H), 10.46 (br, NH, 1H), 8.40-8.35 (m, NH, 1H), 8.18 (s, 1H), 7.92 (s, 1H), 7.81-7.78 (m, 1H), 7.61-7.58 (m, 1H), 7.54-7.50 (m, 3H), 7.48-7.44 (m, 1H), 7.37-7.32 (m, 2H), 7.12-7.09 (m, 1H), 4.59-4.53 (m, 2H), 4.32-4.29 (m, 2H), 2.50-2.38 (m, 1H), 1.71-1.63 (m, 2H), 1.28-1.20 (m, 2H), 1.05-1.02 (m, 6H), 0.90-0.83 (m, 3H).

Example 174: Synthesis of 1-butyl-5-(2-chloro-5-(isobutyramidomethyl)benzamido)-N-(4-(trifluoromethyl)phenyl)-1H-indole-2-carboxamide (Compound 174)

The title compound was obtained according to the same procedure as Example 170, except for using 4-(trifluoromethyl)aniline instead of 4-fluoroaniline.

1H NMR (300 MHz, DMSO-$d_6$) 10.66 (br, NH, 1H), 10.47 (br, NH, 1H), 8.40-8.35 (m, NH, 1H), 8.19 (s, 1H), 8.04-8.00 (m, 2H), 7.76-7.71 (m, 2H), 7.62-7.58 (m, 1H), 7.54-7.50 (m, 2H), 7.44 (s, 1H), 7.36-7.33 (m, 2H), 4.57-4.54 (m, 2H), 4.32-4.29 (m, 2H), 2.50-2.35 (m, 1H), 1.71-1.63 (m, 2H), 1.29-1.20 (m, 2H), 1.05-1.02 (m, 6H), 0.90-0.83 (m, 3H).

Example 175: Synthesis of 1-butyl-5-(2-chloro-5-(isobutyramidomethyl)benzamido)-N-(3-(trifluoromethyl)phenyl)-1H-indole-2-carboxamide (Compound 175)

The title compound was obtained according to the same procedure as Example 170, except for using 3-(trifluoromethyl)aniline instead of 4-fluoroaniline.

1H NMR (300 MHz, DMSO-$d_6$) 10.62 (br, NH, 1H), 10.46 (br, NH, 1H), 8.40-8.35 (m, NH, 1H), 8.25 (s, 1H), 8.18 (s, 1H), 8.10-8.04 (m, 1H), 7.64-7.58 (m, 2H), 7.54-7.44 (m, 4H), 7.34 (m, 2H), 4.59-4.53 (m, 2H), 4.32-4.29 (m, 2H), 2.50-2.38 (m, 1H), 1.72-1.63 (m, 2H), 1.28-1.20 (m, 2H), 1.05-1.01 (m, 6H), 0.90-0.83 (m, 3H).

Example 176: Synthesis of 1-butyl-N-(4-chloro-3-fluorophenyl)-5-(2-chloro-5-(isobutyramidomethyl)benzamido)-1H-indole-2-carboxamide (Compound 176)

The title compound was obtained according to the same procedure as Example 170, except for using 4-chloro-3-fluoroaniline instead of 4-fluoroaniline.

1H NMR (300 MHz, DMSO-$d_6$) 10.62 (br, NH, 1H), 10.46 (br, NH, 1H), 8.40-8.35 (m, NH, 1H), 8.18 (s, 1H), 7.97-7.92 (m, 1H), 7.65-7.58 (m, 3H), 7.54-7.50 (m, 2H), 7.44 (s, 1H), 4.55 (m, 2H), 4.32-4.29 (m, 2H), 2.50-2.38 (m, 1H), 1.72-1.66 (m, 2H), 1.28-1.20 (m, 2H), 1.05-1.01 (m, 6H), 0.90-0.83 (m, 3H).

Example 177: Synthesis of 1-butyl-N-(3-chloro-4-fluorophenyl)-5-(2-chloro-5-(isobutyramidomethyl)benzamido)-1H-indole-2-carboxamide (Compound 177)

The title compound was obtained according to the same procedure as Example 170, except for using 3-chloro-4-fluoroaniline instead of 4-fluoroaniline.

1H NMR (300 MHz, DMSO-$d_6$) 10.52 (br, NH, 1H), 10.46 (br, NH, 1H), 8.40-8.35 (m, NH, 1H), 8.18 (s, 1H), 8.10-8.70 (m, 1H), 7.72 (m, 1H), 7.41-7.58 (m, 1H), 7.54-7.50 (m, 2H), 7.47-7.40 (m, 2H), 7.37-7.29 (m, 2H), 4.55 (m, 2H), 4.32-4.29 (m, 2H), 2.50-2.38 (m, 1H), 1.72-1.66 (m, 2H), 1.28-1.20 (m, 2H), 1.05-1.01 (m, 6H), 0.90-0.83 (m, 3H).

Example 178: Synthesis of 1-butyl-5-(2-chloro-5-(isobutyramidomethyl)benzamido)-N-(3,4-dichlorophenyl)-1H-indole-2-carboxamide (Compound 178)

The title compound was obtained according to the same procedure as Example 170, except for using 3,4-dichloroaniline instead of 4-fluoroaniline.

1H NMR (300 MHz, DMSO-$d_6$) 10.58 (br, NH, 1H), 10.46 (br, NH, 1H), 8.40-8.35 (m, NH, 1H), 8.19-8.16 (m, 2H), 7.79-7.75 (m, 1H), 7.65-7.58 (m, 2H), 7.54-7.50 (m, 2H), 7.44 (s, 1H), 7.37-7.32 (m, 2H), 4.55 (m, 2H), 4.32-4.29 (m, 2H), 2.50-2.38 (m, 1H), 1.72-1.66 (m, 2H), 1.28-1.20 (m, 2H), 1.05-1.01 (m, 6H), 0.90-0.83 (m, 3H).

Example 179: Synthesis of 1-butyl-5-(2-chloro-5-(isobutyramidomethyl)benzamido)-N-(3,4-difluorophenyl)-1H-indole-2-carboxamid (Compound 179)

The title compound was obtained according to the same procedure as Example 170, except for using 3,4-difluoroaniline instead of 4-fluoroaniline.

1H NMR (300 MHz, DMSO-$d_6$) 10.54 (br, NH, 1H), 10.46 (br, NH, 1H), 8.40-8.35 (m, NH, 1H), 8.18 (s, 1H), 7.97-7.90 (m, 1H), 7.61-7.57 (m, 1H), 7.53-7.50 (m, 3H), 7.47-7.39 (m, 2H), 7.37-7.29 (m, 2H), 4.55 (m, 2H), 4.32-4.29 (m, 2H), 2.50-2.36 (m, 1H), 1.72-1.65 (m, 2H), 1.28-1.20 (m, 2H), 1.05-1.01 (m, 6H), 0.90-0.83 (m, 3H).

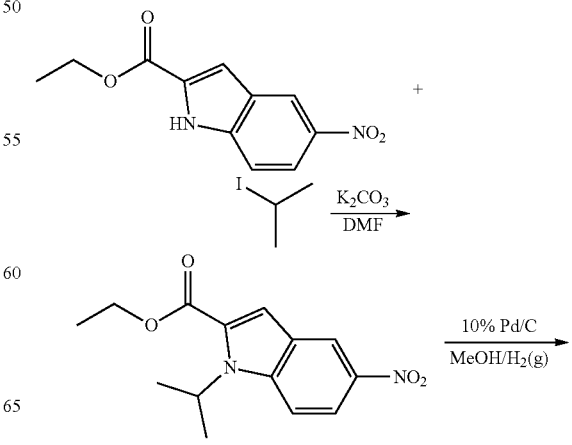

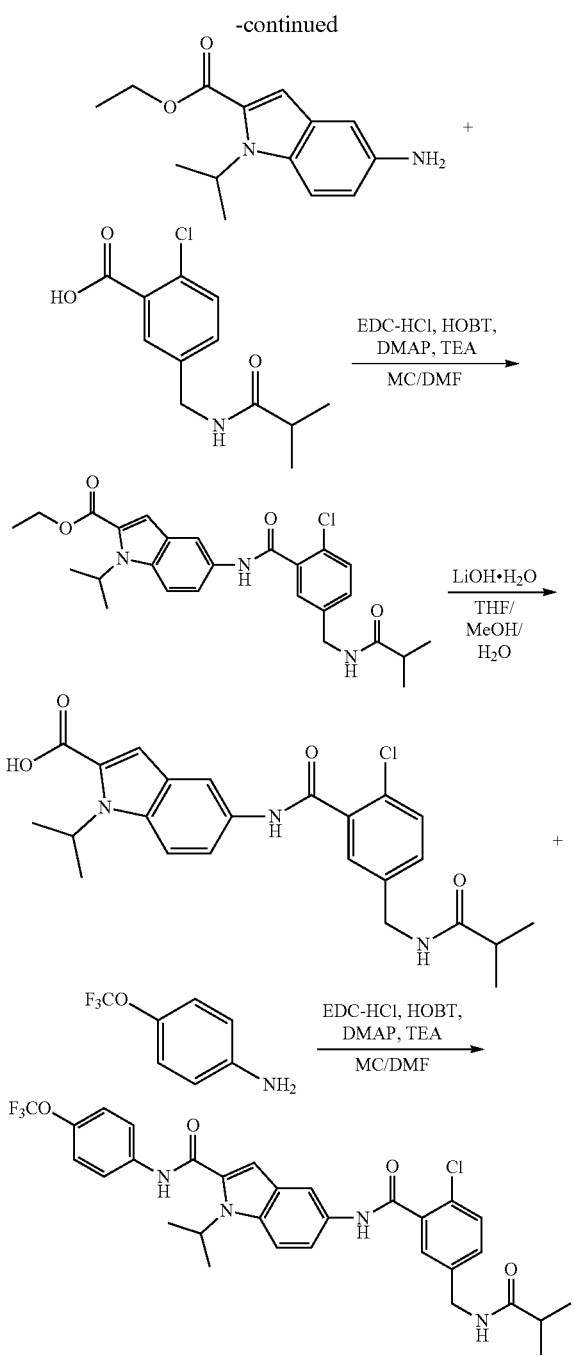

Example 180: Synthesis of 5-(2-chloro-5-(isobutyramidomethyl)benzamido)-1-isopropyl-N-(4-(trifluoromethoxy)phenyl)-1H-indole-2-carboxamide (Compound 180)

Example 180-1: Synthesis of ethyl 1-isopropyl-5-nitro-1H-indole-2-carboxylate

Ethyl 5-nitro-1H-indole-2-carboxylate (5 g, 21.34 mmol) and 2-iodopropane (8.53 ml, 85.36 mmol) were added to a 100 mL flask and dissolved in DMF (50 ml). $K_2CO_3$ (8.85 g, 64.02 mmol) was added thereto and stirred at 100° C. for 12 hours. After the reaction was completed, the organic material was extracted with ethyl acetate/$H_2O$. The organic layer was dried over $MgSO_4$ and distilled under reduced pressure to remove the solvent. The residue was subjected to column chromatography (ethyl acetate:n-hexane=1:3) to obtain ethyl 1-isopropyl-5-nitro-1H-indole-2-carboxylate (3.76 g, 13.6 mmol, 63%, white solid).

1H NMR (300 MHz, DMSO-$d_6$) 8.74 (m, 1H), 8.12-8.10 (m, 1H), 8.02-7.99 (m, 1H), 7.53 (m, 1H), 5.74-5.65 (m, 1H), 4.39-4.32 (m, 2H), 1.62-1.60 (m, 6H), 1.37-1.33 (m, 6H).

Example 180-2: Synthesis of ethyl 5-amino-1-isopropyl-1H-indole-2-carboxylate

Ethyl 1-isopropyl-5-nitro-1H-indole-2-carboxylate (3.76 g, 13.6 mmol) was added to a 100 mL flask and dissolved in MeOH (50 ml). 10% Pd/C (2.0 g) was added and stirred for 12 hours at room temperature under $H_2$ (g). After Celite filtration upon completion of the reaction, the solvent was removed by distillation under reduced pressure. The residue was subjected to column chromatography (ethyl acetate:n-hexane=1:3) to obtain ethyl 5-amino-1-isopropyl-1H-indole-2-carboxylate (3.0 g, 12.18 mmol, 89%).

1H NMR (300 MHz, DMSO-$d_6$) 7.45-7.42 (m, 1H), 6.93 (m, 1H), 6.72-6.70 (m, 2H), 5.64-5.55 (m, 1H), 4.72 (br, NH, 2H), 4.29-4.22 (m, 2H), 1.53-1.50 (m, 6H), 1.33-1.29 (m, 3H).

Example 180-3: Synthesis of ethyl 5-(2-chloro-5-(isobutyramidomethyl)benzamido)-1-isopropyl-1H-indole-2-carboxylate Ethyl 5-amino-1-isopropyl-1H-indole-2-carboxylate (1.5 g, 6.09 mmol) and 2-chloro-5-(isobutyramidomethyl)benzoic acid (1.87 g, 7.308 mmol) were added to a 100 mL flask and dissolved in $CH_2Cl_2$ (30 ml) and DMF (3 ml). HOBT (1.65 g, 12.18 mmol) and DMAP (1.05 g, 12.18 mmol) were added thereto and reacted for 10 minutes. EDC (1.64 g, 12.18 mmol) and TEA (1.2 ml, 12.18 mmol) were added and stirred under reflux for 12 hours. After the reaction was completed, the organic material was extracted with ethyl acetate/$H_2O$. The organic layer was dried over $MgSO_4$ and distilled under reduced pressure to remove the solvent. The residue was subjected to column chromatography (ethyl acetate:n-hexane=3:1) to obtain ethyl 5-(2-chloro-5-(isobutyramidomethyl)benzamido)-1-isopropyl-1H-indole-2-carboxylate (2.4 g, 4.96 mmol, 81%, white solid).

1H NMR (300 MHz, DMSO-$d_6$) 10.47 (br, NH, 1H), 8.39 (m, NH, 1H), 8.17 (m, 1H), 7.76-7.74 (m, 1H), 7.52-7.46 (m, 2H), 7.42 (m, 1H), 7.36-7.33 (m, 1H), 7.23 (m, 1H), 5.69-5.62 (m, 1H), 4.34-4.28 (m, 4H), 2.50-2.38 (m, 1H), 1.59-1.56 (m, 6H), 1.36-1.31 (m, 3H), 1.04-1.02 (m, 6H).

Example 180-4: Synthesis of 5-(2-chloro-5-(isobutyramidomethyl)benzamido)-1-isopropyl-1H-indole-2-carboxylic acid Ethyl 5-(2-chloro-5-(isobutyramidomethyl)benzamido)-1-isopropyl-1H-indole-2-carboxylate (2.4 g, 4.96 mmol) was added to a 500 mL flask and dissolved in THF (30 ml) and MeOH (30 ml). LiOH (1.04 g, 24.8 mmol) dissolved in $H_2O$ (30 ml) was added and stirred for 12 hours. After concentration upon completion of the reaction, the pH was adjusted to 2 with 2N—HCl. The resulting solid was filtered to 5-(2-chloro-5-(isobutyramidomethyl)benzamido)-1-isopropyl-1H-indole-2-carboxylic acid (1.85 g, 4.05 mmol, 82%, white solid).

1H NMR (300 MHz, DMSO-d$_6$) 12.92 (br, OH, 1H), 10.45 (br, NH, 1H), 8.38 (m, NH, 1H), 8.16 (m, 1H), 7.75-7.72 (m, 1H), 7.52-7.50 (m, 1H), 7.46-7.42 (m, 2H), 7.36-7.33 (m, 1H), 7.18 (m, 1H), 5.82-5.73 (m, 1H), 4.30-4.29 (m, 2H), 2.50-2.38 (m, 1H), 1.58-1.56 (m, 6H), 1.04-1.02 (m, 6H).

Example 180-5: Synthesis of 5-(2-chloro-5-(isobutyramidomethyl)benzamido)-1-isopropyl-N-(4-(trifluoromethoxy)phenyl)-1H-indole-2-carboxamide (Compound 180)

5-(2-chloro-5-(isobutyramidomethyl)benzamido)-1-isopropyl-1H-indole-2-carboxylic acid (150 mg, 0.33 mmol) and 4-(trifluoromethoxy)aniline (87 mg, 0.495 mmol) were added to a 10 mL flask and dissolved in CH$_2$Cl$_2$ (5 ml) and DMF (1 ml). HOBT (89 mg, 0.66 mmol) and DMAP (80 mg, 0.66 mmol) were added thereto and reacted for 10 minutes. EDC (126 mg, 0.66 mmol) and TEA (91 µl, 0.66 mmol) were added and stirred under reflux for 12 hours. After the reaction was completed, the organic material was extracted with ethyl acetate/H$_2$O. The organic layer was dried over MgSO$_4$ and distilled under reduced pressure to remove the solvent. The residue was subjected to column chromatography (ethyl acetate:n-hexane=3:1) to obtain 5-(2-chloro-5-(isobutyramidomethyl)benzamido)-1-isopropyl-N-(4-(trifluoromethoxy)phenyl)-1H-indole-2-carboxamide (140 mg, 0.227 mmol, 69%, white solid).

1H NMR (300 MHz, DMSO-d$_6$) 10.66 (br, NH, 1H), 10.45 (br, NH, 1H), 8.38 (m, NH, 1H), 8.17 (m, 1H), 7.91-7.88 (m, 2H), 7.74-7.71 (m, 1H), 7.53-7.43 (m, 3H), 7.39-7.33 (m, 3H), 7.10 (m, 1H), 5.38-5.31 (m, 1H), 4.31-4.29 (m, 2H), 2.50-2.39 (m, 1H), 1.60-1.58 (m, 6H), 1.04-1.02 (m, 6H).

Example 181: Synthesis of 5-(2-chloro-5-(isobutyramidomethyl)benzamido)-1-isopropyl-N-(3-(trifluoromethoxy)phenyl)-1H-indole-2-carboxamide (Compound 181)

The title compound was obtained according to the same procedure as Example 180, except for using 3-(trifluoromethoxy)aniline instead of 4-(trifluoromethoxy)aniline.

1H NMR (300 MHz, DMSO-d$_6$) 10.73 (br, NH, 1H), 10.45 (br, NH, 1H), 8.38 (m, NH, 1H), 8.17 (m, 1H), 7.95 (m, 1H), 7.77-7.72 (m, 2H), 7.53-7.43 (m, 4H), 7.36-7.33 (m, 1H), 7.13-7.09 (m, 2H), 5.42-5.32 (m, 1H), 4.31-4.29 (m, 2H), 2.50-2.39 (m, 1H), 1.61-1.58 (m, 6H), 1.05-1.02 (m, 6H).

Example 182: Synthesis of 5-(2-chloro-5-(isobutyramidomethyl)benzamido)-N-(4-fluorophenyl)-1-isopropyl-1H-indole-2-carboxamide (Compound 182)

The title compound was obtained according to the same procedure as Example 180, except for using 4-fluoroaniline instead of 4-(trifluoromethoxy)aniline.

1H NMR (300 MHz, DMSO-d$_6$) 10.54 (br, NH, 1H), 10.45 (br, NH, 1H), 8.39 (m, NH, 1H), 8.16 (m, 1H), 7.82-7.78 (m, 2H), 7.73-7.70 (m, 1H), 7.53-7.43 (m, 3H), 7.36-7.33 (m, 1H), 7.23-7.18 (m, 2H), 7.07 (m, 1H), 5.40-5.31 (m, 1H), 4.31-4.29 (m, 2H), 2.50-2.39 (m, 1H), 1.60-1.58 (m, 6H), 1.04-1.02 (m, 6H).

Example 183: Synthesis of 5-(2-chloro-5-(isobutyramidomethyl)benzamido)-N-(4-chlorophenyl)-1-isopropyl-1H-indole-2-carboxamide (Compound 183)

The title compound was obtained according to the same procedure as Example 180, except for using 4-chloroaniline instead of 4-(trifluoromethoxy)aniline.

1H NMR (300 MHz, DMSO-d$_6$) 10.60 (br, NH, 1H), 10.45 (br, NH, 1H), 8.38 (m, NH, 1H), 8.16 (m, 1H), 7.84-7.81 (m, 2H), 7.73-7.70 (m, 1H), 7.53-7.50 (m, 1H), 7.47-7.40 (m, 4H), 7.36-7.33 (m, 1H), 7.10 (m, 1H), 5.39-5.31 (m, 1H), 4.31-4.29 (m, 2H), 2.50-2.39 (m, 1H), 1.60-1.58 (m, 6H), 1.04-1.02 (m, 6H).

Example 184: Synthesis of 5-(2-chloro-5-(isobutyramidomethyl)benzamido)-N-(3-chlorophenyl)-1-isopropyl-1H-indole-2-carboxamide (Compound 184)

The title compound was obtained according to the same procedure as Example 180, except for using 3-chloroaniline instead of 4-(trifluoromethoxy)aniline.

1H NMR (300 MHz, DMSO-d$_6$) 10.64 (br, NH, 1H), 10.45 (br, NH, 1H), 8.38 (m, NH, 1H), 8.17-8.16 (m, 1H), 7.98 (m, 1H), 7.74-7.68 (m, 2H), 7.53-7.50 (m, 1H), 7.49-7.42 (m, 2H), 7.39-7.33 (m, 2H), 7.18-7.16 (m, 1H), 7.1 (m, 1H), 5.40-5.31 (m, 1H), 4.31-4.29 (m, 2H), 2.50-2.39 (m, 1H), 1.60-1.58 (m, 6H), 1.04-1.02 (m, 6H).

Example 185: Synthesis of 5-(2-chloro-5-(isobutyramidomethyl)benzamido)-1-isopropyl-N-(4-(trifluoromethyl)phenyl)-1H-indole-2-carboxamide (Compound 185)

The title compound was obtained according to the same procedure as Example 180, except for using 4-(trifluoromethyl)aniline instead of 4-(trifluoromethoxy)aniline.

1H NMR (300 MHz, DMSO-d$_6$) 10.81 (br, NH, 1H), 10.46 (br, NH, 1H), 8.38 (m, NH, 1H), 8.18 (m, 1H), 8.03-8.00 (m, 2H), 7.75-7.72 (m, 3H), 7.53-7.43 (m, 3H), 7.36-7.33 (m, 1H), 7.15 (m, 1H), 5.41-5.32 (m, 1H), 4.31-4.29 (m, 2H), 2.50-2.39 (m, 1H), 1.61-1.59 (m, 6H), 1.05-1.02 (m, 6H).

Example 186: Synthesis of N-(3-chloro-4-fluorophenyl)-5-(2-chloro-5-(isobutyramidomethyl)benzamido)-1-isopropyl-1H-indole-2-carboxamide (Compound 186)

The title compound was obtained according to the same procedure as Example 180, except for using 3-chloro-4-fluoroaniline instead of 4-(trifluoromethoxy)aniline.

1H NMR (300 MHz, DMSO-d$_6$) 10.65 (br, NH, 1H), 10.45 (br, NH, 1H), 8.37 (m, NH, 1H), 8.17 (m, 1H), 8.11-8.08 (m, 1H), 7.74-7.71 (m, 2H), 7.5-7.40 (m, 4H), 7.36-7.34 (m, 1H), 7.11 (m, 1H), 5.41-5.32 (m, 1H), 4.31-4.29 (m, 2H), 2.50-2.39 (m, 1H), 1.60-1.58 (m, 6H), 1.05-1.03 (m, 6H).

Example 187: Synthesis of N-(4-chloro-3-fluorophenyl)-5-(2-chloro-5-(isobutyramidomethyl)benzamido)-1-isopropyl-1H-indole-2-carboxamide (Compound 187)

The title compound was obtained according to the same procedure as Example 180, except for using 4-chloro-3-fluoroaniline instead of 4-(trifluoromethoxy)aniline.

1H NMR (300 MHz, DMSO-d$_6$) 10.76 (br, NH, 1H), 10.44 (br, NH, 1H), 8.36 (m, NH, 1H), 8.17-8.16 (m, 1H), 7.97-7.92 (m, 1H), 7.74-7.71 (m, 1H), 7.58-7.57 (m, 2H), 7.54-7.43 (m, 3H), 7.36-7.33 (m, 1H), 7.12 (m, 1H), 5.38-5.31 (m, 1H), 4.31-4.29 (m, 2H), 2.50-2.39 (m, 1H), 1.60-1.58 (m, 6H), 1.04-1.02 (m, 6H).

Example 188: Synthesis of 5-(2-chloro-5-(isobutyramidomethyl)benzamido)-1-isopropyl-N-(3-(trifluoromethyl)phenyl)-1H-indole-2-carboxamide (Compound 188)

The title compound was obtained according to the same procedure as Example 180, except for using 3-(trifluoromethyl)aniline instead of 4-(trifluoromethoxy)aniline.

1H NMR (300 MHz, DMSO-d$_6$) 10.77 (br, NH, 1H), 10.45 (br, NH, 1H), 8.40-8.35 (m, NH, 1H), 8.28 (s, 1H), 8.18 (s, 1H), 8.04-8.01 (m, 1H), 7.76-7.72 (m, 1H), 7.64-7.58 (m, 1H), 7.54-7.44 (m, 4H), 7.37-7.33 (m, 1H), 7.16 (m, 1H), 5.42-5.37 (m, 1H), 4.31-4.29 (m, 2H), 2.50-2.39 (m, 1H), 1.60-1.58 (m, 6H), 1.04-1.02 (m, 6H).

Example 189: Synthesis of 5-(2-chloro-5-(isobutyramidomethyl)benzamido)-N-(2-chlorophenyl)-1-isopropyl-1H-indole-2-carboxamide (Compound 189)

The title compound was obtained according to the same procedure as Example 180, except for using 2-chloroaniline instead of 4-(trifluoromethoxy)aniline.

1H NMR (300 MHz, DMSO-d$_6$) 10.45 (br, NH, 1H), 10.10 (br, NH, 1H), 8.40-8.35 (m, NH, 1H), 8.16 (s, 1H), 7.75-7.65 (m, 2H), 7.59-7.56 (m, 1H), 7.54-7.48 (m, 1H), 7.44-7.40 (m, 2H), 7.38-7.28 (m, 3H), 7.17 (m, 1H), 5.42-5.35 (m, 1H), 4.31-4.29 (m, 2H), 3.79-3.71 (m, 3H), 2.50-2.39 (m, 1H), 1.60-1.58 (m, 6H), 1.04-1.02 (m, 6H).

Example 190: Synthesis of 5-(2-chloro-5-(isobutyramidomethyl)benzamido)-N-(3,4-dichlorophenyl)-1-isopropyl-1H-indole-2-carboxamide (Compound 190)

The title compound was obtained according to the same procedure as Example 180, except for using 3,4-dichloroaniline instead of 4-(trifluoromethoxy)aniline.

1H NMR (300 MHz, DMSO-d$_6$) 10.72 (br, NH, 1H), 10.45 (br, NH, 1H), 8.37 (m, NH, 1H), 8.17 (m, 2H), 7.76-7.71 (m, 2H), 7.64-7.61 (m, 1H), 7.53-7.43 (m, 3H), 7.36-7.33 (m, 1H), 7.13 (m, 1H), 5.41-5.32 (m, 1H), 4.31-4.29 (m, 2H), 2.50-2.39 (m, 1H), 1.60-1.58 (m, 6H), 1.04-1.02 (m, 6H).

Example 191: Synthesis of 5-(2-chloro-5-(isobutyramidomethyl)benzamido)-N-(3,5-dichlorophenyl)-1-isopropyl-1H-indole-2-carboxamide (Compound 191)

The title compound was obtained according to the same procedure as Example 180, except for using 3,5-dichloroaniline instead of 4-(trifluoromethoxy)aniline.

1H NMR (300 MHz, DMSO-d$_6$) 10.75 (br, NH, 1H), 10.45 (br, NH, 1H), 8.37 (m, NH, 1H), 8.17 (m, 1H), 7.89 (m, 2H), 7.75-7.72 (m, 1H), 7.53-7.43 (m, 3H), 7.34 (m, 2H), 7.14 (m, 1H), 5.40-5.31 (m, 1H), 4.31-4.29 (m, 2H), 2.50-2.39 (m, 1H), 1.60-1.58 (m, 6H), 1.04-1.02 (m, 6H).

Example 192: Synthesis of N-(4-bromophenyl)-5-(2-chloro-5-(isobutyramidomethyl)benzamido)-1-isopropyl-1H-indole-2-carboxamide (Compound 192)

The title compound was obtained according to the same procedure as Example 180, except for using 4-bromoaniline instead of 4-(trifluoromethoxy)aniline.

1H NMR (300 MHz, DMSO-d$_6$) 10.58 (br, NH, 1H), 10.44 (br, NH, 1H), 8.37 (m, NH, 1H), 8.16 (m, 1H), 7.78-7.70 (m, 3H), 7.56-7.36 (m, 5H), 7.36-7.33 (m, 1H), 7.09 (m, 1H), 5.39-5.31 (m, 1H), 4.31-4.29 (m, 2H), 2.50-2.39 (m, 1H), 1.60-1.58 (m, 6H), 1.04-1.02 (m, 6H).

Example 193: Synthesis of 5-(2-chloro-5-(isobutyramidomethyl)benzamido)-N-(4-cyclohexylphenyl)-1-isopropyl-1H-indole-2-carboxamide (Compound 193)

The title compound was obtained according to the same procedure as Example 180, except for using 4-cyclohexylaniline instead of 4-(trifluoromethoxy)aniline.

1H NMR (300 MHz, DMSO-d$_6$) 10.43 (br, NH, 1H), 10.38 (br, NH, 1H), 8.37 (m, NH, 1H), 8.15-8.14 (m, 1H), 7.72-7.66 (m, 3H), 7.53-7.44 (m, 3H), 7.36-7.33 (m, 1H), 7.21-7.18 (m, 2H), 7.04 (m, 1H), 5.40-5.31 (m, 1H), 4.31-4.29 (m, 2H), 2.50-2.39 (m, 1H), 1.80-1.68 (m, 5H), 1.60-1.58 (m, 6H), 1.42-1.24 (m, 6H), 1.05-1.02 (m, 6H).

Example 194: Synthesis of N-(4-(tert-butyl)phenyl)-5-(2-chloro-5-(isobutyramidomethyl)benzamido)-1-isopropyl-1H-indole-2-carboxamide (Compound 194)

The title compound was obtained according to the same procedure as Example 180, except for using 4-(tert-butyl)aniline instead of 4-(trifluoromethoxy)aniline.

1H NMR (300 MHz, DMSO-d$_6$) 10.43 (br, NH, 1H), 10.38 (br, NH, 1H), 8.37 (m, NH, 1H), 8.14 (m, 1H), 7.72-7.68 (m, 3H), 7.53-7.50 (m, 1H), 7.47-7.44 (m, 2H), 7.38-7.33 (m, 3H), 7.05 (m, 1H), 5.41-5.31 (m, 1H), 4.31-4.29 (m, 2H), 2.50-2.39 (m, 1H), 1.60-1.58 (m, 6H), 1.29 (s, 9H), 1.04-1.02 (m, 6H).

Example 195: Synthesis of 5-(2-chloro-5-(isobutyramidomethyl)benzamido)-N-(3-chloro-5-fluorophenyl)-1-isopropyl-1H-indole-2-carboxamide (Compound 195)

The title compound was obtained according to the same procedure as Example 180, except for using 3-chloro-5-fluoroaniline instead of 4-(trifluoromethoxy)aniline.

1H NMR (300 MHz, DMSO-d$_6$) 10.78 (br, NH, 1H), 10.45 (br, NH, 1H), 8.37 (m, NH, 1H), 8.18-8.17 (m, 1H), 7.76-7.66 (m, 3H), 7.53-7.43 (m, 3H), 7.36-7.34 (m, 1H), 7.18-7.14 (m, 2H), 5.40-5.31 (m, 1H), 4.31-4.29 (m, 2H), 2.50-2.39 (m, 1H), 1.60-1.58 (m, 6H), 1.05-1.02 (m, 6H).

Example 196: Synthesis of 5-(2-chloro-5-(isobutyramidomethyl)benzamido)-N-(3,5-difluorophenyl)-1-isopropyl-1H-indole-2-carboxamide (Compound 196)

The title compound was obtained according to the same procedure as Example 180, except for using 3,5-difluoroaniline instead of 4-(trifluoromethoxy)aniline.

1H NMR (300 MHz, DMSO-d$_6$) 10.81 (br, NH, 1H), 10.46 (br, NH, 1H), 8.37 (m, NH, 1H), 8.17 (m, 1H), 7.75-7.72 (m, 1H), 7.56-7.43 (m, 5H), 7.36-7.33 (m, 1H), 7.13 (m, 1H), 7.01-6.94 (m, 1H), 5.38-5.31 (m, 1H), 4.31-4.29 (m, 2H), 2.50-2.39 (m, 1H), 1.60-1.58 (m, 6H), 1.05-1.02 (m, 6H).

Example 197: Synthesis of 5-(2-chloro-5-(isobutyramidomethyl)benzamido)-1-isopropyl-N-(4-methoxyphenyl)-1H-indole-2-carboxamide (Compound 197)

The title compound was obtained according to the same procedure as Example 180, except for using 4-methoxyaniline instead of 4-(trifluoromethoxy)aniline.

1H NMR (300 MHz, DMSO-d$_6$) 10.43 (br, NH, 1H), 10.33 (br, NH, 1H), 8.37 (m, NH, 1H), 8.14 (m, 1H), 7.75-7.67 (m, 3H), 7.53-7.50 (m, 1H), 7.47-7.43 (m, 2H), 7.36-7.33 (m, 1H), 7.03 (s, 1H), 6.95-6.91 (m, 2H), 5.40-5.35 (m, 1H), 4.31-4.29 (m, 2H), 3.79-3.71 (m, 3H), 2.50-2.39 (m, 1H), 1.61-1.57 (m, 6H), 1.05-1.02 (m, 6H).

Example 198: Synthesis of 5-(2-chloro-5-(isobutyramidomethyl)benzamido)-1-isopropyl-N-(6-(trifluoromethyl)pyridin-3-yl)-1H-indole-2-carboxamide (Compound 198)

The title compound was obtained according to the same procedure as Example 180, except for using 6-(trifluoromethyl)pyridin-3-amine instead of 4-(trifluoromethoxy)aniline.

1H NMR (300 MHz, DMSO-d$_6$) 10.99 (br, NH, 1H), 10.47 (br, NH, 1H), 9.11 (m, NH, 1H), 8.51-8.47 (m, 1H), 8.37 (m, 1H), 8.19 (s, 1H), 7.95-7.91 (m, 1H), 7.78-7.74 (m, 1H), 7.53-7.48 (m, 2H), 7.44 (s, 1H), 7.37-7.33 (m, 1H), 7.24 (s, 1H), 5.45-5.39 (m, 1H), 4.32-4.29 (m, 2H), 2.50-2.39 (m, 1H), 1.62-1.59 (m, 6H), 1.05-1.02 (m, 6H).

Example 199: Synthesis of 5-(2-chloro-5-(isobutyramidomethyl)benzamido)-N-(4-cyanophenyl)-1-isopropyl-1H-indole-2-carboxamide (Compound 199)

The title compound was obtained according to the same procedure as Example 180, except for using 4-aminobenzonitrile instead of 4-(trifluoromethoxy)aniline.

1H NMR (300 MHz, DMSO-d$_6$) 10.87 (br, NH, 1H), 10.46 (br, NH, 1H), 8.40-8.35 (m, NH, 1H), 8.18 (m, 1H), 8.00-7.98 (m, 1H), 7.85-7.82 (m, 2H), 7.76-7.72 (m, 1H), 7.56-7.47 (m, 2H), 7.44 (m, 2H), 7.37-7.33 (m, 1H), 7.16 (s, 1H), 5.41-5.33 (m, 1H), 4.32-4.29 (m, 2H), 2.50-2.39 (m, 1H), 1.62-1.59 (m, 6H), 1.05-1.02 (m, 6H).

Example 200: Synthesis of N-(4-chloro-2-methylphenyl)-5-(2-chloro-5-(isobutyramidomethyl)benzamido)-1-isopropyl-1H-indole-2-carboxamide (Compound 200)

The title compound was obtained according to the same procedure as Example 180, except for using 4-chloro-2-methylaniline instead of 4-(trifluoromethoxy)aniline.

1H NMR (300 MHz, DMSO-d$_6$) 10.44 (br, NH, 1H), 10.00 (br, NH, 1H), 8.37 (m, NH, 1H), 8.15 (s, 1H), 7.73-7.70 (m, 1H), 7.53-7.45 (m, 4H), 7.39-7.36 (m, 2H), 7.34-7.27 (m, 1H), 7.13 (s, 1H), 5.44-5.39 (m, 1H), 4.31-4.29 (m, 2H), 2.50-2.39 (m, 1H), 2.29 (s, 3H), 1.60-1.58 (m, 6H), 1.05-1.02 (m, 6H).

Example 201: Synthesis of 5-(2-chloro-5-(isobutyramidomethyl)benzamido)-1-isopropyl-N-(5,6,7,8-tetrahydronaphthalen-1-yl)-1H-indole-2-carboxamide (Compound 201)

The title compound was obtained according to the same procedure as Example 180, except for using 5,6,7,8-tetrahydronaphthalen-1-amine instead of 4-(trifluoromethoxy)aniline.

1H NMR (300 MHz, DMSO-d$_6$) 10.43 (br, NH, 1H), 9.81 (br, NH, 1H), 8.37 (m, NH, 1H), 8.14 (m, 1H), 7.73-7.69 (m, 1H), 7.53-7.44 (m, 3H), 7.37-7.33 (m, 1H), 7.24-7.21 (m, 1H), 7.15-7.10 (m, 2H), 7.02-6.99 (m, 1H), 5.45-5.39 (m, 1H), 4.32-4.29 (m, 2H), 2.78-2.71 (m, 4H), 2.50-2.39 (m, 1H), 1.74 (m, 4H), 1.60-1.58 (m, 6H), 1.05-1.02 (m, 6H).

Example 202: Synthesis of 5-(2-chloro-5-(isobutyramidomethyl)benzamido)-N-(2,4-difluorophenyl)-1-isopropyl-1H-indole-2-carboxamide (Compound 202)

The title compound was obtained according to the same procedure as Example 180, except for using 2,4-difluoroaniline instead of 4-(trifluoromethoxy)aniline.

1H NMR (300 MHz, DMSO-d$_6$) 10.45 (br, NH, 1H), 10.22 (br, NH, 1H), 8.39 (m, NH, 1H), 8.17 (m, 1H), 7.74-7.70 (m, 1H), 7.68-7.60 (m, 1H), 7.53-7.50 (m, 1H), 7.48-7.40 (m, 2H), 7.37-7.33 (m, 2H), 7.15-7.10 (m, 2H), 5.47-5.42 (m, 1H), 4.32-4.29 (m, 2H), 2.50-2.39 (m, 1H), 1.60-1.58 (m, 6H), 1.05-1.02 (m, 6H).

Example 203: Synthesis of methyl 4-(5-(2-chloro-5-(isobutyramidomethyl)benzamido)-1-isopropyl-1H-indole-2-carboxamido)benzoate (Compound 203)

The title compound was obtained according to the same procedure as Example 180, except for using methyl 4-aminobenzoate instead of 4-(trifluoromethoxy)aniline.

1H NMR (300 MHz, DMSO-d$_6$) 10.79 (br, NH, 1H), 10.45 (br, NH, 1H), 8.37 (m, NH, 1H), 8.17 (m, 1H), 8.03-7.88 (m, 3H), 7.75-7.71 (m, 1H), 7.53-7.49 (m, 2H), 7.47-7.43 (m, 2H), 7.36-7.33 (m, 1H), 7.15 (s, 1H), 5.40-5.34 (m, 1H), 4.31-4.29 (m, 2H), 3.85 (s, 3H), 2.50-2.40 (m, 1H), 1.62-1.59 (m, 6H), 1.05-1.02 (m, 6H).

Example 204: Synthesis of 4-(5-(2-chloro-5-(isobutyramidomethyl)benzamido)-1-isopropyl-1H-indole-2-carboxamido)benzoic acid (Compound 204)

Methyl 4-(5-(2-chloro-5-(isobutyramidomethyl)benzamido)-1-isopropyl-1H-indole-2-carboxamido)benzoate (25 mg, 0.042 mmol) was added to a 10 mL flask and dissolved in THF (0.5 ml) and MeOH (0.5 ml). LiOH (8.9 mg, 0.212 mmol) dissolved in H$_2$O (0.3 ml) was added and stirred for 12 hours. After concentration upon completion of the reaction, the pH was adjusted to 2 with 2N—HCl. The resulting solid was filtered to obtain 4-(5-(2-chloro-5-(isobutyramidomethyl)benzamido)-1-isopropyl-1H-indole-2-carboxamido)benzoic acid (15 mg, 0.026 mmol, 61%, white solid).

1H NMR (300 MHz, DMSO-d$_6$) 13.80 (br, OH, 1H), 10.75 (br, NH, 1H), 10.45 (br, NH, 1H), 8.37 (m, NH, 1H), 8.17-8.13 (m, 1H), 7.97-7.89 (m, 3H), 7.75-7.71 (m, 1H), 7.53-7.43 (m, 3H), 7.36-7.33 (m, 2H), 7.14 (s, 1H), 5.40-5.34 (m, 1H), 4.31-4.29 (m, 2H), 2.50-2.40 (m, 1H), 1.62-1.59 (m, 6H), 1.05-1.02 (m, 6H).

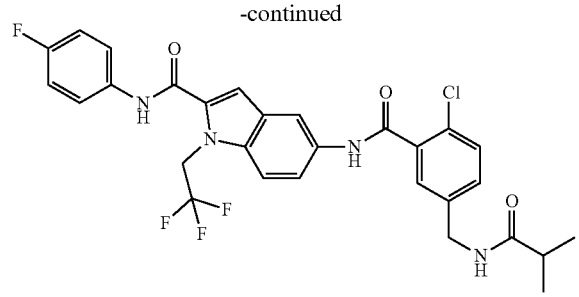

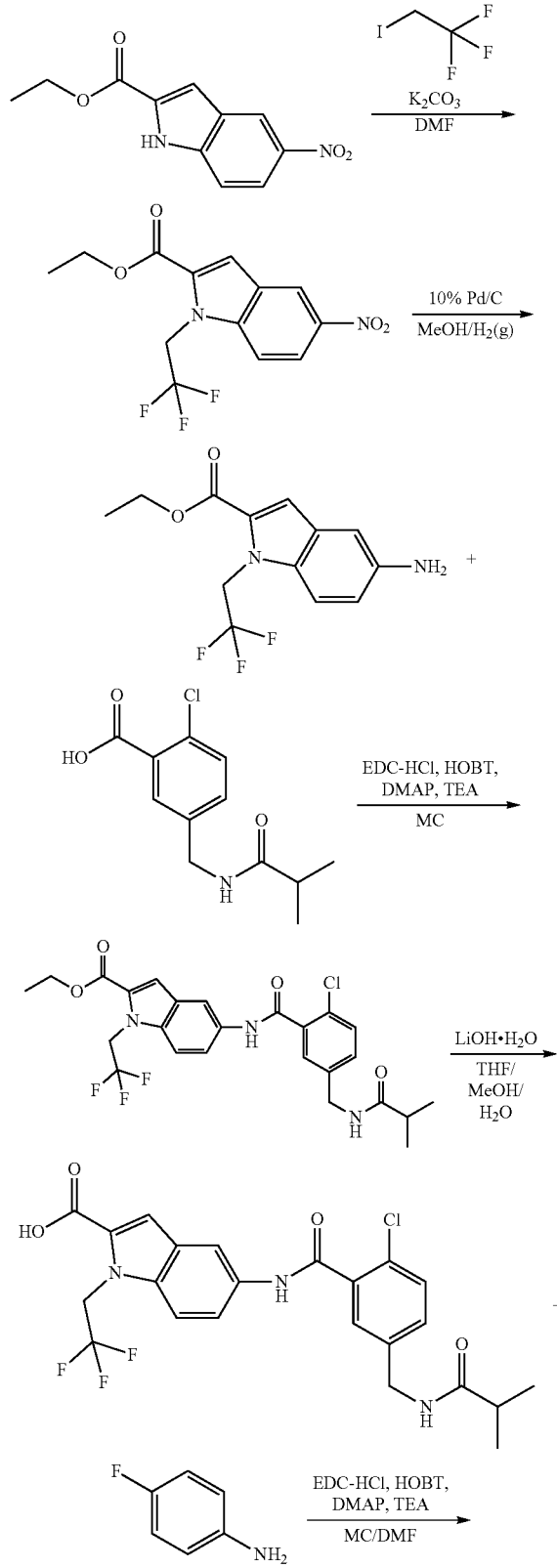

Example 205: Synthesis of 5-(2-chloro-5-(isobutyramidomethyl)benzamido)-N-(4-fluorophenyl)-1-(2,2,2-trifluoroethyl)-1H-indole-2-carboxamide (Compound 205)

Example 205-1: Synthesis of ethyl 5-nitro-1-(2,2,2-trifluoroethyl)-1H-indole-2-carboxylate Ethyl 5-nitro-1H-indole-2-carboxylate (3 g, 12.81 mmol) and 1,1,1-trifluoro-2-iodoethane (4.03 g, 19.21 mmol) were added to a 100 mL flask and dissolved in DMF (50 ml). $K_2CO_3$ (3.54 g, 25.62 mmol) was added thereto and stirred under reflux for 12 hours. After the reaction was completed, the organic material was extracted with ethyl acetate/$H_2O$. The organic layer was dried over $MgSO_4$ and distilled under reduced pressure to remove the solvent. The residue was subjected to column chromatography (ethyl acetate:n-hexane=1:3) to obtain ethyl 5-nitro-1-(2,2,2-trifluoroethyl)-1H-indole-2-carboxylate (3.4 g, 10.75 mmol, 84%, white solid).

1H NMR (300 MHz, DMSO-$d_6$) 8.79 (m, 1H), 8.29-8.26 (m, 1H), 8.03-8.00 (m, 1H), 7.71 (m, 1H), 5.75-5.66 (m, 2H), 4.41-4.34 (m, 2H), 1.37-1.32 (m, 3H).

Example 205-2: Synthesis of ethyl 5-amino-1-(2,2,2-trifluoroethyl)-1H-indole-2-carboxylate Ethyl 5-nitro-1-(2,2,2-trifluoroethyl)-1H-indole-2-carboxylate (3.4 g, 10.75 mmol) was added to a 100 mL flask and dissolved in EtOH (60 ml). 10% Pd/C (1.7 g) was added and stirred for 12 hours at room temperature under $H_2$ (g). After Celite filtration upon completion of the reaction, the solvent was removed by distillation under reduced pressure. The residue was subjected to column chromatography (ethyl acetate:n-hexane=1:3) to obtain ethyl 5-amino-1-(2,2,2-trifluoroethyl)-1H-indole-2-carboxylate (2.8 g, 9.78 mmol, 90%).

1H NMR (300 MHz, DMSO-$d_6$) 7.42-7.39 (m, 1H), 7.12 (m, 1H), 6.81-6.78 (m, 1H), 6.74 (m, 1H), 5.49-5.40 (m, 2H), 4.84 (br, NH, 2H), 4.33-4.26 (m, 2H), 1.33-1.28 (m, 3H).

Example 205-3: Synthesis of ethyl 5-(2-chloro-5-(isobutyramidomethyl)benzamido)-1-(2,2,2-trifluoroethyl)-1H-indole-2-carboxylate Ethyl 5-amino-1-(2,2,2-trifluoroethyl)-1H-indole-2-carboxylate (2.8 g, 9.78 mmol) and 2-chloro-5-(isobutyramidomethyl)benzoic acid (3.0 g, 11.736 mmol) were added to a 100 mL flask and dissolved in $CH_2Cl_2$ (60 ml). HOBT (1.98 g, 14.67 mmol) and DMAP (1.194 g, 9.78 mmol) were added thereto and reacted for 10 minutes. EDC (5.624 g, 29.34 mmol) and TEA (4.09 ml, 29.34 mmol) were added and stirred under reflux for 12 hours. After completion of the reaction, the organic material was extracted with $CH_2Cl_2/H_2O$. The organic layer was dried over $MgSO_4$ and distilled under reduced pressure to remove the solvent. The residue was subjected to column chromatography (ethyl acetate:n-hexane=3:1) to obtain ethyl 5-(2-chloro-5-(isobutyramidomethyl)benzamido)-1-(2,2,2-trifluoroethyl)-1H-indole-2-carboxylate (3.54 g, 6.75 mmol, 69%, white solid).

1H NMR (300 MHz, DMSO-$d_6$) 10.53 (br, NH, 1H), 8.39-8.35 (m, NH, 1H), 8.23 (m, 1H), 7.75-7.72 (m, 1H), 7.59-7.56 (m, 1H), 7.52-7.50 (m, 1H), 7.43 (m, 2H), 7.36-7.33 (m, 1H), 5.62-5.53 (m, 2H), 4.38-4.28 (m, 4H), 2.50-2.38 (m, 1H), 1.36-1.31 (m, 3H), 1.04-1.02 (m, 6H).

Example 205-4: Synthesis of 5-(2-chloro-5-(isobutyramidomethyl)benzamido)-1-(2,2,2-trifluoroethyl)-1H-indole-2-carboxylic acid Ethyl 5-(2-chloro-5-(isobutyramidomethyl)benzamido)-1-(2,2,2-trifluoroethyl)-1H-indole-2-carboxylate (3.54 g, 6.75 mmol) was added to a 500 mL flask and dissolved in THF (40 ml) and MeOH (40 ml). LiOH (1.416 g, 33.75 mmol) dissolved in $H_2O$ (40 ml) was added and stirred for 12 hours. After concentration upon completion of the reaction, the pH was adjusted to 2 with 2N—HCl. The resulting solid was filtered to obtain 5-(2-chloro-5-(isobutyramidomethyl)benzamido)-1-(2,2,2-trifluoroethyl)-1H-indole-2-carboxylic acid (2.94 g, 5.92 mmol, 88%, white solid).

1H NMR (300 MHz, DMSO-$d_6$) 10.51 (br, NH, 1H), 8.37 (m, NH, 1H), 8.22 (m, 1H), 7.72-7.69 (m, 1H), 7.56-7.50 (m, H), 7.43 (m, 1H), 7.37-7.33 (m, 2H), 5.61-5.59 (m, 2H), 4.30-4.29 (m, 2H), 2.50-2.38 (m, 1H), 1.04-1.02 (m, 6H).

Example 205-5: Synthesis of 5-(2-chloro-5-(isobutyramidomethyl)benzamido)-N-(4-fluorophenyl)-1-(2,2,2-trifluoroethyl)-1H-indole-2-carboxamide (Compound 205)

5-(2-chloro-5-(isobutyramidomethyl)benzamido)-1-(2,2,2-trifluoroethyl)-1H-indole-2-carboxylic acid (100 mg, 0.2 mmol) and 4-fluoroaniline (87 mg, 0.495 mmol) were added to a 10 mL flask and dissolved in $CH_2Cl_2$ (5 ml) and DMF (1 ml). HOBT (89 mg, 0.66 mmol) and DMAP (80 mg, 0.66 mmol) were added thereto and reacted for 10 minutes. EDC (126 mg, 0.66 mmol) and TEA (91 µl, 0.66 mmol) were added and stirred under reflux for 12 hours. After the reaction was completed, the organic material was extracted with ethyl acetate/$H_2O$. The organic layer was dried over $MgSO_4$ and distilled under reduced pressure to remove the solvent. The residue was subjected to column chromatography (ethyl acetate:n-hexane=3:1) to obtain 5-(2-chloro-5-(isobutyramidomethyl)benzamido)-N-(4-fluorophenyl)-1-(2,2,2-trifluoroethyl)-1H-indole-2-carboxamide (140 mg, 0.227 mmol, 69%, white solid).

1H NMR (300 MHz, DMSO-$d_6$) 10.54-10.52 (m, NH, 2H), 8.39-8.35 (m, NH, 1H), 8.22 (s, 1H), 7.81-7.72 (m, 3H), 7.58-7.44 (m, 2H), 7.45 (s, 2H), 7.36-7.34 (m, 2H), 7.26-7.19 (m, 2H), 5.70-5.61 (m, 2H), 4.31-4.29 (m, 2H), 2.51-2.39 (m, 1H), 1.05-1.02 (m, 6H).

Example 206: Synthesis of 5-(2-chloro-5-(isobutyramidomethyl)benzamido)-N-(4-chlorophenyl)-1-(2,2,2-trifluoroethyl)-1H-indole-2-carboxamide (Compound 206)

The title compound was obtained according to the same procedure as Example 205, except for using 4-chloroaniline instead of 4-fluoroaniline.

1H NMR (300 MHz, DMSO-$d_6$) 10.60 (s, NH, 1H), 10.52 (s, NH, 1H), 8.39-8.35 (m, NH, 1H), 8.22 (s, 1H), 7.82-7.79 (m, 2H), 7.75-7.72 (m, 1H), 7.59-7.51 (m, 2H), 7.47-7.42 (m, 4H), 7.37-7.34 (m, 1H), 5.70-5.60 (m, 2H), 4.31-4.29 (m, 2H), 2.51-2.39 (m, 1H), 1.05-1.02 (m, 6H).

Example 207: Synthesis of 5-(2-chloro-5-(isobutyramidomethyl)benzamido)-1-(2,2,2-trifluoroethyl)-N-(4-(trifluoromethyl)phenyl)-1H-indole-2-carboxamide (Compound 207)

The title compound was obtained according to the same procedure as Example 205, except for using 4-(trifluoromethyl)aniline instead of 4-fluoroaniline.

1H NMR (300 MHz, DMSO-$d_6$) 10.80 (s, NH, 1H), 10.54 (s, NH, 1H), 8.39-8.35 (m, NH, 1H), 8.24 (s, 1H), 8.03-7.99 (m, 2H), 7.77-7.74 (m, 3H), 7.60-7.57 (m, 1H), 7.54-7.51 (m, 2H), 7.44 (s, 1H), 7.38-7.34 (m, 1H), 5.68-5.61 (m, 2H), 4.31-4.29 (m, 2H), 2.51-2.39 (m, 1H), 1.05-1.02 (m, 6H).

Example 208: Synthesis of 5-(2-chloro-5-(isobutyramidomethyl)benzamido)-1-(2,2,2-trifluoroethyl)-N-(3-(trifluoromethyl)phenyl)-1H-indole-2-carboxamide (Compound 208)

The title compound was obtained according to the same procedure as Example 205, except for using 3-(trifluoromethyl)aniline instead of 4-fluoroaniline.

1H NMR (300 MHz, DMSO-$d_6$) 10.77 (s, NH, 1H), 10.54 (s, NH, 1H), 8.39-8.35 (m, NH, 1H), 8.24 (s, 2H), 8.06-8.02 (m, 1H), 7.78-7.74 (m, 1H), 7.66-7.57 (m, 2H), 7.54-7.51 (m, 2H), 7.52-7.45 (m, 2H), 7.38-7.34 (m, 1H), 7.38-7.34 (m, 1H), 5.69-5.65 (m, 2H), 4.32-4.29 (m, 2H), 2.51-2.39 (m, 1H), 1.05-1.02 (m, 6H).

Example 209: Synthesis of 5-(2-chloro-5-(isobutyramidomethyl)benzamido)-1-(2,2,2-trifluoroethyl)-N-(4-(trifluoromethoxy)phenyl)-1H-indole-2-carboxamide (Compound 209)

The title compound was obtained according to the same procedure as Example 205, except for using 4-(trifluoromethoxy)aniline instead of 4-fluoroaniline.

1H NMR (300 MHz, DMSO-$d_6$) 10.67 (s, NH, 1H), 10.53 (s, NH, 1H), 8.39-8.35 (m, NH, 1H), 8.23 (s, 2H), 7.91-7.87 (m, 2H), 7.76-7.73 (m, 1H), 7.59-7.51 (m, 2H), 7.48-7.44 (m, 2H), 7.41-7.34 (m, 3H), 5.68-5.64 (m, 2H), 4.32-4.29 (m, 2H), 2.51-2.35 (m, 1H), 1.05-1.02 (m, 6H).

Example 210: Synthesis of 5-(2-chloro-5-(isobutyramidomethyl)benzamido)-1-(2,2,2-trifluoroethyl)-N-(3-(trifluoromethoxy)phenyl)-1H-indole-2-carboxamide (Compound 210)

The title compound was obtained according to the same procedure as Example 205, except for using 3-(trifluoromethoxy)aniline instead of 4-fluoroaniline.

1H NMR (300 MHz, DMSO-$d_6$) 10.72 (s, NH, 1H), 10.53 (s, NH, 1H), 8.39-8.35 (m, NH, 1H), 8.23 (s, 1H), 7.90 (s, 1H), 7.80-7.73 (m, 2H), 7.60-7.53 (m, 2H), 7.52-7.44 (m, 3H), 7.38-7.34 (m, 1H), 7.14-7.11 (m, 1H), 5.68-5.64 (m, 2H), 4.32-4.29 (m, 2H), 2.51-2.35 (m, 1H), 1.05-1.02 (m, 6H).

Example 211: Synthesis of 5-(2-chloro-5-(isobutyramidomethyl)benzamido)-N-(3-chlorophenyl)-1-(2,2,2-trifluoroethyl)-1H-indole-2-carboxamide (Compound 211)

The title compound was obtained according to the same procedure as Example 205, except for using 3-chloroaniline instead of 4-fluoroaniline.

1H NMR (300 MHz, DMSO-$d_6$) 10.64 (s, NH, 1H), 10.53 (s, NH, 1H), 8.39-8.35 (m, NH, 1H), 8.23 (s, 1H), 7.96 (s, 1H), 7.77-7.68 (m, 2H), 7.60-7.51 (m, 2H), 7.48-7.44 (m, 2H), 7.42-7.34 (m, 2H), 7.22-7.18 (m, 1H), 5.67-5.63 (m, 2H), 4.32-4.29 (m, 2H), 2.51-2.35 (m, 1H), 1.05-1.02 (m, 6H).

Example 212: Synthesis of N-(3-chloro-4-fluorophenyl)-5-(2-chloro-5-(isobutyramidomethyl)benzamido)-1-(2,2,2-trifluororoethyl)-1H-indole-2-carboxamide (Compound 212)

The title compound was obtained according to the same procedure as Example 205, except for using 3-chloro-4-fluoroaniline instead of 4-fluoroaniline.

1H NMR (300 MHz, DMSO-$d_6$) 10.67 (s, NH, 1H), 10.53 (s, NH, 1H), 8.39-8.35 (m, NH, 1H), 8.23 (s, 1H), 8.08-8.05 (m, 1H), 7.76-7.68 (m, 2H), 7.60-7.51 (m, 2H), 7.48-7.42 (m, 3H), 7.38-7.34 (m, 1H), 5.67-5.63 (m, 2H), 4.32-4.29 (m, 2H), 2.51-2.35 (m, 1H), 1.05-1.02 (m, 6H).

Example 213: Synthesis of N-(4-chloro-3-fluorophenyl)-5-(2-chloro-5-(isobutyramidomethyl)benzamido)-1-(2,2,2-trifluororoethyl)-1H-indole-2-carboxamide (Compound 213)

The title compound was obtained according to the same procedure as Example 205, except for using 4-chloro-3-fluoroaniline instead of 4-fluoroaniline.

1H NMR (300 MHz, DMSO-$d_6$) 10.77 (s, NH, 1H), 10.53 (s, NH, 1H), 8.39-8.35 (m, NH, 1H), 8.23 (s, 1H), 7.94-7.90 (m, 1H), 7.77-7.73 (m, 1H), 7.60-7.56 (m, 3H), 7.54-7.44 (m, 3H), 7.38-7.34 (m, 1H), 5.67-5.60 (m, 2H), 4.32-4.29 (m, 2H), 2.51-2.35 (m, 1H), 1.05-1.02 (m, 6H).

Example 214: Synthesis of N-(4-chloro-2-fluorophenyl)-5-(2-chloro-5-(isobutyramidomethyl)benzamido)-1-(2,2,2-trifluororoethyl)-1H-indole-2-carboxamide (Compound 214)

The title compound was obtained according to the same procedure as Example 205, except for using 4-chloro-2-fluoroaniline instead of 4-fluoroaniline.

1H NMR (300 MHz, DMSO-$d_6$) 10.53 (s, NH, 1H), 10.42 (s, NH, 1H), 8.39-8.35 (m, NH, 1H), 8.23 (s, 1H), 7.75-7.72 (m, 1H), 7.70-7.52 (m, 4H), 7.50 (s, 1H), 7.45-7.44 (s, 1H), 7.38-7.33 (m, 2H), 5.67-5.60 (m, 2H), 4.32-4.29 (m, 2H), 2.51-2.35 (m, 1H), 1.05-1.02 (m, 6H).

Example 215: Synthesis of N-(3-chloro-5-fluorophenyl)-5-(2-chloro-5-(isobutyramidomethyl)benzamido)-1-(2,2,2-trifluororoethyl)-1H-indole-2-carboxamide (Compound 215)

The title compound was obtained according to the same procedure as Example 205, except for using 3-chloro-5-fluoroaniline instead of 4-fluoroaniline.

1H NMR (300 MHz, DMSO-$d_6$) 10.78 (s, NH, 1H), 10.54 (s, NH, 1H), 8.40-8.35 (m, NH, 1H), 8.24 (s, 1H), 7.77-7.74 (m, 2H), 7.69-7.64 (m, 1H), 7.61-7.57 (m, 1H), 7.55-7.50 (m, 2H), 7.45 (s, 1H), 7.38-7.34 (m, 1H), 7.22-7.18 (m, 1H), 5.69-5.60 (m, 2H), 4.32-4.29 (m, 2H), 2.51-2.35 (m, 1H), 1.05-1.02 (m, 6H).

Example 216: Synthesis of N-(3-fluoro-5-trifluoromethylphenyl)-5-(2-chloro-5-(isobutyramidomethyl)benzamido)-1-(2,2,2-trifluoroethyl)-1H-indole-2-carboxamide (Compound 216)

The title compound was obtained according to the same procedure as Example 205, except for using 3-fluoro-5-trifluoromethylaniline instead of 4-fluoroaniline.

1H NMR (300 MHz, DMSO-$d_6$) 10.93 (s, NH, 1H), 10.55 (s, NH, 1H), 8.40-8.35 (m, NH, 1H), 8.25 (s, 1H), 8.05-7.96 (m, 2H), 7.79-7.75 (m, 1H), 7.61-7.57 (m, 1H), 7.54-7.50 (m, 2H), 7.45 (s, 2H), 7.38-7.34 (m, 1H), 5.69-5.60 (m, 2H), 4.32-4.29 (m, 2H), 2.51-2.35 (m, 1H), 1.05-1.02 (m, 6H).

-continued

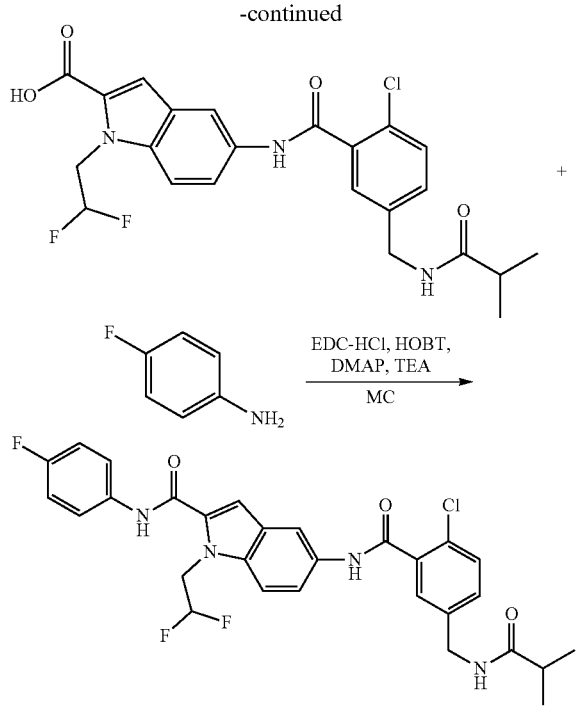

Example 217: Synthesis of 5-(2-chloro-5-(isobutyramidomethyl)benzamido)-N-(4-fluorophenyl)-1-(2,2-difluoroethyl)-1H-indole-2-carboxamide (Compound 217)

Example 217-1: Synthesis of ethyl 5-nitro-1-(2,2-difluoroethyl)-1H-indole-2-carboxylate Ethyl 5-nitro-1H-indole-2-carboxylate (5 g, 21.35 mmol) and 1,1-difluoro-2-iodoethane (8.19 g, 42.70 mmol) were added to a 250 mL flask and dissolved in DMF (50 ml). Cs$_2$CO$_3$ (20.87 g, 64.04 mmol) was added thereto and stirred under reflux for 12 hours. After the reaction was completed, the organic material was extracted with ethyl acetate/H$_2$O. The organic layer was dried over MgSO$_4$ and distilled under reduced pressure to remove the solvent. The residue was recrystallized with hexane to obtain ethyl 5-nitro-1-(2,2-difluoroethyl)-1H-indole-2-carboxylate (5.05 g, 16.93 mmol, 79%, white solid).

1H NMR (300 MHz, DMSO-d$_6$) 8.78 (s, 1H), 8.25-8.21 (m, 1H), 7.95-7.91 (m, 1H), 7.65 (s, 1H), 6.62-6.23 (m, 1H), 5.22-5.12 (m, 2H), 4.41-4.34 (m, 2H), 1.38-1.32 (m, 3H).

Example 217-2: Synthesis of ethyl 5-amino-1-(2,2-difluoroethyl)-1H-indole-2-carboxylate Ethyl 5-nitro-1-(2,2-difluoroethyl)-1H-indole-2-carboxylate (5.05 g, 16.93 mmol) was added to a 250 mL flask and dissolved in MeOH (100 ml). 10% Pd/C (505 mg) was added and stirred for 12 hours at room temperature under H$_2$ (g). After Celite filtration upon completion of the reaction, the solvent was removed by distillation under reduced pressure. The residue was subjected to column chromatography (ethyl acetate:n-hexane=1:3) to obtain ethyl 5-amino-1-(2,2-difluoroethyl)-1H-indole-2-carboxylate (4.08 g, 15.22 mmol, 89.9%).

1H NMR (300 MHz, DMSO-d$_6$) 7.37-7.33 (m, 1H), 7.05 (s, 1H), 6.80-6.73 (m, 1H), 6.47-6.09 (m, 1H), 4.97-4.85 (m, 2H), 4.80 (br, NH, 2H), 4.33-4.25 (m, 2H), 1.33-1.28 (m, 3H).

Example 217-3: Synthesis of ethyl 5-(2-chloro-5-(isobutyramidomethyl)benzamido)-1-(2,2-difluoroethyl)-1H-indole-2-carboxylate Ethyl 5-amino-1-(2,2-difluoroethyl)-1H-indole-2-carboxylate (1.5 g, 5.59 mmol) and 2-chloro-5-(isobutyramidomethyl)benzoic acid (1.71 g, 6.71 mmol) were added to a 100 mL flask and dissolved in CH$_2$Cl$_2$ (38 ml). HOBT (1.13 g, 8.39 mmol) and DMAP (205 mg, 1.68 mmol) was added thereto and reacted for 10 minutes. EDC (1.61 g, 8.39 mmol) and TEA (1.95 ml, 13.98 mmol) were added and stirred under reflux for 12 hours. After completion of the reaction, the organic material was extracted with CH$_2$Cl$_2$/H$_2$O. The organic layer was dried over MgSO$_4$ and distilled under reduced pressure to remove the solvent. The residue was recrystallized with dichloromethane to obtain ethyl 5-(2-chloro-5-(isobutyramidomethyl)benzamido)-1-(2,2-difluoroethyl)-1H-indole-2-carboxylate (2.16 g, 4.26 mmol, 76.2%, white solid).

1H NMR (300 MHz, DMSO-d$_6$) 10.50 (br, NH, 1H), 8.39-8.34 (m, NH, 1H), 8.21 (m, 1H), 7.68-7.64 (m, 1H), 7.57-7.50 (m, 2H), 7.43 (s, 1H), 7.37-7.33 (m, 2H), 6.55-6.17 (m, 1H), 5.09-5.00 (m, 2H), 4.38-4.28 (m, 4H), 2.51-2.37 (m, 1H), 1.37-1.32 (m, 3H), 1.05-1.02 (m, 6H).

Example 217-4: Synthesis of 5-(2-chloro-5-(isobutyramidomethyl)benzamido)-1-(2,2-difluoroethyl)-1H-indole-2-carboxylic acid Ethyl 5-(2-chloro-5-(isobutyramidomethyl)benzamido)-1-(2,2-difluoroethyl)-1H-indole-2-carboxylate (2.1 g, 4.15 mmol) was added to a 500 mL flask and dissolved in THF (21 ml) and MeOH (21 ml). LiOH (0.87 g, 20.75 mmol) dissolved in H$_2$O (17 ml) was added and stirred for 12 hours. After concentration upon completion of the reaction, the pH was adjusted to 2 with 2N—HCl. The resulting solid was filtered to obtain 5-(2-chloro-5-(isobutyramidomethyl)benzamido)-1-(2,2-difluoroethyl)-1H-indole-2-carboxylic acid (1.96 g, 4.11 mmol, 99%, white solid).

1H NMR (300 MHz, DMSO-d$_6$) 13.14 (br, OH, 1H), 10.48 (br, NH, 1H), 8.37 (m, NH, 1H), 8.20 (s, NH, 1H), 7.66-7.62 (m, 1H), 7.54-7.50 (m, 2H), 7.43 (m, 1H), 7.37-7.33 (m, 2H), 6.53-6.15 (m, 1H), 5.10-5.00 (m, 2H), 4.31-4.29 (m, 2H), 2.50-2.38 (m, 1H), 1.04-1.02 (m, 6H).

Example 217-5: Synthesis of 5-(2-chloro-5-(isobutyramidomethyl)benzamido)-N-(4-fluorophenyl)-1-(2,2-difluoroethyl)-1H-indole-2-carboxamide (Compound 217)

5-(2-chloro-5-(isobutyramidomethyl)benzamido)-1-(2,2-difluoroethyl)-1H-indole-2-carboxylic acid (120 mg, 0.25 mmol) and 4-fluoroaniline (33.4 mg, 0.30 mmol) were added to a 10 mL flask and dissolved in CH$_2$Cl$_2$ (1.7 ml). HOBT (50.8 mg, 0.38 mmol) and DMAP (9.2 mg, 0.07 mmol) were added thereto and reacted for 10 minutes. EDC (72.1 mg, 0.38 mmol) and TEA (0.11 ml, 0.75 mmol) were added and stirred under reflux for 12 hours. After the reaction was completed, the organic material was extracted with ethyl acetate/H$_2$O. The organic layer was dried over MgSO$_4$ and distilled under reduced pressure to remove the solvent. The residue was subjected to column chromatography (ethyl acetate:n-hexane=2:1) to obtain 5-(2-chloro-5-(isobutyramidomethyl)benzamido)-N-(4-fluorophenyl)-1-(2,2-difluoroethyl)-1H-indole-2-carboxamide (124.7 mg, 0.22 mmol, 87.1%, white solid).

1H NMR (300 MHz, DMSO-$d_6$) 10.52-10.50 (m, NH, 2H), 8.43-8.39 (m, NH, 1H), 8.20 (s, 1H), 7.83-7.78 (m, 2H), 7.67-7.63 (m, 1H), 7.56-7.50 (m, 2H), 7.45-7.42 (m, 2H), 7.37-7.34 (m, 1H), 7.25-7.18 (m, 2H), 6.59-6.21 (m, 1H), 5.10-5.00 (m, 2H), 4.31-4.29 (m, 2H), 2.51-2.39 (m, 1H), 1.05-1.02 (m, 6H).

Example 218: Synthesis of 5-(2-chloro-5-(isobutyramidomethyl)benzamido)-N-(4-chlorophenyl)-1-(2,2-difluoroethyl)-1H-indole-2-carboxamide (Compound 218)

The title compound was obtained according to the same procedure as Example 217, except for using 4-chloroaniline instead of 4-fluoroaniline.

1H NMR (300 MHz, DMSO-$d_6$) 10.55-10.49 (m, NH, 2H), 8.40-8.35 (m, NH, 1H), 8.20 (s, 1H), 7.84-7.80 (m, 2H), 7.67-7.63 (m, 1H), 7.56-7.50 (m, 2H), 7.45-7.41 (m, 4H), 7.37-7.33 (m, 1H), 6.59-6.21 (m, 1H), 5.10-5.00 (m, 2H), 4.31-4.29 (m, 2H), 2.51-2.39 (m, 1H), 1.05-1.02 (m, 6H).

Example 219: Synthesis of 5-(2-chloro-5-(isobutyramidomethyl)benzamido)-1-(2,2-difluoroethyl)-N-(4-(trifluoromethoxy)phenyl)-1H-indole-2-carboxamide (Compound 219)

The title compound was obtained according to the same procedure as Example 217, except for using 4-(trifluoromethoxy)aniline instead of 4-fluoroaniline.

1H NMR (300 MHz, DMSO-$d_6$) 10.62-10.49 (m, NH, 2H), 8.40-8.35 (m, NH, 1H), 8.21 (s, 1H), 7.92-7.88 (m, 2H), 7.68-7.64 (m, 1H), 7.56-7.50 (m, 2H), 7.45-7.34 (m, 5H), 6.59-6.21 (m, 1H), 5.10-5.00 (m, 2H), 4.32-4.29 (m, 2H), 2.51-2.39 (m, 1H), 1.05-1.02 (m, 6H).

Example 220: Synthesis of 5-(2-chloro-5-(isobutyramidomethyl)benzamido)-1-(2,2-difluoroethyl)-N-(4-(trifluoromethyl)phenyl)-1H-indole-2-carboxamide (Compound 220)

The title compound was obtained according to the same procedure as Example 217, except for using 4-(trifluoromethyl)aniline instead of 4-fluoroaniline.

1H NMR (300 MHz, DMSO-$d_6$) 10.75 (br, NH, 1H), 10.51 (br, NH, 1H), 8.40-8.35 (m, NH, 1H), 8.22 (s, 1H), 8.04-8.01 (m, 2H), 7.67-7.73 (m, 2H), 7.69-7.65 (m, 1H), 7.57-7.51 (m, 2H), 7.48-7.45 (m, 2H), 7.37-7.34 (m, 1H), 6.61-6.21 (m, 1H), 5.10-5.00 (m, 2H), 4.32-4.28 (m, 2H), 2.51-2.39 (m, 1H), 1.05-1.02 (m, 6H).

Example 221: Synthesis of N-(2-chloro-4-fluorophenyl)-5-(2-chloro-5-(isobutyramidomethyl)benzamido)-1-(2,2-difluoroethyl)-1H-indole-2-carboxamide (Compound 221)

The title compound was obtained according to the same procedure as Example 217, except for using 2-chloro-4-fluoroaniline instead of 4-fluoroaniline.

1H NMR (300 MHz, DMSO-$d_6$) 10.51 (br, NH, 1H), 10.25 (br, NH, 1H), 8.40-8.35 (m, NH, 1H), 8.21 (s, 1H), 7.68-7.58 (m, 3H), 7.54-7.51 (m, 2H), 7.47-7.45 (m, 2H), 7.37-7.27 (m, 2H), 6.54-6.16 (m, 1H), 5.08-4.98 (m, 2H), 4.32-4.28 (m, 2H), 2.51-2.39 (m, 1H), 1.05-1.02 (m, 6H).

Example 222: Synthesis of N-(4-chloro-2-fluorophenyl)-5-(2-chloro-5-(isobutyramidomethyl)benzamido)-1-(2,2-difluoroethyl)-1H-indole-2-carboxamide (Compound 222)

The title compound was obtained according to the same procedure as Example 217, except for using 4-chloro-2-fluoroaniline instead of 4-fluoroaniline.

1H NMR (300 MHz, DMSO-$d_6$) 10.50 (br, NH, 1H), 10.35 (br, NH, 1H), 8.40-8.35 (m, NH, 1H), 8.22 (s, 1H), 7.69-7.62 (m, 2H), 7.60-7.50 (m, 3H), 7.47-7.44 (m, 2H), 7.37-7.33 (m, 2H), 6.61-6.17 (m, 1H), 5.09-4.99 (m, 2H), 4.32-4.29 (m, 2H), 2.51-2.39 (m, 1H), 1.05-1.02 (m, 6H).

Example 223: Synthesis of N-(4-chloro-3-fluorophenyl)-5-(2-chloro-5-(isobutyramidomethyl)benzamido)-1-(2,2-difluoroethyl)-1H-indole-2-carboxamide (Compound 223)

The title compound was obtained according to the same procedure as Example 217, except for using 4-chloro-3-fluoroaniline instead of 4-fluoroaniline.

1H NMR (300 MHz, DMSO-$d_6$) 10.72 (br, NH, 1H), 10.51 (br, NH, 1H), 8.40-8.35 (m, NH, 1H), 8.22 (s, 1H), 7.97-7.91 (m, 1H), 7.68-7.50 (m, 5H), 7.43 (m, 2H), 7.37-7.34 (m, 1H), 6.60-6.21 (m, 1H), 5.10-5.00 (m, 2H), 4.32-4.29 (m, 2H), 2.51-2.39 (m, 1H), 1.05-1.02 (m, 6H).

Example 224: Synthesis of N-(3-chloro-4-fluorophenyl)-5-(2-chloro-5-(isobutyramidomethyl)benzamido)-1-(2,2-difluoroethyl)-1H-indole-2-carboxamide (Compound 224)

The title compound was obtained according to the same procedure as Example 217, except for using 3-chloro-4-fluoroaniline instead of 4-fluoroaniline.

1H NMR (300 MHz, DMSO-$d_6$) 10.61 (br, NH, 1H), 10.50 (br, NH, 1H), 8.40-8.35 (m, NH, 1H), 8.22 (s, 1H), 8.11-8.07 (m, 1H), 7.75-7.69 (m, 1H), 7.68-7.64 (m, 1H), 7.55-7.50 (m, 2H), 7.48-7.41 (m, 3H), 7.37-7.34 (m, 1H), 6.60-6.22 (m, 1H), 5.10-5.00 (m, 2H), 4.32-4.28 (m, 2H), 2.51-2.39 (m, 1H), 1.05-1.02 (m, 6H).

Example 225: Synthesis of 5-(2-chloro-5-(isobutyramidomethyl)benzamido)-N-(3,4-dichlorophenyl)-1-(2,2-difluoroethyl)-1H-indole-2-carboxamide (Compound 225)

The title compound was obtained according to the same procedure as Example 217, except for using 3,4-dichloroaniline instead of 4-fluoroaniline.

1H NMR (300 MHz, DMSO-$d_6$) 10.67 (br, NH, 1H), 10.51 (br, NH, 1H), 8.40-8.35 (m, NH, 1H), 8.22-8.17 (m, 2H), 7.78-7.74 (m, 1H), 7.69-7.62 (m, 2H), 7.57-7.50 (m, 2H), 7.44 (s, 2H), 7.37-7.34 (m, 1H), 6.60-6.22 (m, 1H), 5.10-5.00 (m, 2H), 4.32-4.29 (m, 2H), 2.51-2.39 (m, 1H), 1.05-1.02 (m, 6H).

Example 226: Synthesis of 5-(2-chloro-5-(isobutyramidomethyl)benzamido)-1-(2,2-difluoroethyl)-N-(2-fluoro-4-(trifluoromethyl)phenyl)-1H-indole-2-carboxamide (Compound 226)

The title compound was obtained according to the same procedure as Example 217, except for using 2-fluoro-4-(trifluoromethyl)aniline instead of 4-fluoroaniline.

111
1H NMR (300 MHz, DMSO-d$_6$) 10.54-10.51 (br, NH, 2H), 8.40-8.35 (m, NH, 1H), 8.22 (m, 1H), 7.98-7.92 (m, 1H), 7.84-7.80 (m, 1H), 7.69-7.65 (m, 2H), 7.56-7.51 (m, 3H), 7.44 (s, 1H), 7.39-7.33 (m, 1H), 6.57-6.19 (m, 1H), 5.10-5.00 (m, 2H), 4.32-4.29 (m, 2H), 2.51-2.39 (m, 1H), 1.05-1.02 (m, 6H).
112
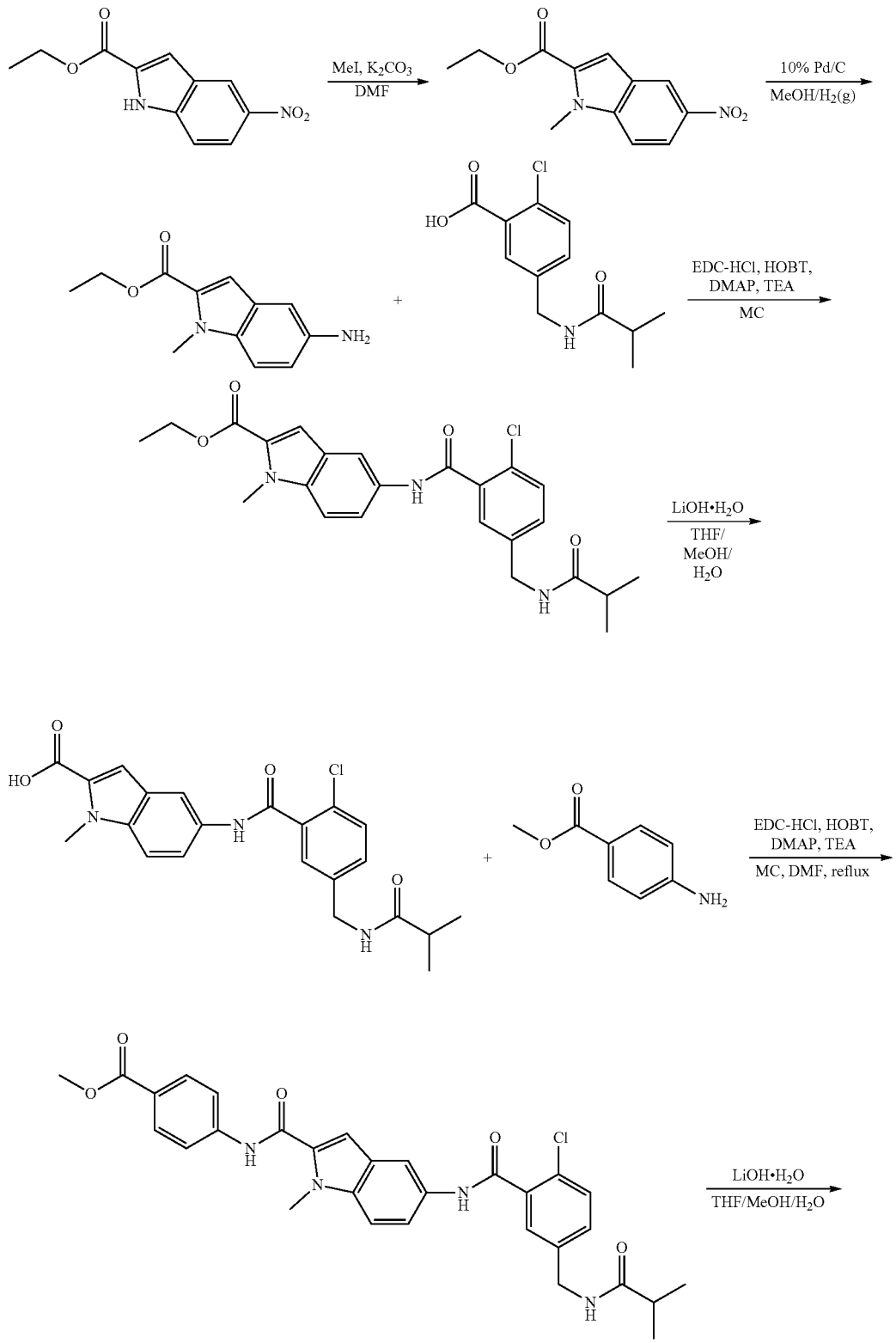

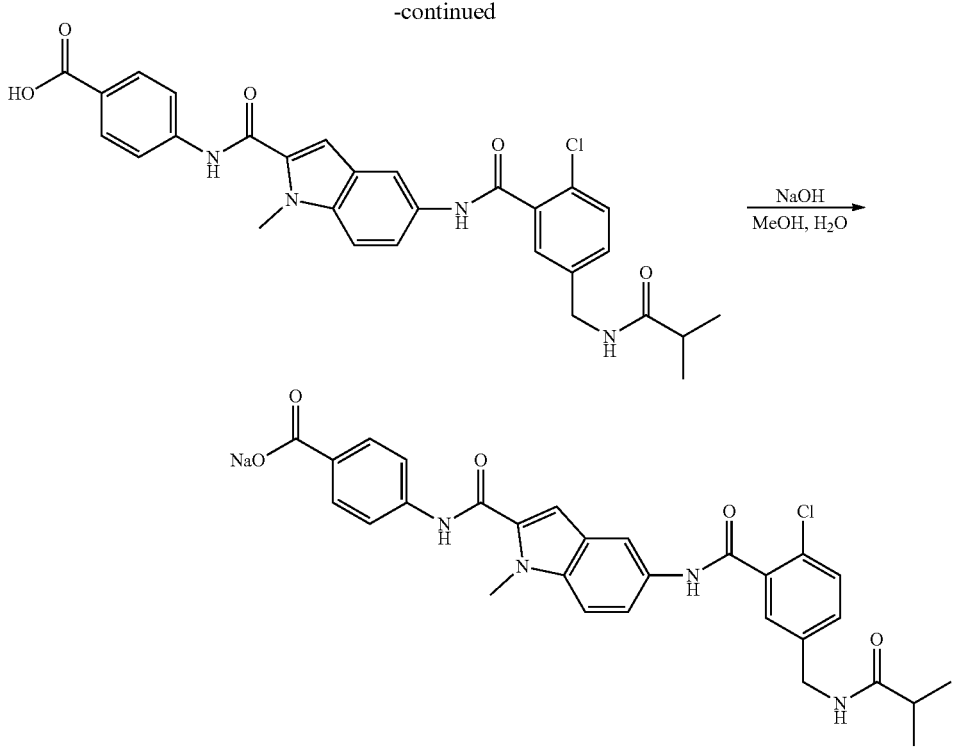

Example 227: Synthesis of methyl 4-(5-(2-chloro-5-(isobutyramidomethyl)benzamido)-1-methyl-1H-indole-2-carboxamido)benzoate (Compound 227)

Example 227-1: Synthesis of ethyl 1-methyl-5-nitro-1H-indole-2-carboxylate

Ethyl 5-nitro-1H-indole-2-carboxylate (2.5 g, 10.67 mmol) and iodomethane (2.27 g, 16.01 mmol) were added to a 100 mL flask and dissolved in DMF (25 ml). $K_2CO_3$ (2.95 g, 21.34 mmol) was added thereto and stirred at room temperature for 12 hours. After the reaction was completed, the organic material was extracted with ethyl acetate/$H_2O$. The organic layer was dried over $MgSO_4$ and distilled under reduced pressure to remove the solvent. The residue was subjected to column chromatography (ethyl acetate:n-hexane=1:3) to obtain ethyl 1-methyl-5-nitro-1H-indole-2-carboxylate (2.38 g, 9.58 mmol, 90%, white solid).

1H NMR (300 MHz, $CDCl_3$) 8.66-8.65 (m, 1H), 8.25-8.22 (m, 1H), 7.46-7.43 (m, 2H), 4.45-4.42 (m, 2H), 4.14 (s, 3H), 1.45-1.41 (m, 3H).

Example 227-2: Synthesis of ethyl 5-amino-1-methyl-1H-indole-2-carboxylate

Ethyl 1-methyl-5-nitro-1H-indole-2-carboxylate (2.38 g, 9.58 mmol) was added to a 100 mL flask and dissolved in MeOH (50 ml). 10% Pd/C (2.3 g) was added and stirred for 12 hours at room temperature under $H_2$ (g). After Celite filtration upon completion of the reaction, the solvent was removed by distillation under reduced pressure. The residue was subjected to column chromatography (ethyl acetate:n-hexane=1:3) to obtain ethyl 5-amino-1-methyl-1H-indole-2-carboxylate (1.66 g, 7.60 mmol, 77%).

1H NMR (300 MHz, $CDCl_3$) 7.52 (s, 1H), 7.21-7.18 (m, 1H), 7.09 (s, 1H), 6.92-6.91 (m, 1H), 6.85-6.82 (m, 1H), 4.38-4.31 (m, 2H), 4.01 (s, 3H), 3.55 (br, NH, 2H), 1.42-1.37 (m, 3H).

Example 227-3: Synthesis of ethyl 5-(2-chloro-5-(isobutyramidomethyl)benzamido)-1-methyl-1H-indole-2-carboxylate Ethyl 5-amino-1-methyl-1H-indole-2-carboxylate (660 mg, 3.02 mmol) and 2-chloro-5-(isobutyramidomethyl)benzoic acid (927 mg, 3.624 mmol) were added to a 100 mL flask and dissolved in $CH_2Cl_2$ (20 ml). HOBT (612 mg, 4.53 mmol) and DMAP (369 mg, 3.02 mmol) were added thereto and reacted for 10 minutes. EDC (1.74 g, 9.06 mmol) and TEA (917 mg, 9.06 mmol) were added and stirred under reflux for 12 hours. After completion of the reaction, the organic material was extracted with $CH_2Cl_2$/$H_2O$. The organic layer was dried over $MgSO_4$ and distilled under reduced pressure to remove the solvent. The residue was subjected to column chromatography (ethyl acetate:n-hexane=3:1) to obtain ethyl 5-(2-chloro-5-(isobutyramidomethyl)benzamido)-1-methyl-1H-indole-2-carboxylate (900 mg, 1.97 mmol, 66%, white solid).

1H NMR (300 MHz, DMSO-$d_6$) 10.46 (br, NH, 1H), 8.39-8.35 (m, NH, 1H), 8.18 (m, 1H), 7.59-7.49 (m, 3H), 7.43 (m, 1H), 7.35-7.33 (m, 1H), 7.25 (m, 1H), 4.36-4.28 (m, 4H), 4.01 (s, 3H), 2.50-2.38 (m, 1H), 1.36-1.31 (m, 3H), 1.04-1.02 (m, 6H).

Example 227-4: Synthesis of 5-(2-chloro-5-(isobutyramidomethyl)benzamido)-1-methyl-1H-indole-2-carboxylic acid Ethyl 5-(2-chloro-5-(isobutyramidomethyl)benzamido)-1-methyl-1H-indole-2-carboxylate (900 mg, 1.97 mmol)

was added to a 500 mL flask and dissolved in THF (100 ml) and MeOH (100 ml). LiOH (413 mg, 9.85 mmol) dissolved in H₂O (70 ml) was added and stirred for 12 hours. After concentration upon completion of the reaction, the pH was adjusted to 2 with 2N—HCl. The resulting solid was filtered to obtain 5-(2-chloro-5-(isobutyramidomethyl)benzamido)-1-methyl-1H-indole-2-carboxylic acid (812 mg, 1.89 mmol, 96%, white solid).

1H NMR (300 MHz, DMSO-d₆) 10.45 (br, NH, 1H), 8.39-8.35 (m, NH, 1H), 8.18 (m, 1H), 7.57-7.49 (m, 3H), 7.43 (m, 1H), 7.35-7.33 (m, 1H), 7.21 (m, 1H), 4.30-4.28 (m, 2H), 4.01 (s, 3H), 2.50-2.38 (m, 1H), 1.04-1.02 (m, 6H).

Example 227-5: Synthesis of methyl 4-(5-(2-chloro-5-(isobutyramidomethyl)benzamido)-1-methyl-1H-indole-2-carboxamido)benzoate (Compound 227)

5-(2-chloro-5-(isobutyramidomethyl)benzamido)-1-methyl-1H-indole-2-carboxylic acid (500 mg, 1.17 mmol) and methyl 4-aminobenzoate (265 mg, 0.345 mmol) were added to a 25 mL flask and dissolved in CH₂Cl₂ (10 ml) and DMF (2 ml). HOBT (474 mg, 3.51 mmol) and DMAP (429 mg, 3.51 mmol) were added thereto and stirred for 10 minutes. EDC (673 mg, 3.51 mmol) and TEA (490 µl, 3.51 mmol) were added and stirred under reflux for 12 hours. After completion of the reaction, the organic material was extracted with CH₂Cl₂/H₂O. The organic layer was dried over MgSO₄ and distilled under reduced pressure to remove the solvent. The residue was subjected to column chromatography (ethyl acetate:n-hexane=3:1) to obtain methyl 4-(5-(2-chloro-5-(isobutyramidomethyl)benzamido)-1-methyl-1H-indole-2-carboxamido)benzoate (420 mg, 0.748 mmol, 64%, white solid).

1H NMR (300 MHz, DMSO-d₆) 10.63 (br, NH, 1H), 10.47 (br, NH, 1H), 8.37 (m, NH, 1H), 8.20 (m, 1H), 7.97 (m, 4H), 7.60-7.50 (m, 3H), 7.45 (m, 1H), 7.36-7.34 (m, 2H), 4.31 (m, 2H), 4.01 (m, 3H), 3.84 (s, 3H), 2.50-2.39 (m, 1H), 1.06-1.02 (m, 6H).

Example 228: Synthesis of 4-(5-(2-chloro-5-(isobutyramidomethyl)benzamido)-1-methyl-1H-indole-2-carboxamido)benzoic acid (Compound 228)

Methyl 4-(5-(2-chloro-5-(isobutyramidomethyl)benzamido)-1-methyl-1H-indole-2-carboxamido)benzoate (420 mg, 0.748 mmol) was added to a 100 mL flask and dissolved in THF (15 ml) and MeOH (15 ml). LiOH (156 mg, 3.74 mmol) dissolved in H₂O (10 ml) was added and stirred for 12 hours. After concentration upon completion of the reaction, the pH was adjusted to 2 with 2N—HCl. The resulting solid was filtered to obtain 4-(5-(2-chloro-5-(isobutyramidomethyl)benzamido)-1-methyl-1H-indole-2-carboxamido)benzoic acid (240 mg, 0.43 mmol, 58%, white solid).

1H NMR (300 MHz, DMSO-d₆) 10.58 (br, NH, 1H), 10.46 (br, NH, 1H), 8.37 (m, NH, 1H), 8.20 (m, 1H), 7.93 (m, 4H), 7.56-7.50 (m, 3H), 7.45 (m, 1H), 7.36 (m, 2H), 4.31-4.30 (m, 2H), 4.01 (s, 3H), 2.50-2.38 (m, 1H), 1.05-1.02 (m, 6H).

Example 229: Synthesis of sodium 4-(5-(2-chloro-5-(isobutyramidomethyl)benzamido)-1-methyl-1H-indole-2-carboxamido)benzoate (Compound 229)

4-(5-(2-chloro-5-(isobutyramidomethyl)benzamido)-1-methyl-1H-indole-2-carboxamido)benzoic acid (100 mg, 0.183 mmol) was added to a 25 mL flask and dissolved in MeOH (10 ml). NaOH (7.32 mg, 0.183 mmol) dissolved in H₂O (2 ml) was added and stirred for 12 hours. After concentration upon completion of the reaction, sodium 4-(5-(2-chloro-5-(isobutyramidomethyl)benzamido)-1-methyl-1H-indole-2-carboxamido)benzoate (94 mg, 0.16 mmol, 90%, a white solid) was obtained.

1H NMR (300 MHz, DMSO-d₆) 10.47 (br, NH, 1H), 10.28 (br, NH, 1H), 8.40 (m, NH, 1H), 8.17 (m, 1H), 7.84-7.81 (m, 2H), 7.67-7.64 (m, 2H), 7.54-7.46 (m, 4H), 7.36-7.29 (m, 2H), 4.31-4.29 (m, 2H), 4.01 (s, 3H), 2.50-2.38 (m, 1H), 1.05-1.02 (m, 6H).

Example 230: Synthesis of methyl 5-(5-(2-chloro-5-(isobutyramidomethyl)benzamido)-1-methyl-1H-indole-2-carboxamido)-2-fluorobenzoate (Compound 230)

The title compound was obtained according to the same procedure as Example 227, except for using methyl 5-amino-2-fluorobenzoate instead of methyl 4-aminobenzoate.

1H NMR (300 MHz, DMSO-d₆) 10.55 (br, NH, 1H), 10.47 (br, NH, 1H), 8.43-8.36 (m, 2H), 8.20 (m, 1H), 8.08-8.02 (m, 1H), 7.59-7.51 (m, 3H), 7.45 (m, 1H), 7.41-7.34 (m, 3H), 4.31-4.29 (m, 2H), 4.01 (s, 3H), 3.88 (s, 3H), 2.50-2.38 (m, 1H), 1.05-1.02 (m, 6H).

Example 231: Synthesis of 5-(5-(2-chloro-5-(isobutyramidomethyl)benzamido)-1-methyl-1H-indole-2-carboxamido)-2-fluorobenzoic acid (Compound 231)

The title compound was obtained according to the same procedure as Example 228, except for using methyl 5-(5-(2-chloro-5-(isobutyramidomethyl)benzamido)-1-methyl-1H-indole-2-carboxamido)-2-fluorobenzoate instead of methyl 4-(5-(2-chloro-5-(isobutyramidomethyl)benzamido)-1-methyl-1H-indole-2-carboxamido)benzoate.

1H NMR (300 MHz, DMSO-d₆) 10.51 (br, NH, 1H), 10.47 (br, NH, 1H), 8.39-8.36 (m, 2H), 8.19 (m, 1H), 8.02-7.99 (m, 1H), 7.59-7.50 (m, 3H), 7.44 (m, 1H), 7.36-7.30 (m, 3H), 4.31-4.29 (m, 2H), 4.01 (s, 3H), 2.50-2.38 (m, 1H), 1.04-1.02 (m, 6H).

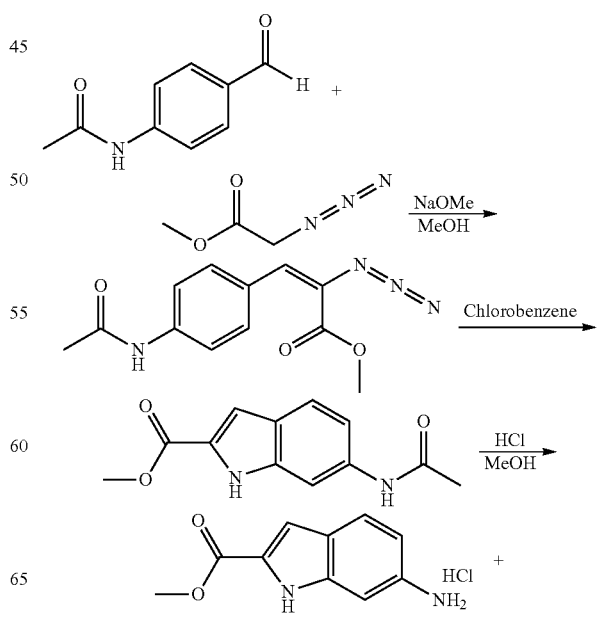

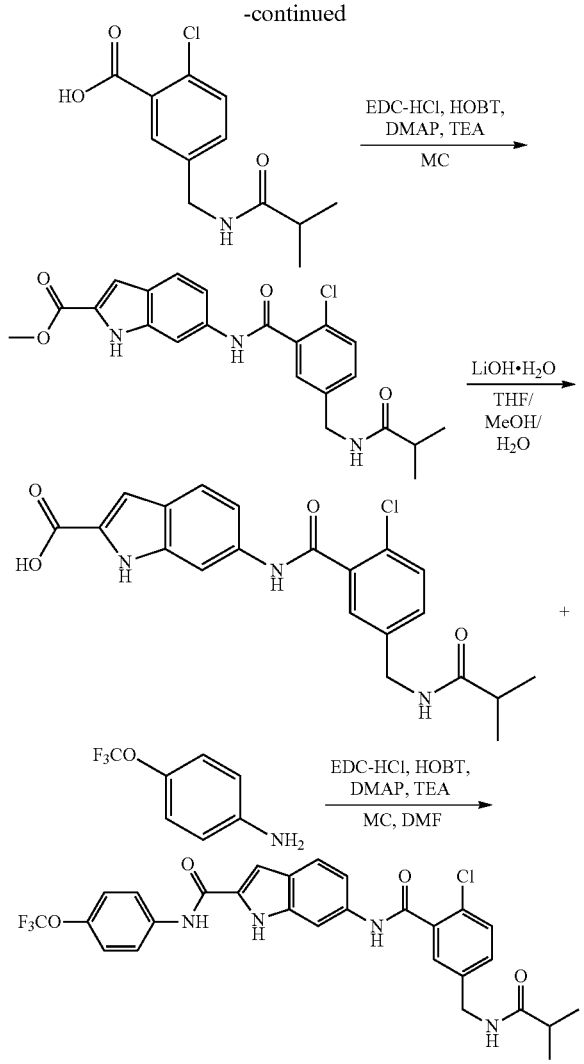

Example 232: Synthesis of 6-(2-chloro-5-(isobutyramidomethyl)benzamido)-N-(4-(trifluoromethoxy)phenyl)-1H-indole-2-carboxamide (Compound 232)

Example 232-1: Synthesis of (E)-methyl 3-(4-acetamidophenyl)-2-azidoacrylate

N-(4-formylphenyl)acetamide (3 g, 18.38 mmol) was added to a 100 mL flask and dissolved in MeOH (50 ml). NaOMe (1.49 g, 27.57 mmol) and methyl 2-azidoacetate (9.52 g, 82.71 mmol) were added and stirred at room temperature for 12 hours. After the reaction was completed, the organic material was extracted with ethyl acetate/NH₄Cl. The organic layer was dried over MgSO₄ and distilled under reduced pressure to remove the solvent to obtain (E)-methyl 3-(4-acetamidophenyl)-2-azidoacrylate (3.8 g, 14.6 mmol, 79%).

Example 232-2: Synthesis of methyl 6-acetamido-1H-indole-2-carboxylate (E)-methyl 3-(4-acetamidophenyl)-2-azidoacrylate (3.8 g, 14.6 mmol) was added to a 100 mL flask, dissolved in chlorobenzene (60 ml) and stirred under reflux for 3 hours. After the reaction was completed, the organic material was extracted with ethyl acetate/H₂O. The organic layer was dried over MgSO₄ and distilled under reduced pressure to remove the solvent. The residue was subjected to column chromatography (ethyl acetate:n-hexane=1:1) to obtain methyl 6-acetamido-1H-indole-2-carboxylate (1.1 g, 4.73 mmol, 32%, solid).

1H NMR (300 MHz, DMSO-$d_6$) 11.76 (br, NH, 1H), 9.97 (br, NH, 1H), 8.02 (m, 1H), 7.55-7.53 (m, 1H), 7.13-7.08 (m, 2H), 3.85 (s, 3H), 2.06 (s, 3H).

Example 232-3: Synthesis of methyl 6-amino-1H-indole-2-carboxylate hydrochloride Methyl 6-acetamido-1H-indole-2-carboxylate (1.54 g, 6.63 mmol) was added to a 100 mL flask and dissolved in MeOH (50 ml). c-HCl (10 ml) was added thereto and stirred under reflux for 3 hours. After completion of the reaction, the solvent was removed by distillation under reduced pressure to obtain methyl 6-amino-1H-indole-2-carboxylate hydrochloride (1.44 g, 5.83 mmol, 96%).

1H NMR (300 MHz, DMSO-$d_6$) 12.14 (br, NH, 1H), 10.08 (br, NH, 3H), 7.77-7.74 (m, 1H), 7.47 (m, 1H), 7.20 (m, 1H), 7.06-7.02 (m, 1H), 3.88 (s, 3H).

Example 232-4: Synthesis of methyl 6-(2-chloro-5-(isobutyramidomethyl)benzamido)-1H-indole-2-carboxylate Methyl 6-amino-1H-indole-2-carboxylate hydrochloride (1.44 g, 5.83 mmol) and 2-chloro-5-(isobutyramidomethyl) benzoic acid (2.44 g, 9.525 mmol) were added to a 100 mL flask and dissolved in CH₂Cl₂ (30 ml). HOBT (2.58 g, 19.05 mmol) and DMAP (2.33 g, 19.05 mmol) were added thereto and stirred for 10 minutes. EDC (3.65 g, 19.05 mmol) and TEA (2.65 ml, 19.05 mmol) were added and stirred at room temperature for 12 hours. After completion of the reaction, the organic material was extracted with CH₂Cl₂/H₂O. The organic layer was dried over MgSO₄ and distilled under reduced pressure to remove the solvent. The residue was subjected to column chromatography (ethyl acetate:n-hexane=3:1) to obtain methyl 6-(2-chloro-5-(isobutyramidomethyl)benzamido)-1H-indole-2-carboxylate (1.33 g, 3.1 mmol, 48%).

1H NMR (300 MHz, DMSO-$d_6$) 11.87 (br, NH, 1H), 10.55 (br, NH, 1H), 8.35 (m, NH, 1H), 8.17 (m, 1H), 7.61-7.58 (m, 1H), 7.52-7.49 (m, 1H), 7.43 (m, 1H), 7.35-7.33 (m, 1H), 7.25-7.22 (m, 1H), 7.12 (m, 1H), 4.30-4.28 (m, 2H), 3.86 (s, 3H), 2.50-2.38 (m, 1H), 1.04-1.02 (m, 6H).

Example 232-5: Synthesis of 6-(2-chloro-5-(isobutyramidomethyl)benzamido)-1H-indole-2-carboxylic acid Methyl 6-(2-chloro-5-(isobutyramidomethyl)benzamido)-1H-indole-2-carboxylate (1.33 g, 3.1 mmol) was added to a 250 mL flask and dissolved in THF (30 ml) and MeOH (30 ml). LiOH (650 mg, 15.5 mmol) dissolved in H₂O (30 ml) was added and stirred for 12 hours. After concentration upon completion of the reaction, the pH was adjusted to 2 with 2N—HCl. The resulting solid was filtered to obtain 6-(2-chloro-5-(isobutyramidomethyl)benzamido)-1H-indole-2-carboxylic acid (1.98 g, 4.34 mmol, 90%, white solid).

1H NMR (300 MHz, DMSO-$d_6$) 11.67 (br, NH, 1H), 10.52 (br, NH, 1H), 8.35 (m, NH, 1H), 8.15 (m, 1H), 7.58-7.55 (m, 1H), 7.52-7.49 (m, 2H), 7.42 (m, 1H), 7.35-7.32 (m, 1H), 7.22-7.19 (m, 1H), 7.03 (m, 1H), 4.30-4.28 (m, 2H), 2.50-2.38 (m, 1H), 1.04-1.02 (m, 6H).

Example 232-6: Synthesis of 6-(2-chloro-5-(isobutyramidomethyl)benzamido)-N-(4-(trifluoromethoxy)phenyl)-1H-indole-2-carboxamide (Compound 232)

6-(2-chloro-5-(isobutyramidomethyl)benzamido)-1H-indole-2-carboxylic acid (200 mg, 0.48 mmol) and 4-(trifluoromethoxy)aniline (170 mg, 0.96 mmol) were added to a 10 mL flask and dissolved in $CH_2Cl_2$ (5 ml) and DMF (1 ml). HOBT (195 mg, 1.44 mmol) and DMAP (176 mg, 1.44 mmol) were added thereto and stirred for 10 minutes. EDC (276 mg, 1.44 mmol) and TEA (200 µl, 1.44 mmol) were added and stirred under reflux for 12 hours. After the reaction was completed, the organic material was extracted with ethyl acetate/$H_2O$. The organic layer was dried over $MgSO_4$ and distilled under reduced pressure to remove the solvent. The residue was suspended in $CH_2Cl_2$ and filtered to obtain 6-(2-chloro-5-(isobutyramidomethyl)benzamido)-N-(4-(trifluoromethoxy)phenyl)-1H-indole-2-carboxamide (187 mg, 0.32 mmol, 68%, yellow solid).

1H NMR (300 MHz, DMSO-$d_6$) 11.73 (br, NH, 1H), 10.49 (br, NH, 1H), 10.32 (br, NH, 1H), 8.32 (m, NH, 1H), 8.14 (m, 1H), 7.93-7.90 (m, 2H), 7.64-7.61 (m, 1H), 7.52-7.49 (m, 1H), 7.43-7.33 (m, 5H), 4.31-4.29 (m, 2H), 2.50-2.39 (m, 1H), 1.05-1.02 (m, 6H).

Example 233: Synthesis of 6-(2-chloro-5-(isobutyramidomethyl)benzamido)-N-(4-(trifluoromethyl)phenyl)-1H-indole-2-carboxamide (Compound 233)

The title compound was obtained according to the same procedure as Example 232, except for using 4-(trifluoromethyl)aniline instead of 4-(trifluoromethoxy)aniline.

1H NMR (300 MHz, DMSO-$d_6$) 11.80 (br, NH, 1H), 10.55 (br, NH, 1H), 10.47 (br, NH, 1H), 8.37 (m, NH, 1H), 8.17 (m, 1H), 8.05-8.02 (m, 2H), 7.75-7.73 (m, 2H), 7.66-7.63 (m, 1H), 7.53-7.50 (m, 1H), 7.45-7.44 (m, 2H), 7.36-7.33 (m, 1H), 7.28-7.25 (m, 1H), 4.31-4.29 (m, 2H), 2.50-2.39 (m, 1H), 1.04-1.02 (m, 6H).

Example 234: Synthesis of 6-(2-chloro-5-(isobutyramidomethyl)benzamido)-N-(4-fluorophenyl)-1H-indole-2-carboxamide (Compound 234)

The title compound was obtained according to the same procedure as Example 232, except for using 4-fluoroaniline instead of 4-(trifluoromethoxy)aniline.

1H NMR (300 MHz, DMSO-$d_6$) 11.75 (br, NH, 1H), 10.53 (br, NH, 1H), 10.22 (br, NH, 1H), 8.36 (m, NH, 1H), 8.15 (m, 1H), 7.82 (m, 2H), 7.63-7.60 (m, 1H), 7.53-7.50 (m, 1H), 7.44 (m, 1H), 7.37-7.33 (m, 2H), 7.27-7.19 (m, 3H), 4.31-4.30 (m, 2H), 2.50-2.39 (m, 1H), 1.04-1.02 (m, 6H).

Example 235: Synthesis of 6-(2-chloro-5-(isobutyramidomethyl)benzamido)-N-(3-(trifluoromethoxy)phenyl)-1H-indole-2-carboxamide (Compound 235)

The title compound was obtained according to the same procedure as Example 232, except for using 3-(trifluoromethoxy)aniline instead of 4-(trifluoromethoxy)aniline.

1H NMR (300 MHz, DMSO-$d_6$) 11.78 (br, NH, 1H), 10.55 (br, NH, 1H), 10.41 (br, NH, 1H), 8.37 (m, NH, 1H), 8.17 (m, 1H), 7.96 (m, 1H), 7.82-7.79 (m, 1H), 7.65-7.62 (m, 1H), 7.53-7.47 (m, 2H), 7.44-7.42 (m, 1H), 7.28-7.25 (m, 1H), 7.10-7.07 (m, 1H), 4.31-4.29 (m, 2H), 2.50-2.39 (m, 1H), 1.05-1.02 (m, 6H).

Example 236: Synthesis of 6-(2-chloro-5-(isobutyramidomethyl)benzamido)-N-(3-(trifluoromethyl)phenyl)-1H-indole-2-carboxamide (Compound 236)

The title compound was obtained according to the same procedure as Example 232, except for using 3-(trifluoromethyl)aniline instead of 4-(trifluoromethoxy)aniline.

1H NMR (300 MHz, DMSO-$d_6$) 11.79 (br, NH, 1H), 10.55 (br, NH, 1H), 10.46 (br, NH, 1H), 8.36 (m, NH, 1H), 8.25 (m, 1H), 8.18 (m, 1H), 8.1-8.08 (m, 1H), 7.66-7.59 (m, 2H), 7.53-7.50 (m, 1H), 7.46-7.44 (m, 3H), 7.36-7.34 (m, 1H), 7.28-7.25 (m, 1H), 4.31-4.29 (m, 2H), 2.50-2.39 (m, 1H), 1.05-1.02 (m, 6H).

Example 237: Synthesis of 6-(2-chloro-5-(isobutyramidomethyl)benzamido)-N-(4-chlorophenyl)-1H-indole-2-carboxamide (Compound 237)

The title compound was obtained according to the same procedure as Example 232, except for using 4-chloroaniline instead of 4-(trifluoromethoxy)aniline.

1H NMR (300 MHz, DMSO-$d_6$) 11.76 (br, NH, 1H), 10.53 (br, NH, 1H), 10.28 (br, NH, 1H), 8.36 (m, NH, 1H), 8.15 (m, 1H), 7.86-7.83 (m, 2H), 7.64-7.61 (m, 1H), 7.53-7.50 (m, 1H), 7.44-7.39 (m, 4H), 7.36-7.33 (m, 1H), 7.27-7.24 (m, 1H), 4.31-4.29 (m, 2H), 2.50-2.39 (m, 1H), 1.04-1.02 (m, 6H).

Example 238: Synthesis of 6-(2-chloro-5-(isobutyramidomethyl)benzamido)-N-(3-chlorophenyl)-1H-indole-2-carboxamide (Compound 238)

The title compound was obtained according to the same procedure as Example 232, except for using 3-chloroaniline instead of 4-(trifluoromethoxy)aniline.

1H NMR (300 MHz, DMSO-$d_6$) 11.76 (br, NH, 1H), 10.54 (br, NH, 1H), 10.30 (br, NH, 1H), 8.36 (m, NH, 1H), 8.16 (m, 1H), 7.99 (m, 1H), 7.75-0.72 (m, 1H), 7.64-7.62 (m, 1H), 7.5-7.50 (m, 1H), 7.43-7.33 (m, 4H), 7.27-7.25 (m, 1H), 7.17-7.14 (m, 1H), 4.31-4.29 (m, 2H), 2.50-2.39 (m, 1H), 1.05-1.02 (m, 6H).

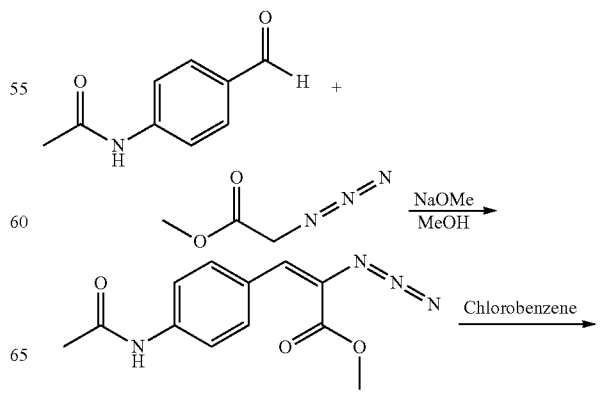

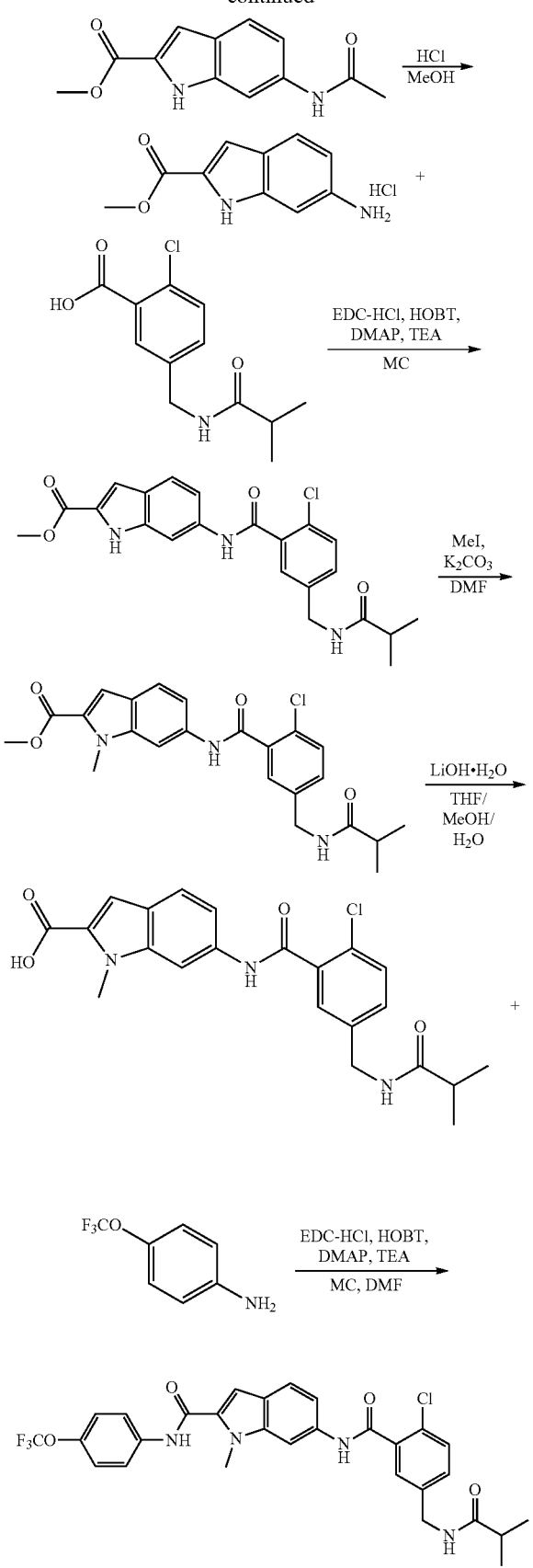

Example 239: Synthesis of 6-(2-chloro-5-(isobutyramidomethyl)benzamido)-1-methyl-N-(4-(trifluoromethoxy)phenyl)-1H-indole-2-carboxamide (Compound 239)

Example 239-1: Synthesis of (E)-methyl 3-(4-acetamidophenyl)-2-azidoacrylate

N-(4-formylphenyl)acetamide (3 g, 18.38 mmol) was added to a 100 mL flask and dissolved in MeOH (50 ml). NaOMe (1.49 g, 27.57 mmol) and methyl 2-azidoacetate (9.52 g, 82.71 mmol) were added thereto and stirred at room temperature for 12 hours. After the reaction was completed, the organic material was extracted with ethyl acetate/NH$_4$Cl. The organic layer was dried over MgSO$_4$ and distilled under reduced pressure to remove the solvent to obtain (E)-methyl 3-(4-acetamidophenyl)-2-azidoacrylate (3.8 g, 14.6 mmol, 79%).

Example 239-2: Synthesis of methyl 6-acetamido-1H-indole-2-carboxylate (E)-methyl 3-(4-acetamidophenyl)-2-azidoacrylate (3.8 g, 14.6 mmol) was added to a 100 mL flask, dissolved in chlorobenzene (60 ml) and stirred under reflux for 3 hours. After the reaction was completed, the organic material was extracted with ethyl acetate/H$_2$O. The organic layer was dried over MgSO$_4$ and distilled under reduced pressure to remove the solvent. The residue was subjected to column chromatography (ethyl acetate:n-hexane=1:1) to obtain methyl 6-acetamido-1H-indole-2-carboxylate (1.1 g, 4.73 mmol, 32%, solid).

1H NMR (300 MHz, DMSO-d$_6$) 11.76 (br, NH, 1H), 9.97 (br, NH, 1H), 8.02 (m, 1H), 7.55-7.53 (m, 1H), 7.13-7.08 (m, 2H), 3.85 (s, 3H), 2.06 (s, 3H).

Example 239-3: Synthesis of methyl 6-amino-1H-indole-2-carboxylate hydrochloride Methyl 6-acetamido-1H-indole-2-carboxylate (1.54 g, 6.63 mmol) was added to a 100 mL flask and dissolved in MeOH (50 ml). c-HCl (10 ml) was added thereto and stirred under reflux for 3 hours. After completion of the reaction, the solvent was removed by distillation under reduced pressure to obtain methyl 6-amino-1H-indole-2-carboxylate hydrochloride (1.44 g, 5.83 mmol, 96%).

1H NMR (300 MHz, DMSO-d$_6$) 12.14 (br, NH, 1H), 10.08 (br, NH, 3H), 7.77-7.74 (m, 1H), 7.47 (m, 1H), 7.20 (m, 1H), 7.06-7.02 (m, 1H), 3.88 (s, 3H).

Example 239-4: Synthesis of methyl 6-(2-chloro-5-(isobutyramidomethyl)benzamido)-1H-indole-2-carboxylate Methyl 6-amino-1H-indole-2-carboxylate hydrochloride (1.44 g, 5.83 mmol) and 2-chloro-5-(isobutyramidomethyl) benzoic acid (2.44 g, 9.525 mmol) were added to a 100 mL flask and dissolved in CH$_2$Cl$_2$ (30 ml). HOBT (2.58 g, 19.05 mmol) and DMAP (2.33 g, 19.05 mmol) were added thereto and reacted for 10 minutes. EDC (3.65 g, 19.05 mmol) and TEA (2.65 ml, 19.05 mmol) were added and stirred at room temperature for 12 hours. After completion of the reaction, the organic material was extracted with CH$_2$Cl$_2$/H$_2$O. The organic layer was dried over MgSO$_4$ and distilled under reduced pressure to remove the solvent. The residue was subjected to column chromatography (ethyl acetate:n- hexane=3:1) to obtain methyl 6-(2-chloro-5-(isobutyramidomethyl)benzamido)-1H-indole-2-carboxylate (1.33 g, 3.1 mmol, 48%).

1H NMR (300 MHz, DMSO-$d_6$) 11.87 (br, NH, 1H), 10.55 (br, NH, 1H), 8.35 (m, NH, 1H), 8.17 (m, 1H), 7.61-7.58 (m, 1H), 7.52-7.49 (m, 1H), 7.43 (m, 1H), 7.35-7.33 (m, 1H), 7.25-7.22 (m, 1H), 7.12 (m, 1H), 4.30-4.28 (m, 2H), 3.86 (s, 3H), 2.50-2.38 (m, 1H), 1.04-1.02 (m, 6H).

Example 239-5: Synthesis of methyl 6-(2-chloro-5-(isobutyramidomethyl)benzamido)-1-methyl-1H-indole-2-carboxylate Methyl 6-(2-chloro-5-(isobutyramidomethyl)benzamido)-1H-indole-2-carboxylate (1.1 g, 2.57 mmol) and iodomethane (1.1 g, 7.71 mmol) were added to a 25 mL flask and dissolved in DMF (15 ml). $K_2CO_3$ (1.06 g, 7.71 mmol) was added thereto and stirred at room temperature for 12 hours. After the reaction was completed, the organic material was extracted with ethyl acetate/$H_2O$. The organic layer was dried over $MgSO_4$ and distilled under reduced pressure to remove the solvent. The residue was subjected to column chromatography (ethyl acetate:n-hexane=2:1) to obtain methyl 6-(2-chloro-5-(isobutyramidomethyl)benzamido)-1-methyl-1H-indole-2-carboxylate (200 mg, 0.45 mmol, 17%).

1H NMR (300 MHz, DMSO-$d_6$) 11.66 (br, NH, 1H), 8.36 (m, NH, 1H), 8.20 (m, 1H), 7.65-7.62 (m, 1H), 7.53-7.51 (m, 1H), 7.44 (m, 1H), 7.37-7.34 (m, 1H), 7.29-7.24 (m, 2H), 4.30-4.29 (m, 2H), 3.99 (s, 3H), 3.85 (s, 3H), 2.50-2.38 (m, 1H), 1.04-1.02 (m, 6H).

Example 239-6: Synthesis of 6-(2-chloro-5-(isobutyramidomethyl)benzamido)-1-methyl-1H-indole-2-carboxylic acid Methyl 6-(2-chloro-5-(isobutyramidomethyl)benzamido)-1-methyl-1H-indole-2-carboxylate (200 mg, 0.45 mmol) was added to a 50 mL flask and dissolved in THF (10 ml) and MeOH (10 ml). LiOH (94 mg, 2.25 mmol) dissolved in $H_2O$ (10 ml) was added and stirred at room temperature for 12 hours. After concentration upon completion of the reaction, the pH was adjusted to 2 with 2N—HCl. The resulting solid was filtered to obtain 6-(2-chloro-5-(isobutyramidomethyl)benzamido)-1-methyl-1H-indole-2-carboxylic acid (187 mg, 0.43 mmol, 96%, solid).

1H NMR (300 MHz, DMSO-$d_6$) 11.63 (br, NH, 1H), 8.36 (m, NH, 1H), 8.18 (m, 1H), 7.63-7.61 (m, 1H), 7.53-7.50 (m, 1H), 7.44 (m, 1H), 7.36-7.34 (m, 1H), 7.28-7.25 (m, 1H), 7.19 (m, 1H), 4.30-4.29 (m, 2H), 2.50-2.38 (m, 1H), 1.04-1.02 (m, 6H).

Example 239-7: Synthesis of 6-(2-chloro-5-(isobutyramidomethyl)benzamido)-1-methyl-N-(4-(trifluoromethoxy)phenyl)-1H-indole-2-carboxamide (Compound 239)

6-(2-chloro-5-(isobutyramidomethyl)benzamido)-1-methyl-1H-indole-2-carboxylic acid (90 mg, 0.21 mmol) and 4-(trifluoromethoxy)aniline (75 mg, 0.42 mmol) were added to a 10 mL flask and dissolved in $CH_2Cl_2$ (5 ml) and DMF (1 ml). HOBT (85 mg, 0.63 mmol) and DMAP (77 mg, 0.63 mmol) were added thereto and reacted for 10 minutes. EDC (121 mg, 0.63 mmol) and TEA (64 μl, 0.63 mmol) were added and stirred under reflux for 12 hours. After the reaction was completed, the organic material was extracted with ethyl acetate/$H_2O$. The organic layer was dried over $MgSO_4$ and distilled under reduced pressure to remove the solvent. The residue was suspended in $CH_2Cl_2$ and filtered to obtain 6-(2-chloro-5-(isobutyramidomethyl)benzamido)-1-methyl-N-(4-(trifluoromethoxy)phenyl)-1H-indole-2-carboxamide (95 mg, 0.16 mmol, 77%, white solid).

1H NMR (300 MHz, DMSO-$d_6$) 11.63 (br, NH, 1H), 10.46 (br, NH, 1H), 8.37 (m, NH, 1H), 8.18 (m, 1H), 7.91-7.88 (m, 2H), 7.68-7.65 (m, 1H), 7.54-7.51 (m, 1H), 7.45 (m, 1H), 7.39-7.29 (m, 5H), 4.31-4.29 (m, 2H), 3.98 (s, 3H), 2.50-2.39 (m, 1H), 1.05-1.02 (m, 6H).

Example 240: Synthesis of 6-(2-chloro-5-(isobutyramidomethyl)benzamido)-1-methyl-N-(4-(trifluoromethyl)phenyl)-1H-indole-2-carboxamide (Compound 240)

The title compound was obtained according to the same procedure as Example 239, except for using 4-(trifluoromethyl)aniline instead of 4-(trifluoromethoxy)aniline.

1H NMR (300 MHz, DMSO-$d_6$) 11.64 (br, NH, 1H), 10.59 (br, NH, 1H), 8.36 (m, NH, 1H), 8.18 (m, 1H), 8.03-8.00 (m, 2H), 7.74-7.66 (m, 3H), 7.54-7.51 (m, 1H), 7.45 (m, 1H), 7.37-7.30 (m, 3H), 4.31-4.29 (m, 2H), 3.99 (s, 3H), 2.50-2.39 (m, 1H), 1.05-1.02 (m, 6H).

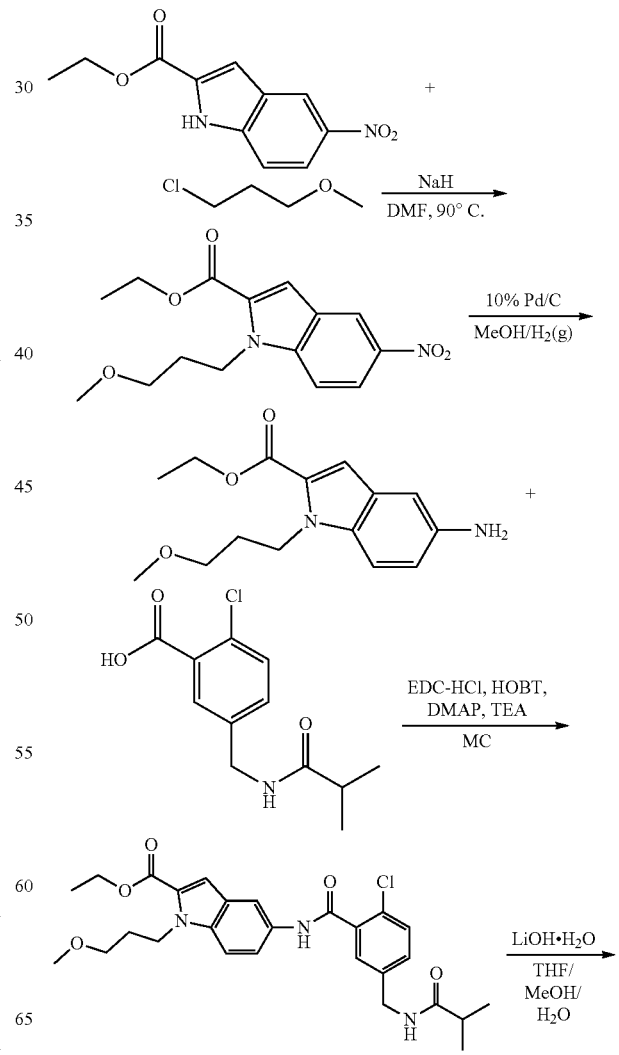

-continued

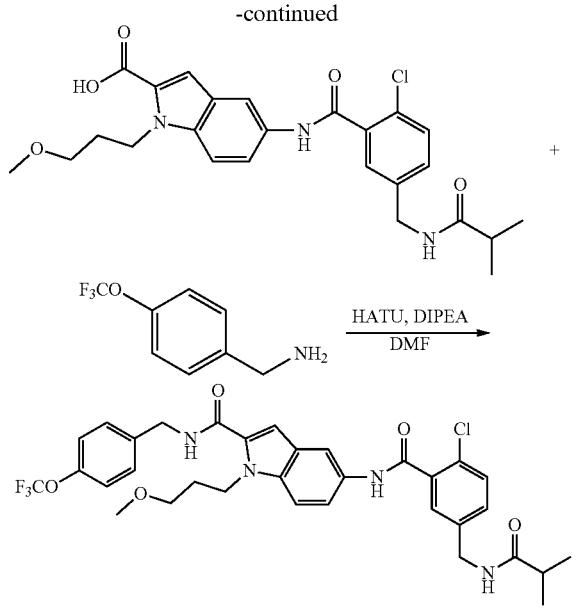

Example 241: Synthesis of 5-(2-chloro-5-(isobutyramidomethyl)benzamido)-1-(3-methoxypropyl)-N-(4-(trifluoromethoxy)benzyl)-1H-indole-2-carboxamide (Compound 241)

Example 241-1: Synthesis of ethyl 1-(3-methoxypropyl)-5-nitro-1H-indole-2-carboxylate Ethyl 5-nitro-1H-indole-2-carboxylate (3 g, 12.8 mmol) and 1-chloro-3-methoxypropane (2.78 g, 25.6 mmol) were added to a 100 mL flask and dissolved in DMF (30 ml). NaH (768 mg, 19.2 mmol) was added thereto and stirred at 90° C. for 12 hours. After the reaction was completed, the organic material was extracted with ethyl acetate/H$_2$O. The organic layer was dried over MgSO$_4$ and distilled under reduced pressure to remove the solvent. The residue was subjected to column chromatography (ethyl acetate:n-hexane=1:3) to obtain ethyl 1-(3-methoxypropyl)-5-nitro-1H-indole-2-carboxylate (1.8 g, 5.88 mmol, 46%, oil).

1H NMR (300 MHz, DMSO-d$_6$) 8.74 (m, 1H), 8.20-8.17 (m, 1H), 7.80-7.77 (m, 1H), 7.56 (m, 1H), 4.68-4.64 (m, 2H), 4.39-4.32 (m, 2H), 3.23-3.21 (m, 2H), 3.14 (s, 3H), 1.97-1.93 (m, 2H), 1.37-1.33 (m, 3H).

Example 241-2: Synthesis of ethyl 5-amino-1-(3-methoxypropyl)-1H-indole-2-carboxylate Ethyl 1-(3-methoxypropyl)-5-nitro-1H-indole-2-carboxylate (1.8 g, 5.88 mmol) was added to a 100 mL flask and dissolved in EtOH (40 ml). 10% Pd/C (360 mg) was added and stirred at room temperature under H$_2$ (g) for 12 hours. After Celite filtration upon completion of the reaction, the solvent was removed by distillation under reduced pressure. The residue was subjected to column chromatography (ethyl acetate:n-hexane=1:1) to obtain ethyl 5-amino-1-(3-methoxypropyl)-1H-indole-2-carboxylate (1.42 g, 5.14 mmol, 87%).

1H NMR (300 MHz, DMSO-d$_6$) 7.27-7.24 (m, 1H), 6.96 (m, 1H), 6.78-6.72 (m, 2H), 4.73 (br, NH, 2H), 4.50-4.45 (m, 2H), 4.31-4.24 (m, 2H), 3.23-3.19 (m, 5H), 1.89-1.85 (m, 2H), 1.33-1.29 (m, 3H).

Example 241-3: Synthesis of ethyl 5-(2-chloro-5-(isobutyramidomethyl)benzamido)-1-(3-methoxypropyl)-1H-indole-2-carboxylate Ethyl 5-amino-1-(3-methoxypropyl)-1H-indole-2-carboxylate (1.42 g, 5.14 mmol) and 2-chloro-5-(isobutyramidomethyl)benzoic acid (1.58 g, 6.168 mmol) were added to a 100 mL flask and dissolved in CH$_2$Cl$_2$ (30 ml). HOBT (2.08 g, 15.42 mmol) and DMAP (1.88 g, 15.42 mmol) were added thereto and stirred for 10 minutes. EDC (2.96 g, 15.42 mmol) and TEA (2.15 ml, 15.42 mmol) were added and stirred under reflux for 12 hours. After completion of the reaction, the organic material was extracted with CH$_2$Cl$_2$/H$_2$O. The organic layer was dried over MgSO$_4$ and distilled under reduced pressure to remove the solvent. The residue was subjected to column chromatography (ethyl acetate:n-hexane=2:1) to obtain ethyl 5-(2-chloro-5-(isobutyramidomethyl)benzamido)-1-(3-methoxypropyl)-1H-indole-2-carboxylate (2.1 g, 4.09 mmol, 79%, white solid).

1H NMR (300 MHz, DMSO-d$_6$) 10.48 (br, NH, 1H), 8.38 (m, NH, 1H), 8.18 (m, 1H), 7.54-7.50 (m, 3H), 7.43 (m, 1H), 7.36-7.33 (m, 1H), 7.28 (m, 1H), 4.59 (m, 2H), 4.36-4.29 (m, 4H), 3.23-3.19 (m. 5H), 2.50-2.38 (m, 1H), 1.95-1.91 (m, 2H), 1.36-1.32 (m, 3H), 1.04-1.02 (m, 6H).

Example 241-4: Synthesis of 5-(2-chloro-5-(isobutyramidomethyl)benzamido)-1-(3-methoxypropyl)-1H-indole-2-carboxylic acid Ethyl 5-(2-chloro-5-(isobutyramidomethyl)benzamido)-1-(3-methoxypropyl)-1H-indole-2-carboxylate (2.1 g, 4.09 mmol) was added to a 250 mL flask and dissolved in THF (30 ml) and MeOH (30 ml). LiOH (858 mg, 20.45 mmol) dissolved in H$_2$O (30 ml) was added and stirred for 12 hours. After concentration upon completion of the reaction, the pH was adjusted to 2 with 2N—HCl. The resulting solid was filtered to obtain 5-(2-chloro-5-(isobutyramidomethyl)benzamido)-1-(3-methoxypropyl)-1H-indole-2-carboxylic acid (1.79 g, 3.68 mmol, 89%, white solid).

1H NMR (300 MHz, DMSO-d$_6$) 12.90 (br, OH, 1H), 10.45 (br, NH, 1H), 8.37 (m, NH, 1H), 8.16 (m, 1H), 7.51-7.49 (m, 3H), 7.42 (m, 1H), 7.35-7.32 (m, 1H), 7.22 (m, 1H), 4.59-4.57 (m, 2H), 4.30-4.28 (m, 2H), 3.24-3.19 (m. 5H), 2.50-2.38 (m, 1H), 1.94-1.90 (m, 2H), 1.04-1.02 (m, 6H).

Example 241-5: Synthesis of 5-(2-chloro-5-(isobutyramidomethyl)benzamido)-1-(3-methoxypropyl)-N-(4-(trifluoromethoxy)benzyl)-1H-indole-2-carboxamide (Compound 241)

5-(2-chloro-5-(isobutyramidomethyl)benzamido)-1-(3-methoxypropyl)-1H-indole-2-carboxylic acid (200 mg, 0.411 mmol) and 4-(trifluoromethoxy)benzylamine (146 mg, 0.822 mmol) were added to a 10 mL flask and dissolved in DMF (1 ml). HATU (167 mg, 1.233 mmol) and DIPEA (172 μl, 1.233 mmol) were added thereto and stirred at room temperature for 12 hours. After the reaction was completed, the organic material was extracted with ethyl acetate/H$_2$O. The organic layer was dried over MgSO$_4$ and distilled under reduced pressure to remove the solvent. The residue was subjected to column chromatography (ethyl acetate:n-hexane=3:1) to obtain 5-(2-chloro-5-(isobutyramidomethyl)benzamido)-1-(3-methoxypropyl)-N-(4-(trifluoromethoxy)benzyl)-1H-indole-2-carboxamide (212 mg, 0.32 mmol, 80%, white solid).

1H NMR (300 MHz, DMSO-d$_6$) 10.42 (br, NH, 1H), 9.12-9.10 (br, NH, 1H), 8.37-8.36 (m, NH, 1H), 8.12 (s, 1H), 7.52-7.43 (m, 6H), 7.36-7.33 (m, 3H), 7.15 (s, 1H), 4.57-4.51 (m, 2H), 4.31-4.29 (m, 2H), 4.31-4.29 (m, 2H), 3.32-3.20 (m, 2H), 3.16 (s, 3H) 2.50-2.39 (m, 1H), 1.92-1.88 (m, 2H), 1.05-1.02 (m, 6H).

Example 242: Synthesis of 5-(2-chloro-5-(isobutyramidomethyl)benzamido)-1-(3-methoxypropyl)-N-(4-(trifluoromethyl)benzyl)-1H-indole-2-carboxamide (Compound 242)

The title compound was obtained according to the same procedure as Example 241, except for using 4-(trifluoromethyl)benzylamine instead of 4-(trifluoromethoxy)benzylamine.

1H NMR (300 MHz, DMSO-d$_6$) 10.41 (br, NH, 1H), 9.16 (br, NH, 1H), 8.36 (m, NH, 1H), 8.12 (s, 1H), 7.72-7.71 (m, 2H), 7.58-7.54 (m, 2H), 7.51-7.42 (m, 3H), 7.42 (m, 1H), 7.35-7.31 (m 1H), 7.16 (s, 1H), 4.58-4.51 (m, 4H), 4.31-4.29 (m, 2H), 3.20-3.17 (m, 2H), 3.16 (s, 3H), 2.50-2.39 (m, 1H), 1.92-1.88 (m, 2H), 1.05-1.02 (m, 6H).

Example 243: Synthesis of 5-(2-chloro-5-(isobutyramidomethyl)benzamido)-N-(4-fluoro-3-(trifluoromethyl)benzyl)-1-(3-methoxypropyl)-1H-indole-2-carboxamide (Compound 243)

The title compound was obtained according to the same procedure as Example 241, except for using 4-fluoro-3-(trifluoromethyl)benzylamine instead of 4-(trifluoromethoxy)benzylamine.

1H NMR (300 MHz, DMSO-d$_6$) 10.42 (br, NH, 1H), 9.15 (br, NH, 1H), 8.36 (m, NH, 1H), 8.12 (s, 1H), 7.75-7.73 (m, 2H), 7.55-7.40 (m, 6H), 7.35-7.30 (m, 1H), 7.16 (m, 1H), 4.58-4.53 (m, 4H), 4.31-4.29 (m, 2H), 3.20-3.17 (m, 2H), 3.13 (s, 3H), 2.50-2.39 (m, 1H), 1.92-1.86 (m, 2H), 1.05-1.00 (m, 6H).

Example 244: Synthesis of 5-(2-chloro-5-(isobutyramidomethyl)benzamido)-N-(2-fluoro-4-(trifluoromethyl)benzyl)-1-(3-methoxypropyl)-1H-indole-2-carboxamide (Compound 244)

The title compound was obtained according to the same procedure as Example 241, except for using 2-fluoro-4-(trifluoromethyl)benzylamine instead of 4-(trifluoromethoxy)benzylamine.

1H NMR (300 MHz, DMSO-d$_6$) 10.43 (br, NH, 1H), 9.15 (br, NH, 1H), 8.36 (m, NH, 1H), 8.14 (s, 1H), 7.75-7.62 (m, 3H), 7.55-7.42 (m, 4H), 7.37-7.33 (m, 1H), 7.18 (m, 1H), 4.58 (m, 4H), 4.31-4.29 (m, 2H), 3.20-3.17 (m, 2H), 3.16 (s, 3H), 2.50-2.39 (m, 1H), 1.92-1.86 (m, 2H), 1.05-1.00 (m, 6H).

Experimental Example 1: Inhibitory Activity on mPGES-1

Microsomal Fraction of A549 Human Lung Cancer Cells

A549 human lung cancer cells were cultured in a DMEM medium supplemented with 100 units/mL penicillin-streptomycin and 10% FBS in an incubator at 37° C. and 5% CO$_2$. After the cells were seeded and cultured in an incubator at 37° C. and 5% CO$_2$, the cells were treated with IL-1β (1 ng/mL). After 48 hours of incubation, the cells were washed with PBS and reacted with 2 mL of trypsin/EDTA for 5 minutes. And then, the cells were separated with addition of 3 mL of DMEM, collected by centrifugation at 1,000 rpm for 5 minutes, and then washed with PBS twice. The prepared cells were resuspended in a homogenization buffer (0.1 M potassium phosphonate buffer, pH 7.4, 2.5 mM glutathione, 0.25 M sucrose) and incubated for 10 minutes on ice. Then, the cells were sonicated (3×20 s) and centrifuged at 1,000 g for 10 minutes and 174000 g for 1 hour at 4° C. to obtain microsomal fraction. The microsomal fraction was resuspended in 50 μL of homogenization buffer and subjected to protein quantification by Bradford assay.

Measurement of mPGES-1 Enzyme Activity

A test compound or DMSO was added to a protein and a reaction buffer (0.1 M potassium phosphate buffer, 2.5 mM GSH) to make a total volume of 100 μL and incubated on ice for 15 minutes. The reaction started when PGH$_2$ was added and 100 μL of a stop solution (40 mM FeCl$_2$, 80 mM citric acid) was added after 2 minutes to complete the reaction. PGE$_2$ production was measured by the PGE$_2$ ELISA kit.

Measurement of PGE$_2$

Samples at various concentrations were added at 24 hours after A549 human lung cancer cells were seeded. After 1 hour, IL-1β of 1 ng/mL was added. The cells were cultured for 48 hours and then the culture supernatant was collected. PGE$_2$ of the collected supernatant was measured according to the manufacturer's instructions using a PGE$_2$ EIA kit.

The results are shown in Tables 1 and 2 below.

TABLE 1

| Compound | A549 cell | | | | |
| --- | --- | --- | --- | --- | --- |
|  | 10 nM | 100 nM | 1000 nM | IC50 | mPGES-1 |
| GRC27864 |  |  |  | 3.21 | 4.63 |
| 1 |  | 44.52 | 67.86 | 276.96 |  |
| 2 |  | 33.42 | 78.57 | 236.88 |  |
| 3 |  | 45.66 | 77.04 | 208.63 | 4.68 |
| 4 |  | 37.04 | 55.56 |  |  |
| 5 |  | 48.15 | 59.26 |  |  |
| 6 |  | 40.74 | 48.15 |  |  |
| 7 |  | 47.22 | 63.89 |  |  |
| 8 |  | 73.2 | 85.94 | 5.22 | 3.32 |
| 9 |  | 75.31 | 84.16 | 7.16 | 4.08 |
| 10 |  | 58 | 80.85 |  |  |
| 11 |  | 67.44 | 70.86 |  |  |
| 12 |  | 37.89 | 46.92 |  |  |
| 13 |  | 74.67 | 82.95 | 26.39 |  |
| 14 |  | 45.86 | 77.5 |  |  |
| 15 |  | 35.42 | 35.99 |  |  |
| 16 |  | 38.06 | 50.25 | 7.19 |  |
| 17 | 29.37 | 52.51 |  | 88.14 |  |
| 18 | 25.9 | 68.73 |  | 60 |  |
| 19 | 31.12 | 41.99 |  | >100 |  |
| 20 | 56.29 | 70.37 |  | 6.87 |  |
| 21 | 29.63 | 27.46 |  | >100 |  |
| 22 | 39.4 | 77.54 |  | 27.44 |  |
| 23 | 36.48 | 65.68 |  | 44.96 |  |
| 24 |  | 53.33 | 63.81 |  |  |
| 25 |  | 52.38 | 74.29 |  |  |
| 26 |  | 26.44 | 41.38 |  |  |
| 27 |  | 22.99 | 50.57 |  |  |
| 28 |  | 37.57 | 79.2 |  |  |
| 29 |  | 10.3 | 49.05 |  |  |
| 30 |  | 35.5 | 61.79 |  |  |
| 31 |  | 51.81 | 81.94 | 9.22 |  |
| 32 |  | 65.03 | 80.64 | 9.62 |  |
| 33 |  | 67.83 | 83.89 | 9.59 |  |
| 34 |  | 69.52 | 84.45 | 7.9 |  |
| 35 |  | 69.39 | 82.16 | 10.38 |  |
| 36 |  | 58.75 | 80.53 |  |  |
| 37 |  | 49.3 | 75.45 |  |  |
| 38 |  | 52.73 | 83.25 |  |  |
| 39 |  | 75.22 | 83.32 |  |  |
| 40 |  | 44.87 | 79.34 |  |  |
| 41 |  | 52.2 | 83.79 |  |  |

TABLE 1-continued

| Compound | A549 cell 10 nM | 100 nM | 1000 nM | IC50 | mPGES-1 |
|---|---|---|---|---|---|
| 42 | | 62.09 | 78.57 | | |
| 43 | | 54.4 | 84.68 | | |
| 44 | | 57.38 | 83.09 | | |
| 45 | | 44.21 | 81.15 | | |
| 46 | | 54.12 | 78.93 | | |
| 47 | | 81.9 | 91.03 | 5.82 | |
| 48 | | 54.65 | 83.02 | | |
| 49 | | 64.05 | 73.44 | 9.75 | |
| 50 | | 33.15 | 68.56 | | |
| 51 | | 52.12 | 68.02 | | |
| 52 | | 57.62 | 72.93 | | |
| 53 | | 8.1 | 37.16 | | |
| 54 | 20.75 | 26.56 | | | |
| 55 | 31.95 | 45.33 | | | |
| 56 | 36.41 | 59.02 | | 59.19 | |
| 57 | 4.23 | 42.46 | | | |
| 58 | 57.43 | 73.35 | | 5.54 | |
| 59 | 51.31 | 76.84 | | 9.5 | |
| 60 | 38.26 | 75.76 | | 30.3 | |
| 61 | 24.33 | 69.13 | | 51.56 | |
| 62 | | 62.67 | 89.48 | 27.52 | |
| 63 | | 77.88 | 82.24 | 14.84 | |
| 64 | | 66.96 | 85.25 | 9.38 | |
| 65 | | 75.47 | 83.04 | 2.71 | |
| 66 | | 79.2 | 91.41 | 43.26 | |
| 67 | | 81.11 | 88.18 | 1.8 | |
| 68 | | 78.35 | 90.56 | 8.52 | |
| 69 | 43.78 | 57.67 | | 47.01 | |
| 70 | 51.14 | 62.55 | | 9.65 | |
| 71 | 47.61 | 65.35 | | 20.14 | |
| 72 | 50.35 | 72.28 | | 9.38 | |
| 73 | 38.54 | 54.36 | | 72.3 | |
| 74 | 62.92 | 82.53 | | 5.87 | |
| 75 | 56.84 | 86.8 | | 6.49 | |
| 76 | 3.11 | 45.55 | | | |

TABLE 2

| Compound | A549 cell IC50 |
|---|---|
| 77 | 6.1 |
| 78 | 5.5 |
| 79 | 8.62 |
| 80 | >100 |
| 81 | 33.55 |
| 82 | 19.79 |
| 83 | 47.9 |
| 84 | 58.83 |
| 85 | 67.63 |
| 86 | 24.75 |
| 87 | 23.72 |
| 88 | 44.07 |
| 89 | 29.83 |
| 90 | 5.79 |
| 91 | 62.95 |
| 92 | 13.22 |
| 93 | 34.44 |
| 94 | 66.66 |
| 95 | 7.22 |
| 96 | 23.16 |
| 97 | >100 |
| 98 | 43.95 |
| 99 | 3.99 |
| 100 | 36.2 |
| 101 | 28.55 |
| 102 | 22.16 |
| 103 | >100 |
| 104 | 27.64 |
| 105 | 4.11 |
| 106 | 19.44 |
| 107 | 42.81 |
| 108 | 7.96 |
| 109 | 7.33 |
| 110 | 60.13 |
| 111 | 9.72 |
| 112 | 17.67 |
| 113 | 6.41 |
| 114 | 5.85 |
| 115 | 24.02 |
| 116 | 43.19 |
| 117 | 31.13 |
| 118 | 8.71 |
| 119 | 7.22 |
| 120 | 8.26 |
| 121 | 10.76 |
| 122 | 11.6 |
| 123 | 9.85 |
| 124 | 5.74 |
| 125 | 12.85 |
| 126 | 7.82 |
| 127 | 6.85 |
| 128 | 15.44 |
| 129 | 7.58 |
| 130 | 6.28 |
| 131 | 5.22 |
| 132 | 5.61 |
| 133 | 7.02 |
| 134 | 9.8 |
| 135 | 7 |
| 136 | 11.73 |
| 137 | 41.96 |
| 138 | 5.33 |
| 139 | 8.39 |
| 140 | 6.52 |
| 141 | 7.11 |
| 142 | 18.94 |
| 143 | 8.26 |
| 144 | 39.47 |
| 145 | 5.97 |
| 146 | 6.08 |
| 147 | 35.6 |
| 148 | 17.34 |
| 149 | 52.86 |
| 150 | 7.29 |
| 151 | 6.54 |
| 152 | 7.58 |
| 153 | 3.95 |
| 154 | 4.49 |
| 155 | 7.23 |
| 156 | 6.02 |
| 157 | 4.94 |
| 158 | 6.14 |
| 159 | 5.55 |
| 160 | 9.31 |
| 161 | 3.99 |
| 162 | 8.63 |
| 163 | 7.43 |
| 164 | 8.08 |
| 165 | 6.45 |
| 166 | 6.98 |
| 167 | 6.24 |
| 168 | 4.68 |
| 169 | 6.02 |
| 170 | 3.91 |
| 171 | 5.74 |
| 172 | 4.3 |
| 173 | 4.34 |
| 174 | 3.74 |
| 175 | 4.51 |
| 176 | 6.2 |
| 177 | 4.66 |
| 178 | 3.92 |
| 179 | 4.74 |
| 180 | 5.07 |
| 181 | 6.15 |
| 182 | 10.89 |
| 183 | 7.45 |

TABLE 2-continued

| A549 cell | |
|---|---|
| Compound | IC50 |
| 184 | 5.84 |
| 185 | 2.68 |
| 186 | 5.94 |
| 187 | 3.05 |
| 188 | 4.93 |
| 189 | 5 |
| 190 | 1.09 |
| 191 | 3.93 |
| 192 | 9.27 |
| 193 | 55.6 |
| 194 | 70.76 |
| 195 | 12.54 |
| 196 | 6.32 |
| 197 | 83.01 |
| 198 | 7.69 |
| 199 | 9.17 |
| 200 | 31.8 |
| 201 | 39.73 |
| 202 | 9.16 |
| 203 | 16.78 |
| 204 | >100 |
| 205 | 5.66 |
| 206 | 2.57 |
| 207 | 4.17 |
| 208 | 5.28 |
| 209 | 3.6 |
| 210 | 5.44 |
| 211 | 7.58 |
| 212 | 3.7 |
| 213 | 5.43 |
| 214 | 1 |
| 215 | 3.69 |
| 216 | 4.82 |
| 217 | 5.9 |
| 218 | 3.61 |
| 219 | 3.28 |
| 220 | 4.36 |
| 221 | 9.63 |
| 222 | 7.08 |
| 223 | 8.71 |
| 224 | 8.67 |
| 225 | 2.91 |
| 226 | 3.55 |
| 227 | 53.69 |
| 228 | >100 |
| 229 | >100 |
| 230 | >100 |
| 231 | >100 |
| 232 | 8.01 |
| 233 | 17.27 |
| 234 | 70.12 |
| 235 | >100 |
| 236 | >100 |
| 237 | 57.38 |
| 238 | 47.91 |
| 239 | 4.17 |
| 240 | 5.25 |
| 241 | 78.23 |
| 242 | 46.23 |
| 243 | 21.46 |
| 244 | 28.76 |

As can be seen in Tables 1 and 2, the indole carboxamide derivatives according to the present invention showed excellent inhibitory effect on $PGE_2$ production. In addition, the compounds according to the present invention showed inhibitory effect on the mPGES-1 enzyme almost equivalent to that of the positive control GRC27864 (compound of formula (I)).

Experimental Example 2: Efficacy Experiment Using Guinea Pig Model of Osteoarthritis Induced by MIA (Monosodium Iodoacetate)

An experiment was conducted as follows in order to evaluate the efficacy of the compound according to the present invention for osteoarthritis-induced guinea pigs.

Specifically, male guinea pigs weighing about 500 g±20% from Coretech Co., Ltd. (Gyeonggi-do, Korea) were acclimated in a laboratory for 8 days, and provided chow and water ad libitum. Temperature (23±3° C.), humidity (55±15%) and light/dark cycle (12 hours, 08:00~20:00) were controlled automatically.

Each group consisted of 10 guinea pigs. Guinea pigs were anesthetized with Zoletil 50 (VIRBAC, France, 5 mg/kg) and xylazine (Rompun®, Bayer AG, Germany, 2.5 mg/kg) and depilated at the area around the right knee with Clipper. Using a C-arm (ARCADIS Varic, SIEMENS Co.), it was confirmed that a syringe equipped with a 26 gauge needle was located in the joint cavity. 50 μL of MIA at a concentration of 60 mg/mL was administered into the joint cavity. One week after MIA administration, Compound 9 of the present invention was added to excipients (DMSO (10% by weight), Tween 80 (30% by weight), HMPC (same amount as the drug)), dissolved in water so that the total amount was 100% by weight, and orally administered to the prepared experimental animals at 10 mg/kg and 25 mg/kg, respectively. In the positive control group, GRC27864 was orally administered at 12.5 mg/kg using the same excipient, and only the excipient was orally administered to the control group. The drug was administered for 4 weeks.

The hind limb incapacitance test was performed for the behavioral evaluation weekly for 4 weeks and the inflammatory factor evaluation was performed by measuring PGE2, IL-1β, and TNF-α in blood after 4 weeks.

The hind limb weight-bearing ratios were obtained by setting up the animals at an inclination of 60 degrees in a plastic room using an incapacitance meter tester, measuring the intensity applied to each hind limb over 10 seconds, and calculating an average. The results are shown in Table 3 below and FIG. 1. Weight-bearing ratios are 50% for normal cases and up to early 30% for the cases in which a disease is induced.

TABLE 3

Incapacitance test (unit: %)

Weight-bearing ratio

| Days | Control group | GRC27864 | Compound 9 (10 mpk) | Compound 9 (25 mpk) |
|---|---|---|---|---|
| 0 | 40.80 ± 4.21 | 40.84 ± 2.68 | 42.05 ± 2.99 | 39.15 ± 4.53 |
| 7 | 39.29 ± 4.68 | 43.66 ± 4.51 | 39.64 ± 5.30 | 42.39 ± 3.69 |
| 14 | 35.56 ± 4.02 | 39.85 ± 3.29 | 39.53 ± 6.41 | 40.65 ± 3.61 |
| 21 | 35.78 ± 1.74 | 37.35 ± 4.43 | 40.16 ± 2.92 | 39.19 ± 3.15 |
| 28 | 34.57 ± 1.49 | 40.92 ± 3.85 | 38.42 ± 1.52 | 39.28 ± 4.14 |

Since inflammation continued to be induced in the control group administered with only the excipients, the weight-bearing ratio dropped to 34.57±1.49% after 4 weeks. However, it was confirmed that the weight-bearing ratios of the GRC27864-administered group and the Compound 9-administered group did not worsen after MIA administration but were maintained.

The concentrations of PGE2, IL-1β, and TNF-α in blood were measured using commercially available ELISA kit after 4 weeks. The results are shown in Table 4 below and FIGS. 2 to 4. *,  and * represent statistical significance compared to the control group, and are P<0.001, P<0.01, and P<0.05 compared to the control group.

TABLE 4

| | | ELISA analysis | | |
|---|---|---|---|---|
| Item | Control group | GRC27864 (12.5 mpk) | Compound 9 (10 mpk) | Compound 9 (25 mpk) |
| PGE2 | 11031.4 ± 2635.5 | 7756.9 ± 1860.5** | 9331.6 ± 2215.6 | 5812.4 ± 1758.8*** |
| IL-1β | 47.139 ± 14.282 | 37.408 ± 9.109 | 41.547 ± 10.683 | 34.345 ± 11.786 |
| TNF-α | 135.574 ± 28.660 | 97.110 ± 20.595* | 119.715 ± 22.898 | 94.833 ± 22.453** |

As a result of comparing the inhibitory ability on inflammatory factors for the control group administered with only the excipient, the group administered with GRC27864 and the group administered with Compound 9 (25 mpk), it was confirmed that the group administered with Compound 9 (25 mpk) inhibited the inflammatory factor more than the group administered with the drug GRC27864.

Experimental Example 3: Anti-Pain Efficacy Test Using Acetic Acid-Induced Abdominal Contraction Mouse Model In order to evaluate the anti-pain efficacy of the compound according to the present invention in abdominal contraction mice, an experiment was conducted as follows.

Specifically, male ICR mice weighing about 20 to 25 g from Orient Bio Co., Ltd. (Gyeonggi-do, Korea) were acclimated in a laboratory for 7 days and provided chow and water ad libitum. Temperature (20±2° C.), humidity (40±60%) and light/dark cycle (12 hours) were controlled automatically.

Based on 10 mice per group, the control group was orally administered with an excipient (200 μL), and the positive control group was orally administered with celecoxib at 25 mg/kg. Compound 9 of the present invention was dissolved in an excipient (10% NMP (N-methyl-2-pyrrolidone), 10% ethanol, 80% polyethylene glycol 400) and administered orally at 10 and 50 mg/kg to each mouse. One hour after drug administration, 0.7% acetic acid was intraperitoneally injected at 10 mg/kg to induce pain. The number of writhing was measured for 10 minutes from 10 minutes after the acetic acid administration. The results are shown in FIG. 5.

In this experiment, the less the number of writhing for 10 minutes, the stronger the anti-pain efficacy of the drug was evaluated. The statistical significance compared to the control group was represented as **P<0.01, *P<0.05 compared to the control group. It can be seen from FIG. 5 that the celecoxib-administered group and the Compound 9-administered group showed a significantly lower number of writhing compared to the control group and celecoxib (25 mg/kg) and Compound 9 (10 mg/kg) showed similar pain suppression effects.

The invention claimed is:

1. An indole carboxamide derivative of formula (II) or pharmaceutically acceptable salt thereof:

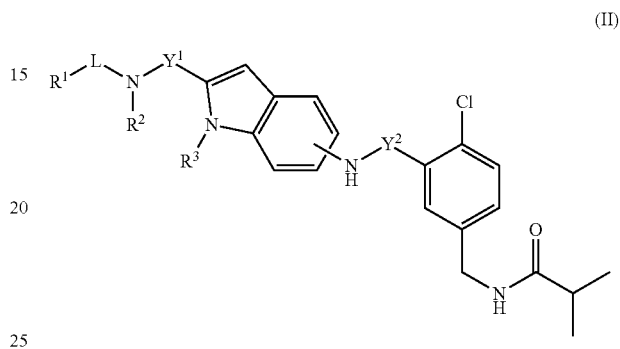

(II)

wherein,

R$^1$ is phenyl, pyridinyl, pyrazolyl, pyrimidinyl, naphthalenyl, benzodioxolyl or tetrahydronaphthyl substituted or unsubstituted with one or more substituents selected from the group consisting of halogen, $C_1$-$C_6$ alkyl group, $C_1$-$C_6$ haloalkyl group, $C_1$-$C_6$ alkoxy group, $C_1$-$C_6$ haloalkoxy group, nitro, phenyl, trifluoromethylphenyl, cyclohexyl, morpholinyl, cyano, $C_1$-$C_6$ alkoxycarbonyl and carboxy;

L is absent or is a $C_1$-$C_6$ alkylene group;

R$^2$ is hydrogen;

Y$^1$ and Y$^2$ are each independently C=O or CH$_2$; and

R$^3$ is hydrogen, a $C_1$-$C_6$ alkyl group, a $C_1$-$C_6$ haloalkyl group, or a $C_2$-$C_{12}$ alkoxyalkyl group.

2. The indole carboxamide derivative or pharmaceutically acceptable salt thereof according to claim 1, wherein the indole carboxamide derivative is a compound of formula (II-1):

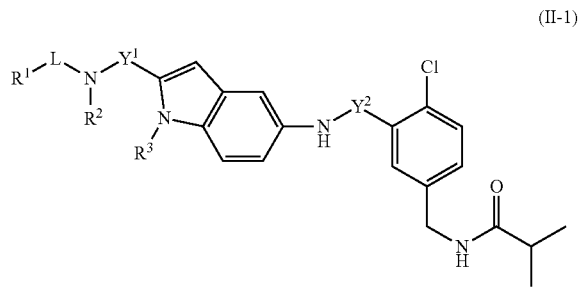

(II-1)

wherein,

R$^1$ is phenyl, pyridinyl, pyrazolyl, pyrimidinyl, naphthalenyl, benzodioxolyl or tetrahydronaphthyl substituted or unsubstituted with one or more substituents selected from the group consisting of halogen, $C_1$-$C_6$ alkyl group, $C_1$-$C_6$ haloalkyl group, $C_1$-$C_6$ alkoxy group, $C_1$-$C_6$ haloalkoxy group, nitro, phenyl, trifluoromethylphenyl, cyclohexyl, morpholinyl, cyano, $C_1$-$C_6$ alkoxycarbonyl and carboxy;

L is absent or is a $C_1$-$C_6$ alkylene group;

$R^2$ is hydrogen;

$Y^1$ and $Y^2$ are each independently C=O or $CH_2$; and $R^3$ is hydrogen, a $C_1$-$C_6$ alkyl group, a $C_1$-$C_6$ haloalkyl group, or a $C_2$-$C_{12}$ alkoxyalkyl group.

3. The indole carboxamide derivative or pharmaceutically acceptable salt thereof according to claim 1, wherein the indole carboxamide derivative is a compound of formula (II-2):

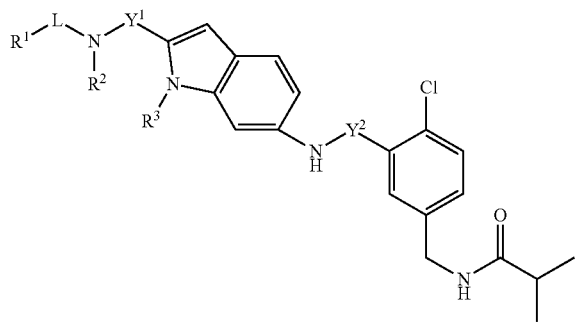

wherein, $R^1$ is phenyl, pyridinyl, pyrazolyl, pyrimidinyl, naphthalenyl, benzodioxolyl or tetrahydronaphthyl substituted or unsubstituted with one or more substituents selected from the group consisting of halogen, $C_1$-$C_6$ alkyl group, $C_1$-$C_6$ haloalkyl group, $C_1$-$C_6$ alkoxy group, $C_1$-$C_6$ haloalkoxy group, nitro, phenyl, trifluoromethylphenyl, cyclohexyl, morpholinyl, cyano, $C_1$-$C_6$ alkoxycarbonyl and carboxy;

L is absent or is a $C_1$-$C_6$ alkylene group;

$R^2$ is hydrogen;

$Y^1$ and $Y^2$ are each independently C=O or $CH_2$; and $R^3$ is hydrogen, a $C_1$-$C_6$ alkyl group, a $C_1$-$C_6$ haloalkyl group, or a $C_2$-$C_{12}$ alkoxyalkyl group.

4. The indole carboxamide derivative or pharmaceutically acceptable salt thereof according to claim 1, wherein $R^1$ is phenyl, pyridinyl, pyrazolyl, pyrimidinyl, naphthalenyl, benzodioxolyl or tetrahydronaphthyl substituted or unsubstituted with one or more substituents selected from the group consisting of fluoro, chloro, bromo, methyl, tert-butyl, trifluoromethyl, methoxy, trifluoromethoxy, nitro, phenyl, trifluoromethylphenyl, cyclohexyl, morpholinyl, cyano, methoxycarbonyl and carboxy.

5. The indole carboxamide derivative or pharmaceutically acceptable salt thereof according to claim 1, wherein at least one of $Y^1$ or $Y^2$ is C=O.

6. The indole carboxamide derivative or pharmaceutically acceptable salt thereof according to claim 1, wherein $R^1$ is phenyl, pyridinyl, pyrazolyl, pyrimidinyl, naphthalenyl, benzodioxolyl or tetrahydronaphthyl substituted or unsubstituted with one or more substituents selected from the group consisting of fluoro, chloro, bromo, methyl, tert-butyl, trifluoromethyl, methoxy, trifluoromethoxy, nitro, phenyl, trifluoromethylphenyl, cyclohexyl, morpholinyl, cyano, methoxycarbonyl and carboxy; L is absent or is methylene or ethylene; $R^2$ is hydrogen; $Y^1$ and $Y^2$ are each independently C=O or $CH_2$; and $R^3$ is hydrogen, methyl, ethyl, n-propyl, i-propyl, n-butyl, trifluoromethyl, difluoroethyl, trifluoroethyl, methoxymethyl, methoxyethyl, methoxypropyl or ethoxymethyl.

7. The indole carboxamide derivative or pharmaceutically acceptable salt thereof according to claim 1, wherein $R^1$ is phenyl substituted with a $C_1$-$C_6$ haloalkoxy group; L is absent; $R^2$ is hydrogen; $Y^1$ and $Y^2$ are C=O; and $R^3$ is a $C_1$-$C_6$ alkyl group.

8. The indole carboxamide derivative or pharmaceutically acceptable salt thereof according to claim 1 selected from the group consisting of the following compounds:

5-(2-chloro-5-(isobutyramidomethyl)benzamido)-N-(3-fluorophenyl)-1-methyl-1H-indole-2-carboxamide (Compound 1);

5-(2-chloro-5-(isobutyramidomethyl)benzamido)-N-(4-fluorophenyl)-1-methyl-1H-indole-2-carboxamide (Compound 2);

5-(2-chloro-5-(isobutyramidomethyl)benzamido)-N-(3-chlorophenyl)-1-methyl-1H-indole-2-carboxamide (Compound 3);

5-(2-chloro-5-(isobutyramidomethyl)benzamido)-N-(4-fluoro-3-(trifluoromethyl)phenyl)-1-methyl-1H-indole-2-carboxamide (Compound 4);

5-(2-chloro-5-(isobutyramidomethyl)benzamido)-N-(3-chloro-5-fluorophenyl)-1-methyl-1H-indole-2-carboxamide (Compound 5);

5-(2-chloro-5-(isobutyramidomethyl)benzamido)-N-(3,5-difluorophenyl)-1-methyl-1H-indole-2-carboxamide (Compound 6);

5-(2-chloro-5-(isobutyramidomethyl)benzamido)-1-methyl-N-(3-(trifluoromethyl)phenyl)-1H-indole-2-carboxamide (Compound 7);

5-(2-chloro-5-(isobutyramidomethyl)benzamido)-1-methyl-N-(4-(trifluoromethyl)phenyl)-1H-indole-2-carboxamide (Compound 8);

5-(2-chloro-5-(isobutyramidomethyl)benzamido)-1-methyl-N-(4-(trifluoromethoxy)phenyl)-1H-indole-2-carboxamide (Compound 9);

5-(2-chloro-5-(isobutyramidomethyl)benzamido)-N-(2-fluorophenyl)-1-methyl-1H-indole-2-carboxamide (Compound 10);

5-(2-chloro-5-(isobutyramidomethyl)benzamido)-N-(4-chlorophenyl)-1-methyl-1H-indole-2-carboxamide (Compound 11);

5-(2-chloro-5-(isobutyramidomethyl)benzamido)-1-methyl-N-(4'-(trifluoromethyl)-[1,1'-biphenyl]-4-yl)-1H-indole-2-carboxamide (Compound 12);

N-(4-bromophenyl)-5-(2-chloro-5-(isobutyramidomethyl)benzamido)-1-methyl-1H-indole-2-carboxamide (Compound 13);

5-(2-chloro-5-(isobutyramidomethyl)benzamido)-1-methyl-N-(o-tolyl)-1H-indole-2-carboxamide (Compound 14);

5-(2-chloro-5-(isobutyramidomethyl)benzamido)-1-methyl-N-(2-(trifluoromethoxy)phenyl)-1H-indole-2-carboxamide (Compound 15);

5-(2-chloro-5-(isobutyramidomethyl)benzamido)-1-methyl-N-(4'-(trifluoromethyl)-[1,1'-biphenyl]-3-yl)-1H-indole-2-carboxamide (Compound 16);

5-(2-chloro-5-(isobutyramidomethyl)benzamido)-N-(3-fluoro-5-(trifluoromethyl)phenyl)-1-methyl-1H-indole-2-carboxamide (Compound 17);

5-(2-chloro-5-(isobutyramidomethyl)benzamido)-1-methyl-N-(6-(trifluoromethyl) pyridin-3-yl)-1H-indole-2-carboxamide (Compound 18);

5-(2-chloro-5-(isobutyramidomethyl)benzamido)-1-methyl-N-(3-(4-(trifluoromethyl)phenyl)-1H-pyrazol-5-yl)-1H-indole-2-carboxamide (Compound 19);

5-(2-chloro-5-(isobutyramidomethyl)benzamido)-1-methyl-N-(4-methyl-3-(4-(trifluoromethyl)phenyl)-1H-pyrazol-5-yl)-1H-indole-2-carboxamide (Compound 20);

N-(4-chloro-2-methylphenyl)-5-(2-chloro-5-(isobutyramidomethyl)benzamido)-1-methyl-1H-indole-2-carboxamide (Compound 22);

5-(2-chloro-5-(isobutyramidomethyl)benzamido)-N-(4-fluoro-2-methylphenyl)-1-methyl-1H-indole-2-carboxamide (Compound 23);

(S)—N-(1-(4-bromophenyl)ethyl)-5-(2-chloro-5-(isobutyramidomethyl)benzamido)-1-methyl-1H-indole-2-carboxamide (Compound 24);

(S)-5-(2-chloro-5-(isobutyramidomethyl)benzamido)-1-methyl-N-(1-(4-nitrophenyl)ethyl)-1H-indole-2-carboxamide (Compound 25);

5-(2-chloro-5-(isobutyramidomethyl)benzamido)-1-methyl-N-(2-methylbenzyl)-1H-indole-2-carboxamide (Compound 26);

5-(2-chloro-5-(isobutyramidomethyl)benzamido)-N-(1-(4-fluorophenyl)ethyl)-1-methyl-1H-indole-2-carboxamide (Compound 27);

(S)-5-(2-chloro-5-(isobutyramidomethyl)benzamido)-1-methyl-N-(1-phenylethyl)-1H-indole-2-carboxamide (Compound 28);

5-(2-chloro-5-(isobutyramidomethyl)benzamido)-N-(4-methoxybenzyl)-1-methyl-1H-indole-2-carboxamide (Compound 29);

N-([1,1'-biphenyl]-4-ylmethyl)-5-(2-chloro-5-(isobutyramidomethyl)benzamido)-1-methyl-1H-indole-2-carboxamide (Compound 30);

(S)-5-(2-chloro-5-(isobutyramidomethyl)benzamido)-1-methyl-N-(1-(naphthalen-2-yl)ethyl)-1H-indole-2-carboxamide (Compound 31);

5-(2-chloro-5-(isobutyramidomethyl)benzamido)-N-(4-fluorobenzyl)-1-methyl-1H-indole-2-carboxamide (Compound 32);

N-(4-(tert-butyl)benzyl)-5-(2-chloro-5-(isobutyramidomethyl)benzamido)-1-methyl-1H-indole-2-carboxamide (Compound 33);

5-(2-chloro-5-(isobutyramidomethyl)benzamido)-1-methyl-N-(4-(trifluoromethyl)benzyl)-1H-indole-2-carboxamide (Compound 34);

5-(2-chloro-5-(isobutyramidomethyl)benzamido)-1-methyl-N-(2-(trifluoromethyl)benzyl)-1H-indole-2-carboxamide (Compound 35);

5-(2-chloro-5-(isobutyramidomethyl)benzamido)-N-(3-fluorobenzyl)-1-methyl-1H-indole-2-carboxamide (Compound 36);

5-(2-chloro-5-(isobutyramidomethyl)benzamido)-N-(2-fluorobenzyl)-1-methyl-1H-indole-2-carboxamide (Compound 37);

5-(2-chloro-5-(isobutyramidomethyl)benzamido)-N-(3,4-difluorobenzyl)-1-methyl-1H-indole-2-carboxamide (Compound 38);

N-(4-chloro-3-fluorobenzyl)-5-(2-chloro-5-(isobutyramidomethyl)benzamido)-1-methyl-1H-indole-2-carboxamide (Compound 39);

(R)-5-(2-chloro-5-(isobutyramidomethyl)benzamido)-1-methyl-N-(1-phenylethyl)-1H-indole-2-carboxamide (Compound 40);

5-(2-chloro-5-(isobutyramidomethyl)benzamido)-1-methyl-N-(3-(trifluoromethyl)benzyl)-1H-indole-2-carboxamide (Compound 41);

5-(2-chloro-5-(isobutyramidomethyl)benzamido)-N-(3-fluoro-5-(trifluoromethyl)benzyl)-1-methyl-1H-indole-2-carboxamide (Compound 42);

5-(2-chloro-5-(isobutyramidomethyl)benzamido)-N-(3-chlorobenzyl)-1-methyl-1H-indole-2-carboxamide (Compound 43);

5-(2-chloro-5-(isobutyramidomethyl)benzamido)-N-(2-chlorobenzyl)-1-methyl-1H-indole-2-carboxamide (Compound 44);

5-(2-chloro-5-(isobutyramidomethyl)benzamido)-1-methyl-N-(4-nitrobenzyl)-1H-indole-2-carboxamide (Compound 45);

5-(2-chloro-5-(isobutyramidomethyl)benzamido)-N-(3-bromobenzyl)-1-methyl-1H-indole-2-carboxamide (Compound 46);

5-(2-chloro-5-(isobutyramidomethyl)benzamido)-1-methyl-N-(1-(4-(trifluoromethyl)phenyl) ethyl)-1H-indole-2-carboxamide (Compound 47);

5-(2-chloro-5-(isobutyramidomethyl)benzamido)-N-(4-bromobenzyl)-1-methyl-1H-indole-2-carboxamide (Compound 48);

5-(2-chloro-5-(isobutyramidomethyl)benzamido)-N-(4-chlorobenzyl)-1-methyl-1H-indole-2-carboxamide (Compound 49);

N-(benzo[d][1,3]dioxol-5-ylmethyl)-5-(2-chloro-5-(isobutyramidomethyl)benzamido)-1-methyl-1H-indole-2-carboxamide (Compound 50);

5-(2-chloro-5-(isobutyramidomethyl)benzamido)-N-(3,5-difluorobenzyl)-1-methyl-1H-indole-2-carboxamide (Compound 51);

5-(2-chloro-5-(isobutyramidomethyl)benzamido)-1-methyl-N-(4-(trifluoromethoxy)benzyl)-1H-indole-2-carboxamide (Compound 52);

N-(4-bromo-2-fluorobenzyl)-5-(2-chloro-5-(isobutyramidomethyl)benzamido)-1-methyl-1H-indole-2-carboxamide (Compound 53);

5-(2-chloro-5-(isobutyramidomethyl)benzamido)-N-(2,6-difluorobenzyl)-1-methyl-1H-indole-2-carboxamide (Compound 54);

5-(2-chloro-5-(isobutyramidomethyl)benzamido)-N-(2,6-dichlorobenzyl)-1-methyl-1H-indole-2-carboxamide (Compound 55);

N-(3-chloro-4-fluorobenzyl)-5-(2-chloro-5-(isobutyramidomethyl)benzamido)-1-methyl-1H-indole-2-carboxamide (Compound 56);

N-(2-chloro-3-(trifluoromethyl)benzyl)-5-(2-chloro-5-(isobutyramidomethyl)benzamido)-1-methyl-1H-indole-2-carboxamide (Compound 57);

(R)-5-(2-chloro-5-(isobutyramidomethyl)benzamido)-1-methyl-N-(1-(4-(trifluoromethyl)phenyl) ethyl)-1H-indole-2-carboxamide (Compound 58);

(R)-5-(2-chloro-5-(isobutyramidomethyl)benzamido)-1-methyl-N-(1-(4-(trifluoromethoxy)phenyl) ethyl)-1H-indole-2-carboxamide (Compound 59);

(S)-5-(2-chloro-5-(isobutyramidomethyl)benzamido)-1-methyl-N-(1-(4-(trifluoromethyl)phenyl) ethyl)-1H-indole-2-carboxamide (Compound 60);

(S)-5-(2-chloro-5-(isobutyramidomethyl)benzamido)-1-methyl-N-(1-(4-(trifluoromethoxy)phenyl) ethyl)-1H-indole-2-carboxamide (Compound 61);

N-(4-(tert-butyl)benzyl)-5-(2-chloro-5-(isobutyramidomethyl)benzamido)-1-(2,2,2-trifluoroethyl)-1H-indole-2-carboxamide (Compound 62);

5-(2-chloro-5-(isobutyramidomethyl)benzamido)-1-(2,2,2-trifluoroethyl)-N-(2-(trifluoromethyl)benzyl)-1H-indole-2-carboxamide (Compound 63);

5-(2-chloro-5-(isobutyramidomethyl)benzamido)-1-(2,2,2-trifluoroethyl)-N-(4-(trifluoromethyl)benzyl)-1H-indole-2-carboxamide (Compound 64);

(S)-5-(2-chloro-5-(isobutyramidomethyl)benzamido)-N-(1-(naphthalen-2-yl)ethyl)-1-(2,2,2-trifluoroethyl)-1H-indole-2-carboxamide (Compound 65);

(S)-5-(2-chloro-5-(isobutyramidomethyl)benzamido)-N-(1-(4-nitrophenyl)ethyl)-1-(2,2,2-trifluoroethyl)-1H-indole-2-carboxamide (Compound 66);

(S)—N-(1-(4-bromophenyl)ethyl)-5-(2-chloro-5-(isobutyramidomethyl)benzamido)-1-(2,2,2-trifluoroethyl)-1H-indole-2-carboxamide (Compound 67);

5-(2-chloro-5-(isobutyramidomethyl)benzamido)-N-(4-fluorobenzyl)-1-(2,2,2-trifluoroethyl)-1H-indole-2-carboxamide (Compound 68);

5-(2-chloro-5-(isobutyramidomethyl)benzamido)-N-(3-fluoro-5-(trifluoromethyl)benzyl)-1-(2,2,2-trifluoroethyl)-1H-indole-2-carboxamide (Compound 69);

5-(2-chloro-5-(isobutyramidomethyl)benzamido)-1-(2,2,2-trifluoroethyl)-N-(3-(trifluoromethyl)benzyl)-1H-indole-2-carboxamide (Compound 70);

N-(4-chloro-3-fluorobenzyl)-5-(2-chloro-5-(isobutyramidomethyl)benzamido)-1-(2,2,2-trifluoroethyl)-1H-indole-2-carboxamide (Compound 71);

5-(2-chloro-5-(isobutyramidomethyl)benzamido)-1-(2,2,2-trifluoroethyl)-N-(4-(trifluoromethoxy)benzyl)-1H-indole-2-carboxamide (Compound 72);

5-((2-chloro-5-(isobutyramidomethyl)benzyl)amino)-1-methyl-N-(4-(trifluoromethoxy)phenyl)-1H-indole-2-carboxamide (Compound 73);

5-(2-chloro-5-(isobutyramidomethyl)benzamido)-N-(4-(trifluoromethoxy)phenyl)-1H-indole-2-carboxamide (Compound 74);

5-(2-chloro-5-(isobutyramidomethyl)benzamido)-N-(4-(trifluoromethyl)phenyl)-1H-indole-2-carboxamide (Compound 75);

2-chloro-5-(isobutyramidomethyl)-N-(1-methyl-2-(((4-(trifluoromethoxy)phenyl)amino) methyl)-1H-indol-5-yl)benzamide (Compound 76);

5-(2-chloro-5-(isobutyramidomethyl)benzamido)-1-(methoxymethyl)-N-(4-(trifluoromethoxy)phenyl)-1H-indole-2-carboxamide (Compound 77);

5-(2-chloro-5-(isobutyramidomethyl)benzamido)-1-(methoxymethyl)-N-(4-(trifluoromethyl)phenyl)-1H-indole-2-carboxamide (Compound 78);

5-(2-chloro-5-(isobutyramidomethyl)benzamido)-N-(4-chlorophenyl)-1-(methoxymethyl)-1H-indole-2-carboxamide (Compound 79);

5-(2-chloro-5-(isobutyramidomethyl)benzamido)-1-(methoxymethyl)-N-(6-(trifluoromethyl) pyridin-3-yl)-1H-indole-2-carboxamide (Compound 80);

N-(4-chloro-2-methylphenyl)-5-(2-chloro-5-(isobutyramidomethyl)benzamido)-1-(methoxymethyl)-1H-indole-2-carboxamide (Compound 81);

5-(2-chloro-5-(isobutyramidomethyl)benzamido)-N-(4-cyclohexylphenyl)-1-(methoxymethyl)-1H-indole-2-carboxamide (Compound 82);

5-(2-chloro-5-(isobutyramidomethyl)benzamido)-N-(2,4-difluorophenyl)-1-(methoxymethyl)-1H-indole-2-carboxamide (Compound 83);

N-(4-(tert-butyl)phenyl)-5-(2-chloro-5-(isobutyramidomethyl)benzamido)-1-(methoxymethyl)-1H-indole-2-carboxamide (Compound 84);

5-(2-chloro-5-(isobutyramidomethyl)benzamido)-N-(4-fluorophenyl)-1-(methoxymethyl)-1H-indole-2-carboxamide (Compound 85);

5-(2-chloro-5-(isobutyramidomethyl)benzamido)-N-(3-chlorophenyl)-1-(methoxymethyl)-1H-indole-2-carboxamide (Compound 86);

5-(2-chloro-5-(isobutyramidomethyl)benzamido)-1-(methoxymethyl)-N-(3-(trifluoromethyl)phenyl)-1H-indole-2-carboxamide (Compound 87);

5-(2-chloro-5-(isobutyramidomethyl)benzamido)-N-(3-fluorophenyl)-1-(methoxymethyl)-1H-indole-2-carboxamide (Compound 88);

5-(2-chloro-5-(isobutyramidomethyl)benzamido)-1-(methoxymethyl)-N-(3-(trifluoromethoxy)phenyl)-1H-indole-2-carboxamide (Compound 89);

5-(2-chloro-5-(isobutyramidomethyl)benzamido)-N-(3-chloro-5-fluorophenyl)-1-(methoxymethyl)-1H-indole-2-carboxamide (Compound 90);

5-(2-chloro-5-(isobutyramidomethyl)benzamido)-1-(methoxymethyl)-N-(5,6,7,8-tetrahydronaphthalen-1-yl)-1H-indole-2-carboxamide (Compound 91);

5-(2-chloro-5-(isobutyramidomethyl)benzamido)-1-(3-methoxypropyl)-N-(4-(trifluoromethoxy)phenyl)-1H-indole-2-carboxamide (Compound 92);

N-(4-(tert-butyl)phenyl)-5-(2-chloro-5-(isobutyramidomethyl)benzamido)-1-(3-methoxypropyl)-1H-indole-2-carboxamide (Compound 93);

N-(4-chloro-2-methylphenyl)-5-(2-chloro-5-(isobutyramidomethyl)benzamido)-1-(3-methoxypropyl)-1H-indole-2-carboxamide (Compound 94);

N-(3-chloro-4-fluorophenyl)-5-(2-chloro-5-(isobutyramidomethyl)benzamido)-1-(3-methoxypropyl)-1H-indole-2-carboxamide (Compound 95);

5-(2-chloro-5-(isobutyramidomethyl)benzamido)-N-(4-chlorophenyl)-1-(3-methoxypropyl)-1H-indole-2-carboxamide (Compound 96);

5-(2-chloro-5-(isobutyramidomethyl)benzamido)-N-(4-fluoro-2-methylphenyl)-1-(3-methoxypropyl)-1H-indole-2-carboxamide (Compound 97);

5-(2-chloro-5-(isobutyramidomethyl)benzamido)-N-(3-fluoro-4-morpholinophenyl)-1-(3-methoxypropyl)-1H-indole-2-carboxamide (Compound 98);

5-(2-chloro-5-(isobutyramidomethyl)benzamido)-1-(3-methoxypropyl)-N-(3-(trifluoromethoxy)phenyl)-1H-indole-2-carboxamide (Compound 99);

5-(2-chloro-5-(isobutyramidomethyl)benzamido)-1-(3-methoxypropyl)-N-(3-(trifluoromethyl)phenyl)-1H-indole-2-carboxamide (Compound 100);

5-(2-chloro-5-(isobutyramidomethyl)benzamido)-1-(3-methoxypropyl)-N-(4-(trifluoromethyl)phenyl)-1H-indole-2-carboxamide (Compound 101);

5-(2-chloro-5-(isobutyramidomethyl)benzamido)-N-(4-fluorophenyl)-1-(3-methoxypropyl)-1H-indole-2-carboxamide (Compound 102);

5-(2-chloro-5-(isobutyramidomethyl)benzamido)-N-(3-chlorophenyl)-1-(3-methoxypropyl)-1H-indole-2-carboxamide (Compound 103);

5-(2-chloro-5-(isobutyramidomethyl)benzamido)-N-(2-chlorophenyl)-1-(3-methoxypropyl)-1H-indole-2-carboxamide (Compound 104);

5-(2-chloro-5-(isobutyramidomethyl)benzamido)-N-(4-cyclohexylphenyl)-1-(3-methoxypropyl)-1H-indole-2-carboxamide (Compound 105);

5-(2-chloro-5-(isobutyramidomethyl)benzamido)-N-(2,4-difluorophenyl)-1-(3-methoxypropyl)-1H-indole-2-carboxamide (Compound 106);

5-(2-chloro-5-(isobutyramidomethyl)benzamido)-N-(2-fluorophenyl)-1-(3-methoxypropyl)-1H-indole-2-carboxamide (Compound 107);

5-(2-chloro-5-(isobutyramidomethyl)benzamido)-N-(3-fluorophenyl)-1-(3-methoxypropyl)-1H-indole-2-carboxamide (Compound 108);

5-(2-chloro-5-(isobutyramidomethyl)benzamido)-N-(3,5-difluorophenyl)-1-(3-methoxypropyl)-1H-indole-2-carboxamide (Compound 109);

5-(2-chloro-5-(isobutyramidomethyl)benzamido)-1-(ethoxymethyl)-N-(4-fluorophenyl)-1H-indole-2-carboxamide (Compound 110) 5-(2-chloro-5-(isobutyramidomethyl)benzamido)-1-(ethoxymethyl)-N-(4-chlorophenyl)-1H-indole-2-carboxamide (Compound 111);

5-(2-chloro-5-(isobutyramidomethyl)benzamido)-N-(3-(trifluoromethoxy)phenyl)-1-(ethoxymethyl)-1H-indole-2-carboxamide (Compound 112);

5-(2-chloro-5-(isobutyramidomethyl)benzamido)-1-(ethoxymethyl)-N-(4-(trifluoromethyl)phenyl)-1H-indole-2-carboxamide (Compound 113);

N-(3-chlorophenyl)-5-(2-chloro-5-(isobutyramidomethyl)benzamido)-1-(ethoxymethyl)-1H-indole-2-carboxamide (Compound 114);

5-(2-chloro-5-(isobutyramidomethyl)benzamido)-N-(3-chloro-4-fluorophenyl)-1-(ethoxymethyl)-1H-indole-2-carboxamide (Compound 115);

5-(2-chloro-5-(isobutyramidomethyl)benzamido)-N-(4-fluorophenyl)-1-(2-methoxyethyl)-1H-indole-2-carboxamide (Compound 116);

5-(2-chloro-5-(isobutyramidomethyl)benzamido)-N-(4-chlorophenyl)-1-(2-methoxyethyl)-1H-indole-2-carboxamide (Compound 117);

5-(2-chloro-5-(isobutyramidomethyl)benzamido)-1-(2-methoxyethyl)-N-(4-(trifluoromethoxy)phenyl)-1H-indole-2-carboxamide (Compound 118);

5-(2-chloro-5-(isobutyramidomethyl)benzamido)-1-(2-methoxyethyl)-N-(3-(trifluoromethoxy)phenyl)-1H-indole-2-carboxamide (Compound 119);

N-(2-chloro-4-fluorophenyl)-5-(2-chloro-5-(isobutyramidomethyl)benzamido)-1-(2-methoxyethyl)-1H-indole-2-carboxamide (Compound 120);

N-(4-chloro-2-fluorophenyl)-5-(2-chloro-5-(isobutyramidomethyl)benzamido)-1-(2-methoxyethyl)-1H-indole-2-carboxamide (Compound 121);

N-(4-chloro-3-fluorophenyl)-5-(2-chloro-5-(isobutyramidomethyl)benzamido)-1-(2-methoxyethyl)-1H-indole-2-carboxamide (Compound 122);

N-(3-chloro-4-fluorophenyl)-5-(2-chloro-5-(isobutyramidomethyl)benzamido)-1-(2-methoxyethyl)-1H-indole-2-carboxamide (Compound 123);

5-(2-chloro-5-(isobutyramidomethyl)benzamido)-N-(3-chloro-5-fluorophenyl)-1-(2-methoxyethyl)-1H-indole-2-carboxamide (Compound 124);

5-(2-chloro-5-(isobutyramidomethyl)benzamido)-N-(3-chlorophenyl)-1-(2-methoxyethyl)-1H-indole-2-carboxamide (Compound 125);

5-(2-chloro-5-(isobutyramidomethyl)benzamido)-N-(4-trifluoromethylphenyl)-1-(2-methoxyethyl)-1H-indole-2-carboxamide (Compound 126);

5-(2-chloro-5-(isobutyramidomethyl)benzamido)-N-(3-trifluoromethylphenyl)-1-(2-methoxyethyl)-1H-indole-2-carboxamide (Compound 127);

5-(2-chloro-5-(isobutyramidomethyl)benzamido)-N-(3-fluorophenyl)-1-(2-methoxyethyl)-1H-indole-2-carboxamide (Compound 128);

5-(2-chloro-5-(isobutyramidomethyl)benzamido)-N-(3-fluoro-5-trifluoromethylphenyl)-1-(2-methoxyethyl)-1H-indole-2-carboxamide (Compound 129);

5-(2-chloro-5-(isobutyramidomethyl)benzamido)-N-(3,4-dichlorophenyl)-1-(2-methoxyethyl)-1H-indole-2-carboxamide (Compound 130);

5-(2-chloro-5-(isobutyramidomethyl)benzamido)-N-(2,4-dichlorophenyl)-1-(2-methoxyethyl)-1H-indole-2-carboxamide (Compound 131);

5-(2-chloro-5-(isobutyramidomethyl)benzamido)-N-(3,5-dichlorophenyl)-1-(2-methoxyethyl)-1H-indole-2-carboxamide (Compound 132);

5-(2-chloro-5-(isobutyramidomethyl)benzamido)-N-(3,4-difluorophenyl)-1-(2-methoxyethyl)-1H-indole-2-carboxamide (Compound 133);

5-(2-chloro-5-(isobutyramidomethyl)benzamido)-1-ethyl-N-(4-(trifluoromethoxy)phenyl)-1H-indole-2-carboxamide (Compound 134);

5-(2-chloro-5-(isobutyramidomethyl)benzamido)-1-ethyl-N-(4-(trifluoromethyl)phenyl)-1H-indole-2-carboxamide (Compound 135);

5-(2-chloro-5-(isobutyramidomethyl)benzamido)-1-ethyl-N-(3-(trifluoromethyl)phenyl)-1H-indole-2-carboxamide (Compound 136);

5-(2-chloro-5-(isobutyramidomethyl)benzamido)-1-ethyl-N-(4-fluorophenyl)-1H-indole-2-carboxamide (Compound 137);

5-(2-chloro-5-(isobutyramidomethyl)benzamido)-N-(4-chlorophenyl)-1-ethyl-1H-indole-2-carboxamide (Compound 138);

5-(2-chloro-5-(isobutyramidomethyl)benzamido)-1-ethyl-N-(3-fluorophenyl)-1H-indole-2-carboxamide (Compound 139);

5-(2-chloro-5-(isobutyramidomethyl)benzamido)-1-ethyl-N-(3-(trifluoromethoxy)phenyl)-1H-indole-2-carboxamide (Compound 140);

5-(2-chloro-5-(isobutyramidomethyl)benzamido)-N-(3-chlorophenyl)-1-ethyl-1H-indole-2-carboxamide (Compound 141);

5-(2-chloro-5-(isobutyramidomethyl)benzamido)-N-(2,4-difluorophenyl)-1-ethyl-1H-indole-2-carboxamide (Compound 142);

5-(2-chloro-5-(isobutyramidomethyl)benzamido)-1-ethyl-N-(4-fluoro-3-(trifluoromethyl)phenyl)-1H-indole-2-carboxamide (Compound 143);

5-(2-chloro-5-(isobutyramidomethyl)benzamido)-1-ethyl-N-(2-fluorophenyl)-1H-indole-2-carboxamide (Compound 144);

N-(3-chloro-4-fluorophenyl)-5-(2-chloro-5-(isobutyramidomethyl)benzamido)-1-ethyl-1H-indole-2-carboxamide (Compound 145);

5-(2-chloro-5-(isobutyramidomethyl)benzamido)-1-ethyl-N-(3-fluoro-5-(trifluoromethyl)phenyl)-1H-indole-2-carboxamide (Compound 146);

5-(2-chloro-5-(isobutyramidomethyl)benzamido)-N-(4-cyanophenyl)-1-ethyl-1H-indole-2-carboxamide (Compound 147);

N-(4-chloro-2-methylphenyl)-5-(2-chloro-5-(isobutyramidomethyl)benzamido)-1-ethyl-1H-indole-2-carboxamide (Compound 148);

N-(4-fluoro-2-methylphenyl)-5-(2-chloro-5-(isobutyramidomethyl)benzamido)-1-ethyl-1H-indole-2-carboxamide (Compound 149);

5-(2-chloro-5-(isobutyramidomethyl)benzamido)-N-(3,5-difluorophenyl)-1-ethyl-1H-indole-2-carboxamide (Compound 150);

5-(2-chloro-5-(isobutyramidomethyl)benzamido)-N-(3-chloro-5-fluorophenyl)-1-ethyl-1H-indole-2-carboxamide (Compound 151);

5-(2-chloro-5-(isobutyramidomethyl)benzamido)-1-ethyl-N-(2-fluoro-4-(trifluoromethyl)phenyl)-1H-indole-2-carboxamide (Compound 152);

N-(4-chloro-3-fluorophenyl)-5-(2-chloro-5-(isobutyramidomethyl)benzamido)-1-ethyl-1H-indole-2-carboxamide (Compound 153);

N-(4-chloro-2-fluorophenyl)-5-(2-chloro-5-(isobutyramidomethyl)benzamido)-1-ethyl-1H-indole-2-carboxamide (Compound 154);

N-(2-chloro-4-fluorophenyl)-5-(2-chloro-5-(isobutyramidomethyl)benzamido)-1-ethyl-1H-indole-2-carboxamide (Compound 155);

5-(2-chloro-5-(isobutyramidomethyl)benzamido)-N-(4-cyclohexylphenyl)-1-ethyl-1H-indole-2-carboxamide (Compound 156);

5-(2-chloro-5-(isobutyramidomethyl)benzamido)-1-propyl-N-(4-(trifluoromethoxy)phenyl)-1H-indole-2-carboxamide (Compound 157);

5-(2-chloro-5-(isobutyramidomethyl)benzamido)-1-propyl-N-(3-(trifluoromethoxy)phenyl)-1H-indole-2-carboxamide (Compound 158);

5-(2-chloro-5-(isobutyramidomethyl)benzamido)-1-propyl-N-(4-(trifluoromethyl)phenyl)-1H-indole-2-carboxamide (Compound 159);

5-(2-chloro-5-(isobutyramidomethyl)benzamido)-1-propyl-N-(3-(trifluoromethyl)phenyl)-1H-indole-2-carboxamide (Compound 160);

5-(2-chloro-5-(isobutyramidomethyl)benzamido)-N-(4-chlorophenyl)-1-propyl-1H-indole-2-carboxamide (Compound 161);

5-(2-chloro-5-(isobutyramidomethyl)benzamido)-N-(3-chlorophenyl)-1-propyl-1H-indole-2-carboxamide (Compound 162);

5-(2-chloro-5-(isobutyramidomethyl)benzamido)-N-(3-chloro-5-fluorophenyl)-1-propyl-1H-indole-2-carboxamide (Compound 163);

N-(3-chloro-4-fluorophenyl)-5-(2-chloro-5-(isobutyramidomethyl)benzamido)-1-propyl-1H-indole-2-carboxamide (Compound 164);

N-(4-chloro-3-fluorophenyl)-5-(2-chloro-5-(isobutyramidomethyl)benzamido)-1-propyl-1H-indole-2-carboxamide (Compound 165);

5-(2-chloro-5-(isobutyramidomethyl)benzamido)-N-(4-fluorophenyl)-1-propyl-1H-indole-2-carboxamide (Compound 166);

5-(2-chloro-5-(isobutyramidomethyl)benzamido)-N-(3-fluorophenyl)-1-propyl-1H-indole-2-carboxamide (Compound 167);

5-(2-chloro-5-(isobutyramidomethyl)benzamido)-N-(4-cyclohexylphenyl)-1-propyl-1H-indole-2-carboxamide (Compound 168);

5-(2-chloro-5-(isobutyramidomethyl)benzamido)-N-(3-fluoro-5-(trifluoromethyl)phenyl)-1-propyl-1H-indole-2-carboxamide (Compound 169);

1-butyl-5-(2-chloro-5-(isobutyramidomethyl)benzamido)-N-(4-fluorophenyl)-1H-indole-2-carboxamide (Compound 170);

1-butyl-5-(2-chloro-5-(isobutyramidomethyl)benzamido)-N-(4-chlorophenyl)-1H-indole-2-carboxamide (Compound 171);

1-butyl-5-(2-chloro-5-(isobutyramidomethyl)benzamido)-N-(4-(trifluoromethoxy)phenyl)-1H-indole-2-carboxamide (Compound 172);

1-butyl-5-(2-chloro-5-(isobutyramidomethyl)benzamido)-N-(3-(trifluoromethoxy)phenyl)-1H-indole-2-carboxamide (Compound 173);

1-butyl-5-(2-chloro-5-(isobutyramidomethyl)benzamido)-N-(4-(trifluoromethyl)phenyl)-1H-indole-2-carboxamide (Compound 174);

1-butyl-5-(2-chloro-5-(isobutyramidomethyl)benzamido)-N-(3-(trifluoromethyl)phenyl)-1H-indole-2-carboxamide (Compound 175);

1-butyl-N-(4-chloro-3-fluorophenyl)-5-(2-chloro-5-(isobutyramidomethyl)benzamido)-1H-indole-2-carboxamide (Compound 176);

1-butyl-N-(3-chloro-4-fluorophenyl)-5-(2-chloro-5-(isobutyramidomethyl)benzamido)-1H-indole-2-carboxamide (Compound 177);

1-butyl-5-(2-chloro-5-(isobutyramidomethyl)benzamido)-N-(3,4-dichlorophenyl)-1H-indole-2-carboxamide (Compound 178);

1-butyl-5-(2-chloro-5-(isobutyramidomethyl)benzamido)-N-(3,4-difluorophenyl)-1H-indole-2-carboxamide (Compound 179);

5-(2-chloro-5-(isobutyramidomethyl)benzamido)-1-isopropyl-N-(4-(trifluoromethoxy)phenyl)-1H-indole-2-carboxamide (Compound 180);

5-(2-chloro-5-(isobutyramidomethyl)benzamido)-1-isopropyl-N-(3-(trifluoromethoxy)phenyl)-1H-indole-2-carboxamide (Compound 181);

5-(2-chloro-5-(isobutyramidomethyl)benzamido)-N-(4-fluorophenyl)-1-isopropyl-1H-indole-2-carboxamide (Compound 182);

5-(2-chloro-5-(isobutyramidomethyl)benzamido)-N-(4-chlorophenyl)-1-isopropyl-1H-indole-2-carboxamide (Compound 183);

5-(2-chloro-5-(isobutyramidomethyl)benzamido)-N-(3-chlorophenyl)-1-isopropyl-1H-indole-2-carboxamide (Compound 184);

5-(2-chloro-5-(isobutyramidomethyl)benzamido)-1-isopropyl-N-(4-(trifluoromethyl)phenyl)-1H-indole-2-carboxamide (Compound 185);

N-(3-chloro-4-fluorophenyl)-5-(2-chloro-5-(isobutyramidomethyl)benzamido)-1-isopropyl-1H-indole-2-carboxamide (Compound 186);

N-(4-chloro-3-fluorophenyl)-5-(2-chloro-5-(isobutyramidomethyl)benzamido)-1-isopropyl-1H-indole-2-carboxamide (Compound 187);

5-(2-chloro-5-(isobutyramidomethyl)benzamido)-1-isopropyl-N-(3-(trifluoromethyl)phenyl)-1H-indole-2-carboxamide (Compound 188);

5-(2-chloro-5-(isobutyramidomethyl)benzamido)-N-(2-chlorophenyl)-1-isopropyl-1H-indole-2-carboxamide (Compound 189);

5-(2-chloro-5-(isobutyramidomethyl)benzamido)-N-(3,4-dichlorophenyl)-1-isopropyl-1H-indole-2-carboxamide (Compound 190);

5-(2-chloro-5-(isobutyramidomethyl)benzamido)-N-(3,5-dichlorophenyl)-1-isopropyl-1H-indole-2-carboxamide (Compound 191);

N-(4-bromophenyl)-5-(2-chloro-5-(isobutyramidomethyl)benzamido)-1-isopropyl-1H-indole-2-carboxamide (Compound 192);

5-(2-chloro-5-(isobutyramidomethyl)benzamido)-N-(4-cyclohexylphenyl)-1-isopropyl-1H-indole-2-carboxamide (Compound 193);

N-(4-(tert-butyl)phenyl)-5-(2-chloro-5-(isobutyramidomethyl)benzamido)-1-isopropyl-1H-indole-2-carboxamide (Compound 194);

5-(2-chloro-5-(isobutyramidomethyl)benzamido)-N-(3-chloro-5-fluorophenyl)-1-isopropyl-1H-indole-2-carboxamide (Compound 195);

5-(2-chloro-5-(isobutyramidomethyl)benzamido)-N-(3,5-difluorophenyl)-1-isopropyl-1H-indole-2-carboxamide (Compound 196);
5-(2-chloro-5-(isobutyramidomethyl)benzamido)-1-isopropyl-N-(4-methoxyphenyl)-1H-indole-2-carboxamide (Compound 197);
5-(2-chloro-5-(isobutyramidomethyl)benzamido)-1-isopropyl-N-(6-(trifluoromethyl) pyridin-3-yl)-1H-indole-2-carboxamide (Compound 198);
5-(2-chloro-5-(isobutyramidomethyl)benzamido)-N-(4-cyanophenyl)-1-isopropyl-1H-indole-2-carboxamide (Compound 199);
N-(4-chloro-2-methylphenyl)-5-(2-chloro-5-(isobutyramidomethyl)benzamido)-1-isopropyl-1H-indole-2-carboxamide (Compound 200);
5-(2-chloro-5-(isobutyramidomethyl)benzamido)-1-isopropyl-N-(5,6,7,8-tetrahydronaphthalen-1-yl)-1H-indole-2-carboxamide (Compound 201);
5-(2-chloro-5-(isobutyramidomethyl)benzamido)-N-(2,4-difluorophenyl)-1-isopropyl-1H-indole-2-carboxamide (Compound 202);
Methyl 4-(5-(2-chloro-5-(isobutyramidomethyl)benzamido)-1-isopropyl-1H-indole-2-carboxamido)benzoate (Compound 203);
4-(5-(2-chloro-5-(isobutyramidomethyl)benzamido)-1-isopropyl-1H-indole-2-carboxamido)benzoic acid (Compound 204);
5-(2-chloro-5-(isobutyramidomethyl)benzamido)-N-(4-fluorophenyl)-1-(2,2,2-trifluoroethyl)-1H-indole-2-carboxamide (Compound 205);
5-(2-chloro-5-(isobutyramidomethyl)benzamido)-N-(4-chlorophenyl)-1-(2,2,2-trifluoroethyl)-1H-indole-2-carboxamide (Compound 206);
5-(2-chloro-5-(isobutyramidomethyl)benzamido)-1-(2,2,2-trifluoroethyl)-N-(4-(trifluoromethyl)phenyl)-1H-indole-2-carboxamide (Compound 207);
5-(2-chloro-5-(isobutyramidomethyl)benzamido)-1-(2,2,2-trifluoroethyl)-N-(3-(trifluoromethyl)phenyl)-1H-indole-2-carboxamide (Compound 208);
5-(2-chloro-5-(isobutyramidomethyl)benzamido)-1-(2,2,2-trifluoroethyl)-N-(4-(trifluoromethoxy)phenyl)-1H-indole-2-carboxamide (Compound 209);
5-(2-chloro-5-(isobutyramidomethyl)benzamido)-1-(2,2,2-trifluoroethyl)-N-(3-(trifluoromethoxy)phenyl)-1H-indole-2-carboxamide (Compound 210);
5-(2-chloro-5-(isobutyramidomethyl)benzamido)-N-(3-chlorophenyl)-1-(2,2,2-trifluoroethyl)-1H-indole-2-carboxamide (Compound 211);
N-(3-chloro-4-fluorophenyl)-5-(2-chloro-5-(isobutyramidomethyl)benzamido)-1-(2,2,2-trifluoroethyl)-1H-indole-2-carboxamide (Compound 212);
N-(4-chloro-3-fluorophenyl)-5-(2-chloro-5-(isobutyramidomethyl)benzamido)-1-(2,2,2-trifluoroethyl)-1H-indole-2-carboxamide (Compound 213);
N-(4-chloro-2-fluorophenyl)-5-(2-chloro-5-(isobutyramidomethyl)benzamido)-1-(2,2,2-trifluoroethyl)-1H-indole-2-carboxamide (Compound 214);
N-(3-chloro-5-fluorophenyl)-5-(2-chloro-5-(isobutyramidomethyl)benzamido)-1-(2,2,2-trifluoroethyl)-1H-indole-2-carboxamide (Compound 215);
N-(3-fluoro-5-trifluoromethylphenyl)-5-(2-chloro-5-(isobutyramidomethyl)benzamido)-1-(2,2,2-trifluoroethyl)-1H-indole-2-carboxamide (Compound 216);
5-(2-chloro-5-(isobutyramidomethyl)benzamido)-N-(4-fluorophenyl)-1-(2,2-difluoroethyl)-1H-indole-2-carboxamide (Compound 217);
5-(2-chloro-5-(isobutyramidomethyl)benzamido)-N-(4-chlorophenyl)-1-(2,2-difluoroethyl)-1H-indole-2-carboxamide (Compound 218);
5-(2-chloro-5-(isobutyramidomethyl)benzamido)-1-(2,2-difluoroethyl)-N-(4-(trifluoromethoxy)phenyl)-1H-indole-2-carboxamide (Compound 219);
5-(2-chloro-5-(isobutyramidomethyl)benzamido)-1-(2,2-difluoroethyl)-N-(4-(trifluoromethyl)phenyl)-1H-indole-2-carboxamide (Compound 220);
N-(2-chloro-4-fluorophenyl)-5-(2-chloro-5-(isobutyramidomethyl)benzamido)-1-(2,2-difluoroethyl)-1H-indole-2-carboxamide (Compound 221);
N-(4-chloro-2-fluorophenyl)-5-(2-chloro-5-(isobutyramidomethyl)benzamido)-1-(2,2-difluoroethyl)-1H-indole-2-carboxamide (Compound 222);
N-(4-chloro-3-fluorophenyl)-5-(2-chloro-5-(isobutyramidomethyl)benzamido)-1-(2,2-difluoroethyl)-1H-indole-2-carboxamide (Compound 223);
N-(3-chloro-4-fluorophenyl)-5-(2-chloro-5-(isobutyramidomethyl)benzamido)-1-(2,2-difluoroethyl)-1H-indole-2-carboxamide (Compound 224);
5-(2-chloro-5-(isobutyramidomethyl)benzamido)-N-(3,4-dichlorophenyl)-1-(2,2-difluoroethyl)-1H-indole-2-carboxamide (Compound 225);
5-(2-chloro-5-(isobutyramidomethyl)benzamido)-1-(2,2-difluoroethyl)-N-(2-fluoro-4-(trifluoromethyl)phenyl)-1H-indole-2-carboxamide (Compound 226);
Methyl 4-(5-(2-chloro-5-(isobutyramidomethyl)benzamido)-1-methyl-1H-indole-2-carboxamido)benzoate (Compound 227);
4-(5-(2-chloro-5-(isobutyramidomethyl)benzamido)-1-methyl-1H-indole-2-carboxamido)benzoic acid (Compound 228);
Sodium 4-(5-(2-chloro-5-(isobutyramidomethyl)benzamido)-1-methyl-1H-indole-2-carboxamido)benzoate (Compound 229);
Methyl 5-(5-(2-chloro-5-(isobutyramidomethyl)benzamido)-1-methyl-1H-indole-2-carboxamido)-2-fluorobenzoate (Compound 230);
5-(5-(2-chloro-5-(isobutyramidomethyl)benzamido)-1-methyl-1H-indole-2-carboxamido)-2-fluorobenzoic acid (Compound 231);
6-(2-chloro-5-(isobutyramidomethyl)benzamido)-N-(4-(trifluoromethoxy)phenyl)-1H-indole-2-carboxamide (Compound 232);
6-(2-chloro-5-(isobutyramidomethyl)benzamido)-N-(4-(trifluoromethyl)phenyl)-1H-indole-2-carboxamide (Compound 233);
6-(2-chloro-5-(isobutyramidomethyl)benzamido)-N-(4-fluorophenyl)-1H-indole-2-carboxamide (Compound 234);
6-(2-chloro-5-(isobutyramidomethyl)benzamido)-N-(3-(trifluoromethoxy)phenyl)-1H-indole-2-carboxamide (Compound 235);
6-(2-chloro-5-(isobutyramidomethyl)benzamido)-N-(3-(trifluoromethyl)phenyl)-1H-indole-2-carboxamide (Compound 236);
6-(2-chloro-5-(isobutyramidomethyl)benzamido)-N-(4-chlorophenyl)-1H-indole-2-carboxamide (Compound 237);
6-(2-chloro-5-(isobutyramidomethyl)benzamido)-N-(3-chlorophenyl)-1H-indole-2-carboxamide (Compound 238);
6-(2-chloro-5-(isobutyramidomethyl)benzamido)-1-methyl-N-(4-(trifluoromethoxy)phenyl)-1H-indole-2-carboxamide (Compound 239);

6-(2-chloro-5-(isobutyramidomethyl)benzamido)-1-methyl-N-(4-(trifluoromethyl)phenyl)-1H-indole-2-carboxamide (Compound 240);

5-(2-chloro-5-(isobutyramidomethyl)benzamido)-1-(3-methoxypropyl)-N-(4-(trifluoromethoxy)benzyl)-1H-indole-2-carboxamide (Compound 241);

5-(2-chloro-5-(isobutyramidomethyl)benzamido)-N-(4-fluoro-3-(trifluoromethyl)benzyl)-1-(3-methoxypropyl)-1H-indole-2-carboxamide (Compound 243); and 5-(2-chloro-5-(isobutyramidomethyl)benzamido)-N-(2-fluoro-4-(trifluoromethyl)benzyl)-1-(3-methoxypropyl)-1H-indole-2-carboxamide (Compound 244).

9. A pharmaceutical composition for inhibiting microsomal prostaglandin $E_2$ synthase-1 (mPGES-1) comprising the indole carboxamide derivative or pharmaceutically acceptable salt thereof according to claim 1 and a pharmaceutically acceptable carrier.

10. The pharmaceutical composition according to claim 9 for treating inflammation, arthritis, high fever, pain, cancer, stroke or Alzheimer's disease.

11. A method for inhibiting microsomal prostaglandin $E_2$ synthase-1 (mPGES-1), comprising administering a composition comprising an effective amount of the indole carboxamide derivative or pharmaceutically acceptable salt thereof according to claim 1 to a subject in need thereof.

12. A method for treating inflammation, arthritis, high fever, pain, cancer, stroke or Alzheimer's disease, comprising administering a composition comprising an effective amount of the indole carboxamide derivative or pharmaceutically acceptable salt thereof according to claim 1 to a subject in need thereof.

* * * * *